(12) United States Patent
Fujisawa

(10) Patent No.: US 10,690,952 B2
(45) Date of Patent: Jun. 23, 2020

(54) LIQUID CRYSTAL DISPLAY ELEMENT

(71) Applicant: DIC Corporation, Tokyo (JP)

(72) Inventor: Toru Fujisawa, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 8 days.

(21) Appl. No.: 15/751,678

(22) PCT Filed: Jul. 26, 2016

(86) PCT No.: PCT/JP2016/071844
§ 371 (c)(1),
(2) Date: Jul. 9, 2018

(87) PCT Pub. No.: WO2017/026272
PCT Pub. Date: Feb. 16, 2017

(65) Prior Publication Data
US 2018/0307070 A1  Oct. 25, 2018

(30) Foreign Application Priority Data

Aug. 11, 2015 (JP) .................................. 2015-158943

(51) Int. Cl.
*G02F 1/1333* (2006.01)
*G02F 1/1334* (2006.01)
*C09K 19/24* (2006.01)
*C09K 19/30* (2006.01)
*C09K 19/14* (2006.01)
*C09K 19/54* (2006.01)
*G02F 1/1337* (2006.01)
*C09K 19/20* (2006.01)
*G02F 1/1335* (2006.01)
*G02F 1/1343* (2006.01)
*C09K 19/12* (2006.01)
*C09K 19/04* (2006.01)
*G02F 1/13357* (2006.01)

(52) U.S. Cl.
CPC ............ *G02F 1/1334* (2013.01); *C09K 19/14* (2013.01); *C09K 19/2014* (2013.01); *C09K 19/24* (2013.01); *C09K 19/3066* (2013.01); *C09K 19/54* (2013.01); *C09K 19/542* (2013.01); *G02F 1/1337* (2013.01); *G02F 1/1343* (2013.01); *G02F 1/133514* (2013.01); *G02F 1/133528* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *C09K 2019/548* (2013.01); *G02F 1/133707* (2013.01); *G02F 1/133788* (2013.01); *G02F 2001/133622* (2013.01); *G02F 2001/134372* (2013.01); *G02F 2001/134381* (2013.01)

(58) Field of Classification Search
CPC .... C09K 19/24; C09K 19/3006; C09K 19/14; C09K 19/54; C09K 19/2015; C09K 19/542; C09K 2019/3016; C09K 2019/122; C09K 2019/3009; C09K 2019/301; C09K 2019/3027; C09K 2019/3004; C09K 2019/123; C09K 2019/0448; C09K 2019/548; G02F 1/1333; G02F 1/1334; G02F 1/1337; G02F 1/133514; G02F 1/133528; G02F 1/1343; G02F 1/133788; G02F 1/133707; G02F 2001/134381; G02F 2001/133622; G02F 2001/134372
USPC .................................................... 252/299.01
See application file for complete search history.

(56) References Cited

U.S. PATENT DOCUMENTS

| | | |
|---|---|---|
| 2006/0158589 A1 | 7/2006 | Nishi et al. |
| 2006/0209240 A1 | 9/2006 | Kataoka |
| 2011/0255048 A1 | 10/2011 | Goetz et al. |
| 2012/0069289 A1 | 3/2012 | Taugerbeck et al. |

(Continued)

FOREIGN PATENT DOCUMENTS

| | | |
|---|---|---|
| CN | 104730752 A | 6/2015 |
| JP | H06-160814 A | 6/1994 |

(Continued)

OTHER PUBLICATIONS

International Search Report dated Oct. 25, 2016, issued in counterpart application No. PCT/JP2016/073423. (2 pages).

(Continued)

*Primary Examiner* — Geraldina Visconti
(74) *Attorney, Agent, or Firm* — Westerman, Hattori, Daniels & Adrian, LLP

(57) ABSTRACT

The liquid crystal display element includes: two transparent substrates, at least one of the two transparent substrates having an electrode; a liquid crystal composition sandwiched between the two transparent substrates and containing one or two or more liquid crystal compounds; and a copolymer included in the liquid crystal composition, the copolymer being a cured product of a polymerizable composition that contains two or more polymerizable compounds. The polymerizable compounds used include one or two or more polymerizable, photo-alignable compounds (Vn), and the content of the polymerizable composition is 1% by mass or more and less than 40% by mass based on the total weight of the polymerizable composition and the liquid crystal composition. The liquid crystal display element of the present invention is applicable to various operational modes such as TN, STN, ECB, VA, VA-TN, IPS, FFS, π cell, OCB, and cholesteric liquid crystal modes.

12 Claims, 12 Drawing Sheets

(56) References Cited

U.S. PATENT DOCUMENTS

| | | |
|---|---|---|
| 2012/0256124 A1 | 10/2012 | Ohgiri et al. |
| 2013/0114034 A1 | 5/2013 | Archetti et al. |
| 2013/0119311 A1 | 5/2013 | Jansen et al. |
| 2013/0242234 A1 | 9/2013 | Guo et al. |
| 2014/0002781 A1 | 1/2014 | Chien et al. |
| 2016/0363794 A1 | 12/2016 | Zhou et al. |
| 2017/0045765 A1 | 2/2017 | Fujisawa et al. |
| 2018/0307069 A1* | 10/2018 | Kodera .................. C08F 20/30 |

FOREIGN PATENT DOCUMENTS

| | | |
|---|---|---|
| JP | 2002-31821 A | 1/2002 |
| JP | 2006-145992 A | 6/2006 |
| JP | 2006-188668 A | 7/2006 |
| JP | 2012-513482 A | 6/2012 |
| JP | 2012-219270 A | 11/2012 |
| JP | 2012-527495 A | 11/2012 |
| JP | 2013-536271 A | 9/2013 |
| JP | 2013-538249 A | 10/2013 |
| JP | 2014-526715 A | 10/2014 |
| JP | 2015-75492 A | 4/2015 |
| JP | 2015-99344 A | 5/2015 |
| WO | 2015/122457 A1 | 8/2015 |

OTHER PUBLICATIONS

Written Opinion dated Oct. 25, 2016, issued in counterpart application No. PCT/JP2016/073423, with English translation. (23 pages).

* cited by examiner

Light: Polymer

Dark: Liquid crystal

Thin black lines represent polymer-to-polymer gaps ():Liquid crystal molecules in OFF state
():Liquid crystal molecules in ON state Alignment direction
(parallel alignment)

LIQUID CRYSTAL DISPLAY ELEMENT

TECHNICAL FIELD

The present invention relates to a liquid crystal display element.

BACKGROUND ART

A field sequential full-color display system that requires no color filter is characterized in that a backlight that flashes "red, green, and blue" in sequence is used. The frame time of ordinary CRTs and liquid crystal displays is 16.7 ms. However, the frame time of the field sequential full-color display system is 5.6 ms, and fast responsiveness is required for the field sequential full-color display system.

One indicator of the fast responsiveness is the sum of τd and τr. Here, τd is the decay response time of the liquid crystal, and τr is the rise response time of the liquid crystal. To achieve the fast responsiveness in the field sequential full color display system, it is desired that the sum of τd and τr is less than 1.5 ms.

Currently, in the marketplace, liquid crystal materials called nematic liquid crystals are commonly used for flat panel displays of TV sets, monitors, mobile phones, smart phones, tablet terminals, etc. However, the nematic liquid crystals have a slow response speed of from ten-odd milliseconds to several milliseconds, and it is therefore desired to improve the response speed. Since the response speed of a liquid crystal is largely influenced by the rotational viscosity γ1 of the liquid crystal and its elastic constants, it has been attempted to improve the response speed by developing novel compounds and optimizing their chemical composition, but the progress of the improvement has slowed. In contract, ferroelectric liquid crystals (FLCs) using smectic liquid crystals are capable of fast response on the order of several hundreds of microseconds. However, since the ferroelectric liquid crystals have only two states, i.e., bright and dark states, halftone display necessary for full-color display is not easily obtained, and an area coverage modulation method, for example, is used.

Among the FLCs, a polymer stabilized V-shaped-FLC (PSV-FLC) element composed of a mixture of an FLC and a monomer includes a fine polymer network formed in the ferroelectric liquid crystal and not only has fast responsiveness, which is a feature of the FLC, but also is capable of halftone display. Moreover, the PSV-FLC shows improved impact resistance as compared with conventional FLCs (see, for example, PTL 1).

In a composite material of a nematic liquid crystal and a polymer, when a polymerizable compound is added to the nematic liquid crystal medium in an amount of 70% by mass or more, a fast response on the order to several tens of microseconds is obtained. However, the driving voltage of the element exceeds about 80 V, and the element is not suitable for practical use. Moreover, the effective birefringence of the element is lower than that of the liquid crystal used by at least one order of magnitude, and this causes a reduction in transmittance of the element. In previously proposed PS (polymer-stabilized) and PSA (polymer-sustained alignment) displays (see, for example, PTL 2 to PTL 6), at least one polymerizable compound is added to a liquid crystal medium in an amount of 0.3% by mass or more and less than 1% by mass, and then the polymerizable compound is subjected to ultraviolet photopolymerization while a voltage is applied or no voltage is applied. In this case, fine protrusions obtained by cross-linking or polymerization are famed at the interface between the liquid crystal medium and a glass substrate to thereby induce mainly a pretilt. However, there is room for improvement in terms of fast responsiveness of these devices. In particular, to increase the rise rate of a liquid crystal display device to achieve fast response, various techniques have been practically used such as reducing the viscosity of the liquid crystal composition, increasing its dielectric constant, reducing its elastic constants, imparting a pretilt angle, and improving a driving method such as an overdrive method. However, as for the decay rate, no effective technique other than reducing the viscosity of the liquid crystal composition has been found at present, and there is a need for improvement in the decay rate.

CITATION LIST

Patent Literature

PTL 1: Japanese Unexamined Patent Application Publication No. 2002-31821
PTL 2: Japanese Unexamined Patent Application Publication (Translation of PCT Application) No. 2013-536271
PTL 3: Japanese Unexamined Patent Application Publication (Translation of PCT Application) No. 2013-538249
PTL 4: Japanese Unexamined Patent Application Publication (Translation of PCT Application) No. 2012-527495
PTL 5: Japanese Unexamined Patent Application Publication (Translation of PCT Application) No. 2012-513482
PTL 6: Japanese Unexamined Patent Application Publication No. 2012-219270

SUMMARY OF INVENTION

Technical Problem

It is an object of the present invention to provide a liquid crystal display element having a high transmittance and fast responsiveness. This is achieved by preventing an increase in driving voltage, preventing a reduction in birefringence, and improving the transmittance and the decay rate of the liquid crystal.

Solution to Problem

The present inventor has focused attention on the use of a polymerizable, photo-alignable compound for a liquid crystal composition and for a polymerizable composition containing a polymerizable compound for the purpose of achieving fast response and improved transmittance by forming, over the entire liquid crystal cell, a polymer network having refractive index anisotropy, an alignment function, and a high degree of orientational order. Thus, the present invention has been completed.

[1] A liquid crystal display element comprising: two transparent substrates, at least one of the two transparent substrates being provided with an electrode; a liquid crystal composition sandwiched between the two transparent substrates and containing one or two or more liquid crystal compounds; and a copolymer included in the liquid crystal composition, the copolymer being a cured product of a polymerizable composition that contains two or more polymerizable compounds, wherein the polymerizable compounds used comprise one or two or more polymerizable, photo-alignable compounds (Vn), and wherein the content of the polymerizable composition is 1% by mass or more and less than 40% by mass based on the total weight of the polymerizable composition and the liquid crystal composition.

[2] The liquid crystal display element according to [1], wherein the copolymer in the liquid crystal composition forms a polymer network, and wherein the liquid crystal display element further comprises alignment layers that are disposed on the respective transparent substrates and used to align the liquid crystal composition.

[3] The liquid crystal display element according to [2], wherein the polymer network has uniaxial refractive index anisotropy, and wherein an optical axis direction or an easy alignment axis direction of the polymer network matches an easy alignment axis direction of the liquid crystal composition.

[4] The liquid crystal display element according to any one of [1] to [3], wherein the liquid crystal composition has a pretilt angle of 0 to 90° with respect to a direction normal to the transparent substrates.

[5] The liquid crystal display element according to any one of [2] to [4], wherein the polymer network forms a layer having a thickness of at least 0.5% of the thickness of a cell in a cross-sectional direction of the cell.

[6] The liquid crystal display element according to any one of [2] to [5], wherein an optical axis direction or an easy alignment axis direction of the polymer network forms a pretilt angle of 0.1 to 30.0° with respect to a direction normal or horizontal to the transparent substrates.

[7] The liquid crystal display element according to any one of [1] to [6], wherein the one or two or more polymerizable, photo-alignable compounds (Vn) used comprise one or two or more selected from polymerizable, photo-alignable compounds represented by the following general formula (Vn-1):

[Chem. 1]

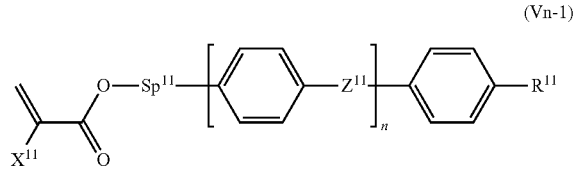

(Vn-1)

(wherein $X^{11}$ represents a hydrogen atom or a methyl group;

$Sp^{11}$ represents a single bond, an alkylene group having 1 to 12 carbon atoms, or —O—$(CH_2)_{s2}$— (wherein s1 represents an integer of 1 to 11, and the oxygen atom in —O—$(CH_2)_{s1}$— is bonded to an aromatic ring);

n represents an integer of 1 to 3;

$Z^{11}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —C≡C—, a single bond, —CY$^1$=CY$^2$— (wherein Y$^1$ and Y$^2$ each independently represent a hydrogen atom or a fluorine atom), —CH=N—, —N=CH—, or —N=N—; when a plurality of $Z^{11}$s are present, they may be the same or different, but at least one $Z^{11}$ is —CH=CH—, —CH=N—, —N=CH—, or —N=N—; and $R^{11}$ represents a hydrogen atom, a fluorine atom, a chlorine atom, a bromine atom, an iodine atom, a pentafluorosulfuranyl group, a cyano group, a nitro group, an isocyano group, a thioisocyano group, a linear or branched alkyl group which has 1 to 12 carbon atoms and in which one —CH$_2$— group or at least two nonadjacent —CH$_2$— groups are each independently optionally substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, or a group represented by formula (Vn-1-1):

[Chem. 2]

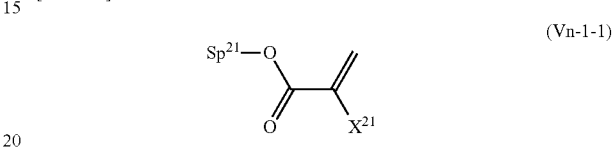

(Vn-1-1)

(wherein, in formula (Vn-1-1), $X^{21}$ represents a hydrogen atom or a methyl group; $Sp^{21}$ represents a single bond, an alkylene group having 1 to 12 carbon atoms, or —O—$(CH_2)_{s2}$— (wherein s2 represents an integer of 1 to 11, and the oxygen atom in —O—$(CH_2)_{s2}$— is bonded to an aromatic ring)), wherein, in each 1,4-phenylene group present in formula (Vn-1), any hydrogen atom is optionally substituted with a fluorine atom, a fluorinated methyl group, a fluorinated methoxy group, an alkyl group having 1 or 2 carbon atoms, or the group represented by formula (Vn-1-1), and wherein, when a plurality of $X^{21}$s and $Sp^{21}$s are present, they may be the same or different).

[8] The liquid crystal display element according to [7], wherein the one or two or more polymerizable, photo-alignable compounds represented by general formula (Vn-1) are used in an amount of 0.005% by mass or more and less than 1.0% by mass based on the total amount of the polymerizable compounds comprising the one or two or more polymerizable, photo-alignable compounds and the liquid crystal composition.

[9] The liquid crystal display element according to any one of [1] to [8], wherein the polymerizable compounds comprise one or two or more compounds selected from compounds represented by the following general formula (P):

[Chem. 3]

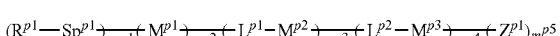

(P)

(wherein $Z^{p1}$ represents a fluorine atom, a cyano group, a hydrogen atom, an alkyl group which has 1 to 15 carbon atoms and in which any hydrogen atom is optionally substituted with a halogen atom, an alkoxy group which has 1 to 15 carbon atoms and in which any hydrogen atom is optionally substituted with a halogen atom, an alkenyl group which has 1 to 15 carbon atoms and in which any hydrogen atom is optionally substituted with a halogen atom, an alkenyloxy group which has 1 to 15 carbon atoms and in which any hydrogen atom is optionally substituted with a halogen atom, or -Sp$^{p2}$-R$^{p2}$;

$R^{p1}$ and $R^{p2}$ each independently represent any of the following formulas (R-I) to (R-IX):

[Chem. 4]

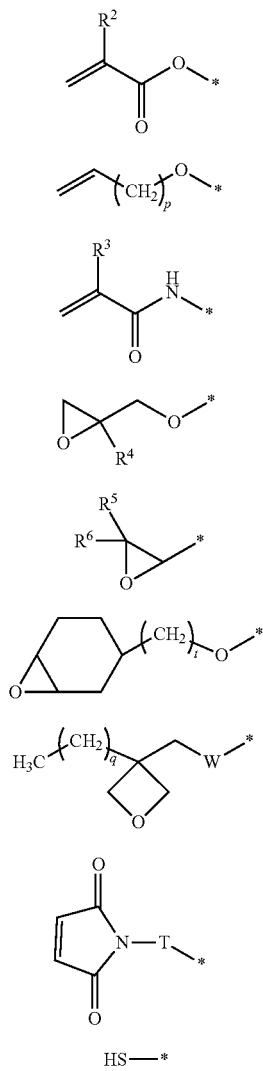

(R-I)

(R-II)

(R-III)

(R-IV)

(R-V)

(R-VI)

(R-VII)

(R-VIII)

(R-IX)

HS—* wherein, in formulas (R-I) to (R-IX), $R^2$ to $R^6$ are each independently a hydrogen atom, an alkyl group having 1 to 5 carbon atoms, or a halogenated alkyl group having 1 to 5 carbon atoms; W is a single bond, —O—, or a methylene group; T is a single bond or —COO—; and p, t, and q are each independently 0, 1, or 2, wherein $Sp^{p1}$ and $Sp^{p2}$ each represent a spacer group, and $Sp^{p1}$ and $Sp^{p2}$ each independently represent a single bond, an alkylene group having 1 to 12 carbon atoms, or —O—$(CH_2)_s$— (wherein s is an integer from 1 to 11, and the oxygen atom in —O—$(CH_2)_s$— is bonded to an aromatic ring), wherein $L^{p1}$ and $L^{p2}$ each independently represent a single bond, —O—, —S—, —$CH_2$—, —$OCH_2$—, —$CH_2O$—, —CO—, —$C_2H_4$—, —COO—, —OCO—, —$OCOOCH_2$—, —$CH_2OCOO$—, —$OCH_2CH_2O$—, —CO—$NR^a$—, —$NR^a$—CO—, —$SCH_2$—, —$CH_2S$—, —CH=$CR^a$—COO—, —CH=$CR^a$—OCO—, —COO—$CR^a$=CH—, —OCO—$CR^a$=CH—, —COO—$CR^a$=CH—COO—, —COO—$CR^a$=CH—OCO—, —OCO—$CR^a$=CH—COO—, —OCO—$CR^a$=CH—OCO—, —$(CH_2)_z$—C(=O)—O—, —$(CH_2)_z$—O—(C=O)—, —O—(C=O)—$(CH_2)_z$—, —(C=O)—O—$(CH_2)_z$—, —CH=CH—, —CF=CF—, —CF=CH—, —CH=CF—, —$CF_2$—, —$CF_2O$—, —$OCF_2$—, —$CF_2CH_2$—, —$CH_2CF_2$—, —$CF_2CF_2$—, or —C≡C— (wherein each Ra independently represents a hydrogen atom or an alkyl group having 1 to 4 carbon atoms, and z represents an integer of 1 to 4), wherein $M^{p2}$ represents a 1,4-phenylene group, a 1,4-cyclohexylene group, an anthracene-2,6-diyl group, a phenanthrene-2,7-diyl group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, and $M^{p2}$ may be unsubstituted or substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen atom, a cyano group, a nitro group, or —$R^{p1}$, wherein $M^{p1}$ represents any of the following formulas (i-11) to (ix-11):

[Chem. 5]

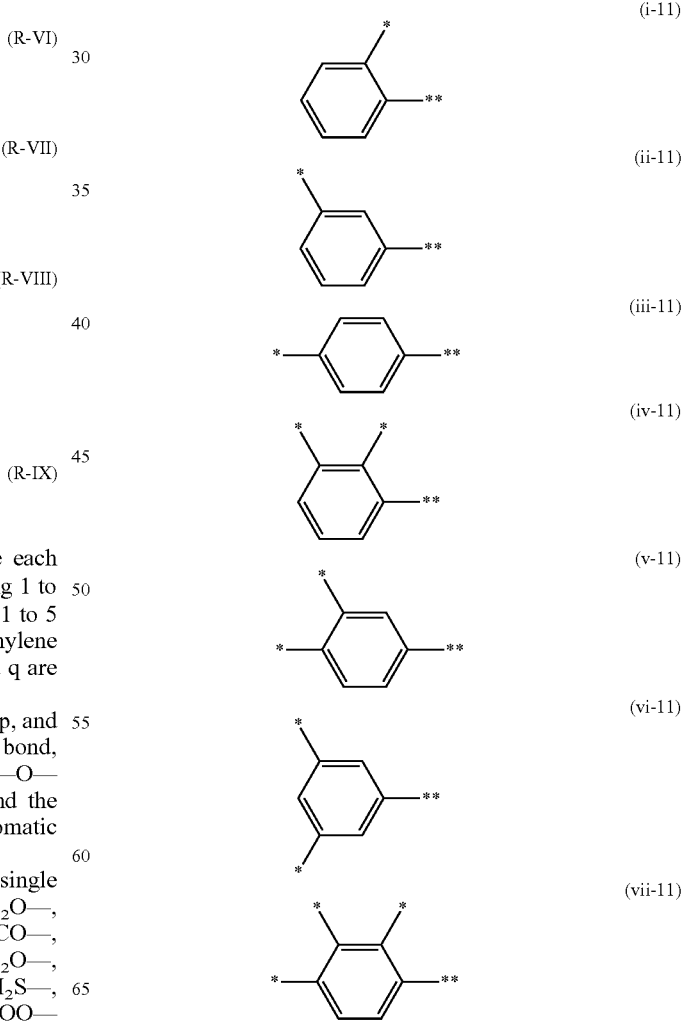

(viii-11)

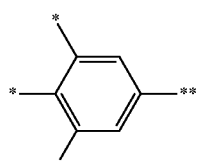

(ix-11)

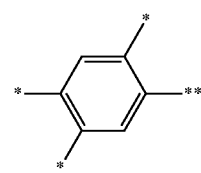

(wherein * represents a bond to Sp$^{p1}$, and ** represents a bond to L$^{p1}$ or L$^{p2}$), wherein M$^{p3}$ represents any of the following formulas (i-13) to (ix-13):

[Chem. 6]

(i-13)

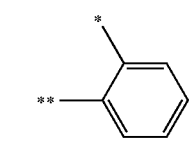

(ii-13)

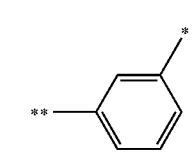

(iii-13)

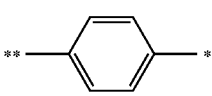

(iv-13)

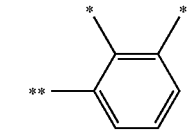

(v-13)

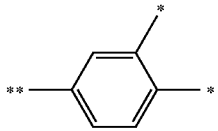

(vi-13)

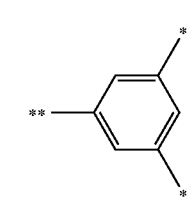

(vii-13)

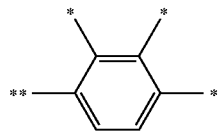

(viii-13)

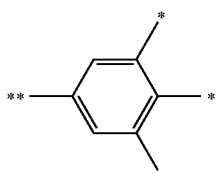

(ix-13)

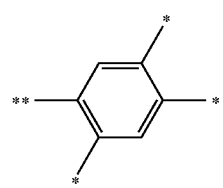

(wherein * represents a bond to Z$^{p1}$, and ** represents a bond to L$^{p2}$), and wherein m$^{p2}$ to m$^{p4}$ each independently represent 0, 1, 2, or 3; m$^{p1}$ and m$^{p5}$ each independently represent 1, 2, or 3; when a plurality of Z$^P$ s are present, they may be the same or different; when a plurality of R$^{p1}$s are present, they may be the same or different; when a plurality of R$^{p2}$s are present, they may be the same or different; when a plurality of Sp$^{p1}$s are present, they may be the same or different; when a plurality of Sp$^{p2}$s are present, they may be the same or different; when a plurality of L$^{p1}$s are present, they may be the same or different; and when a plurality of M$^{p2}$s are present, they may be the same or different).

[10] The liquid crystal display element according to any one of [1] to [9], wherein the liquid crystal composition contains a liquid crystal compound represented by the following general formula (LC):

[Chem. 7]

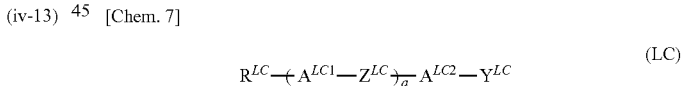

(LC)

(wherein, in general formula (LC), R$^{LC}$ represents an alkyl group having 1 to 15 carbon atoms; one or two or more CH$_2$ groups in the alkyl group are each optionally substituted with —O—, —CH=CH—, —CO—, —OCO—, —COO—, or —C≡C—, provided that no oxygen atoms are directly adjacent to each other; one or two or more hydrogen atoms in the alkyl group are each optionally substituted with a halogen atom; A$^{LC1}$ and A$^{LC2}$ each independently represent a group selected from the group consisting of a group (a), a group (b), and a group (c) below:

(a) a trans-1,4-cyclohexylene group (one CH$_2$ group or two or more non-adjacent CH$_2$ groups present in the trans-1,4-cyclohexylene group are each optionally substituted with an oxygen atom or a sulfur atom), (b) a 1,4-phenylene group (one CH group or two or more non-adjacent CH groups present in the 1,4-phenylene group are each optionally substituted with a nitrogen atom), and (c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chroman-2,6-diyl group;

wherein one or two or more hydrogen atoms contained in each of the group (a), the group (b), and the group (c) are each optionally substituted with a fluorine atom, a chlorine atom, —CF$_3$, or —OCF$_3$, wherein Z$^{LC}$ represents a single bond, —CH=CH—, —CF=CF—, —C≡C—, —CH$_2$CH$_2$—, —(CH$_2$)$_4$—, —OCH$_2$—, —CH$_2$O—, —OCF$_2$—, —CF$_2$O—, —COO—, or —OCO—, wherein Y$^{LC}$ represents a hydrogen atom, a fluorine atom, a chlorine atom, a cyano group, or an alkyl group having 1 to 15 carbon atoms; one or two or more CH$_2$ groups in the alkyl group are each optionally substituted with —O—, —CH=CH—, —CO—, —OCO—, —COO—, —C≡C—, —CF$_2$O—, or —OCF$_2$—, provided that no oxygen atoms are directly adjacent to each other; and one or two or more hydrogen atoms in the alkyl group are each optionally substituted with a halogen atom, and wherein a represents an integer of 1 to 4; when a is 2, 3, or 4 and a plurality of A$^{LC1}$s are present in general formula (LC), the plurality of A$^{LC1}$s may be the same or different; and when a is 2, 3, or 4 and a plurality of Z$^{LC}$s are present, the plurality of Z$^{LC}$s may be the same or different).

[11] The liquid crystal display element according to any one of [1] to [10], wherein the liquid crystal display element has a VA mode, IPS mode, FFS mode, VA-TN mode, TN mode, or ECB mode cell structure.

[12] A liquid crystal display element comprising: two transparent substrates, at least one of the two transparent substrates being provided with an electrode; a liquid crystal composition sandwiched between the two transparent substrates and containing one or two or more liquid crystal compounds; and a copolymer included in the liquid crystal composition, the copolymer being a cured product of a polymerizable composition that contains two or more polymerizable compounds, wherein the polymerizable compounds used comprise one or two or more polymerizable, photo-alignable compounds (Vn), wherein the content of the polymerizable composition in a composition comprising the polymerizable composition and the liquid crystal composition is 1% by mass or more and less than 40% by mass based on the total weight of the polymerizable composition and the liquid crystal composition, and wherein the polymerizable compounds in the composition are polymerized by irradiation with energy rays.

[13] The liquid crystal display element according to [12], wherein the polymerizable compounds in the composition are polymerized by irradiation with the energy rays at a temperature of −50° C. to 30° C.

[14] The liquid crystal display element according to [12] or [13], wherein the polymerizable compounds in the composition are polymerized by irradiation with the energy rays while a voltage is applied such that a pretilt angle with respect to a direction normal or horizontal to the transparent substrates before irradiation with the energy rays is 0.1 to 300

Advantageous Effects of Invention

The present invention can provide a liquid crystal display element having a high transmittance and fast responsiveness. This is achieved by preventing an increase in driving voltage, preventing a reduction in birefringence, and improving the transmittance and the decay rate of the liquid crystal.

DESCRIPTION OF EMBODIMENTS

Figure 1:
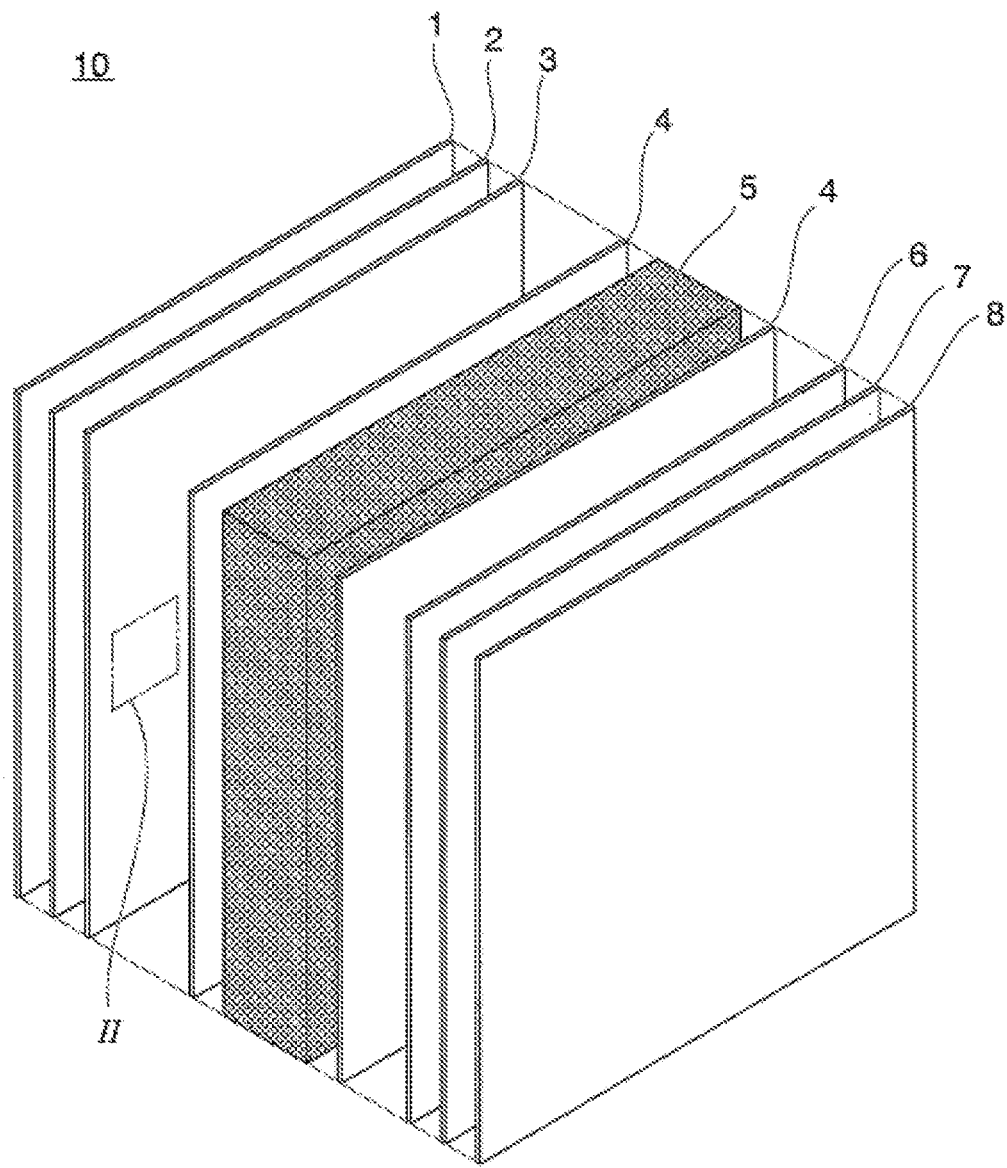
FIG. 1 is a schematic illustration of a liquid crystal display element.

<Liquid Crystal Composition>
[Liquid Crystal Compound]
Preferably, a liquid crystal composition used in the present invention contains a liquid crystal compound represented by general formula (LC).

[Chem. 8]

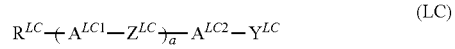

(LC)

In general formula (LC), R$^{LC}$ represents an alkyl group having 1 to 15 carbon atoms. One or two or more CH$_2$ groups in the alkyl group are each optionally substituted with —O—, —CH=CH—, —CO—, —OCO—, —COO—, or —C≡C—, provided that no oxygen atoms are directly adjacent to each other. One or two or more hydrogen atoms in the alkyl group are each optionally substituted with a halogen atom. The alkyl group represented by R$^{LC}$ may be a branched chain group or a linear chain group and is preferably a linear chain group.

In general formula (LC), $A^{LC1}$ and $A^{LC2}$ each independently represent a group selected from the group consisting of a group (a), a group (b), and a group (c):

(a) a trans-1,4-cyclohexylene group (one $CH_2$ group or two or more non-adjacent $CH_2$ groups present in the trans-1,4-cyclohexylene group are each optionally substituted with an oxygen atom or a sulfur atom), (b) a 1,4-phenylene group (one CH group or two or more non-adjacent CH groups present in the 1,4-phenylene group are each optionally substituted with a nitrogen atom), and (c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chroman-2,6-diyl group.

One or two or more hydrogen atoms in each of the group (a), the group (b), and the group (c) are each optionally substituted with a fluorine atom, a chlorine atom, —$CF_3$, or —$OCF_3$.

In general formula (LC), $Z^{LC}$ represents a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—.

In general formula (LC), $Y^{LC}$ represents a hydrogen atom, a fluorine atom, a chlorine atom, a cyano group, or an alkyl group having 1 to 15 carbon atoms. One or two or more $CH_2$ groups in the alkyl group are each optionally substituted with —O—, —CH=CH—, —CO—, —OCO—, —COO—, —C≡C—, —$CF_2O$—, or —$OCF_2$—, provided that no oxygen atoms are directly adjacent to each other. One or two or more hydrogen atoms in the alkyl group are each optionally substituted with a halogen atom.

In general formula (LC), a represents an integer of 1 to 4. When a is 2, 3, or 4 and a plurality of $A^{LC1}$s are present in general formula (LC), the plurality of $A^{LC1}$s may be the same or different. When a is 2, 3, or 4 and a plurality of $Z^{LC}$s are present, the plurality of $Z^{LC}$s may be the same or different.

Preferably, the compound represented by general formula (LC) above comprises one or two or more compounds selected from the group consisting of compounds represented by general formulas (LC1) and (LC2) below.

[Chem. 9]

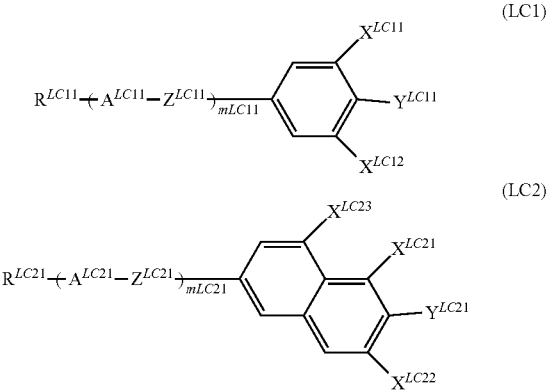

In general formulas (LC1) and (LC2), $R^{LC11}$ and $R^{LC21}$ each independently represent an alkyl group having 1 to 15 carbon atoms. One or two or more $CH_2$ groups in the alkyl group are each optionally substituted with —O—, —CH=CH—, —CO—, —OCO—, —COO—, or —C≡C—, provided that no oxygen atoms are directly adjacent to each other. One or two or more hydrogen atoms in the alkyl group are each optionally substituted with a halogen atom. In the compounds represented by general formulas (LC1) and (LC2), $R^{LC11}$ and $R^{LC21}$ are each independently preferably an alkyl group having 1 to 7 carbon atoms, an alkoxy group having 1 to 7 carbon atoms, or an alkenyl group having 2 to 7 carbon atoms, more preferably an alkyl group having 1 to 5 carbon atoms, an alkoxy group having 1 to 5 carbon atoms, or an alkenyl group having 2 to 5 carbon atoms, and still more preferably linear. Most preferably, the alkenyl group has any of the following structures:

[Chem. 10]

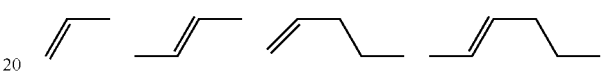

(wherein the right end of each structure is bonded to a ring structure).

In general formulas (LC1) and (LC2), $A^{LC11}$ and $A^{LC21}$ each independently represent any of the following structures. In these structures, one or two or more $CH_2$ groups in the cyclohexylene group are each optionally substituted with an oxygen atom, and one or two or more CH groups in the 1,4-phenylene group are each optionally substituted with a nitrogen atom. In each of these structures, one or two or more hydrogen atoms are each optionally substituted with a fluorine atom, a chlorine atom, —$CF_3$, or —$OCF_3$.

[Chem. 11]

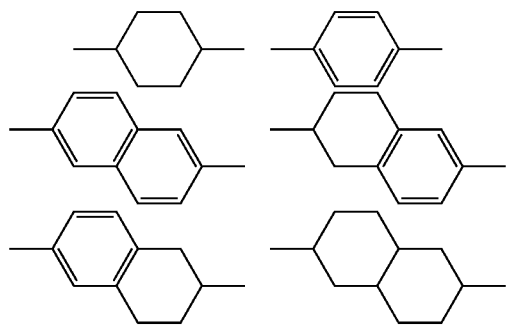

In the compounds represented by general formulas (LC1) and (LC2), $A^{LC11}$ and $A^{LC21}$ are each independently preferably any of the following structures.

[Chem. 12]

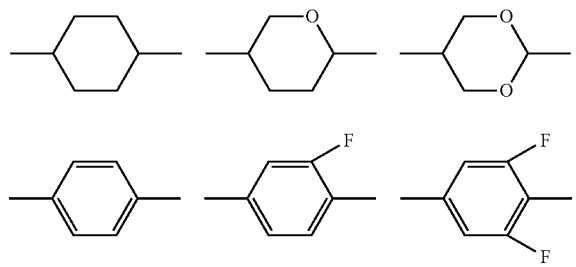

In general formulas (LC1) and (LC2), $X^{LC11}$, $X^{LC12}$, and $X^{LC21}$ to $X^{LC23}$ each independently represent a hydrogen atom, a chlorine atom, a fluorine atom, —$CF_3$, or —$OCF_3$, and $Y^{LC11}$ and $Y^{LC21}$ each independently represent a hydrogen atom, a chlorine atom, a fluorine atom, a cyano group, —$CF_3$, —$OCH_2F$, —$OCHF_2$, or —$OCF_3$. In the compounds represented by general formulas (LC1) and (LC2), $Y^{LC11}$ and $Y^{LC21}$ are each independently preferably a fluorine atom, a cyano group, —$CF_3$, or —$OCF_3$, more preferably a fluorine atom or —$OCF_3$, and particularly preferably a fluorine atom.

In general formulas (LC1) and (LC2), $Z^{LC11}$ and $Z^{LC21}$ each independently represent a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—. In the compounds represented by general formulas (LC1) and (LC2), $Z^{LC11}$ and $Z^{LC21}$ are each independently preferably a single bond, —$CH_2CH_2$—, —COO—, —OCO—, —$OCH_2$—, —$CH_2O$—, —$OCF_2$—, or —$CF_2O$—, more preferably a single bond, —$CH_2CH_2$—, —$OCH_2$—, —$OCF_2$—, or —$CF_2O$—, and still more preferably a single bond, —$OCH_2$—, or —$CF_2O$—.

In general formulas (LC1) and (LC2), $m^{LC11}$ and $m^{LC21}$ each independently represent an integer of 1 to 4. In the compounds represented by general formulas (LC1) and (LC2), $m^{LC11}$ and $m^{LC21}$ are each independently preferably 1, 2, or 3, more preferably 1 or 2 when importance is attached to storage stability at low temperature and response speed, and more preferably 2 or 3 in order to improve the upper limit value of nematic phase upper-limit temperature. In general formulas (LC1) and (LC2), when a plurality of $A^{LC11}$s, $A^{LC21}$s, $Z^{LC11}$s, and $Z^{LC21}$s are present, they may be the same or different.

Preferably, the compound represented by general formula (LC1) comprises one or two or more compounds selected from the group consisting of compounds represented by general formulas (LC1-a) to (LC1-c) below.

[Chem. 13]

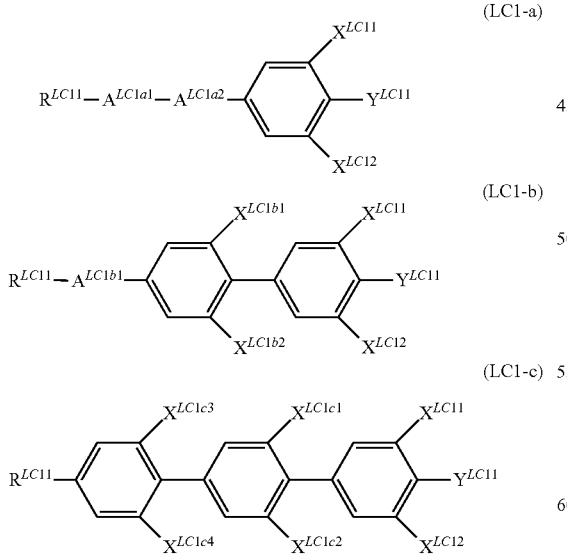

In general formulas (LC1-a) to (LC1-c), $R^{LC11}$, $Y^{LC11}$, $X^{LC11}$, and $X^{LC12}$ independently have the same meaning as $R^{LC11}$, $Y^{LC11}$, $X^{LC11}$, and $X^{LC12}$, respectively, in general formula (LC1) above. In the compounds represented by general formulas (LC1-a) to (LC1-c), each $R^{LC11}$ is independently preferably an alkyl group having 1 to 7 carbon atoms, an alkoxy group having 1 to 7 carbon atoms, or an alkenyl group having 2 to 7 carbon atoms and more preferably an alkyl group having 1 to 5 carbon atoms, an alkoxy group having 1 to 5 carbon atoms, or an alkenyl group having 2 to 5 carbon atoms. $X^{LC11}$ and $X^{LC12}$ are each independently preferably a hydrogen atom or a fluorine atom, and each $Y^{LC11}$ is independently preferably a fluorine atom, —$CF_3$, or —$OCF_3$.

In general formulas (LC1-a) to (LC1-c), $A^{LC1a1}$, $A^{LC1a2}$ and $A^{LC1b1}$ each represent a trans-1,4-cyclohexylene group, a tetrahydropyran-2,5-diyl group, or a 1,3-dioxane-2,5-diyl group. In general formulas (LC1-a) to (LC1-c), $X^{LC1b1}$, $X^{LC1b2}$, and $X^{LC1c1}$ to $X^{LC1c4}$ each independently represent a hydrogen atom, a chlorine atom, a fluorine atom, —$CF_3$, or —$OCF_3$. In the compounds represented by general formulas (LC1-a) to (LC1-c), $X^{LC1b1}$, $X^{LC1b2}$, and $X^{LC1c1}$ to $X^{LC1c4}$ are each independently preferably a hydrogen atom or a fluorine atom.

It is also preferable that general formula (LC1) comprises one or two or more compounds selected from the group consisting of compounds represented by general formulas (LC1-d) to (LC1-p) below.

[Chem. 14]

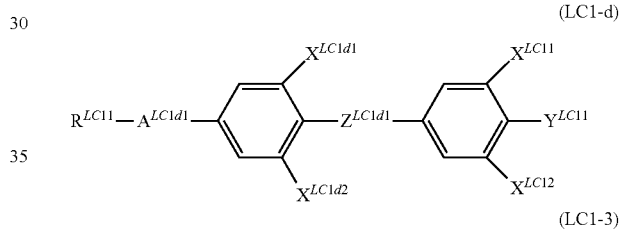

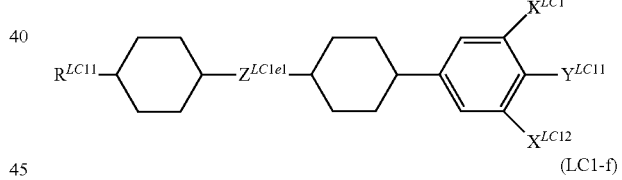

[Chem. 15]

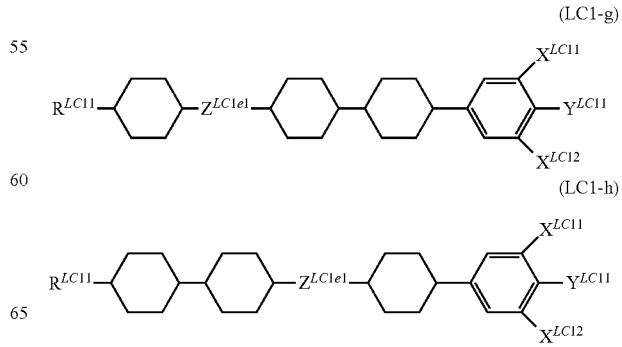

-continued (LC1-i)
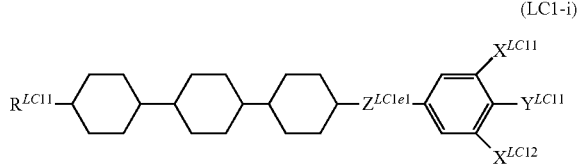

[Chem. 16]

(LC1-j)
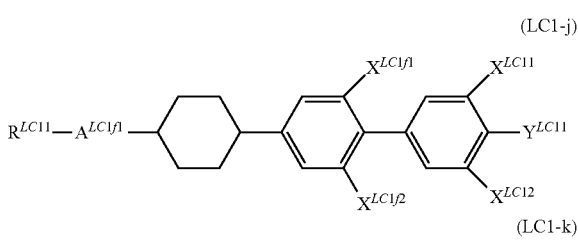

(LC1-k)
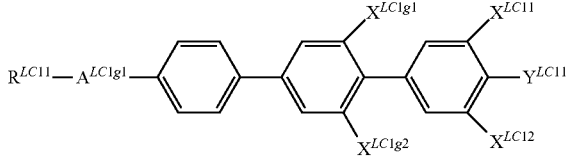

[Chem. 17]

(LC1-l)
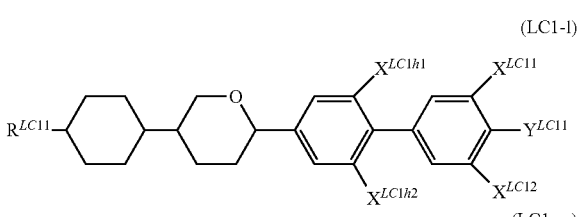

(LC1-m)
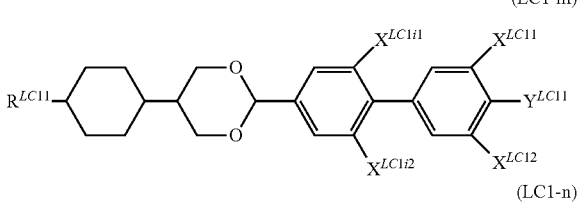

(LC1-n)
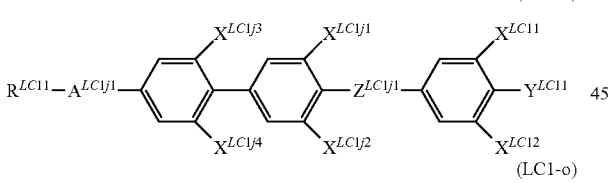

(LC1-o)
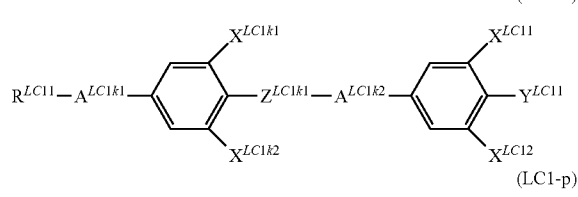

(LC1-p)
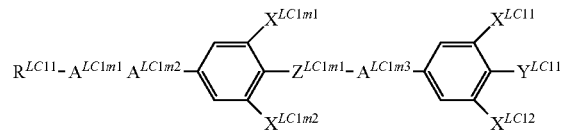

In general formulas (LC1-d) to (LC1-p), $R^{LC11}$, $Y^{LC11}$, $X^{LC11}$, and $X^{LC12}$ independently have the same meaning as $R^{LC11}$, $Y^{LC11}$, $X^{LC11}$, and $X^{LC12}$, respectively, in general formula (LC1) above. In the compounds represented by general formulas (LC1-d) to (LC1-p), each $R^{LC11}$ is independently preferably an alkyl group having 1 to 7 carbon atoms, an alkoxy group having 1 to 7 carbon atoms, or an alkenyl group having 2 to 7 carbon atoms and more preferably an alkyl group having 1 to 5 carbon atoms, an alkoxy group having 1 to 5 carbon atoms, or an alkenyl group having 2 to 5 carbon atoms. $X^{LC11}$ and $X^{LC12}$ are each independently preferably a hydrogen atom or a fluorine atom. Each $Y^{LC11}$ is independently preferably a fluorine atom, —CF$_3$, or —OCF$_3$.

In general formulas (LC1-d) to (LC1-p), $A^{LC1d1}$, $A^{LC1f1}$, $A^{LC1g1}$, $A^{LC1j1}$, $A^{LC1k1}$, $A^{LC1k2}$, and $A^{LC1m1}$ to $A^{LC1m3}$ each independently represent a 1,4-phenylene group, a trans-1,4-cyclohexylene group, a tetrahydropyran-2,5-diyl group, or a 1,3-dioxane-2,5-diyl group.

In general formulas (LC1-d) to (LC1-p), $X^{LC1d1}$, $X^{LC1d2}$, $X^{LC1f1}$, $X^{LC1f2}$, $X^{LC1g1}$, $X^{LC1g2}$, $X^{LC1h1}$, $X^{LC1h2}$, $X^{LC1i1}$, $X^{LC1i2}$, $X^{LC1j1}$ to $X^{LC1j4}$, $X^{LC1k1}$, $X^{LC1k2}$, $X^{LC1m1}$, and $X^{LC1m2}$ each independently represent a hydrogen atom, a chlorine atom, a fluorine atom, —CF$_3$, or —OCF$_3$. In the compounds represented by general formulas (LC1-d) to (LC1-m), $X^{LC1d1}$ to $X^{LC1m2}$ are each independently preferably a hydrogen atom or a fluorine atom.

In general formulas (LC1-d) to (LC1-p), $Z^{LC1d1}$, $Z^{LC1e1}$, $Z^{LC1j1}$, $Z^{LC1k1}$, and $Z^{LC1m1}$ each independently represent a single bond, —CH=CH—, —CF=CF—, —C≡C—, —CH$_2$CH$_2$—, —(CH$_2$)$_4$—, —OCH$_2$—, —CH$_2$O—, —OCF$_2$—, —CF$_2$O—, —COO—, or —OCO—. In the compounds represented by general formulas (LC1-d) to (LC1-p), $Z^{LC1d1}$ to $Z^{LC1m1}$ are each independently preferably a single bond, —CH$_2$CH$_2$—, —(CH$_2$)$_4$—, —CF$_2$O—, or —OCH$_2$—.

Preferably, each of the compounds represented by general formulas (LC1-d) to (LC1-p) comprises one or two or more compounds selected from the group consisting of compounds represented by general formulas (LC1-1) to (LC1-45) below. In general formulas (LC1-1) to (LC1-45), each $R^{LC11}$ independently represents an alkyl group having 1 to 7 carbon atoms.

[Chem. 18]

(LC1-1)
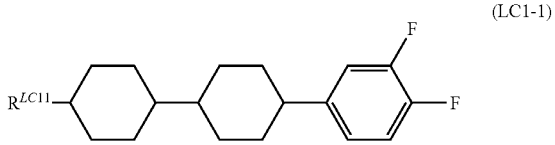

(LC1-2)

(LC1-3)
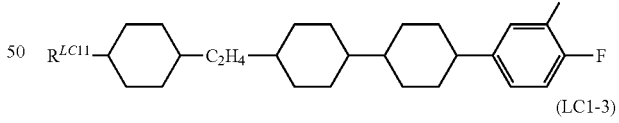

[Chem. 19]

(LC1-4)
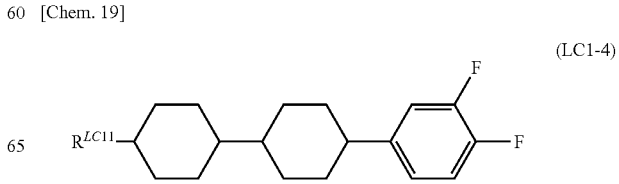

(LC1-5)
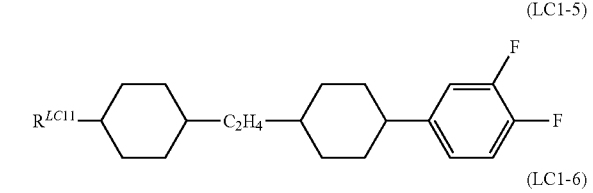
(LC1-6)
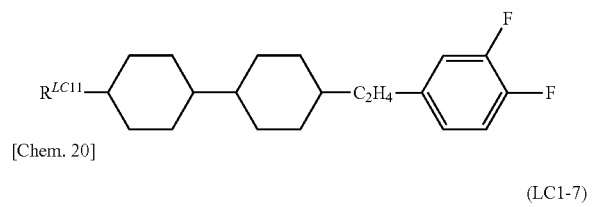
[Chem. 20]
(LC1-7)
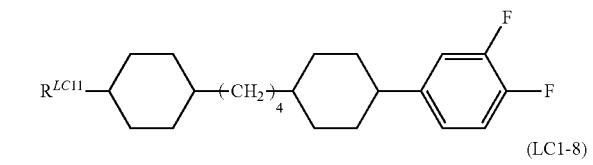
(LC1-8)
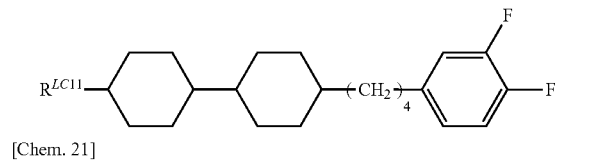
[Chem. 21]
(LC1-9)
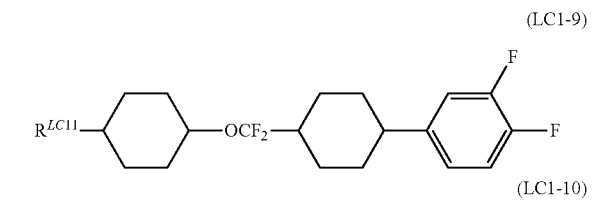
(LC1-10)
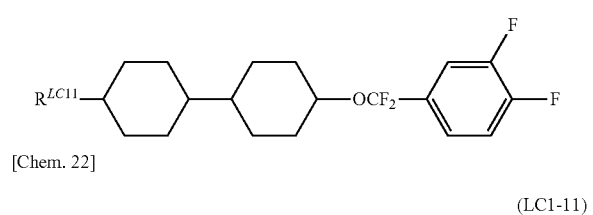
[Chem. 22]
(LC1-11)
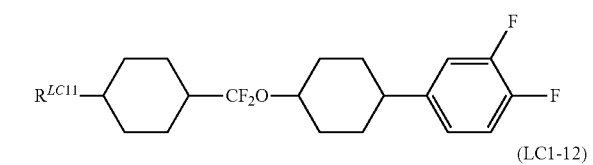
(LC1-12)
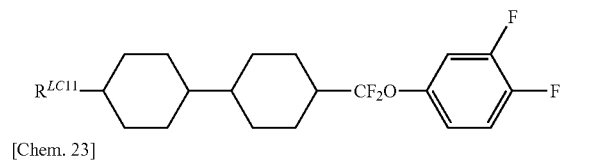
[Chem. 23]
(LC1-13)
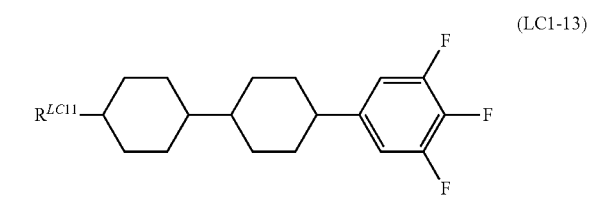
(LC1-14)
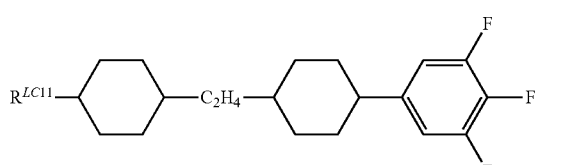
(LC1-15)
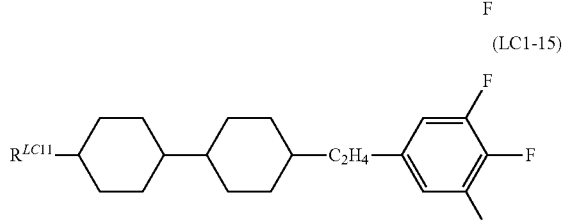
[Chem. 24]
(LC1-16)
(LC1-17)
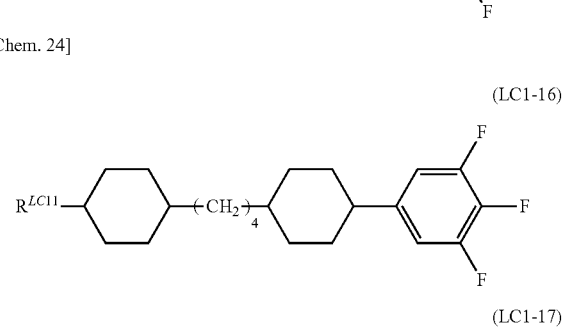
[Chem. 25]
(LC1-18)
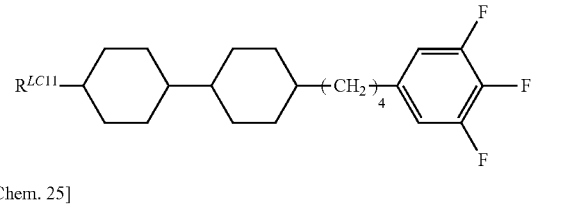
(LC1-19)
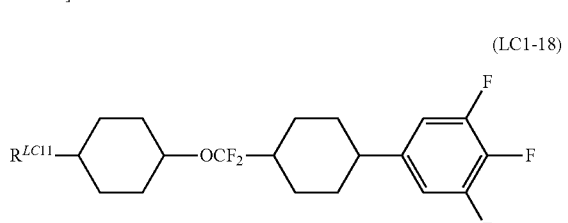
[Chem. 26]
(LC1-20)
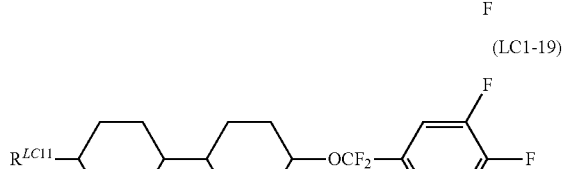

(LC1-21)
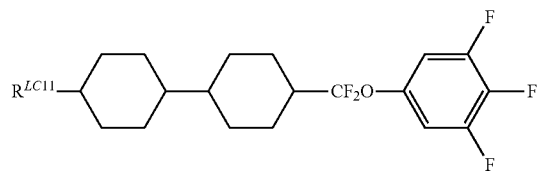
[Chem. 27]
(LC1-22)
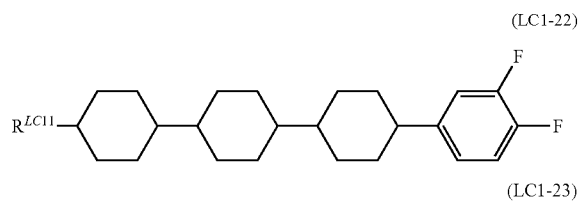
(LC1-23)
(LC1-24)
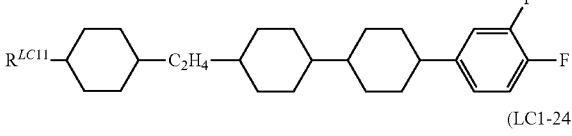
[Chem. 28]
(LC1-25)
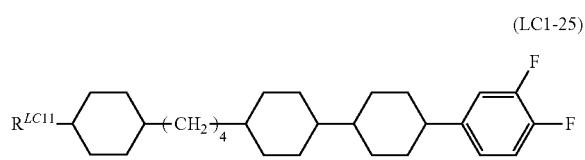
(LC1-26)
(LC1-27)
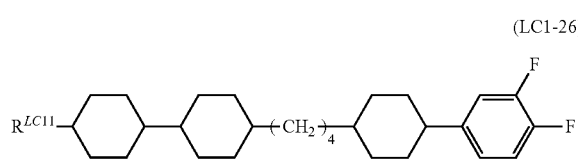
[Chem. 29]
(LC1-28)
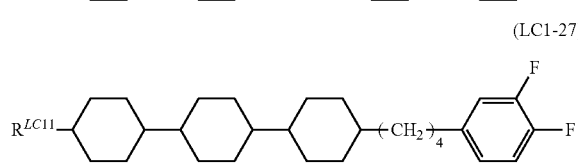
(LC1-29)
[Chem. 30]
(LC1-30)
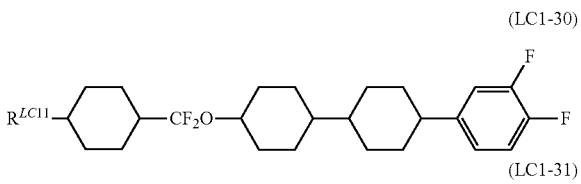
(LC1-31)
(LC1-32)
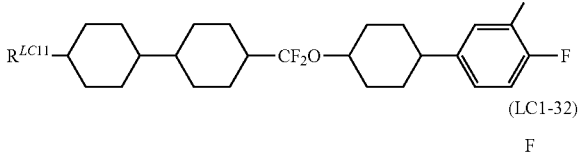
[Chem. 31]
(LC1-33)
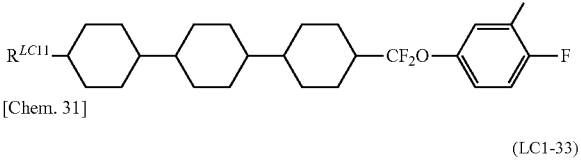
(LC1-34)
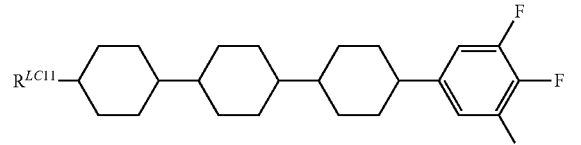
(LC1-35)
(LC1-36)
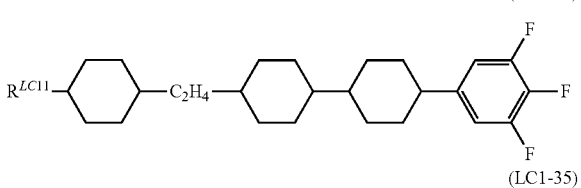
[Chem. 32]
(LC1-37)
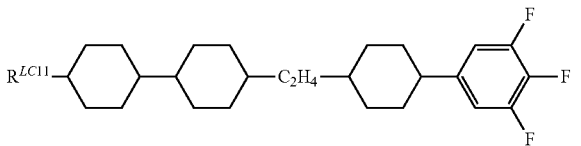
(LC1-38)
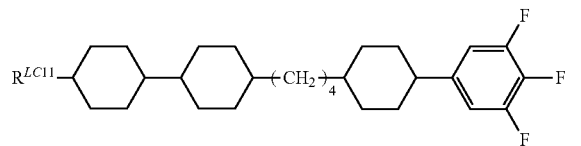

-continued (LC1-39)
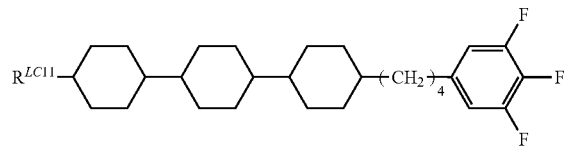

[Chem. 33]

(LC1-40)
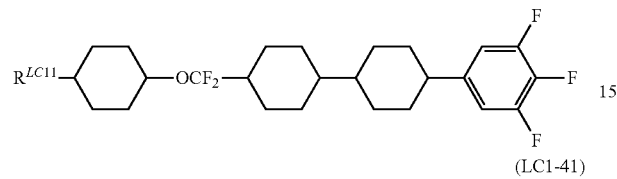

(LC1-41)
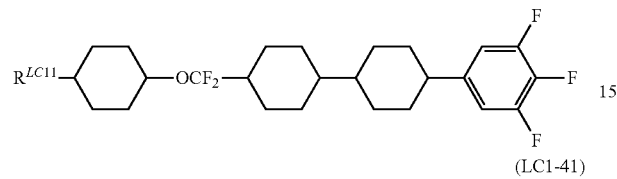

(LC1-42)
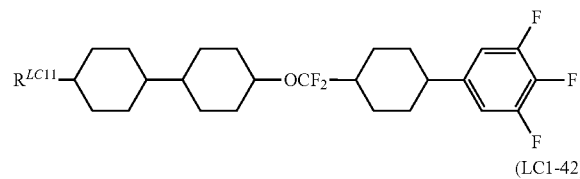

[Chem. 34]

(LC1-43)
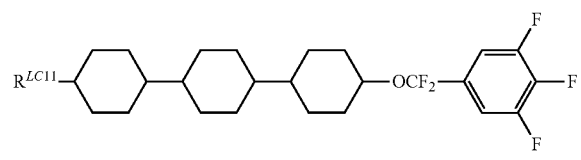

(LC1-44)
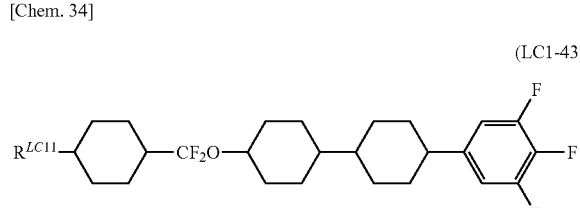

(LC1-45)
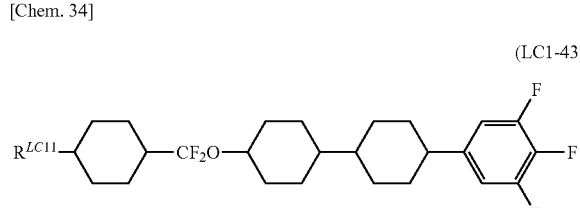

Preferably, general formula (LC2) comprises one or two or more compounds selected from the group consisting of compounds represented by general formulas (LC2-a) to (LC2-g) below.

[Chem. 35]

(LC2-a)
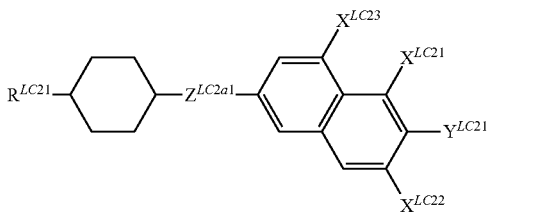

(LC2-b)
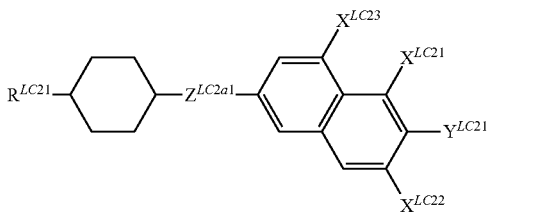

(LC2-c)
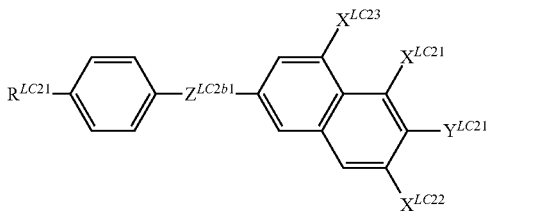

(LC2-d)
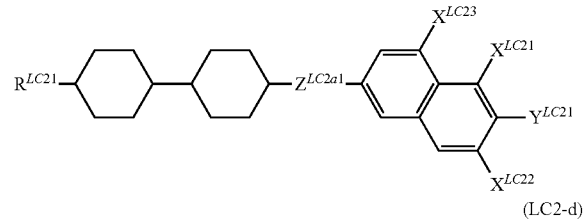

(LC2-e)
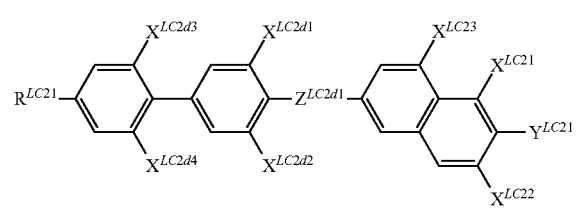

(LC2-f)
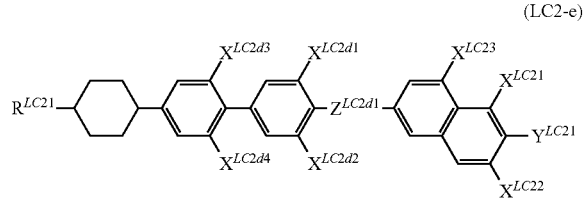

(LC2-g)
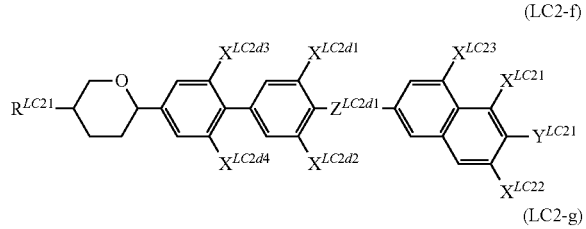

In general formulas (LC2-a) to (LC2-g), $R^{LC21}$, $Y^{LC21}$, and $X^{LC21}$ to $X^{LC23}$ independently have the same meaning as $R^{LC21}$, $Y^{LC21}$, and $X^{LC21}$ to $X^{LC23}$, respectively, in general formula (LC2) above. In the compounds represented by general formulas (LC2-a) to (LC2-g), each $R^{LC21}$ is independently preferably an alkyl group having 1 to 7 carbon atoms, an alkoxy group having 1 to 7 carbon atoms, or an alkenyl group having 2 to 7 carbon atoms and more preferably an alkyl group having 1 to 5 carbon atoms, an alkoxy group having 1 to 5 carbon atoms, or an alkenyl group having 2 to 5 carbon atoms. $X^{LC21}$ to $X^{LC23}$ are each independently preferably a hydrogen atom or a fluorine atom, and each $Y^{LC21}$ is independently preferably a fluorine atom, $-CF_3$, or $-OCF_3$.

In general formulas (LC2-a) to (LC2-g), $X^{LC2d1}$ to $X^{LC2d4}$, $X^{LC2e1}$ to $X^{LC2e4}$, $X^{LC2f1}$ to $X^{LC2f4}$, and $X^{LC2g1}$ to $X^{LC2g4}$ each independently represent a hydrogen atom, a chlorine atom, a fluorine atom, $-CF_3$, or $-OCF_3$. In the compounds represented by general formulas (LC2-a) to (LC2-g), $X^{LC2d1}$ to $X^{LC2g4}$ are each independently preferably a hydrogen atom or a fluorine atom.

In general formulas (LC2-a) to (LC2-g), $Z^{LC2a1}$, $Z^{LC2b1}$, $Z^{LC2c1}$, $Z^{LC2d1}$, $Z^{LC2e1}$, $Z^{LC2f1}$, and $Z^{LC2g1}$ each independently represent a single bond, $-CH=CH-$, $-CF=CF-$, $-C\equiv C-$, $-CH_2CH_2-$, $-(CH_2)_4-$, $-OCH_2-$, $-CH_2O-$, $-OCF_2-$, $-CF_2O-$, $-COO-$, or $-OCO-$. In the compounds represented by general formulas (LC2-a) to (LC2-g), $Z^{LC2a1}$ to $Z^{LC2g4}$ are each independently preferably $-CF_2O-$ or $-OCH_2-$.

It is also preferable that the compound represented by general formula (LC) above comprises one or two or more compounds selected from the group consisting of compounds represented by the following general formulas (LC3) to (LC5):

[Chem. 36]

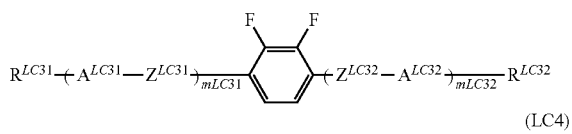

(LC3)

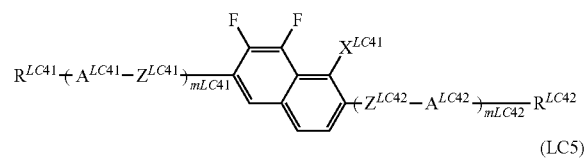

(LC4)

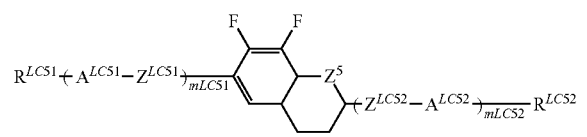

(LC5)

(wherein $R^{LC31}$, $R^{LC32}$, $R^{LC41}$, $R^{LC42}$, $R^{LC51}$, and $R^{LC52}$ each independently represent an alkyl group having 1 to 15 carbon atoms; one or two or more $-CH_2-$ groups in the alkyl group are each optionally substituted with $-O-$, $-CH=CH-$, $-CO-$, $-OCO-$, $-COO-$, or $-C\equiv C-$, provided that no oxygen atoms are directly adjacent to each other; one or two or more hydrogen atoms in the alkyl group are each optionally substituted with a halogen atom; and $A^{LC31}$, $A^{LC32}$, $A^{LC41}$, $A^{LC42}$, $A^{LC51}$, and $A^{LC52}$ each independently represent any of the following structures:

[Chem. 37]

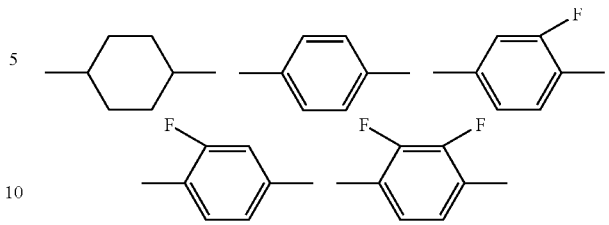

(wherein, in these structures, one or two or more $-CH_2-$ groups in the cyclohexylene group are each optionally substituted with an oxygen atom; one or two or more $-CH-$ groups in each 1,4-phenylene group are each optionally substituted with a nitrogen atom; and one or two or more hydrogen atoms in each of these structures are each optionally substituted with a fluorine atom, a chlorine atom, $-CF_3$, or $-OCF_3$), wherein $Z^{LC31}$, $Z^{LC32}$, $Z^{LC41}$, $Z^{LC42}$, $Z^{LC51}$, and $Z^{LC51}$ each independently represent a single bond, $-CH=CH-$, $-C\equiv C-$, $-CH_2CH_2-$, $-(CH_2)_4-$, $-COO-$, $-OCH_2-$, $-CH_2O-$, $-OCF_2-$, or $-CF_2O-$; $Z^5$ represents $-CH_2-$ or an oxygen atom; $X^4$ represents a hydrogen atom or a fluorine atom; $m^{LC31}$, $m^{LC32}$, $m^{LC41}$, $m^{LC42}$, $m^{LC51}$, and $m^{LC52}$ each independently represent 0 to 3; $m^{LC31}+m^{LC32}$, $m^{LC41}+m^{LC42}$, and $m^{LC51}+m^{LC52}$ are each 1, 2, or 3; and when a plurality of $A^{LC31}$s to $A^{LC52}$s and $Z^{LC31}$s to $Z^{LC52}$s are present, they may be the same or different). It is preferable to contain one or two or more compounds selected from the group consisting of the compounds represented by general formulas (LC3) to (LC5).

$R^{LC31}$ to $R^{LC52}$ are each independently preferably an alkyl group having 1 to 7 carbon atoms, an alkoxy group having 1 to 7 carbon atoms, or an alkenyl group having 2 to 7 carbon atoms. Most preferably, the alkenyl group is represented by any of the following structures:

[Chem. 38]

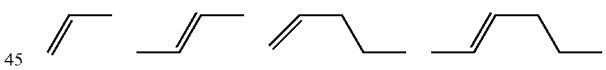

(wherein the right end of each structure is bonded to a ring structure).

$A^{LC31}$ to $A^{LC52}$ are each independently preferably any of the following structures.

[Chem. 39]

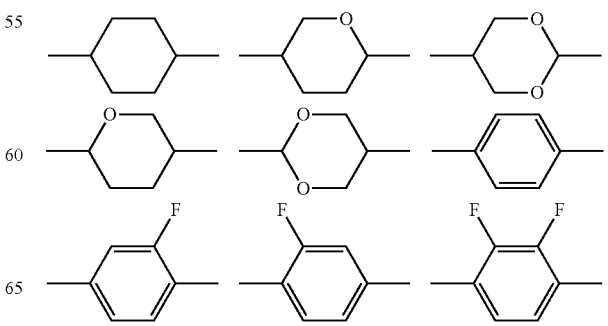

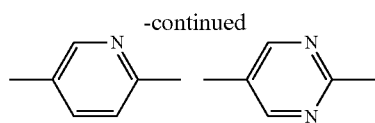

$Z^{LC31}$ to $Z^{LC51}$ are each independently preferably a single bond, —CH$_2$O—, —COO—, —OCO—, —CH$_2$CH$_2$—, —CF$_2$O—, —OCF$_2$—, or —OCH$_2$—.

It is preferable that at least one compound selected from the group consisting of compounds represented by general formulas (LC3-1), (LC4-1), and (LC5-1) is contained as the compounds represented by general formulas (LC3), (LC4), and (LC5):

[Chem. 40]

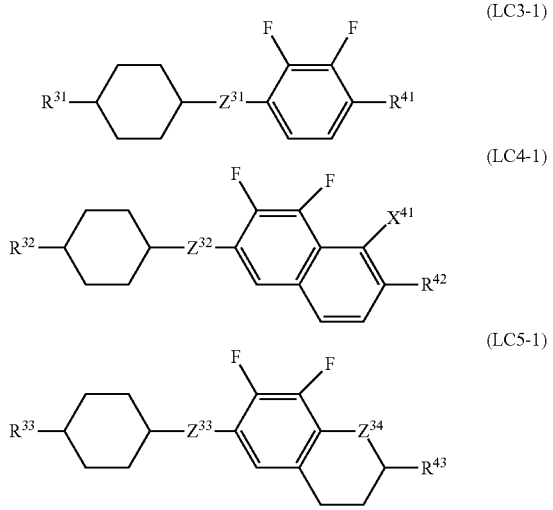

(wherein $R^{31}$ to $R^{33}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^{41}$ to $R^{43}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $Z^{31}$ to $Z^{33}$ each represent a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—; $X^{41}$ represents a hydrogen atom or a fluorine atom; and $Z^{34}$ represents —CH$_2$— or an oxygen atom).

In general formulas (LC3-1) to (LC5-1), $R^{31}$ to $R^{33}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms. $R^{31}$ to $R^{33}$ are each preferably an alkyl group having 1 to 5 carbon atoms or an alkenyl group having 2 to 5 carbon atoms, more preferably an alkyl group having 2 to 5 carbon atoms or an alkenyl group having 2 to 4 carbon atoms, still more preferably an alkyl group having 3 to 5 carbon atoms or an alkenyl group having 2 carbon atoms, and particularly preferably an alkyl group having 3 carbon atoms.

$R^{41}$ to $R^{43}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms. $R^{41}$ to $R^{43}$ are each preferably an alkyl group having 1 to 5 carbon atoms, an alkoxy group having 1 to 5 carbon atoms, an alkenyl group having 4 to 8 carbon atoms, or an alkenyloxy group having 3 to 8 carbon atoms, more preferably an alkyl group having 1 to 3 carbon atoms or an alkoxy group having 1 to 3 carbon atoms, still more preferably an alkyl group having 3 carbon atoms or an alkoxy group having 2 carbon atoms, and particularly preferably an alkoxy group having 2 carbon atoms.

$Z^{31}$ to $Z^{33}$ each represent a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—. $Z^{31}$ to $Z^{33}$ are each preferably a single bond, —CH$_2$CH$_2$—, —COO—, —OCH$_2$—, —CH$_2$O—, —OCF$_2$—, or —CF$_2$O— and more preferably a single bond or —CH$_2$O—.

The liquid crystal composition contains a compound selected from the group consisting of the compounds represented by general formulas (LC3-1), (LC4-1), and (LC5-1) in an amount of preferably 5% by mass to 50% by mass, more preferably 5% by mass to 40% by mass, still more preferably 5% by mass to 30% by mass, yet more preferably 8% by mass to 27% by mass, and further more preferably 10% by mass to 25% by mass.

Specifically, the compound represented by general formula (LC3-1) is preferably a compound represented by any of the following general formulas (LC3-11) to (LC3-15):

[Chem. 41]

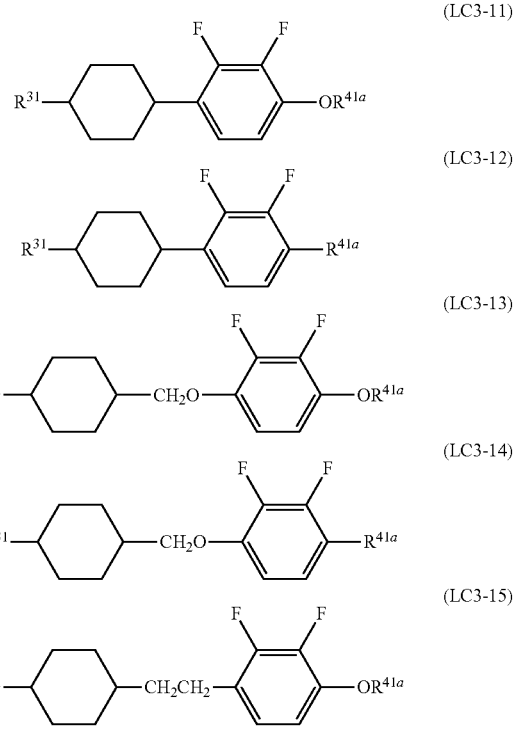

(wherein $R^{31}$ represents an alkyl group having 1 to 5 carbon atoms or an alkenyl group having 2 to 5 carbon atoms, and $R^{41a}$ represents an alkyl group having 1 to 5 carbon atoms).

Specifically, the compound represented by general formula (LC4-1) is preferably a compound represented by any of the following general formulas (LC4-11) to (LC4-14):

[Chem. 42]

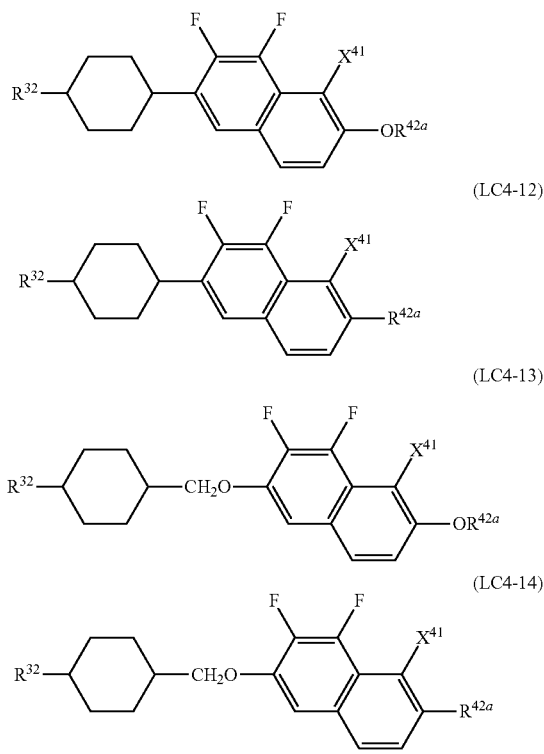

(LC4-11)
(LC4-12)
(LC4-13)
(LC4-14)

(wherein $R^{32}$ represents an alkyl group having 1 to 5 carbon atoms or an alkenyl group having 2 to 5 carbon atoms; $R^{42a}$ represents an alkyl group having 1 to 5 carbon atoms; and $X^{41}$ represents a hydrogen atom or a fluorine atom).

Specifically, the compound represented by general formula (LC5-1) is preferably a compound represented by any of the following general formulas (LC5-11) to (LC5-14):

[Chem. 43]

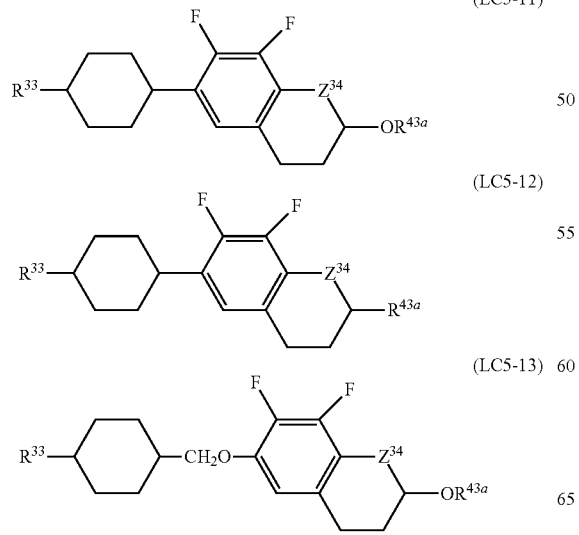

(LC5-11)
(LC5-12)
(LC5-13)

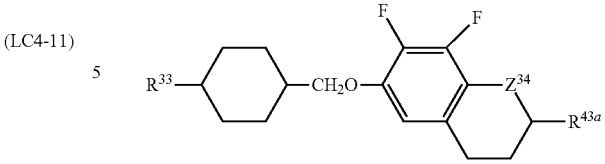

(LC5-14)

(wherein $R^{33}$ represents an alkyl group having 1 to 5 carbon atoms or an alkenyl group having 2 to 5 carbon atoms; $R^{43a}$ represents an alkyl group having 1 to 5 carbon atoms; and $Z^{34}$ represents —$CH_2$— or an oxygen atom).

In general formulas (LC3-11), (LC3-13), (LC4-11), (LC4-13), (LC5-11), and (LC5-13), it is preferable that embodiments of $R^{31}$ to $R^{33}$ are the same as those for general formulas (LC3-1) to (LC5-1). $R^{41a}$ to $R^{41c}$ are each preferably an alkyl group having 1 to 3 carbon atoms, more preferably an alkyl group having 1 or 2 carbon atoms, and particularly preferably an alkyl group having 2 carbon atoms.

In general formulas (LC3-12), (LC3-14), (LC4-12), (LC4-14), (LC5-12), and (LC5-14), it is preferable that embodiments of $R^{31}$ to $R^{33}$ are the same as those for general formulas (LC3-1) to (LC5-1). $R^{41a}$ to $R^{41c}$ are preferably an alkyl group having 1 to 3 carbon atoms, more preferably an alkyl group having 1 or 3 carbon atoms, and particularly preferably an alkyl group having 3 carbon atoms.

Among general formulas (LC3-11) to (LC5-14), general formulas (LC3-11), (LC4-11), (LC5-11), (LC3-13), (LC4-13), and (LC5-13) are preferred in order to increase the absolute value of dielectric constant anisotropy, and general formulas (LC3-11), (LC4-11), and (LC5-11) are more preferred.

A liquid crystal layer in the liquid crystal display element of the present invention contains preferably one or two or more compounds represented by general formulas (LC3-11) to (LC5-14), more preferably one or two compounds represented by general formulas (LC3-11) to (LC5-14), and particularly preferably one or two compounds represented by general formula (LC3-1).

It is preferable that at least one compound selected from the group consisting of compounds represented by general formulas (LC3-2), (LC4-2), and (LC5-2) is contained as the compounds represented by general formulas (LC3), (LC4), and (LC5):

[Chem. 44]

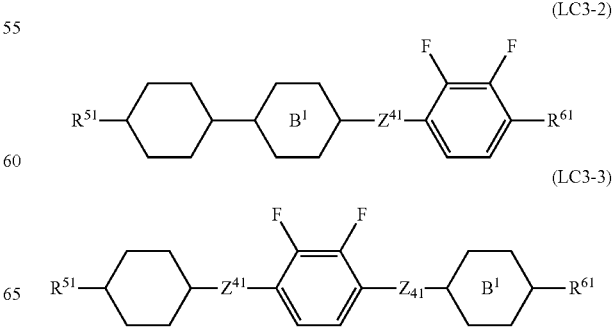

(LC3-2)
(LC3-3)

-continued

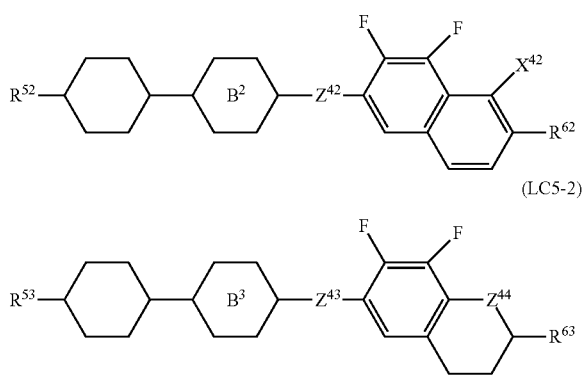

(wherein $R^{51}$ to $R^{53}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^{61}$ to $R^{63}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $B^1$ to $B^3$ each represent a 1,4-phenylene group optionally substituted with fluorine or a trans-1,4-cyclohexylene group optionally substituted with fluorine; $Z^{41}$ to $Z^{43}$ each represent a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O—; $X^{42}$ represents a hydrogen atom or a fluorine atom; and $Z^{44}$ represents —CH$_2$— or an oxygen atom).

In general formulas (LC3-2), (LC4-2), and (LC5-2), $R^{51}$ to $R^{53}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms. $R^{51}$ to $R^{53}$ are each preferably an alkyl group having 1 to 5 carbon atoms or an alkenyl group having 2 to 5 carbon atoms, more preferably an alkyl group having 2 to 5 carbon atoms or an alkenyl group having 2 to 4 carbon atoms, still more preferably an alkyl group having 3 to 5 carbon atoms or an alkenyl group having 2 carbon atoms, and particularly preferably an alkyl group having 3 carbon atoms.

$R^{61}$ to $R^{63}$ each represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms. $R^{61}$ to $R^{63}$ are each preferably an alkyl group having 1 to 5 carbon atoms, an alkoxy group having 1 to 5 carbon atoms, an alkenyl group having 4 to 8 carbon atoms, or an alkenyloxy group having 3 to 8 carbon atoms, more preferably an alkyl group having 1 to 3 carbon atoms or an alkoxy group having 1 to 3 carbon atoms, still more preferably an alkyl group having 3 carbon atoms or an alkoxy group having 2 carbon atoms, and particularly preferably an alkoxy group having 2 carbon atoms.

$B^{31}$ to $B^{33}$ each represent a 1,4-phenylene group optionally substituted with fluorine or a trans-1,4-cyclohexylene group optionally substituted with fluorine and are each preferably an unsubstituted 1,4-phenylene group or an unsubstituted trans-1,4-cyclohexylene group and more preferably a trans-1,4-cyclohexylene group.

$Z^{41}$ to $Z^{43}$ each represent a single bond, —CH=CH—, —C≡C—, —CH$_2$CH$_2$—, —(CH$_2$)$_4$—, —COO—, —OCO—, —OCH$_2$—, —CH$_2$O—, —OCF$_2$—, or —CF$_2$O— and are each preferably a single bond, —CH$_2$CH$_2$—, —COO—, —OCH$_2$—, —CH$_2$O—, —OCF$_2$—, or —CF$_2$O— and more preferably a single bond or —CH$_2$O—.

The liquid crystal composition contains any of the compounds represented by general formulas (LC3-2), (LC3-3), (LC4-2), and (LC5-2) in an amount of preferably 10 to 60% by mass, more preferably 20 to 50% by mass, still more preferably 25 to 45% by mass, yet more preferably 28 to 42% by mass, and further more preferably 30 to 40% by mass.

Specifically, the compound represented by general formula (LC3-2) is preferably a compound represented by any of the following general formulas (LC3-21) to (LC3-29).

The compound represented by general formula (LC3-3) is preferably a compound represented by any of the following general formulas (LC3-31) to (LC3-33):

[Chem. 45]

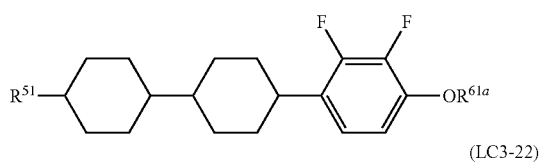

(LC3-21)

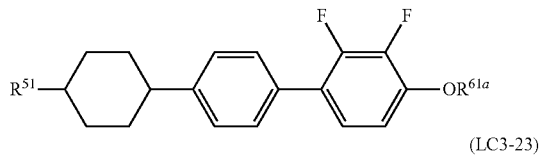

(LC3-22)

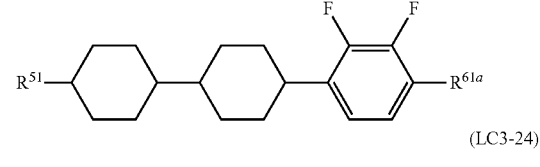

(LC3-23)

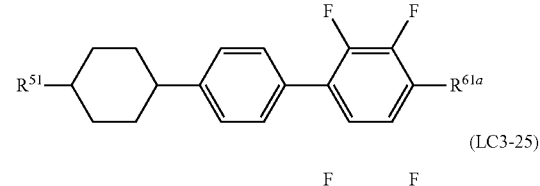

(LC3-24)

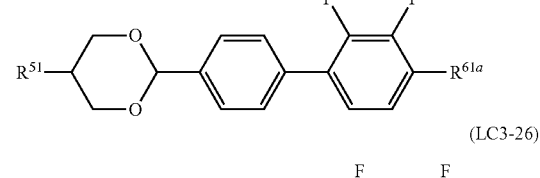

(LC3-25)

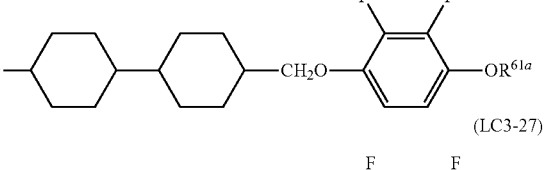

(LC3-26)

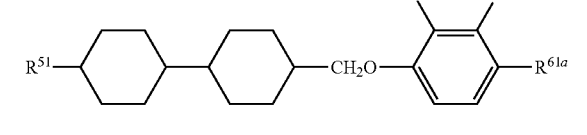

(LC3-27)

-continued (LC3-28)
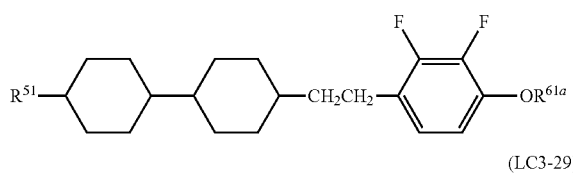

(LC3-29)
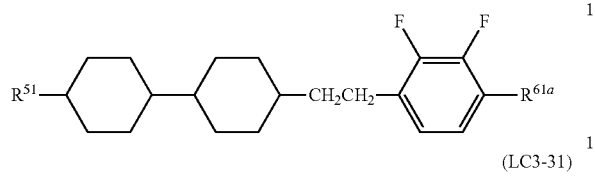

(LC3-31)
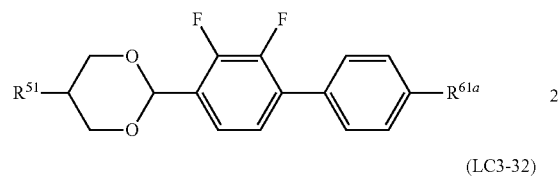

(LC3-32)
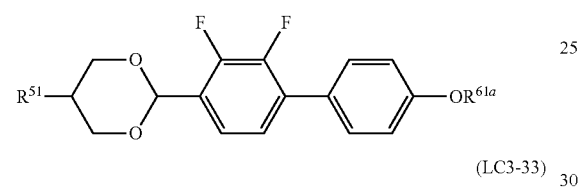

(LC3-33)
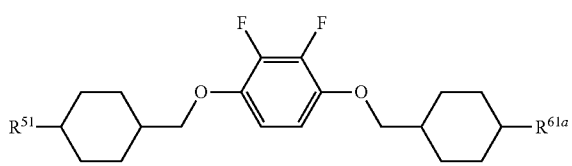

(wherein $R^{51}$ represents an alkyl group having 1 to 5 carbon atoms or an alkenyl group having 2 to 5 carbon atoms; $R^{61a}$ represents an alkyl group having 1 to 5 carbon atoms; and it is preferable that embodiments of $R^{51}$ and $R^{61a}$ are the same as those of $R^{51}$ and $R^{61}$ in general formula (LC3-2)).

Specifically, the compound represented by general formula (LC4-2) is preferably a compound represented by any of the following general formulas (LC4-21) to (LC4-26):

[Chem. 46]

(LC4-21)
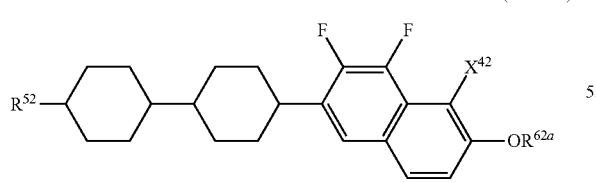

(LC4-22)
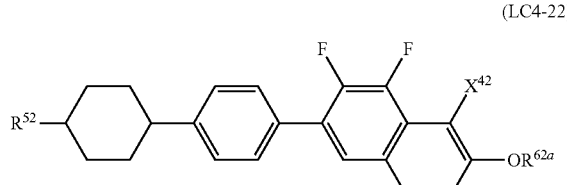

-continued (LC4-23)
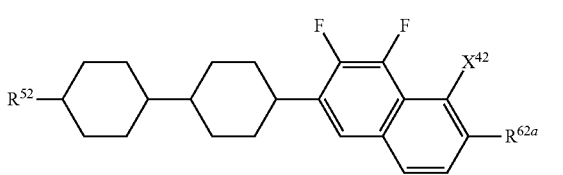

(LC4-24)
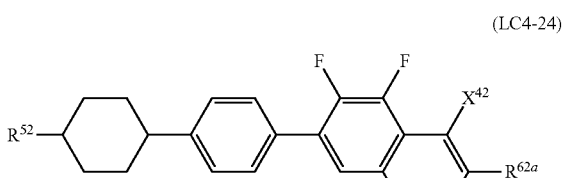

(LC4-25)
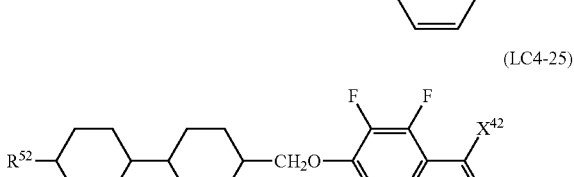

(LC4-26)
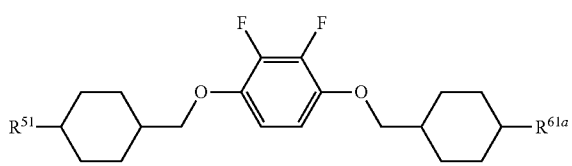

(wherein $R^{52}$ represents an alkyl group having 1 to 5 carbon atoms or an alkenyl group having 2 to 5 carbon atoms; $R^{62a}$ represents an alkyl group having 1 to 5 carbon atoms; $X^{42}$ represents a hydrogen atom or a fluorine atom; it is preferable that embodiments of $R^{52}$ and $R^{62a}$ are the same as those of $R^{52}$ and $R^{62}$ in general formula (LC4-2)).

Specifically, the compound represented by general formula (LC5-2) is a compound represented by any of the following general formulas (LC5-21) to (LC5-26):

[Chem. 47]

(LC5-21)
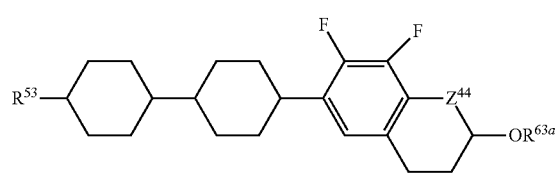

(LC5-22)
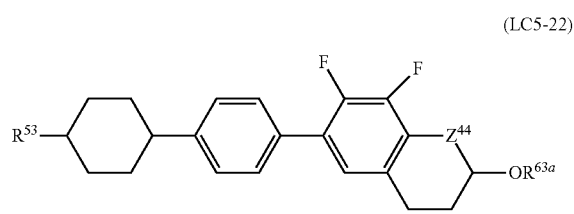

(LC5-23)

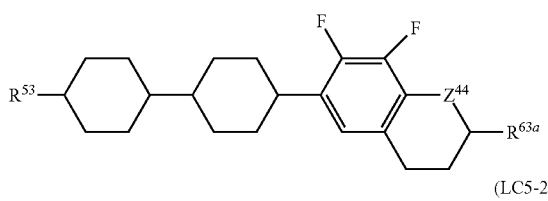

(LC5-24)

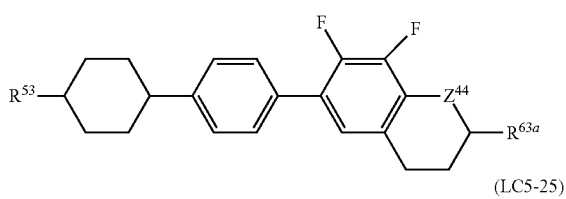

(LC5-25)

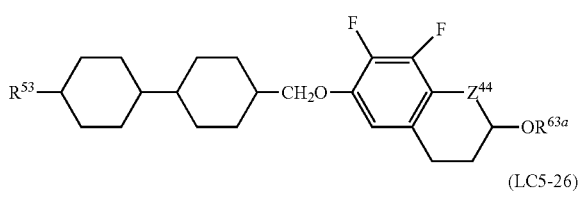

(LC5-26)

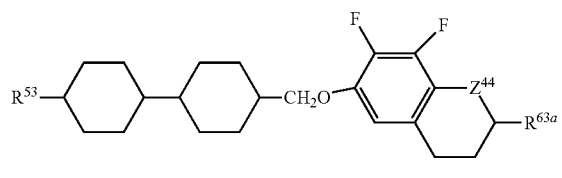

(LC5-25), it is preferable that embodiments of $R^{51}$ to $R^{53}$ are the same as those for general formulas (LC3-2), (LC4-2), and (LC5-2). $R^{61a}$ to $R^{63a}$ are each preferably an alkyl group having 1 to 3 carbon atoms, more preferably an alkyl group having 1 or 2 carbon atoms, and particularly preferably an alkyl group having 2 carbon atoms.

In general formulas (LC3-23), (LC3-24), (LC3-26), (LC4-23), (LC4-24), (LC4-26), (LC5-23), (LC5-24), and (LC5-26), it is preferable that embodiments of $R^{51}$ to $R^{53}$ are the same as those for general formulas (LC3-2), (LC4-2), and (LC5-2). $R^{61a}$ to $R^{63a}$ are each preferably an alkyl group having 1 to 3 carbon atoms, more preferably an alkyl group having 1 or 3 carbon atoms, and particularly preferably an alkyl group having 3 carbon atoms.

Among general formulas (LC3-21) to (LC5-26), general formulas (LC3-21), (LC3-22), (LC3-25), (LC4-21), (LC4-22), (LC4-25), (LC5-21), (LC5-22), and (LC5-25) are preferred in order to increase the absolute value of the dielectric constant anisotropy.

One or two or more compounds represented by general formulas (LC3-2), (Lc4-2), and (LC5-2) may be contained. It is preferable to contain at least one selected from compounds in which $B^1$ to $B^3$ are each a 1,4-phenylene group and at least one selected from compounds in which $B^1$ to $B^3$ are each a trans-1,4-cyclohexylene group.

Moreover, it is preferable that the compound represented by general formula (LC3) comprises one or two or more compounds selected from the group consisting of compounds represented by the following general formulas (LC3-a) and (LC3-b):

[Chem. 48]

(LC3-a)

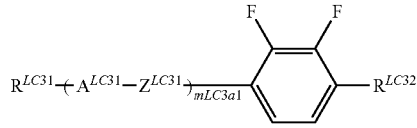

(LC3-b)

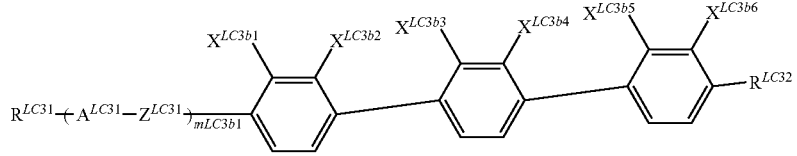

(wherein $R^{53}$ represents an alkyl group having 1 to 5 carbon atoms or an alkenyl group having 2 to 5 carbon atoms; $R^{63a}$ represents an alkyl group having 1 to 5 carbon atoms; $W^2$ represents —$CH_2$— or an oxygen atom; and it is preferable that embodiments of $R^{53}$ and $R^{63a}$ are the same as those of $R^{53}$ and $R^{63}$ in general formula (LC5-2)).

In general formulas (LC3-21), (LC3-22), (LC3-25), (LC4-21), (LC4-22), (LC4-25), (LC5-21), (LC5-22), and (wherein $R^{LC31}$, $R^{LC32}$, $A^{LC31}$ and $Z^{LC31}$ independently have the same meaning as $R^{LC31}$, $R^{LC32}$, $A^{LC31}$, and $Z^{LC31}$, respectively, in general formula (LC3); $X^{LC3b1}$ to $X^{LC3b6}$ each represent a hydrogen atom or a fluorine atom; in at least one of the combination of $X^{LC3b1}$ and $X^{LC3b2}$ and the combination of $X^{LC3b3}$ and $X^{LC3b4}$, each atom is a fluorine atom; $m^{LC3a1}$ represents 1, 2, or 3; $m^{LC3b1}$ represents 0 or 1;

and, when a plurality of $A^{LC31}$s and $Z^{LC31}$s are present, they may be the same or different).

Preferably, $R^{LC31}$ and $R^{LC32}$ are each independently an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.

$A^{L31}$ is preferably a 1,4-phenylene group, a trans-1,4-cyclohexylene group, a tetrahydropyran-2,5-diyl group, or a 1,3-dioxane-2,5-diyl group and more preferably a 1,4-phenylene group or a trans-1,4-cyclohexylene group.

$Z^{LC31}$ is preferably a single bond, —CH$_2$O—, —COO—, —OCO—, or —CH$_2$CH$_2$— and more preferably a single bond.

Preferably, general formula (LC3-a) represents the following general formula (LC3-a1):

[Chem. 49]

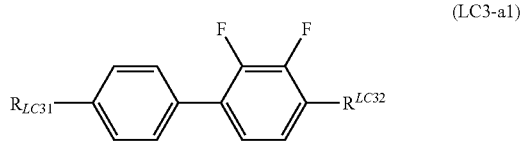

(LC3-a1)

(wherein $R^{LC31}$ and $R^{LC32}$ independently have the same meaning as $R^{LC31}$ and $R^{LC32}$, respectively, in general formula (LC3) above).

$R^{L31}$ and $R^{LC32}$ are each independently preferably an alkyl group having 1 to 7 carbon atoms, an alkoxy group having 1 to 7 carbon atoms, or an alkenyl group having 2 to 7 carbon atoms. More preferably, $R^{LC31}$ represents an alkyl group having 1 to 7 carbon atoms, and $R^{LC32}$ represents an alkoxy group having 1 to 7 carbon atoms.

General formula (LC3-b) is preferably any of the following general formulas (LC3-b1) to (LC3-b12), more preferably any of the following general formulas (LC3-b1), (LC3-b6), (LC3-b8), and (LC3-b11), still more preferably any of the following general formulas (LC3-b1) and (LC3-b6), and most preferably general formula (LC3-b1):

[Chem. 50]

(LC3-b1)

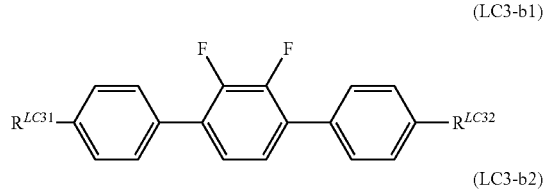

(LC3-b2)

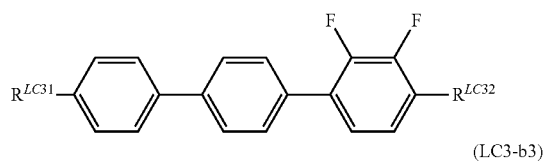

(LC3-b3)

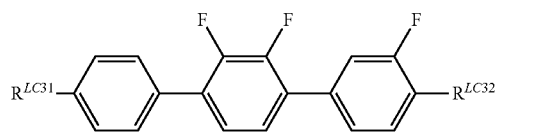

(LC3-b4)

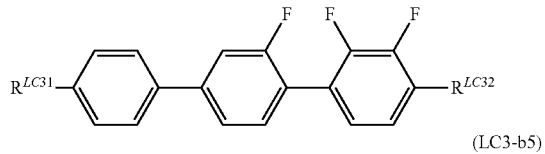

(LC3-b5)

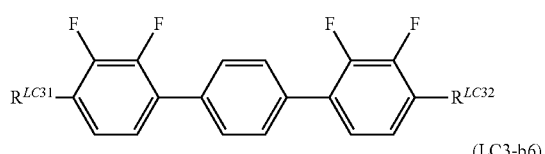

(LC3-b6)

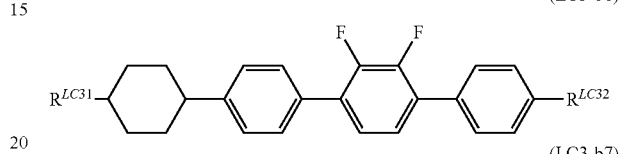

(LC3-b7)

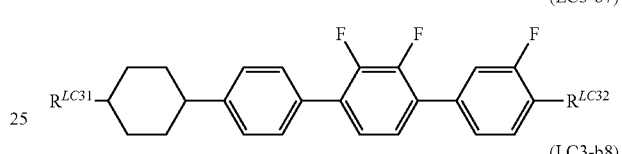

(LC3-b8)

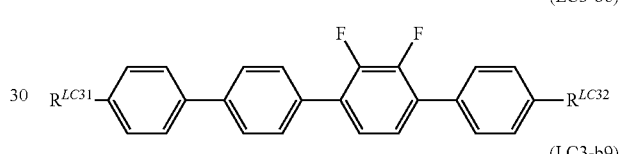

(LC3-b9)

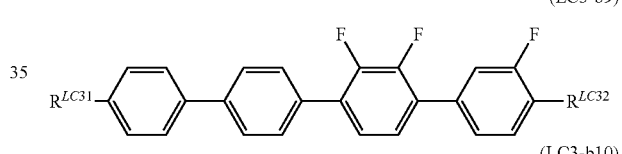

(LC3-b10)

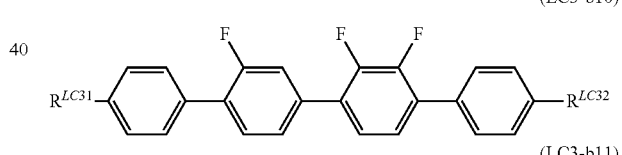

(LC3-b11)

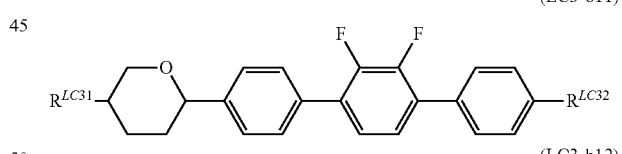

(LC3-b12)

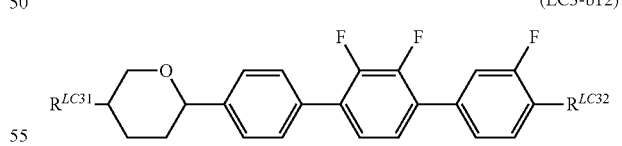

(wherein $R^{LC31}$ and $R^{LC32}$ independently have the same meaning as $R^{L31}$ and $R^{LC32}$, respectively, in general formula (LC3) above).

$R^{LC31}$ and $R^{LC32}$ are each independently preferably an alkyl group having 1 to 7 carbon atoms, an alkoxy group having 1 to 7 carbon atoms, or an alkenyl group having 2 to 7 carbon atoms. More preferably, $R^{LC31}$ is an alkyl group having 2 or 3 carbon atoms, and $R^{LC32}$ is an alkyl group having 2 carbon atoms.

The compound represented by general formula (LC4) is preferably a compound represented by any of the following general formulas (LC4-a) to (LC4-c) below, and the compound represented by general formula (LC5) is preferably a compound represented by any of the following general formulas (LC5-a) to (LC5-c):

[Chem. 51]

(LC4-a)

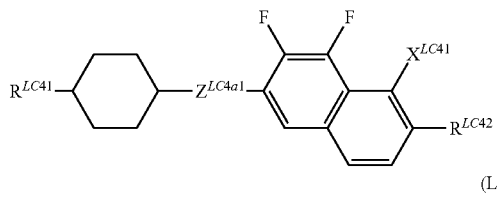

(LC4-b)

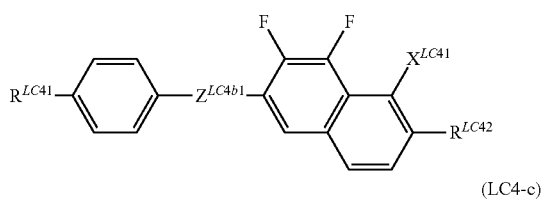

(LC4-c)

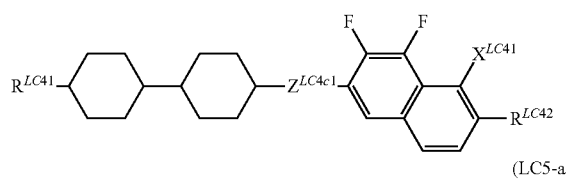

(LC5-a)

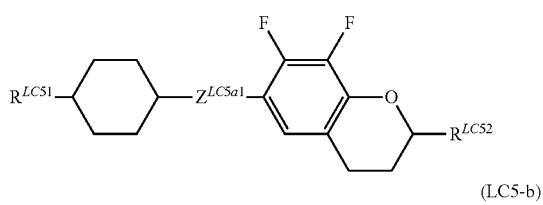

(LC5-b)

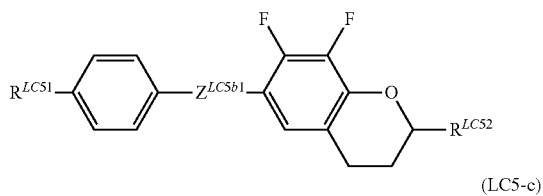

(LC5-c)

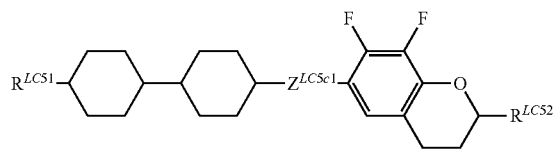

(wherein $R^{LC41}$, $R^{LC42}$, and $X^{LC41}$ independently have the same meaning as $R^{LC41}$, $R^{LC42}$, and $X^{LC41}$, respectively, in general formula (LC4) above; $R^{LC51}$ and $R^{LC52}$ independently have the same meaning as $R^{LC51}$ and $R^{LC52}$, respectively, in general formula (LC5) above; and $Z^{LC4a1}$, $Z^{LC4b1}$, $Z^{LC4c1}$, $Z^{LC5a1}$, $Z^{LC5b1}$, and $Z^{LC5c1}$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—).

Preferably, $R^{LC41}$, $R^{LC42}$, $R^{LC51}$, and $R^{LC52}$ are each independently an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.

$Z^{LC4a1}$ to $Z^{LC5c1}$ are each independently preferably a single bond, —CH$_2$O—, —COO—, —OCO—, or —CH$_2$CH$_2$— and more preferably a single bond.

It is also preferable that the compound represented by general formula (LC) above comprises one or two or more compounds selected from compounds represented by general formula (LC6) below (except for the compounds represented by general formulas (LC1) to (LC5)).

[Chem. 52]

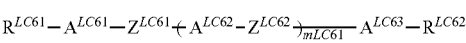

(LC6)

In general formula (LC6), $R^{LC61}$ and $R^{LC62}$ each independently represent an alkyl group having 1 to 15 carbon atoms. One or two or more CH$_2$ groups in the alkyl group are each optionally substituted with —O—, —CH=CH—, —CO—, —OCO—, —COO—, or —C≡C—, provided that no oxygen atoms are directly adjacent to each other. One or two or more hydrogen atoms in the alkyl group are each optionally substituted with a halogen atom. In the compound represented by general formula (LC6), $R^{LC61}$ and $R^{LC62}$ are each independently an alkyl group having 1 to 7 carbon atoms, an alkoxy group having 1 to 7 carbon atoms, or an alkenyl group having 2 to 7 carbon atoms. Most preferably, the alkenyl group has any of the following structures:

[Chem. 53]

(wherein the right end of each structure is bonded to a ring structure).

In general formula (LC6), $A^{LC61}$ to $A^{LC63}$ each independently represent any of the following structures. In these structures, one or two or more CH$_2$CH$_2$ groups in the cyclohexylene group are each optionally substituted with —CH=CH—, —CF$_2$O—, or —OCF$_2$—, and one or two or more CH groups in each 1,4-phenylene group are each optionally substituted with a nitrogen atom.

[Chem. 54]

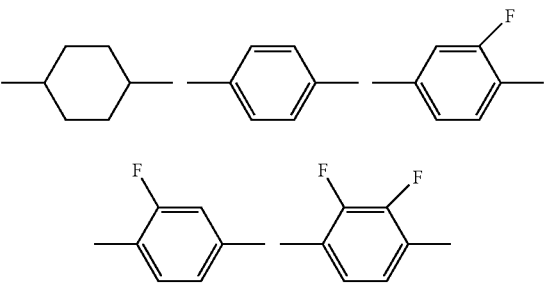

In the compound represented by general formula (LC6), $A^{LC61}$ to $A^{LC63}$ are each independently preferably any of the following structures.

[Chem. 55]

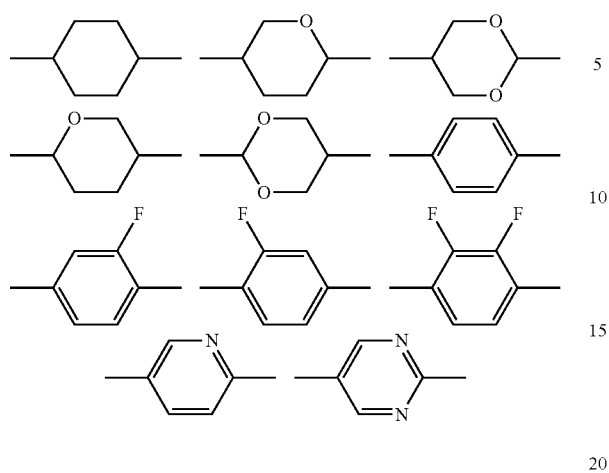

In general formula (LC6), $Z^{LC61}$ and $Z^{LC62}$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—, and mLC61 represents 0 to 3. In the compound represented by general formula (LC6), $Z^{LC61}$ and $Z^{LC62}$ are each independently preferably a single bond, —CH$_2$CH$_2$—, —COO—, —OCH$_2$—, —CH$_2$O—, —OCF$_2$—, or —CF$_2$O—.

Preferably, the compound represented by general formula (LC6) comprises one or two or more compounds selected from the group consisting of compounds represented by general formulas (LC6-a) to (LC6-v) below. In general formulas (LC6-a1) to (LC6-p1), $R^{LC61}$ and $R^{LC62}$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.

[Chem. 56]

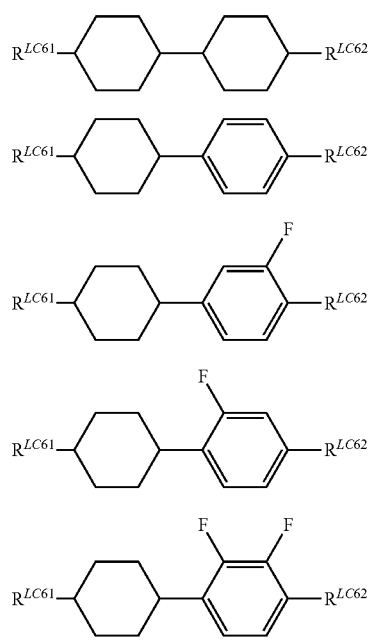

(LC6-a1)

(LC6-b1)

(LC6-b2)

(LC6-b3)

(LC6-b4)

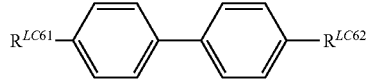
(LC6-c1)

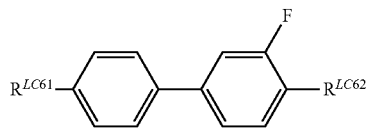
(LC6-c2)

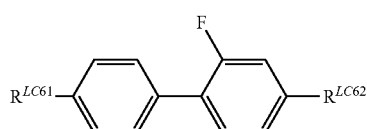
(LC6-c3)

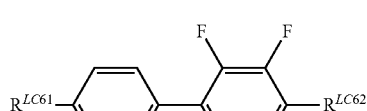
(LC6-c4)

[Chem. 57]

(LC6-d1)

(LC6-e1)

(LC6-e2)

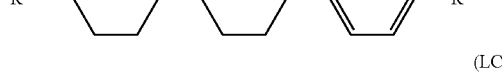
(LC6-e3)

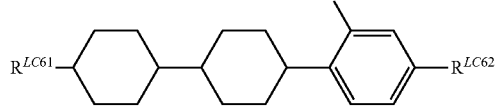
(LC6-e4)

(LC6-f1)

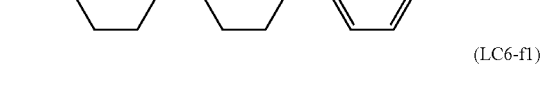
(LC6-f2)

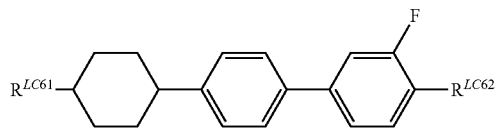

(LC6-f3) 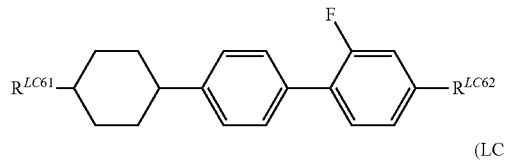
(LC6-f4) 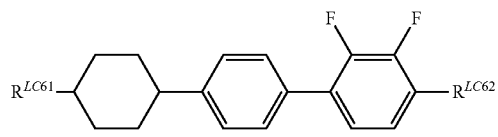
[Chem. 58]
(LC6-g1) 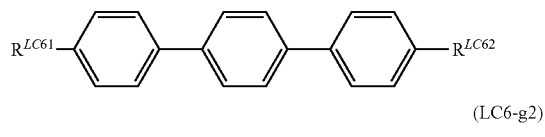
(LC6-g2) 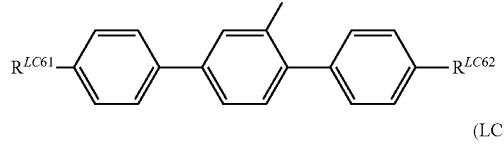
(LC6-g3) 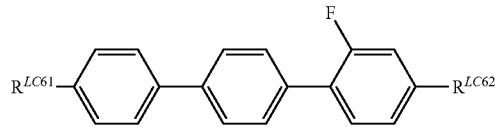
(LC6-h1) 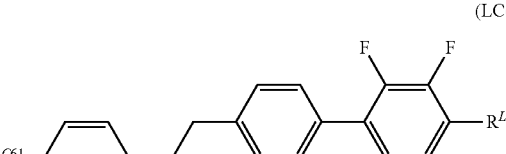
(LC6-h2) 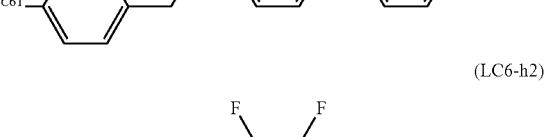
(LC6-h3) 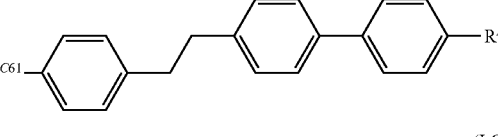
(LC6-h4) 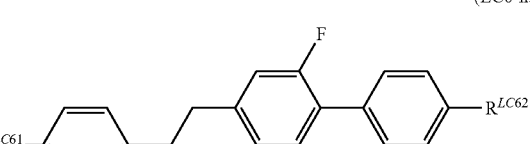
(LC6-h5) 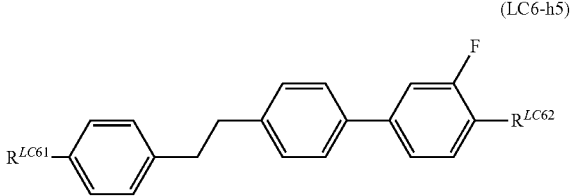
(LC6-h6) 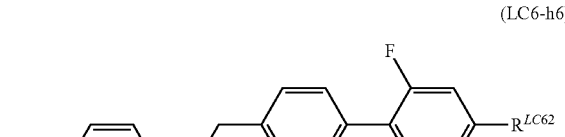
(LC6-i1) 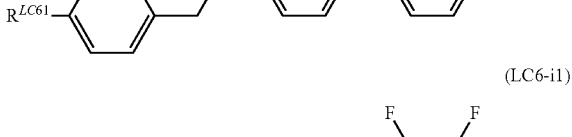
(LC6-i2) 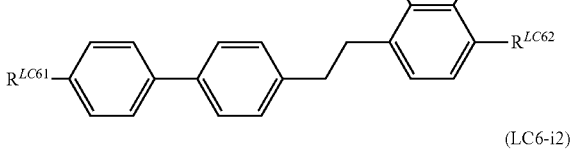
(LC6-i3) 
[Chem. 59]
(LC6-j1) 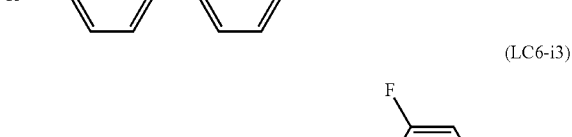
(LC6-j2) 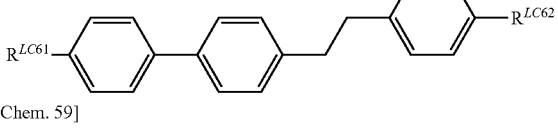
(LC6-j3) 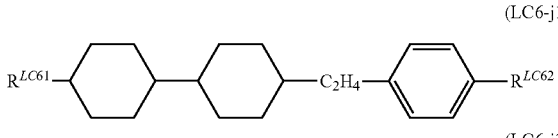
(LC6-k1) 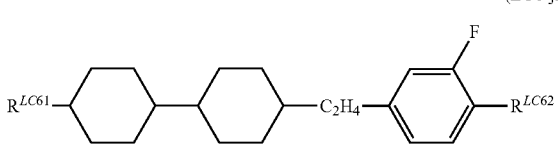

(LC6-k2)
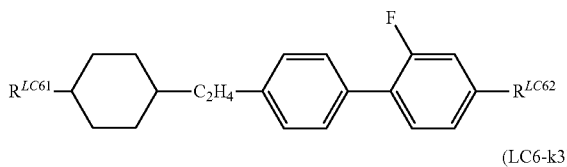

(LC6-k3)
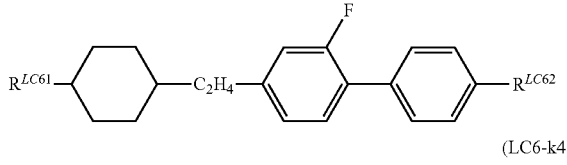

(LC6-k4)
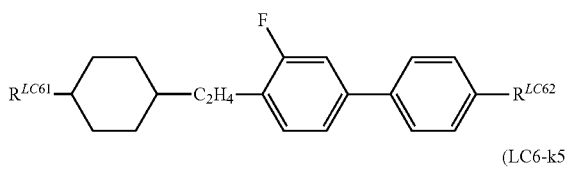

(LC6-k5)
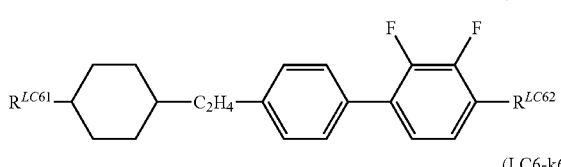

(LC6-k6)
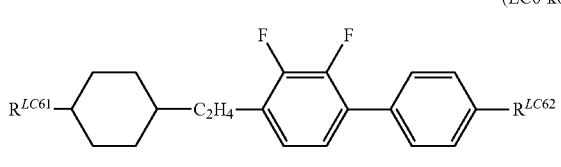

(LC6-l1)
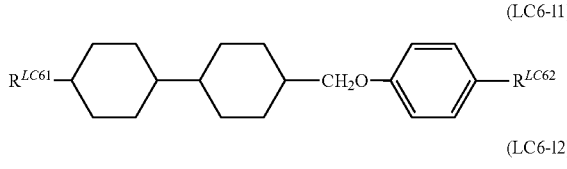

(LC6-l2)
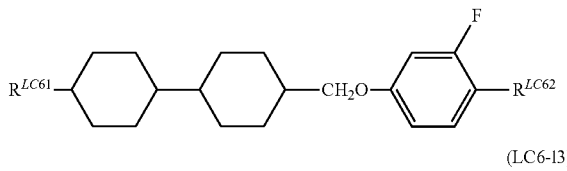

(LC6-l3)
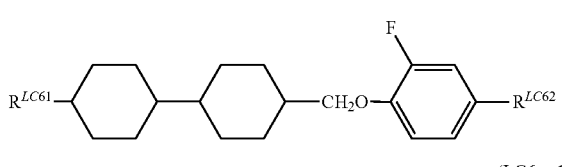

(LC6-m1)
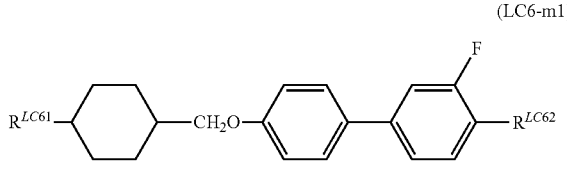

(LC6-m2)
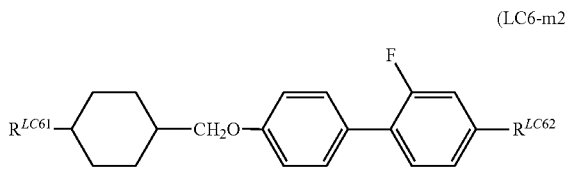

(LC6-m3)
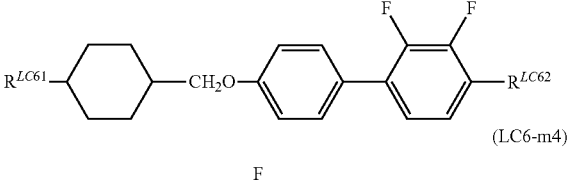

(LC6-m4)
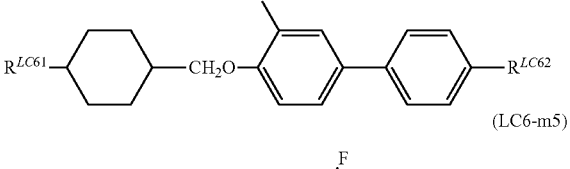

(LC6-m5)
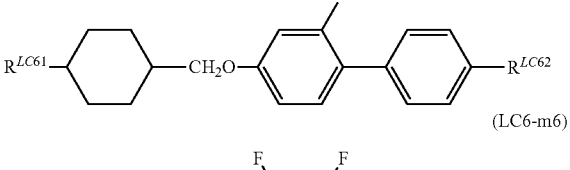

(LC6-m6)
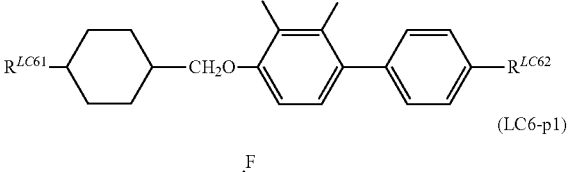

(LC6-p1)

[Polymerizable Compounds]

Examples of the polymerizable compounds in the present invention include monofunctional polymerizable compounds having one reactive group and polyfunctional polymerizable compounds such as bifunctional and trifunctional polymerizable compounds having two or more reactive groups. These reactive group-containing polymerizable compounds may or may not contain a mesogenic moiety.

In the reactive group-containing polymerizable compounds, each reactive group is preferably a photopolymerizable substituent. In particular, when a vertical alignment film is formed by thermal polymerization, the reactive group is particularly preferably a photopolymerizable substituent because the reaction of the reactive group-containing polymerizable compound can be prevented when the material of the vertical alignment film material is thermally polymerized.

Each polymerizable compound in the present invention is preferably a compound represented by the following general formula (P):

[Chem. 60]

(P)

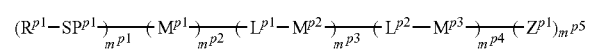

(wherein, in general formula (P), $Z^{p1}$ represents a fluorine atom, a cyano group, a hydrogen atom, an alkyl group which has 1 to 15 carbon atoms and in which any hydrogen atom is optionally substituted with a halogen atom, an alkoxy group which has 1 to 15 carbon atoms and in which any hydrogen atom is optionally substituted with a halogen atom, an alkenyl group which has 1 to 15 carbon atoms and in which any hydrogen atom is optionally substituted with a halogen atom, an alkenyloxy group which has 1 to 15 carbon atoms and in which any hydrogen atom is optionally substituted with a halogen atom, or -Sp$^{p2}$-R$^{p2}$;

R$^{p1}$ and R$^{p2}$ each independently represent any of the following formulas (R-I) to (R-IX):

[Chem. 61]

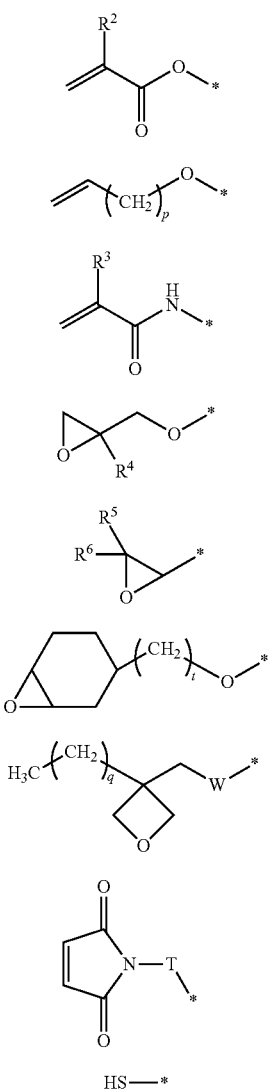

wherein, in formulas (R-I) to (R-IX), R$^2$ to R$^6$ are each independently a hydrogen atom, an alkyl group having 1 to 5 carbon atoms, or a halogenated alkyl group having 1 to 5 carbon atoms; W is a single bond, —O—, or a methylene group; T is a single bond or —COO—; and p, t, and q each independently represent 0, 1, or 2, wherein Sp$^{p1}$ and Sp$^{p2}$ each represent a spacer group, and Sp$^{p1}$ and Sp$^{p2}$ each independently represent a single bond, an alkylene group having 1 to 12 carbon atoms, or —O—(CH$_2$)$_s$— (wherein s represents an integer of 1 to 11, and the oxygen atom is bonded to an aromatic ring), wherein L$^{p1}$ and L$^{p2}$ each independently represent a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —OCH$_2$CH$_2$O—, —CO—NR$^a$—, —NR$^a$—CO—, —SCH$_2$—, —CH$_2$S—, —CH=CR$^a$—COO—, —CH=CR$^a$—OCO—, —COO—CR$^a$=CH—, —OCO—CR$^a$=CH—, —COO—CR$^a$=CH—COO—, —COO—CR$^a$=CH—OCO—, —OCO—CR$^a$=CH—COO—, —OCO—CR$^a$=CH—OCO—, —(CH$_2$)$_z$—C(=O)—O—, —(CH$_2$)$_z$—O—(C=O)—, —O—(C=O)—(CH$_2$)$_z$—, —(C=O)—O—(CH$_2$)$_z$—, —CF=CF—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (wherein each Ra independently represents a hydrogen atom or an alkyl group having 1 to 4 carbon atoms, and z represents an integer of 1 to 4), wherein M$^{p2}$ represents a 1,4-phenylene group, a 1,4-cyclohexylene group, an anthracene-2,6-diyl group, a phenanthrene-2,7-diyl group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, and M$^{p2}$ may be unsubstituted or substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen atom, a cyano group, a nitro group, or an —R$^{p1}$, wherein M$^{p1}$ represents any of the following formulas (i-11) to (ix-11):

[Chem. 62]

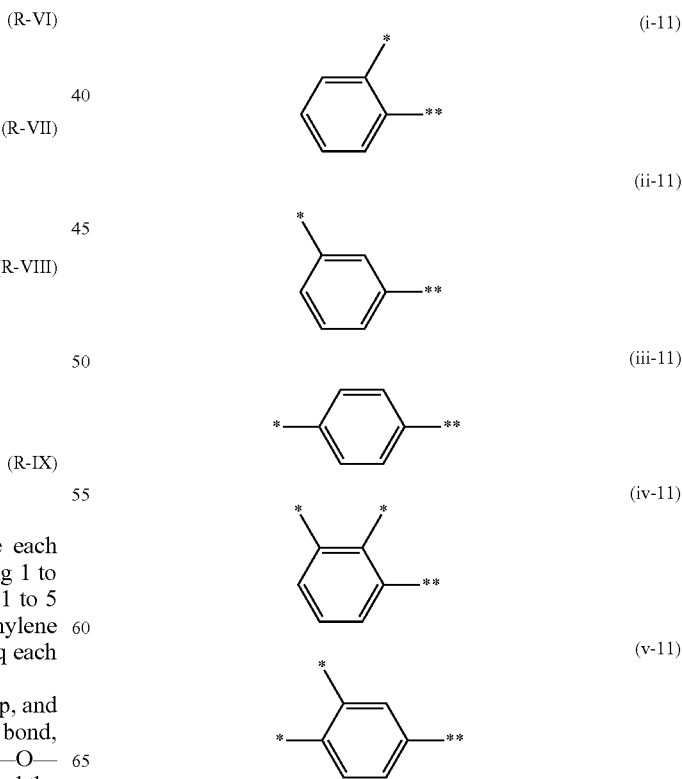

-continued (vi-11)

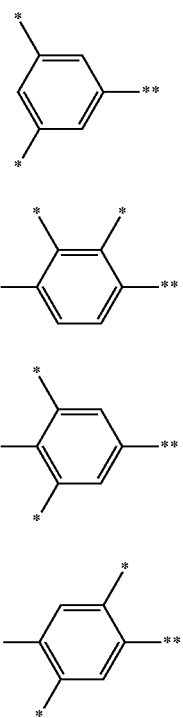

(vii-11)

(vii-11)

(ix-11)

(wherein * represents a bond to Sp$^{p1}$, and ** represents a bond to L$^{p1}$ or L$^{p2}$), wherein M$^{p3}$ represents any of the following formulas (i-13) to (ix-13):

[Chem. 63]

(i-13)

(ii-13)

(iii-13)

(iv-13)

(v-13)

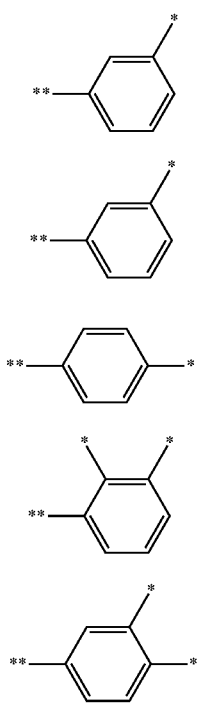

-continued (vi-13)

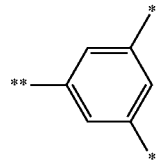

(vii-13)

(viii-13)

(ix-13)

(wherein * represents a bond to Z$^{p1}$, and ** represents a bond to L$^{p2}$), and wherein m$^{p2}$ to m$^{p4}$ each independently represent 0, 1, 2, or 3; m$^{p1}$ and m$^{p5}$ each independently represent 1, 2, or 3; when a plurality of Z$^{p1}$s are present, they may be the same or different; when a plurality of R$^{p1}$s are present, they may be the same or different; when a plurality of R$^{p2}$s are present, they may be the same or different; when a plurality of Sp$^{p1}$s are present, they may be the same or different; when a plurality of Sp$^{p2}$s are present, they may be the same or different; when a plurality of L$^{p1}$s are present, they may be the same or different; and when a plurality of M$^{p2}$s are present, they may be the same or different). It is preferable that one or two or more polymerizable compounds are contained.

In general formula (P) in the present invention, Z$^{p1}$ is preferably -Sp$^{p2}$-R$^{p2}$, and R$^{11}$ and R$^{12}$ are each independently preferably any of formulas (R-1) to (R-3).

In general formula (P) above, m$^{p1}$+m$^{p5}$ is preferably 2 or more.

In general formula (P) above, L$^{p1}$ is preferably a single bond, —OCH$_2$—, —CH$_2$O—, —CO—, —C$_2$H$_4$—, —COO—, —OCO—, —COOC$_2$H$_4$—, —OCOC$_2$H$_4$—, —C$_2$H$_4$OCO—, —C$_2$H$_4$COO—, —CF$_2$—, —CF$_2$O—, —(CH$_2$)$_z$—C(=O)—O—, —(CH$_2$)$_z$—O—(C=O)—, —O—(C=O)—(CH$_2$)$_z$—, —CH=CH—COO—, —COO—CH=CH—, —OCOCH=CH—, —(C=O)—O—(CH$_2$)$_z$—, —OCF$_2$—, or —C≡C—, and L$^{p2}$ is preferably —OCH$_2$CH$_2$O—, —COOC$_2$H$_4$—, —OCOC$_2$H$_4$—, —(CH$_2$)$_z$—C(=O)—O—, —(CH$_2$)$_z$—O—(C=O)—, —O—(C=O)—(CH$_2$)$_z$—, —(C=O)—O—(CH$_2$)$_z$—, —CH=CH—COO—, —COO—CH=CH—, —OCOCH=CH—, —C$_2$H$_4$OCO—, or —C$_2$H$_4$COO—. In the above formulas, z is preferably an integer of 1 to 4.

In general formula (P) above, it is preferable that at least one of L$^{p1}$ and L$^{p2}$ is at least one selected from the group consisting of —(CH$_2$)$_z$—C(=O)—O—, —(CH$_2$)$_z$—O—(C=O)—, —O—(C=O)—(CH$_2$)$_z$—, and —(C=O)—O—(CH$_2$)$_z$—.

In general formula (P) above, R$^{p1}$ and R$^{p2}$ are each independently more preferably any of the following formulas (R-1) to (R-15).

[Chem. 64]

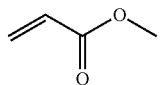
(R-1)

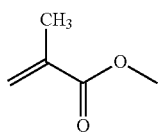
(R-2)

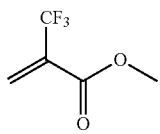
(R-3)

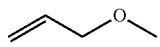
(R-4)

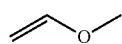
(R-5)

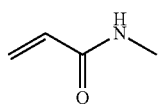
(R-6)

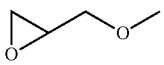
(R-7)

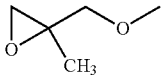
(R-8)

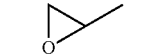
(R-9)

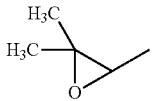
(R-10)

-continued

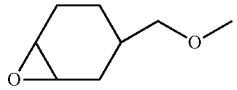
(R-11)

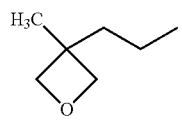
(R-12)

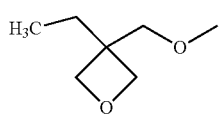
(R-13)

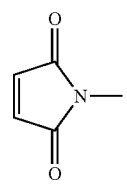
(R-14)

HS—
(R-15)

m$^{p3}$ in general formula (P) above is 0, 1, 2, or 3. When m$^{p2}$ is 1, L$^{p1}$ is preferably a single bond. When m$^{p2}$ is 2 or 3, a plurality of L$^{p1}$s are present, and at least one of the plurality of L$^{p1}$s is preferably a single bond.

m$^{p3}$ in general formula (P) above is 0, 1, 2, or 3. When m$^{p3}$ is 1, M$^{p2}$ is preferably a 1,4-phenylene group. When m$^{p3}$ is 2 or 3, a plurality of M$^{p2}$s are present, and at least MP2 adjacent to M$^{p1}$ through L$^{p1}$ is preferably a 1,4-phenylene group.

m$^{p3}$ in general formula (P) above represents 0, 1, 2, or 3, and it is preferable that at least one M$^{p2}$ is a 1,4-phenylene group substituted with one or two or more fluorine atoms.

m$^{p4}$ in general formula (P) above is 0, 1, 2, or 3, and it is preferable that at least one M$^{p3}$ is a 1,4-phenylene group substituted with one or two or more fluorine atoms.

The spacer groups (Sp$^{p1}$, Sp$^{p2}$, and Sp$^{p4}$) in general formula (P) above are each preferably a single bond, —OCH$_2$—, —(CH$_2$)$_z$O—, —CO—, —C$_2$H$_4$—, —COO—, —OCO—, —COOC$_2$H$_4$—, —OCOC$_2$H$_4$—, —(CH$_2$)$_z$—, —C$_2$H$_4$OCO—, —C$_2$H$_4$COO—, —CF$_2$—, —CF$_2$O—, —(CH$_2$)$_z$—C(=O)—O—, —(CH$_2$)$_z$—O—(C=O)—, —O—(C=O)—(CH$_2$)$_z$—, —(C=O)—O—(CH$_2$)$_z$—, —O—(CH$_2$)$_z$—O—, —OCF$_2$—, —CH=CH—COO—, —COO—CH=CH—, —OCOCH=CH—, or —C≡C—, and z is preferably an integer from 1 to 10 inclusive.

Preferably, the polymerizable compound of general formula (P) in the present invention comprises at least one compound selected from the group consisting of compounds represented by general formulas (P-a), (P-b), (P-c), and (P-d).

[Chem. 65]

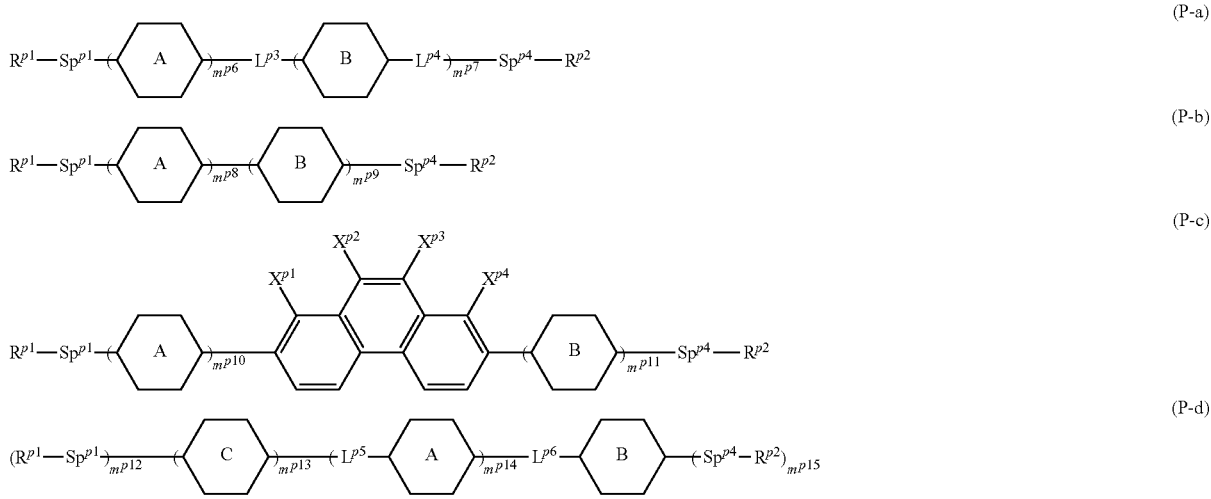

In general formulas (P-a) to (P-d), $R^{p1}$ and $R^{p2}$ each independently represent any of the following formulas (R-I) to (R-IX).

[Chem. 66]

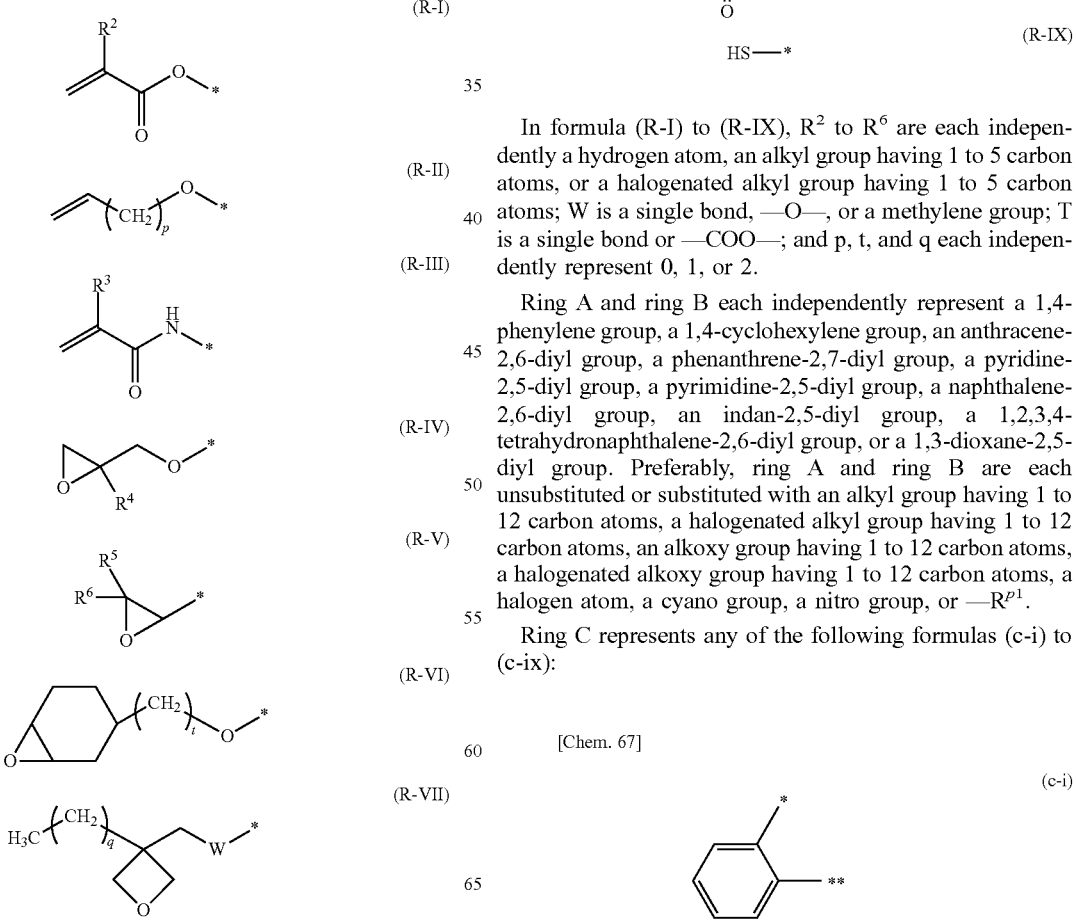

In formula (R-I) to (R-IX), $R^2$ to $R^6$ are each independently a hydrogen atom, an alkyl group having 1 to 5 carbon atoms, or a halogenated alkyl group having 1 to 5 carbon atoms; W is a single bond, —O—, or a methylene group; T is a single bond or —COO—; and p, t, and q each independently represent 0, 1, or 2.

Ring A and ring B each independently represent a 1,4-phenylene group, a 1,4-cyclohexylene group, an anthracene-2,6-diyl group, a phenanthrene-2,7-diyl group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group. Preferably, ring A and ring B are each unsubstituted or substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen atom, a cyano group, a nitro group, or —$R^{p1}$.

Ring C represents any of the following formulas (c-i) to (c-ix):

[Chem. 67]

(c-i)

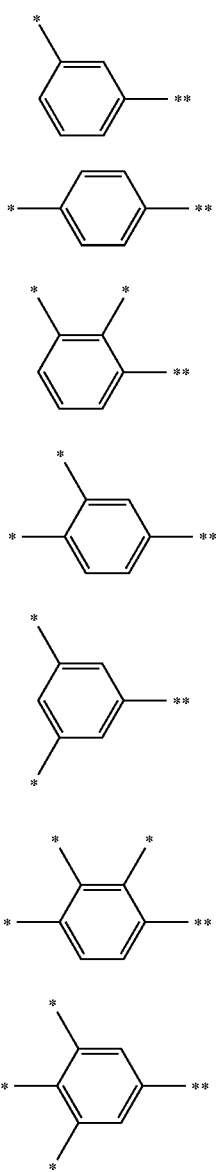

(c-ii)
(c-iii)
(c-iv)
(c-v)
(c-vi)
(c-vii)
(c-viii)

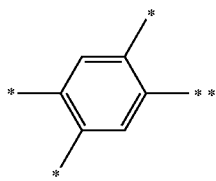

(c-ix)

(wherein * represents a bond to $Sp^{p1}$, and ** represents a bond to $L^{p5}$ or $L^{p6}$).

$Sp^{p1}$ and $Sp^{p4}$ each represent a spacer group, and $X^{p1}$ to $X^{p4}$ are each independently preferably a hydrogen atom or a halogen atom.

$L^{p4}$, $L^{p5}$ and $L^{p6}$ are each independently preferably a single bond, —OCH$_2$—, —CH$_2$O—, —CO—, —C$_2$H$_4$—, —COO—, —OCO—, —COOC$_2$H$_4$—, —OCOC$_2$H$_4$—, —C$_2$H$_4$OCO—, —C$_2$H$_4$COO—, —CF$_2$—, —CF$_2$O—, —(CH$_2$)$_z$—C(=O)—O—, —(CH$_2$)$_z$—O—(C=O)—, —O—(C=O)—(CH$_2$)$_z$—, —(C=O)—O—(CH$_2$)$_z$—, —O—(CH$_2$)$_z$—O—, —OCF$_2$—, —CH=CHCOO—, —COOCH=CH—, —OCOCH=CH—, or —C≡C—, and z in the above formulas is preferably an integer of 1 to 4.

$L^{p3}$ is preferably —CH=CHCOO—, —COOCH=CH—, or —OCOCH=CH—.

In the compound represented by general formula (P-a) above, $m^{p6}$ and $m^{p7}$ are each independently preferably 0, 1, 2, or 3. More preferably, $m^{p6}+m^{p7}=2$ to 5.

In the compound represented by general formula (P-d) above, $m^{p12}$ and $m^{p15}$ are each independently preferably 1, 2, or 3; $m^{p13}$ is preferably 0, 1, 2, or 3; and $m^{p14}$ is preferably 0 or 1. More preferably, $m^{p12}+m^{p15}=2$ to 5. When a plurality of $R^{p1}$s are present, they may be the same or different. When a plurality of $R^{p1}$s are present, they may be the same or different. When a plurality of $R^{p2}$s are present, they may be the same or different. When a plurality of $Sp^{p1}$s are present, they may be the same or different. When a plurality of $Sp^{p4}$s are present, they may be the same or different. When a plurality of $L^4$s and $L^{p5}$s are present, they may be the same or different. When a plurality of rings A to C are present, they may be the same or different.

Preferred structures of the compounds represented by general formulas (P-a) to (P-d) in the present invention will next be exemplified.

Preferred examples of the compound represented by general formula (P-a) in the present invention include polymerizable compounds represented by formulas (P-a-1) to (P-a-31) below.

[Chem. 68]

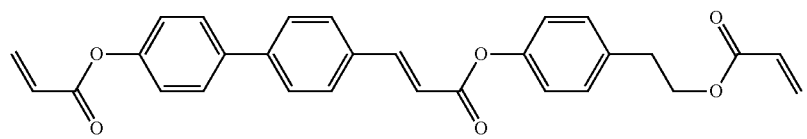

(P-a-1)

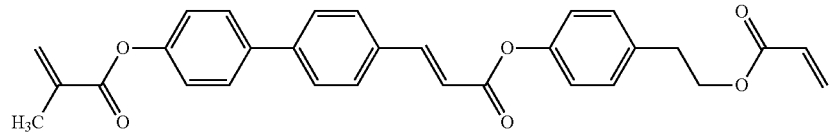

(P-a-2)

-continued
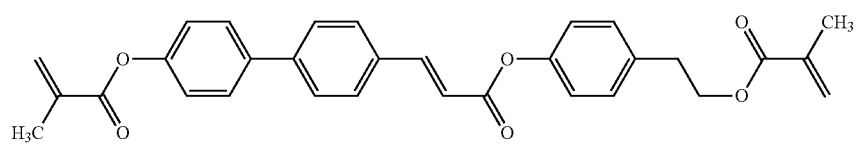 (P-a-3)
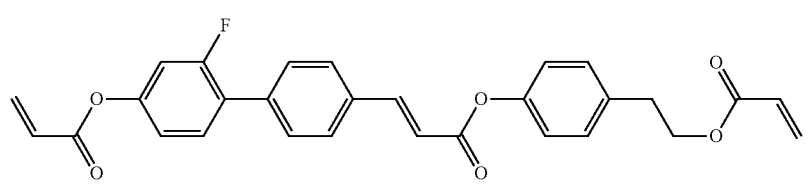 (P-a-4)
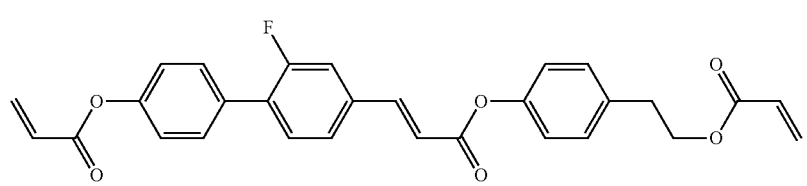 (P-a-5)
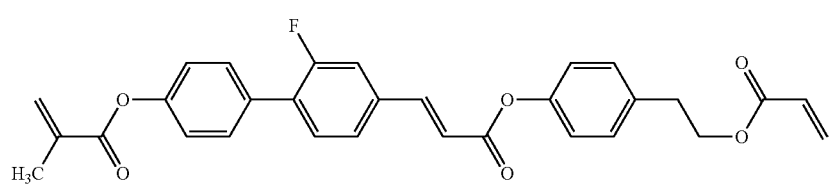 (P-a-6)
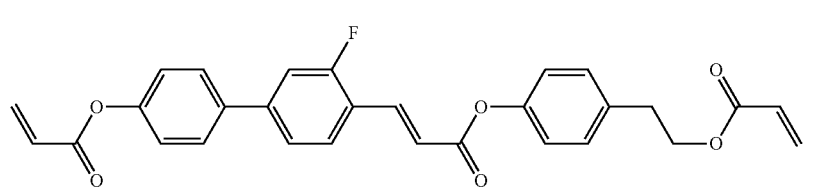 (P-a-7)
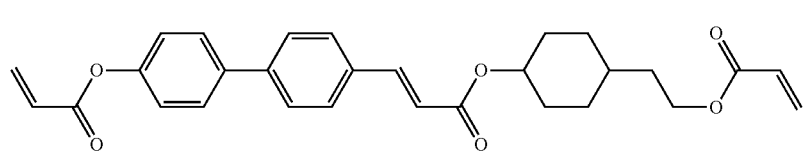 (P-a-8)
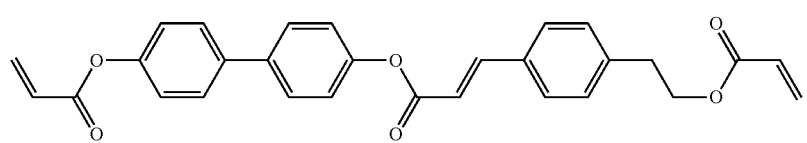 (P-a-9)
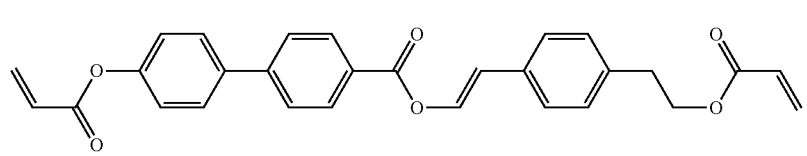 (P-a-10)
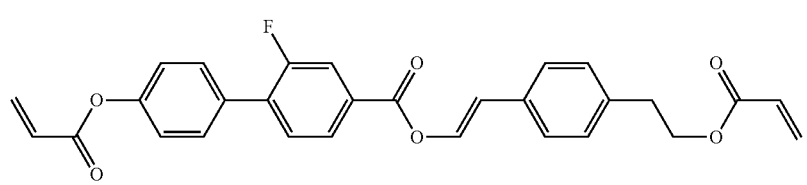 (P-a-11)

(P-a-12)
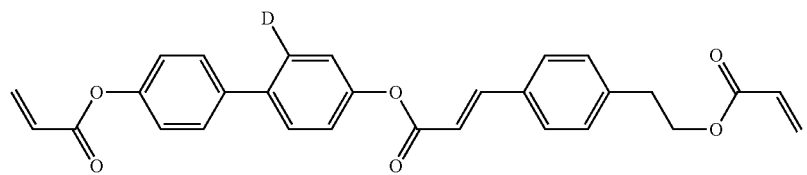
(P-a-13)
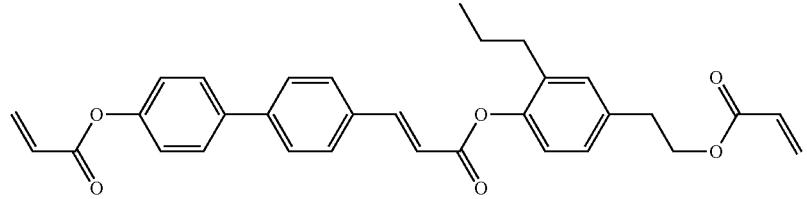
[Chem. 69]
(P-a-14)
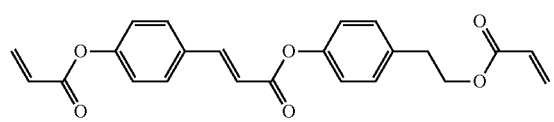
(P-a-15)
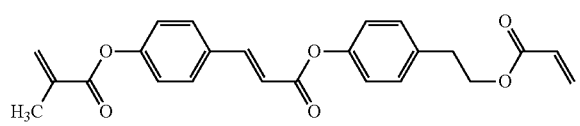
(P-a-16)
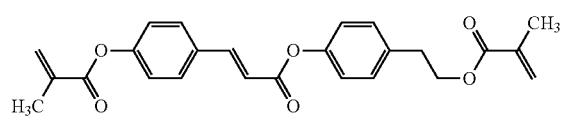
(P-a-17)
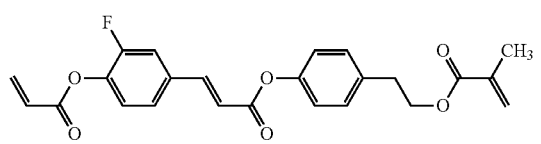
(P-a-18)
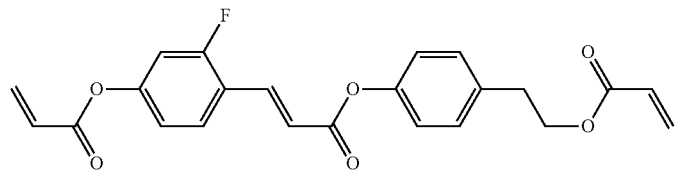
[Chem. 70]
(P-a-19)
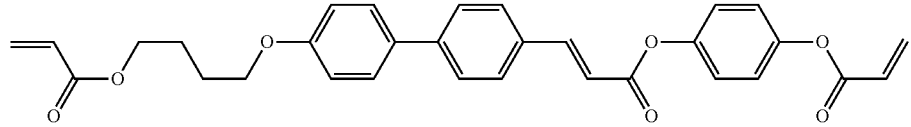
(P-a-20)
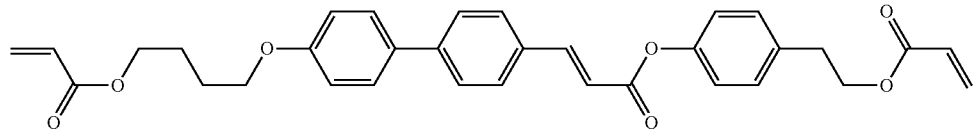
(P-a-21)
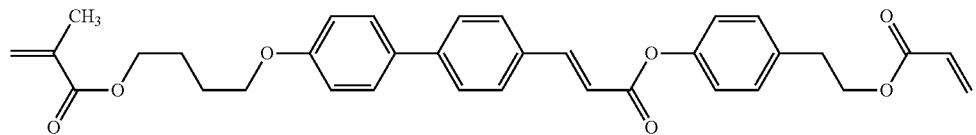
(P-a-22)
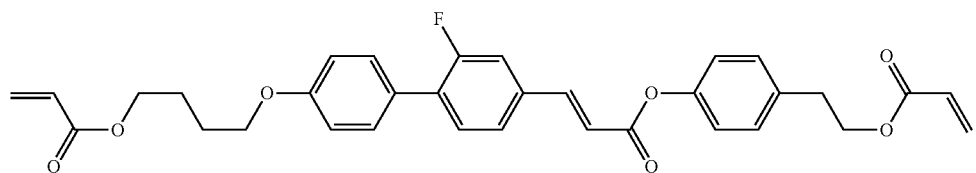

(P-a-23)
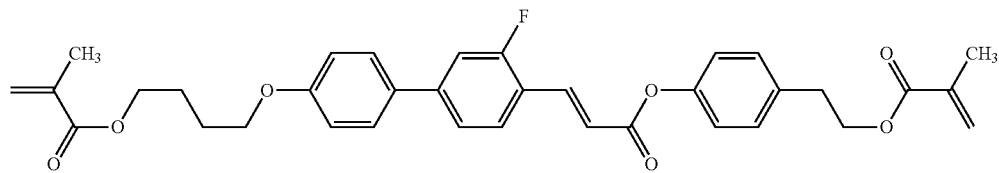
(P-a-24)
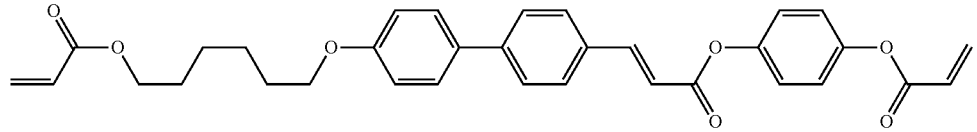
(P-a-25)
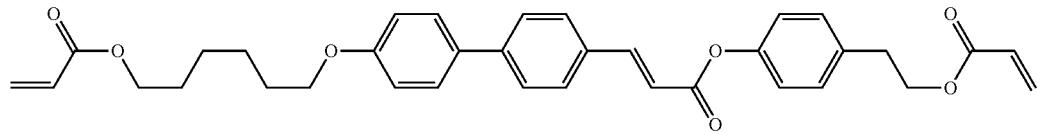
(P-a-26)
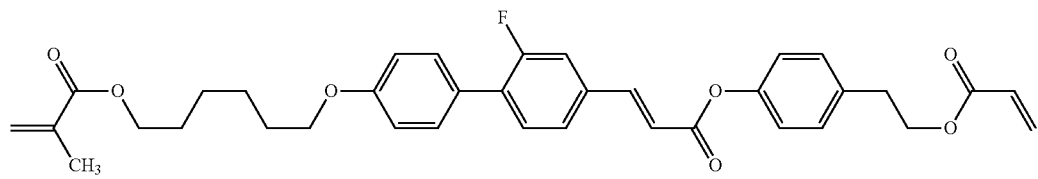
(P-a-27)
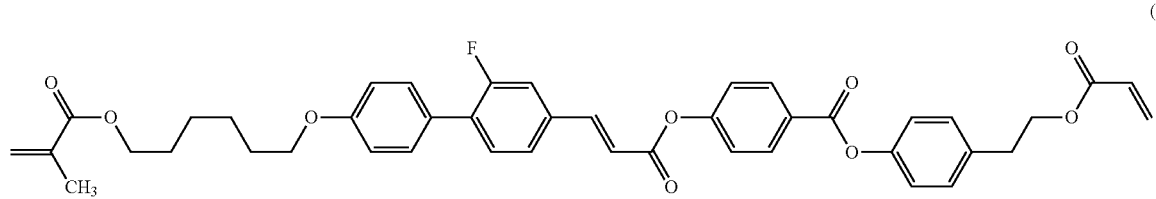
[Chem. 71]
(P-a-28)
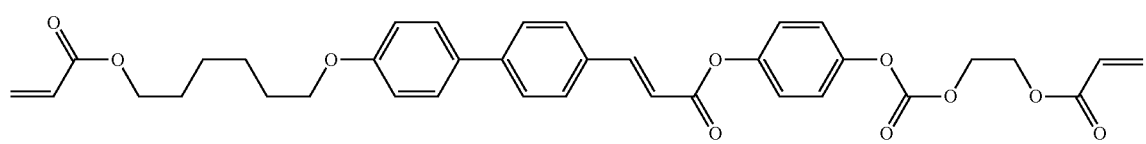
(P-a-29)
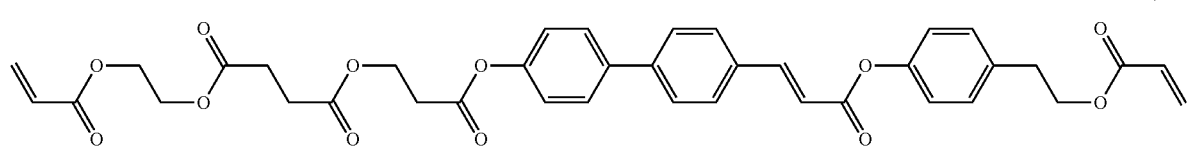
(P-a-30)
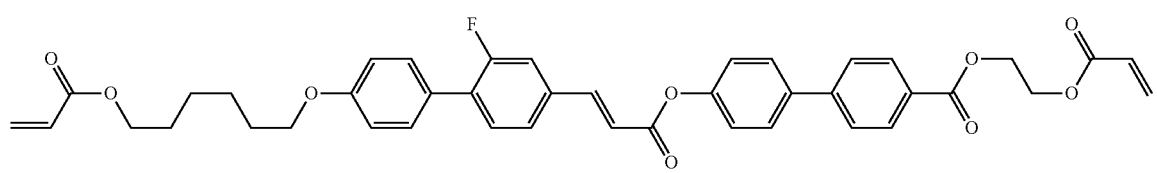
(P-a-31)
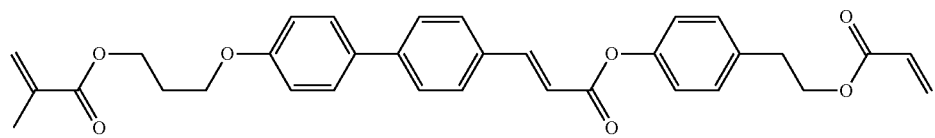

Preferred examples of the compound represented by general formula (P-b) in the present invention include polymerizable compounds represented by formulas (P-b-1) to (P-b-34) below.
[Chem. 72]
(P-b-1)
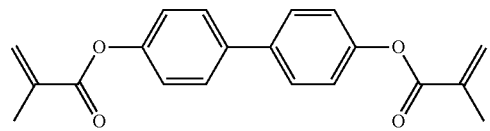
(P-b-2)
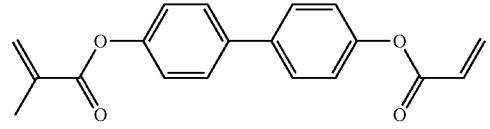
(P-b-3)
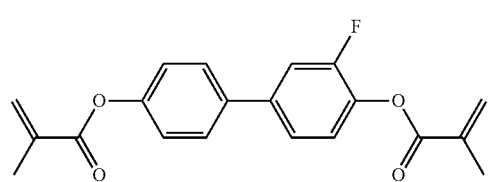
(P-b-4)
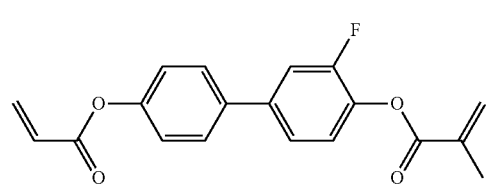
(P-b-5)
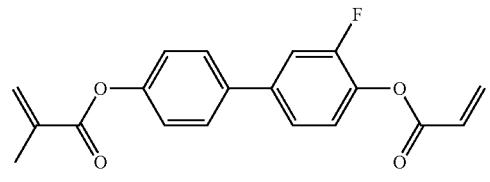
(P-b-6)
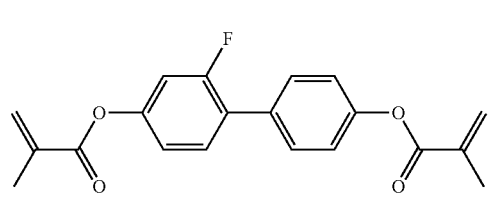
(P-b-7)
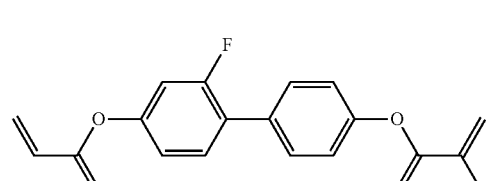
(P-b-8)
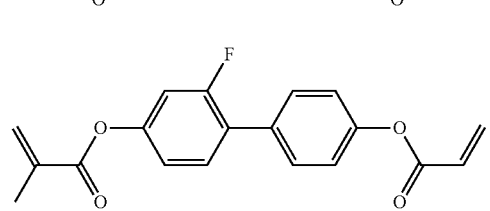
(P-b-9)
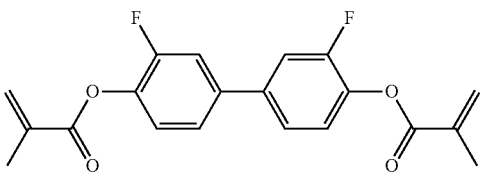
(P-b-10)
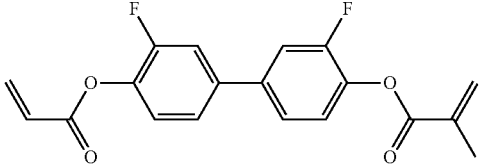
(P-b-11)
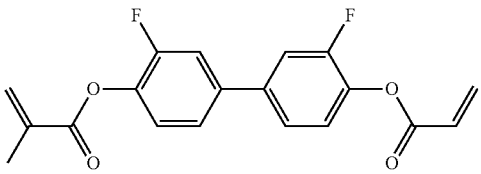
(P-b-12)
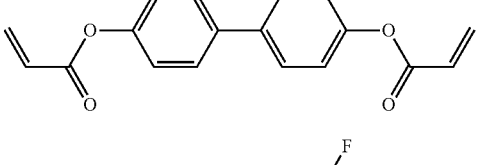
(P-b-13)
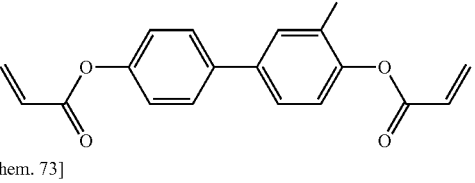
[Chem. 73]
(P-b-14)
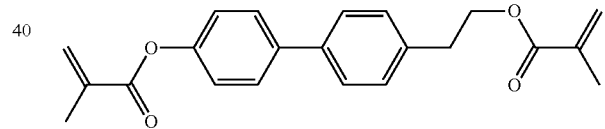
(P-b-15)
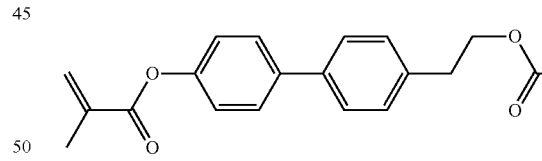
(P-b-16)
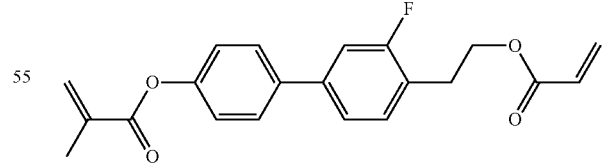
(P-b-17)
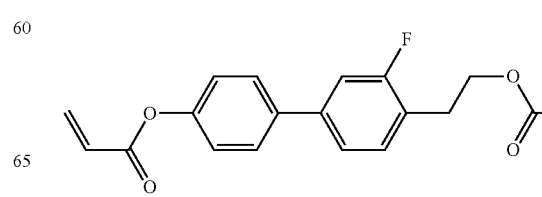

(P-b-18) 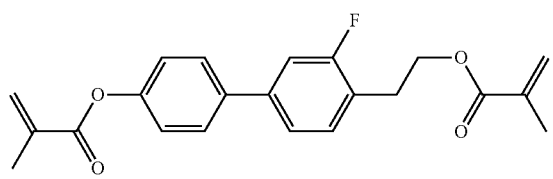
(P-b-19) 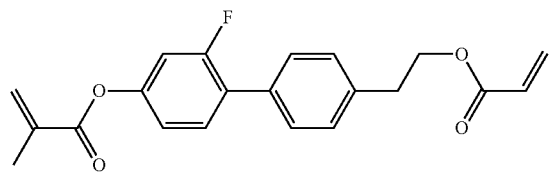
(P-b-20) 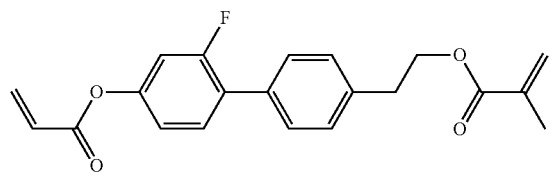
(P-b-21) 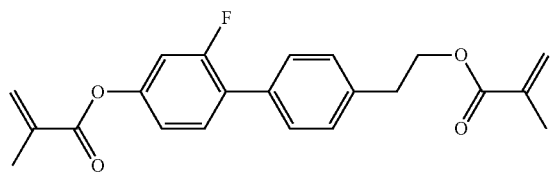
(P-b-22) 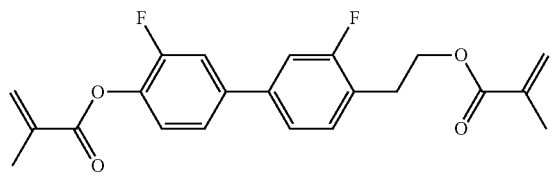
(P-b-23) 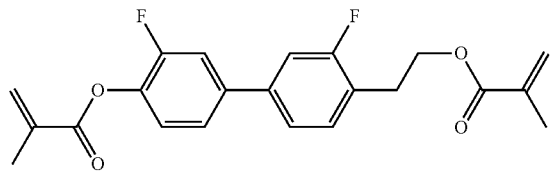
(P-b-24) 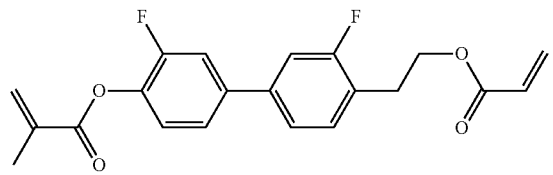
(P-b-25) 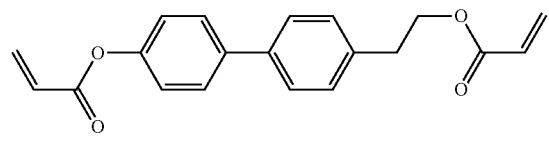
(P-b-26) 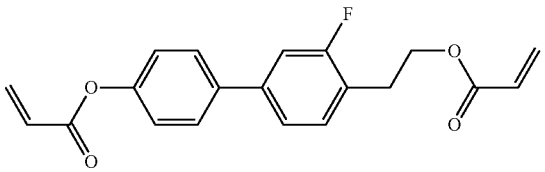
[Chem. 74]
(P-b-27) 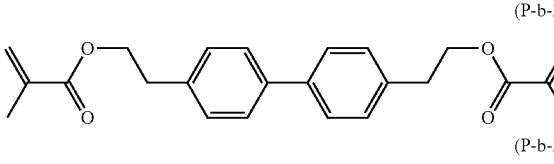
(P-b-28) 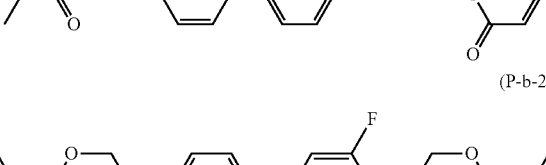
(P-b-29) 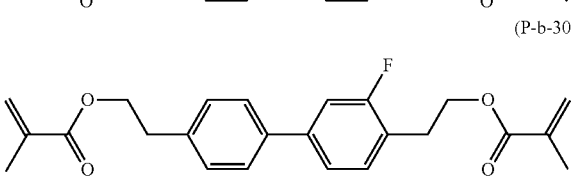
(P-b-30) 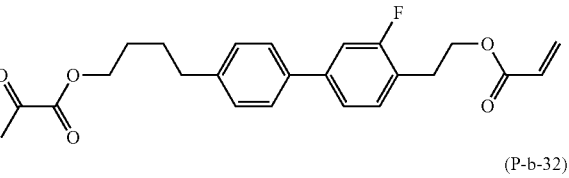
(P-b-31) 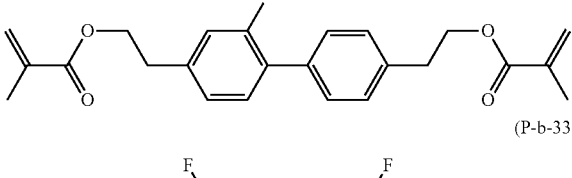
(P-b-32) 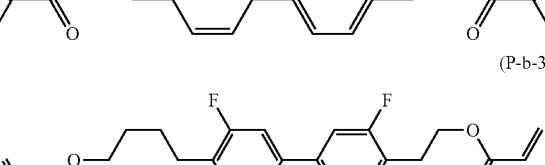
(P-b-33) 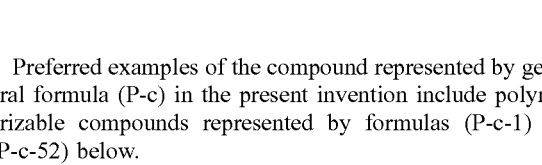
(P-b-34)
Preferred examples of the compound represented by general formula (P-c) in the present invention include polymerizable compounds represented by formulas (P-c-1) to (P-c-52) below.

[Chem. 75]
(P-c-1)
(P-c-2)
(P-c-3)
(P-c-4)
(P-c-5)
(P-c-6)
(P-c-7)
(P-c-8)
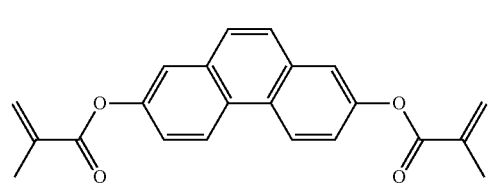
-continued
(P-c-9)
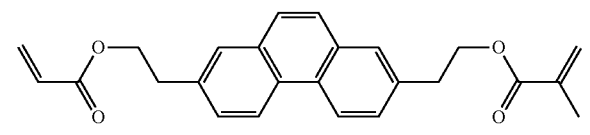
(P-c-10)
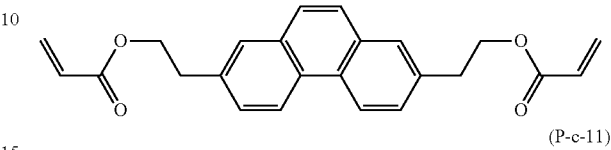
(P-c-11)
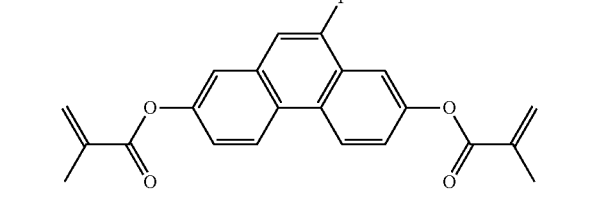
(P-c-12)
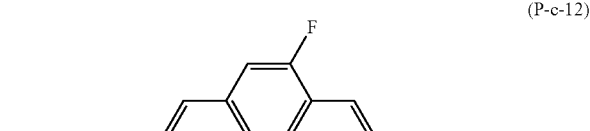
(P-c-13)
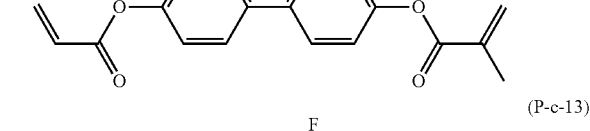
(P-c-14)
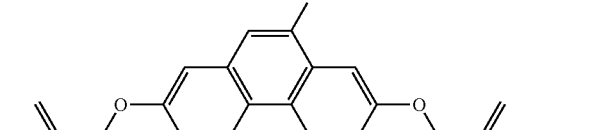
(P-c-15)

-continued (P-c-16)
(P-c-17)
(P-c-18)
(P-c-19)
(P-c-20)
(P-c-21)
(P-c-22)

-continued (P-c-23)
(P-c-24)
(P-c-25)
(P-c-26)
(P-c-27)
(P-c-28)
(P-c-29)

[Chem. 76]

(P-c-30) 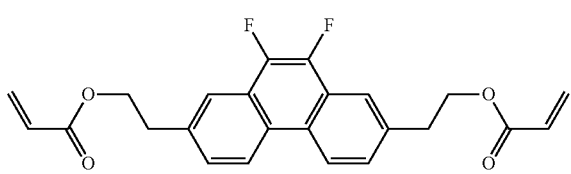
(P-c-31) 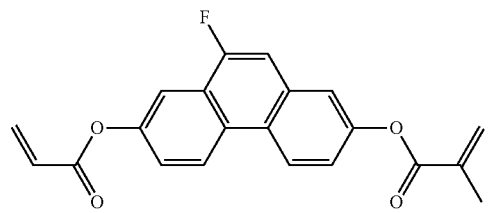
(P-c-32) 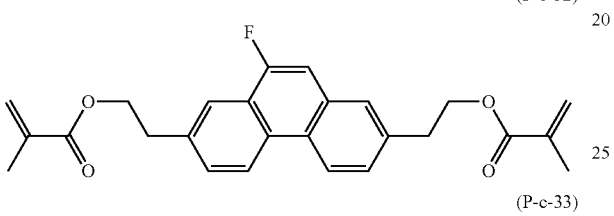
(P-c-33) 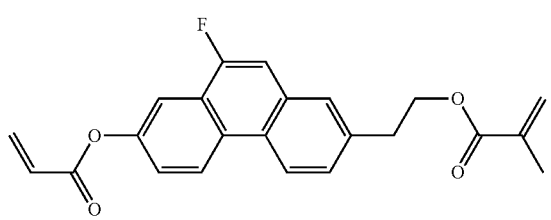
(P-c-34) 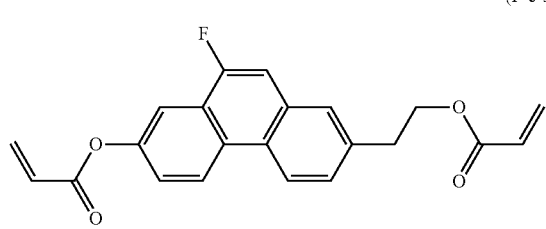
(P-c-35) 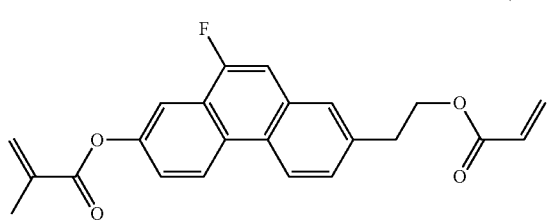
(P-c-36) 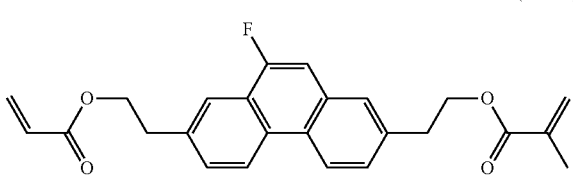
(P-c-37) 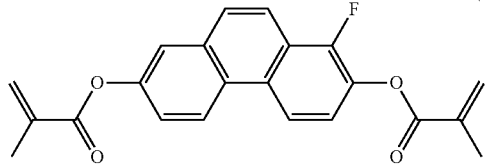
(P-c-38) 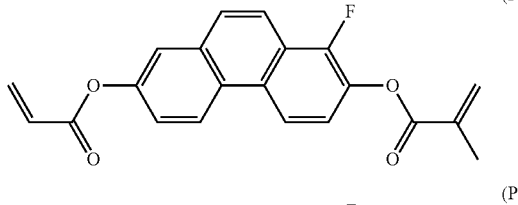
(P-c-39) 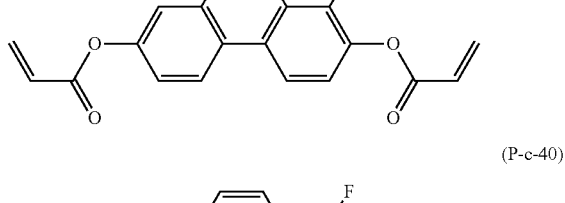
(P-c-40) 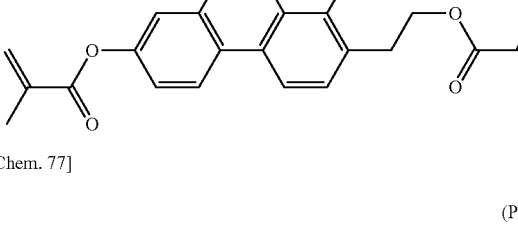
[Chem. 77]
(P-c-41) 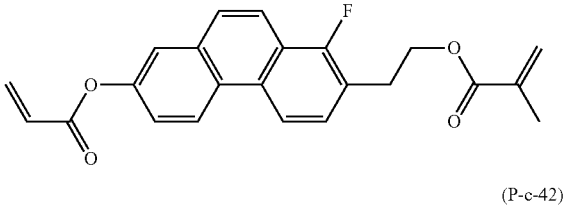
(P-c-42) 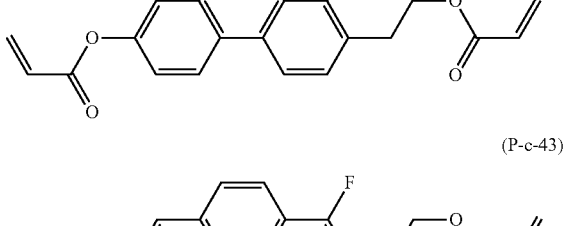
(P-c-43) 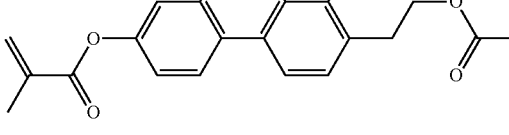
(P-c-44) 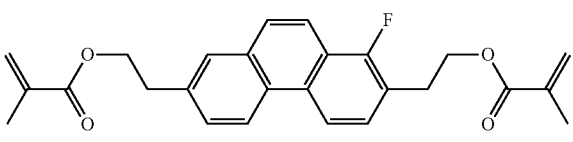

-continued (P-c-45)
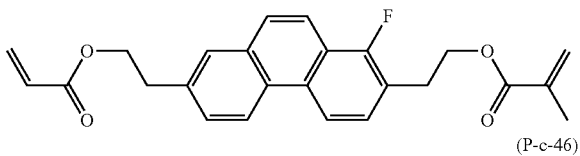

(P-c-46)
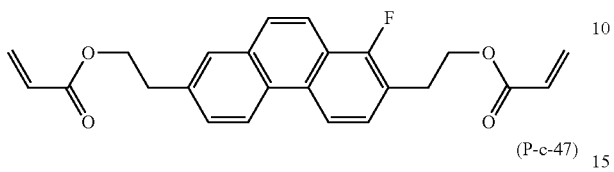

(P-c-47)
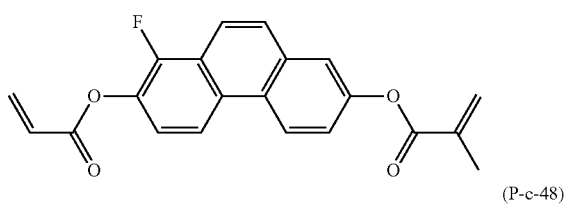

(P-c-48)
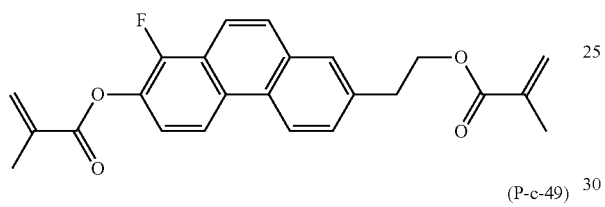

(P-c-49)
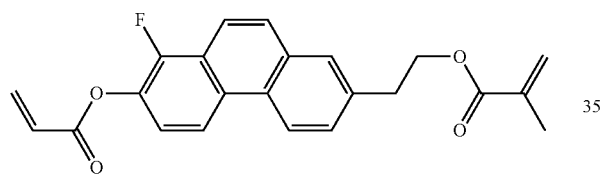

(P-c-50)
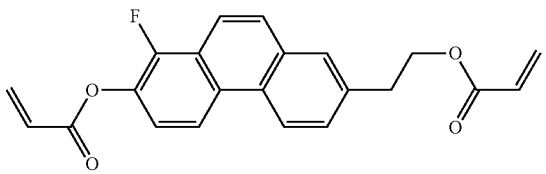

(P-c-51)

(P-c-52)
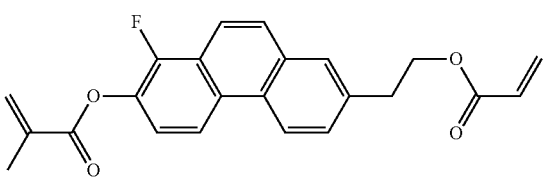

The compound represented by general formula (P-d) in the present invention is preferably a compound represented by the following general formula (P-d'):

[Chem. 78]

(P-d')
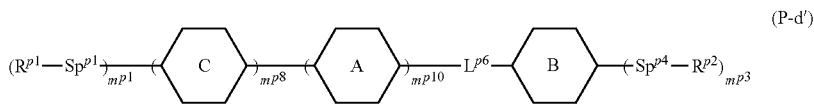

(in the compound represented by general formula (P-d') above, $m^{p10}$ is more preferably 2 or 3, and, since other symbols are the same as those in general formula (p-d) above, their descriptions will be omitted).

Preferred examples of the compound represented by general formula (P-d) in the present invention include polymerizable compounds represented by formulas (P-d-1) to (P-d-31) below.

[Chem. 79]
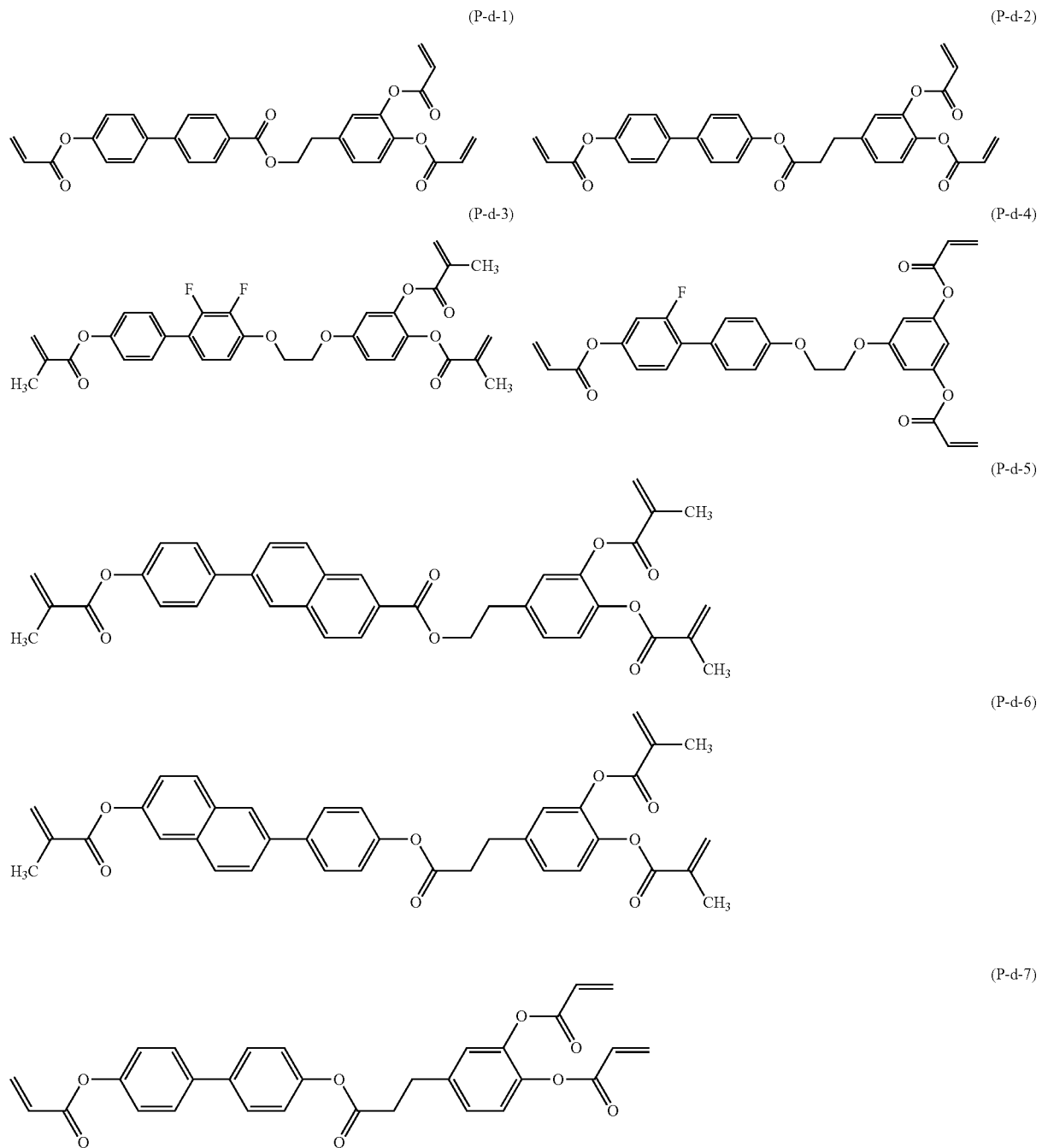
[Chem. 80]
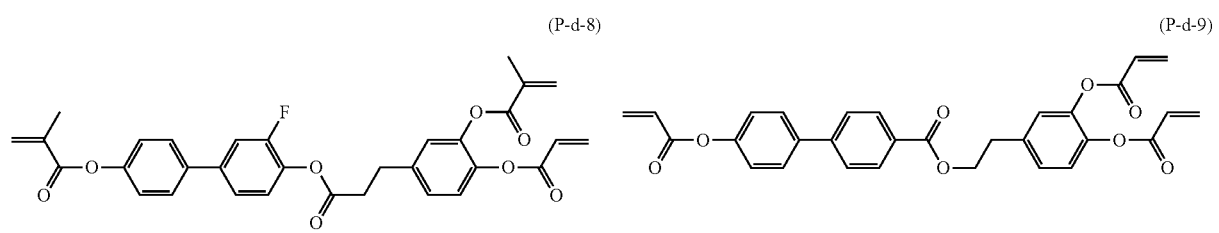

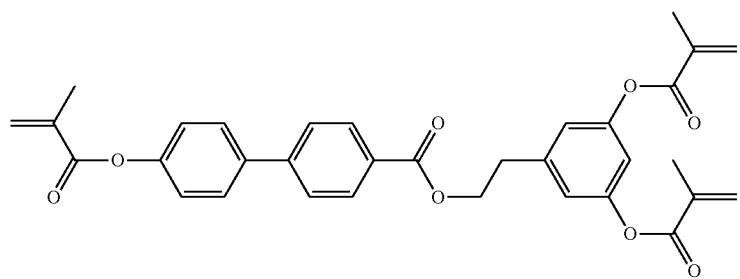
(P-d-10)
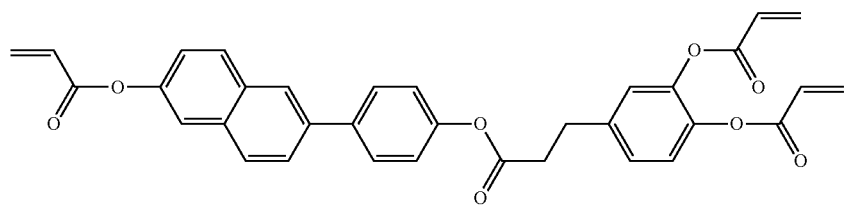
(P-d-11)
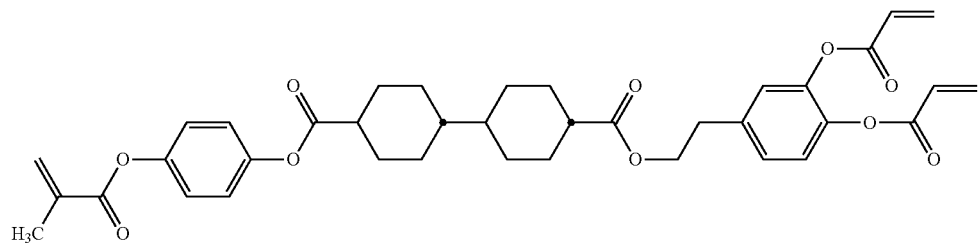
(P-d-12)
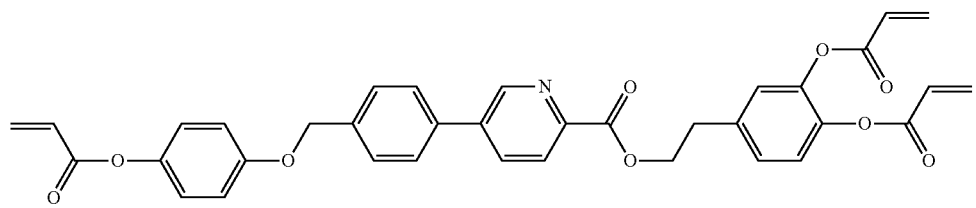
(P-d-13)
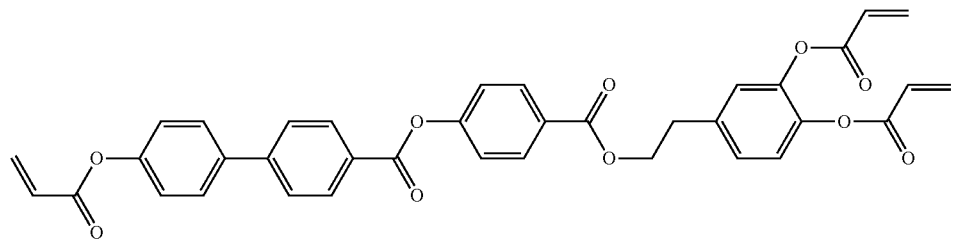
(P-d-14)
[Chem. 81]
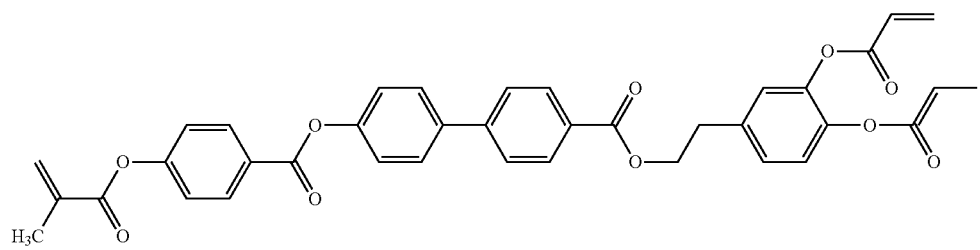
(P-d-15)

-continued
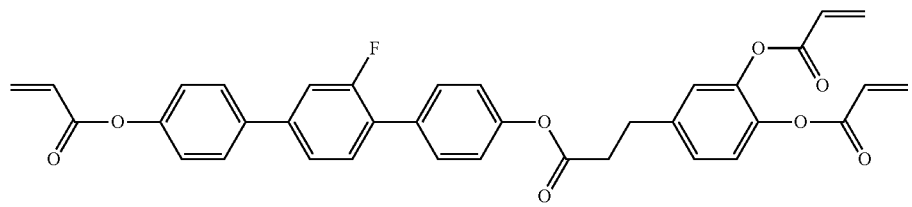
(P-d-16)
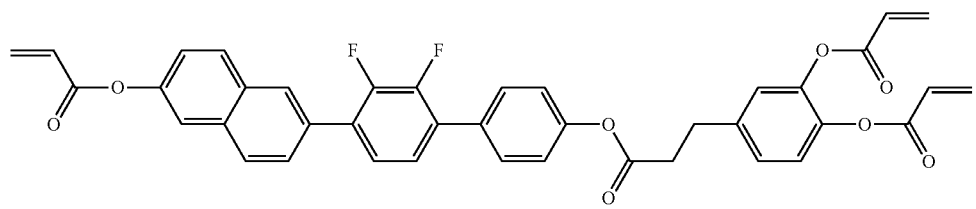
(P-d-17)
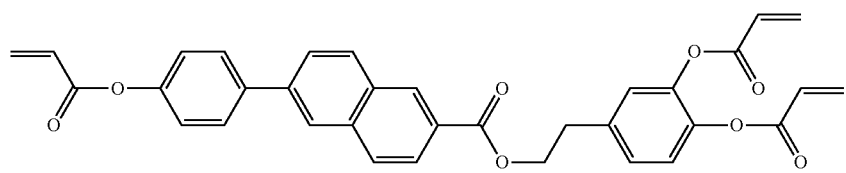
(P-d-18)
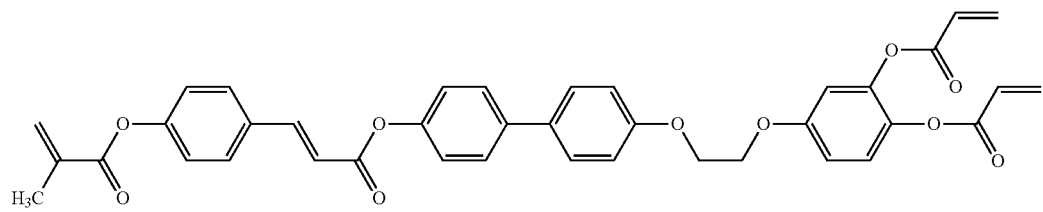
(P-d-19)
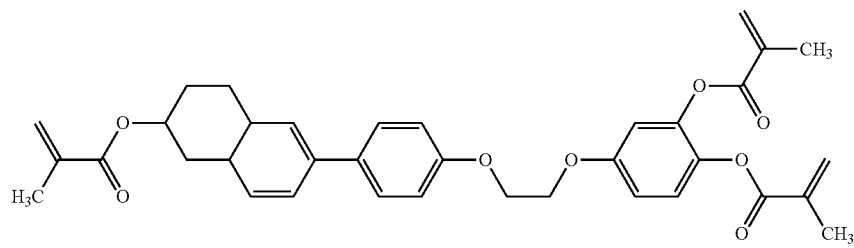
(P-d-20)
[Chem. 82]
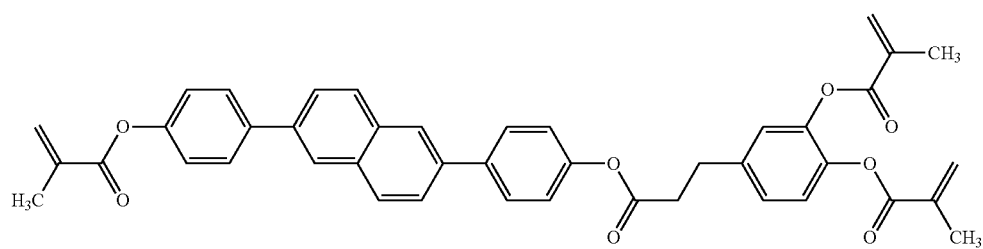
(P-d-21)
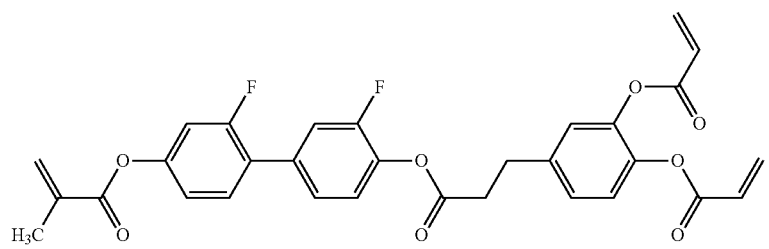
(P-d-22)

(P-d-23)
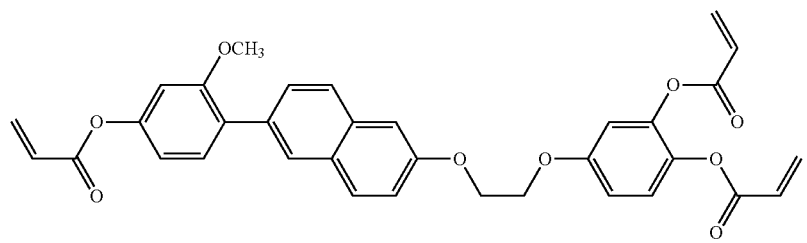
[Chem. 83]
(P-d-24) (P-d-25)
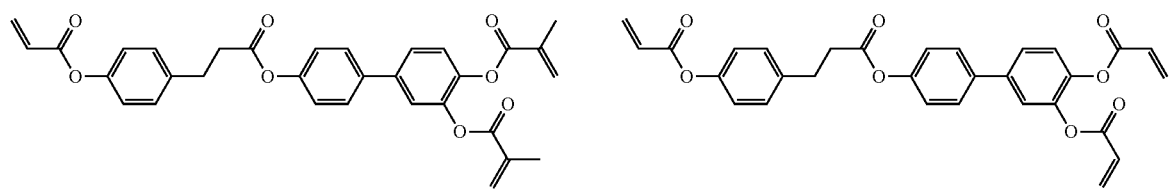
(P-d-26) (P-d-27)
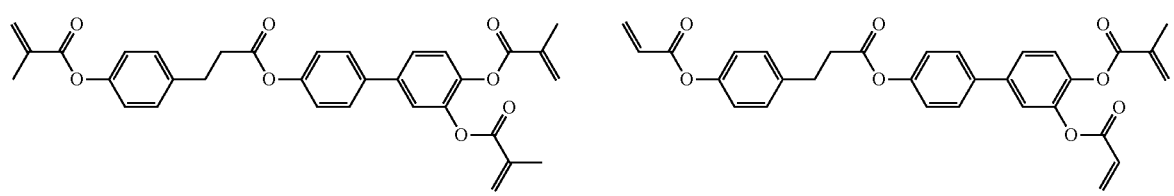
(P-d-28)
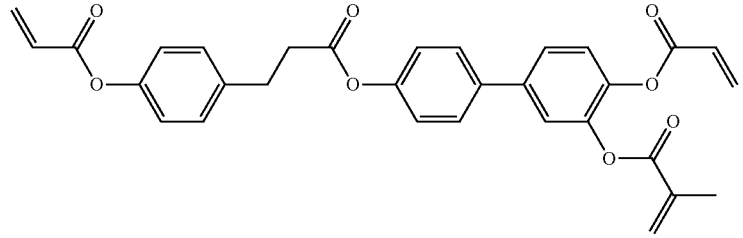
[Chem. 84]
(P-d-29) (P-d-30)
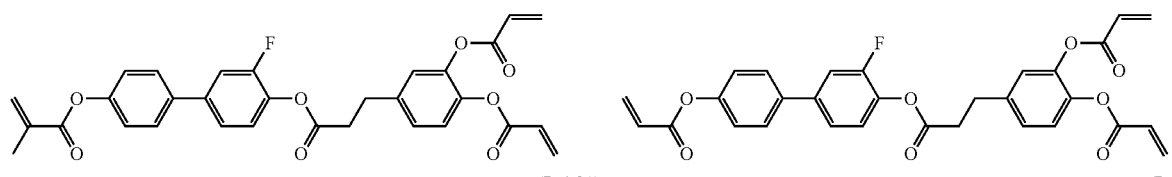
(P-d-31) (P-d-32)
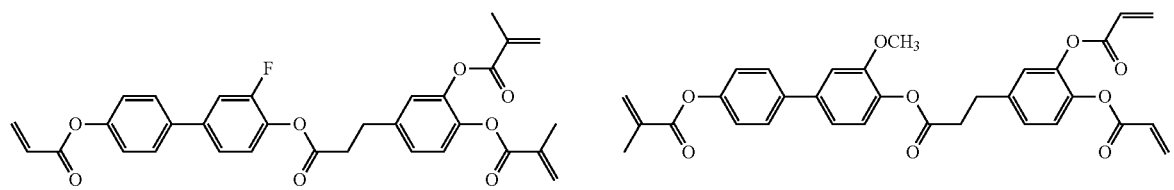
(P-d-33)
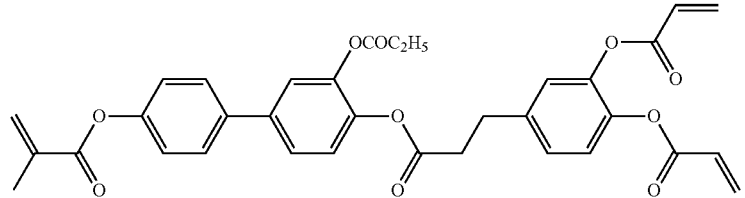

[Chem. 85]

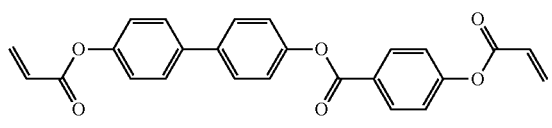
(P-d-34)

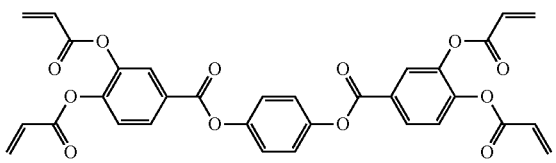
(P-d-35)

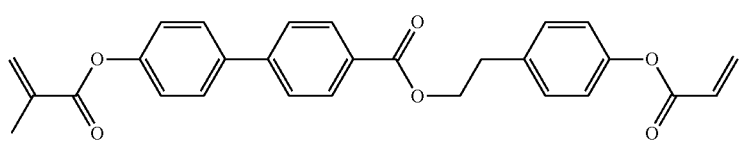
(P-d-36)

The "alkyl group having 1 to 15 carbon atoms" in the present invention is preferably a linear or branched alkyl group and is more preferably a linear alkyl group. In general formula (1) above, $R^1$ and $R^2$ are each independently an alkyl group having 1 to 15 carbon atoms. $R^1$ and $R^2$ are each independently preferably an alkyl group having 1 to 8 carbon atoms and more preferably an alkyl group having 1 to 6 carbon atoms.

Examples of the "alkyl group having 1 to 15 carbon atoms" in the present invention include a methyl group, an ethyl group, a propyl group, a butyl group, an isopropyl group, an isobutyl group, a t-butyl group, a 3-pentyl group, an isopentyl group, a neopentyl group, a pentyl group, a hexyl group, a heptyl group, an octyl group, a nonyl group, a decyl group, a dodecyl group, and a pentadecyl group. In the present description, these examples are common to all alkyl groups, and an appropriate alkyl group is selected from these examples according to the number of carbon atoms.

One preferred example of the "alkoxy group having 1 to 15 carbon atoms" in the present invention is an alkoxy group in which at least one oxygen atom in the substituent is present at a position where it is directly bondable to a ring structure. More preferred examples include a methoxy group, an ethoxy group, propoxy groups (a n-propoxy group, an i-propoxy group), a butoxy group, a pentyloxy group, an octyloxy group, and a decyloxy group. In the present description, these examples are common to all alkoxy groups, and an appropriate alkoxy group is selected from these examples according to the number of carbon atoms.

Examples of the "alkenyl group having 2 to 15 carbon atoms" in the present invention include a vinyl group, an allyl group, a 1-propenyl group, an isopropenyl group, a 2-butenyl group, a 3-butenyl group, a 1,3-butadienyl group, a 2-pentenyl group, a 3-pentenyl group, and a 2-hexenyl group. More preferred examples of the alkenyl group in the present invention include alkenyl groups represented by the following formula (i) (a vinyl group), formula (ii) (a 1-propenyl group), formula (iii) (a 3-butenyl group), formula (iv) (a 3-pentenyl group):

[Chem. 86]

(i)

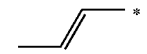
(ii)

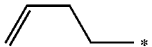
(iii)

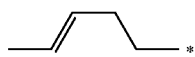
(iv)

(wherein, in formulas (i) to (iv), * is a position to be bonded to a ring structure). When the liquid crystal composition in the present invention contains a polymerizable monomer, the structures represented by formulas (ii) and (iv) are preferred, and the structure represented by formula (ii) is more preferred. In the present description, these examples are common to all alkenyl groups, and an appropriate alkenyl group is selected from these examples according to the number of carbon atoms.

Among the polymerizable compounds in the present invention, a polymerizable compound represented by the following general formula (VI) is preferred as a polymerizable compound having a monofunctional reactive group that is preferable for increasing solubility in a low molecular weight liquid crystal to prevent crystallization:

[Chem. 87]

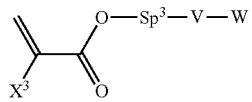
(VI)

(wherein $X^3$ represents a hydrogen atom or a methyl group; $Sp^3$ represents a single bond, an alkylene group having 1 to 12 carbon atoms, —O—$(CH_2)_t$— (wherein t represents an integer of 2 to 11, and the oxygen atom is bonded to an aromatic ring); V represents a linear or branched polyvalent alkylene group having 2 to 20 carbon atoms or a polyvalent cyclic substituent having 5 to 30 carbon atoms; the alkylene group in the polyvalent alkylene group is optionally substituted with an oxygen atom, provided that no oxygen atoms are adjacent to each other; the alkylene group in the polyvalent alkylene group is optionally substituted with an alkyl group having 5 to 20 carbon atoms (wherein the alkylene group in the resulting group is optionally substituted with an oxygen atom, provided that no oxygen atoms are adjacent to each other) or with a cyclic substituent; W represents a hydrogen atom, a halogen atom, or an alkyl group having 1 to 15 carbon atoms; and, in each 1,4-phenylene group in the formula, any hydrogen atom is optionally substituted with —CH$_3$, —OCH$_3$, a fluorine atom, or a cyano group)

In general formula (VI) above, X$^3$ represents a hydrogen atom or a methyl group. When importance is attached to response speed, X$^3$ is preferably a hydrogen atom. When importance is attached to reducing the amount of reaction residues, X$^3$ is preferably a methyl group.

In general formula (VI) above, Sp$^3$ represents a single bond, an alkylene group having 1 to 12 carbon atoms, or —O—(CH$_2$)$_t$— (wherein t represents an integer of 2 to 11, and the oxygen atom is bonded to an aromatic ring). When the content of the polymerizable compound is less than 10% by weight, it is preferable that the carbon chain of Sp$^3$ is not excessively long because the length of the carbon chain has an influence on Tg, and Sp$^3$ is preferably a single bond or an alkylene group having 1 to 5 carbon atoms. When the content of the polymerizable compound is less than 6% by weight, Sp$^3$ is more preferably a single bond or an alkylene group having 1 to 3 carbon atoms. When the content of the polymerizable compound is 10% by weight or more, Sp$^3$ is preferably an alkylene group having 5 to 10 carbon atoms. When Sp$^3$ represents —O—(CH$_2$)$_t$—, t is preferably 1 to 5 and more preferably 1 to 3. Since the number of carbon atoms has an influence on a pretilt angle, it is preferable that a mixture of a plurality of polymerizable compounds that differ in the number of carbon atoms in Sp$^3$ is used as needed so that the desired pretilt angle is obtained.

In general formula (VI) above, V represents a linear or branched polyvalent alkylene group having 2 to 20 carbon atoms or a polyvalent cyclic substituent having 5 to 30 carbon atoms. The alkylene group in the polyvalent alkylene group is optionally substituted with an oxygen atom, provided that no oxygen atoms are adjacent to each other. The alkylene group in the polyvalent alkylene group is optionally substituted with an alkyl group having 5 to 20 carbon atoms (wherein the alkylene group in the resulting group is optionally substituted with an oxygen atom, provided that no oxygen atoms are adjacent to each other) or with a cyclic substituent and is preferably substituted with two or more cyclic substituents.

One specific example of the polymerizable compound represented by general formula (VI) is a compound represented by general formula (XIa):

[Chem. 88]

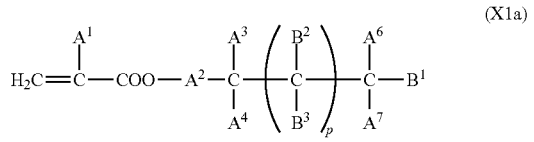

(XIa)

(wherein A$^1$ represents a hydrogen atom or a methyl group;

A$^2$ represents a single bond or an alkylene group having 1 to 8 carbon atoms (wherein one or two or more methylene groups in the alkylene group are each independently optionally substituted with an oxygen atom, —CO—, —COO—, or —OCO—, provided that no oxygen atoms are directly bonded to each other, and wherein one or two or more hydrogen atoms in the alkylene group are each independently optionally substituted with a fluorine atom, a methyl group, or an ethyl group);

A$^3$ and A$^6$ each independently represent a hydrogen atom, a halogen atom, or an alkyl group having 1 to 10 carbon atoms (wherein one or two or more methylene groups in the alkyl group are each independently optionally substituted with an oxygen atom, —CO—, —COO—, or —OCO—, provided that no oxygen atoms are directly bonded to each other, and wherein one or two or more hydrogen atoms in the alkyl group are each independently optionally substituted with a halogen atom or an alkyl group having 1 to 17 carbon atoms);

A$^4$ and A$^7$ each independently represent a hydrogen atom, a halogen atom, or an alkyl group having 1 to 10 carbon atoms (wherein one or two or more methylene groups in the alkyl group are each independently optionally substituted with an oxygen atom, —CO—, —COO—, or —OCO—, provided that no oxygen atoms are directly bonded to each other, and wherein one or two or more hydrogen atoms in the alkyl group are each independently optionally substituted with a halogen atom or an alkyl group having 1 to 9 carbon atoms); and B$^1$, B$^2$, and B$^3$ each independently represent a hydrogen atom or a linear or branched alkyl group having 1 to 10 carbon atoms (wherein one or two or more methylene groups in the alkyl group are each independently optionally substituted with an oxygen atom, —CO—, —COO—, or —OCO—, provided that no oxygen atoms are directly bonded to each other, and wherein one or two or more hydrogen atoms in the alkyl group are each independently optionally substituted with a halogen atom or a trialkoxysilyl group having 3 to 6 carbon atoms).

General formula (XIa) above is preferably a compound represented by general formula (II-b).

[Chem. 89]

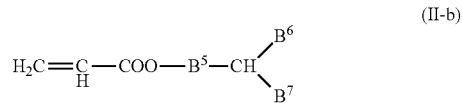

(II-b)

Specifically, the compound represented by general formula (II-b) is preferably a compound represented by any of the following formulas (II-q) to (II-z) and (II-aa) to (II-a1).

[Chem. 90]

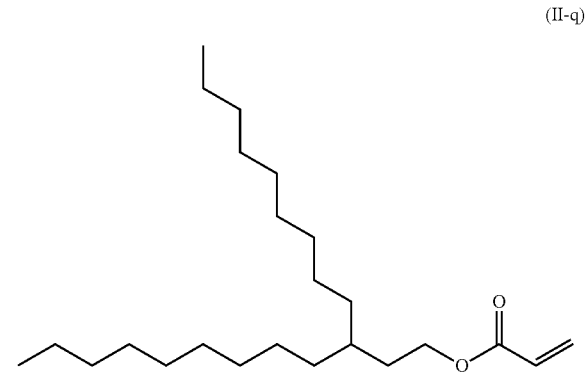

(II-q)

(II-r)
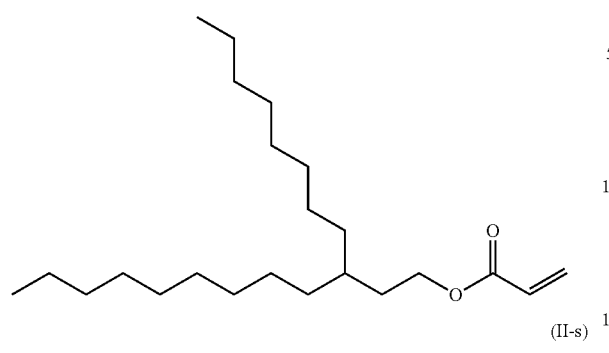
(II-s)
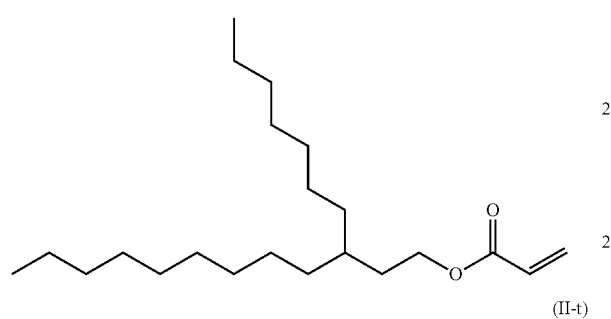
(II-t)
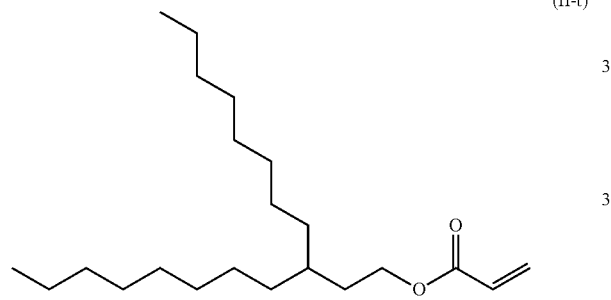
(II-u)
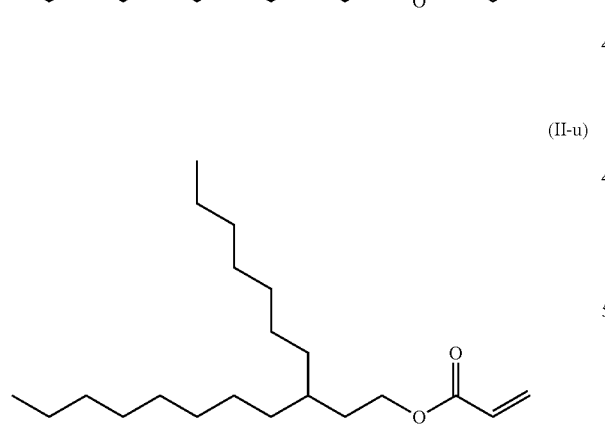
(II-v)
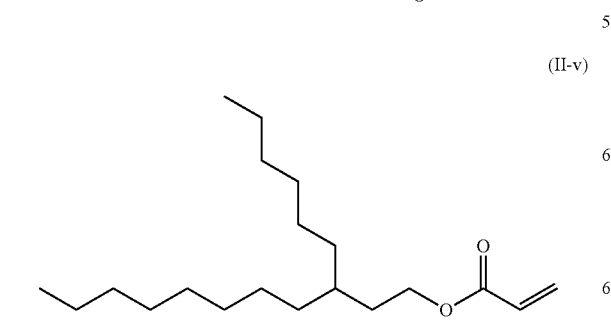
(II-x)
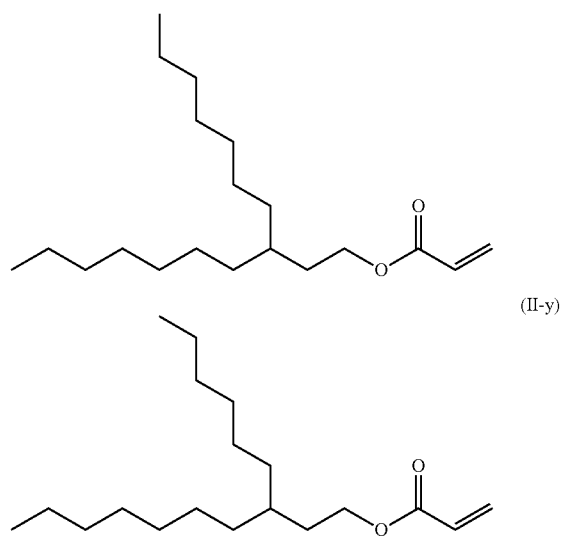
(II-y)
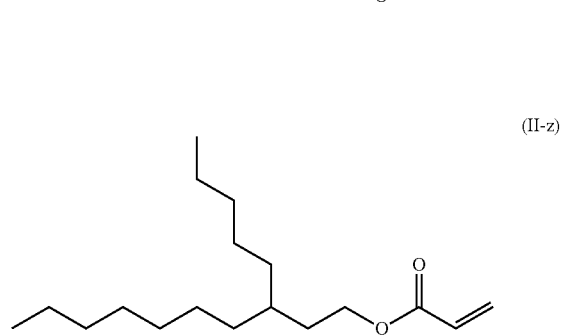
(II-z)
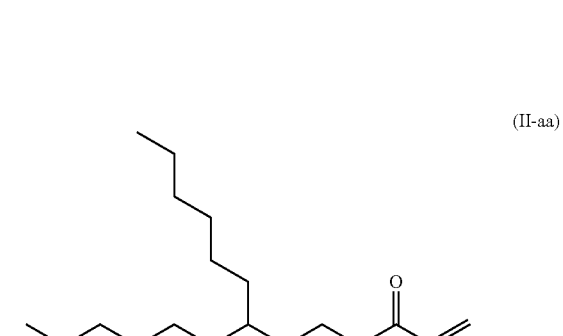
(II-aa)
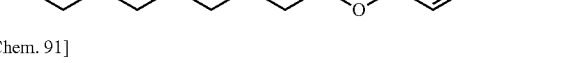
[Chem. 91]
(II-ab)
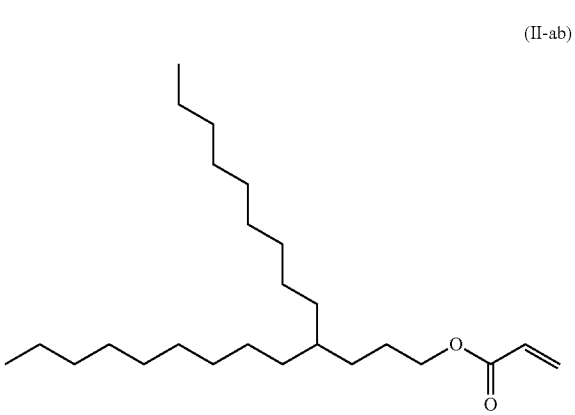

-continued
(II-ac)
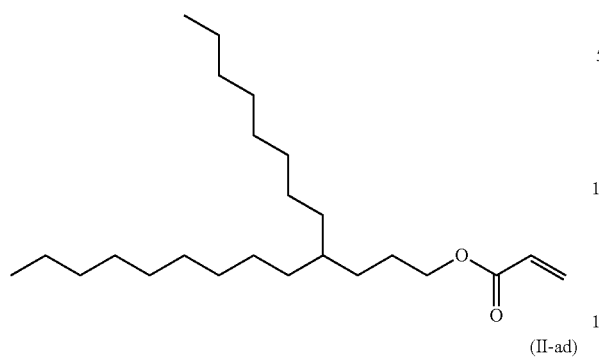
(II-ag)
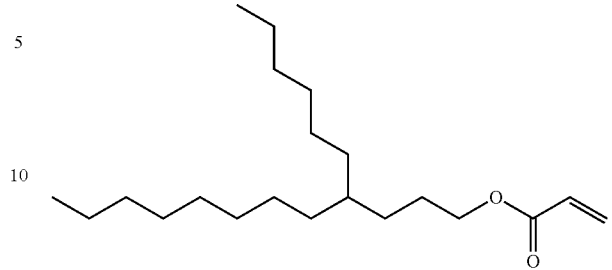
(II-ad)
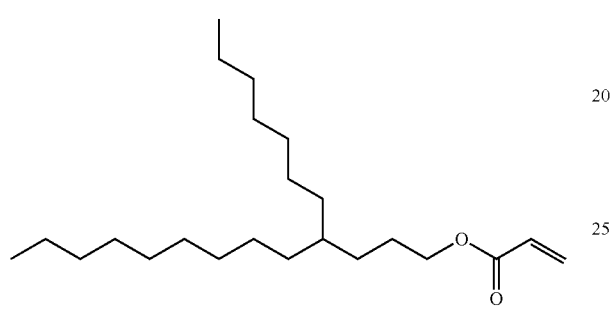
(II-ae)
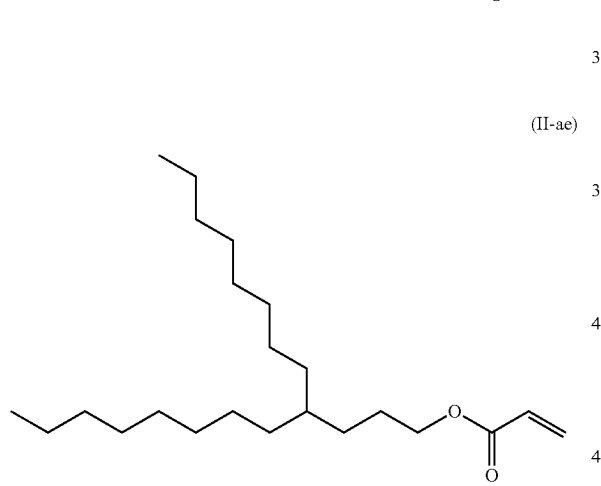
(II-ah)
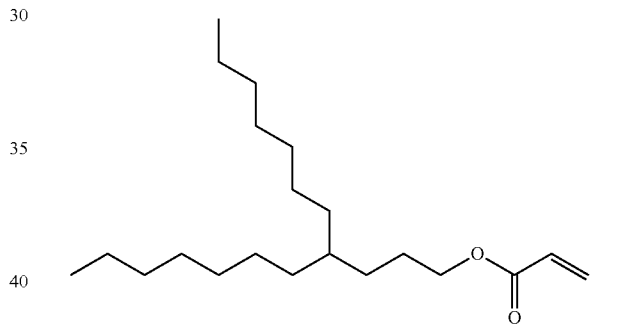
[Chem. 92]
(II-af)
(II-ai)
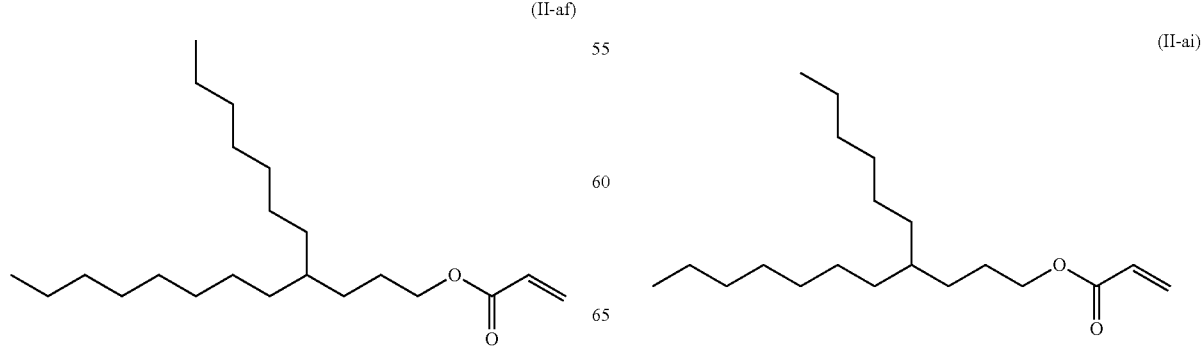

-continued (II-aj)

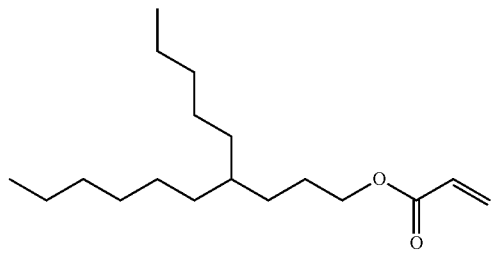

(II-ak)

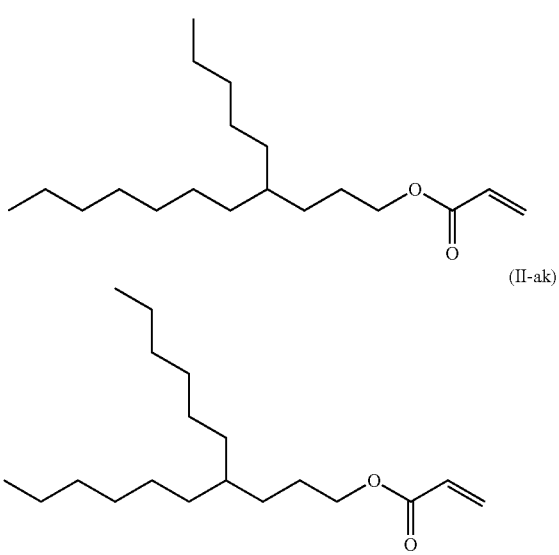

-continued (II-al)

One or two or more compounds represented by general formulas (VI), (XaI), and (II-b) may be used.

The polymerizable compound represented by general formula (VI) may also be a compound represented by general formula (X1b):

[Chem. 93]

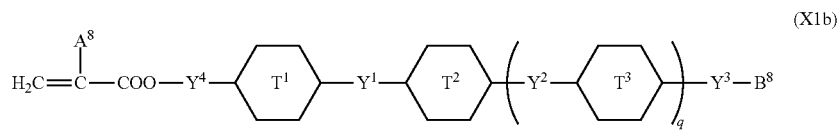

(X1b)

(wherein $A^8$ represents a hydrogen atom or a methyl group; six-membered rings $T^1$, $T^2$, and $T^3$ each independently represent any of the following rings:

[Chem. 94]

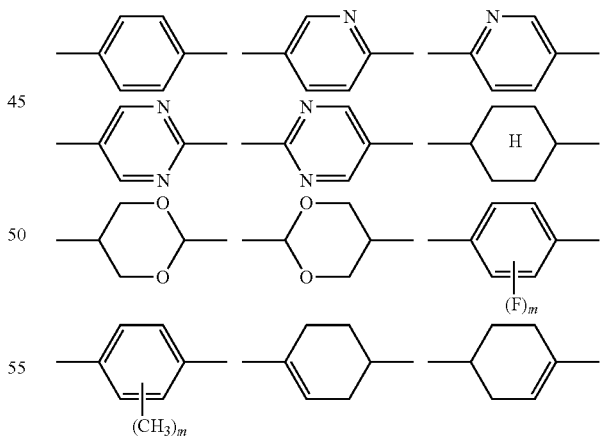

(wherein q is an integer from 1 to 4);
q represents 0 or 1;
$Y^1$ and $Y^2$ each independently represent a single bond, —$CH_2CH_2$—, —$CH_2O$—, —$OCH_2$—, —COO—, —OCO—, —C≡C—, —CF=CF—, —$(CH_2)_4$—, —$CH_2CH_2CH_2O$—, —$OCH_2CH_2CH_2$—, —CH=CHCH$_2$CH$_2$—, or —CH$_2$CH$_2$CH=CH—;

$Y^3$ and $Y^4$ each independently represent a single bond or an alkylene group having 1 to 12 carbon atoms (wherein one or two or more methylene groups in the alkylene group are each independently optionally substituted with an oxygen atom, —CO—, —COO—, or —OCO—, provided that no oxygen atoms are directly bonded to each other, and wherein one or two or more hydrogen atoms in the alkylene group are each independently optionally substituted with a fluorine atom, a methyl group, or an ethyl group); and $B^8$ represents a hydrogen atom, a cyano group, a halogen atom, an alkyl group having 1 to 8 carbon atoms, or an alkylene group having an acryloyl group or a methacryloyl group at its terminal end).

Examples of such a compound include, but not limited to, the following compounds.

[Chem. 95]

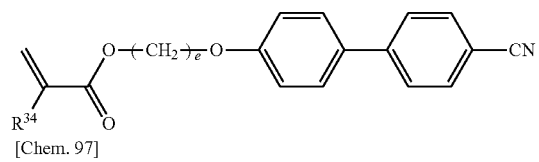

(X1b-1)

[Chem. 96]

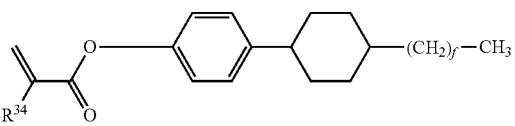

(X1b-2)

[Chem. 97]

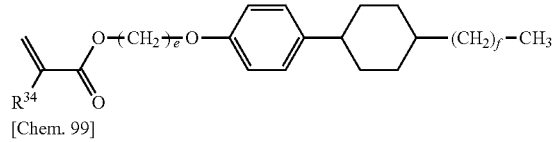

(X1b-3)

[Chem. 98]

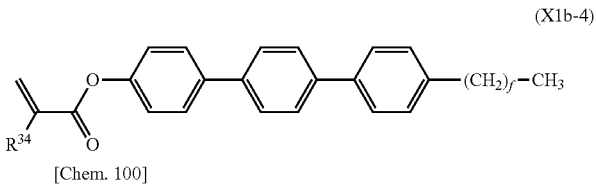

(X1b-4)

[Chem. 99]

(X1b-5)

[Chem. 100]

(X1b-6)

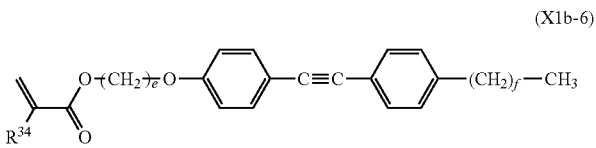

[Chem. 101]

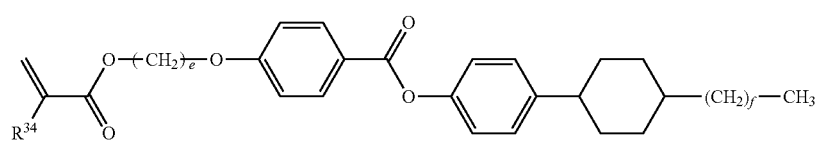

(X1b-7)

One specific example of the polymerizable compound represented by general formula (VI) is a compound represented by general formula (X1c):

[Chem. 102]

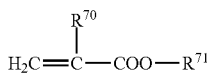

(X1c)

(wherein $R^{70}$ represents a hydrogen atom or a methyl group, and $R^{71}$ represents a hydrocarbon group having a fused ring).

Examples of such a compound include, but not limited to, the following compounds.

[Chem. 103]

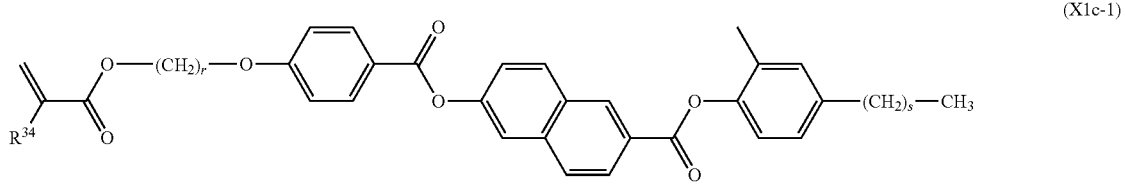

(X1c-1)

[Chem. 104]

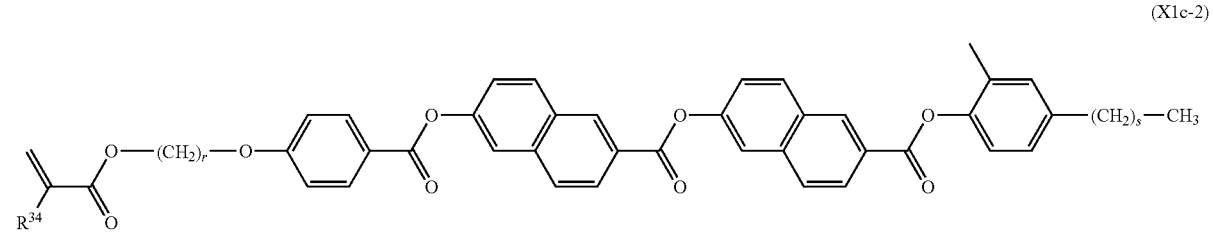

(X1c-2)

[Chem. 105]

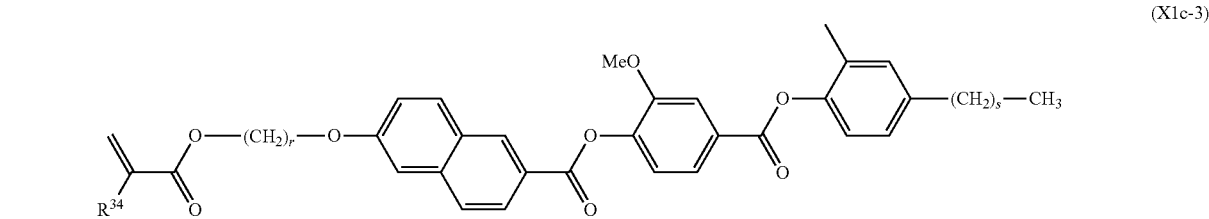

(X1c-3)

[Chem. 106]

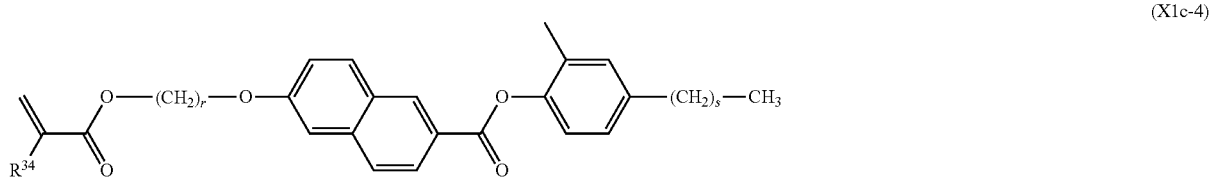

(X1c-4)

Among the polymerizable compounds in the present invention, a polymerizable compound represented by the following general formula (V) is preferred as a polymerizable compound having a polyfunctional reactive group that is preferable for increasing solubility in a low molecular weight liquid crystal to prevent crystallization:

[Chem. 107]

$$\underset{X^1}{\overset{O}{\underset{\|}{\text{C}}}}\text{O}-Sp^1-U\left(Sp^2-O\underset{O}{\overset{\|}{\text{C}}}\underset{X^2}{\overset{}{}}\right)_k \quad (V)$$

(wherein $X^1$ and $X^2$ each independently represent a hydrogen atom or a methyl group; $Sp^1$ and $Sp^2$ each independently represent a single bond, an alkylene group having 1 to 12 carbon atoms, or —O—$(CH_2)_s$— (wherein s represents an integer of 1 to 11, and the oxygen atom is bonded to an aromatic ring); U represents a linear or branched polyvalent alkylene group having 2 to 20 carbon atoms or a polyvalent cyclic substituent having 5 to 30 carbon atoms; the alkylene group in the polyvalent alkylene group is optionally substituted with an oxygen atom, provided that no oxygen atoms are adjacent to each other; the alkylene group in the polyvalent alkylene group is optionally substituted with an alkyl group having 5 to 20 carbon atoms (wherein the alkylene group in the resulting group is optionally substituted with an oxygen atom, provided that no oxygen atoms are adjacent to each other) or with a cyclic substituent; k represents an integer of 1 to 5; and, in each 1,4-phenylene group in the formula, any hydrogen atom is optionally substituted with —$CH_3$, —$OCH_3$, a fluorine atom, or a cyano group).

In general formula (V), $X^1$ and $X^2$ each independently represent a hydrogen atom or a methyl group. When importance is attached to response speed, $X^1$ and $X^2$ are each preferably a hydrogen atom. When importance is attached to reducing the amount of reaction residues, $X^1$ and $X^2$ are each preferably a methyl group.

In general formula (V) above, $Sp^1$ and $Sp^2$ each independently represent a single bond, an alkylene group having 1 to 12 carbon atoms, or —O—$(CH_2)_s$— (wherein s represents an integer of 2 to 11, and the oxygen atom is bonded to an aromatic ring). In the liquid crystal display element of the present invention, the pretilt angle is influenced by the number of carbon atoms in the polymerizable compound, the amount of the polymerizable compound relative to the liquid crystal, the type of the alignment film used, and alignment treatment conditions. When the pretilt angle is set to, for example, about 5 degrees, it is preferable that the carbon chain of the polymerizable compound is not excessively long. In this case, a single bond or an alkylene group having 1 to 5 carbon atoms is more preferable, and a single bond or an alkylene group having 1 to 3 carbon atoms is still more preferable, but the number of carbon atoms is not necessarily limited thereto. When the pretilt angle is set to about 2 degrees or less, it is preferable to use a polymerizable compound having 6 to 12 carbon atoms, and it is more preferable to use a polymerizable compound having 8 to 10 carbon atoms. When $Sp^1$ and $Sp^2$ each represent —O—$(CH_2)_s$—, the pretilt angle is also influenced by them, and it is therefore preferable to appropriately adjust the lengths of $Sp^1$ and $Sp^2$ as needed. For the purpose of increasing the pretilt angle, s is preferably 1 to 5 and more preferably 1 to 3. For the purpose of decreasing the pretilt angle, s is preferably 6 to 10. It is preferable that at least one of $Sp^1$ and $Sp^2$ is a single bond, because asymmetric molecules are formed and pretilt is thereby induced.

In the compound represented by general formula (V) above, it is also preferable that $Sp^1$ and $Sp^2$ are the same. Preferably, two or more compounds in which $Sp^1$ and $Sp^2$ are the same are used. In this case, it is more preferable to use two or more compounds that differ in $Sp^1$ and $Sp^2$.

In general formula (V) above, U represents a linear or branched polyvalent alkylene group having 2 to 20 carbon atoms or a polyvalent cyclic substituent having 5 to 30 carbon atoms. The alkylene group in the polyvalent alkylene group is optionally substituted with an oxygen atom, provided that no oxygen atoms are adjacent to each other. The alkylene group is optionally substituted with an alkyl group having 5 to 20 carbon atoms (wherein the alkylene group in the resulting group is optionally substituted with an oxygen atom, provided that no oxygen atoms are adjacent to each other) or with a cyclic substituent and is preferably substituted with two or more cyclic substituents.

Specifically, U in general formula (V) above is represented by any of the following formulas (Va-1) to (Va-13). To increase anchoring force, highly linear biphenyl, for example, is preferable, and formulas (Va-1) to (Va-6) are preferable. Structures represented by formulas (Va-6) to (Va-11) are preferred because of their high solubility in a liquid crystal, and it is preferable to use a combination of formulas (Va-6) to (Va-11) and (Va-1) to (Va-6).

[Chem. 108]

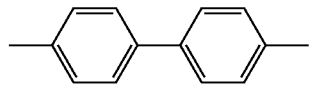
(Va-1)

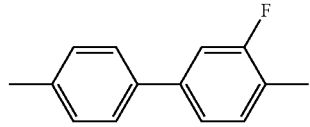
(Va-2)

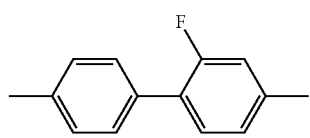
(Va-3)

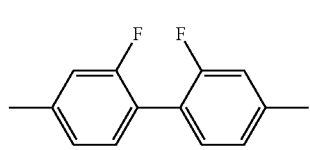
(Va-4)

[Chem. 109]

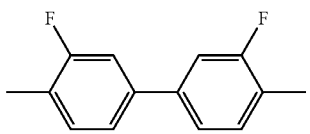
(Va-5)

[Chem. 110]

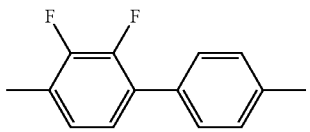
(Va-6)

[Chem. 111]

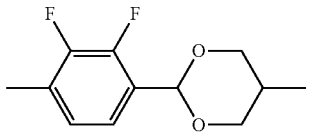
(Va-7)

[Chem. 112]

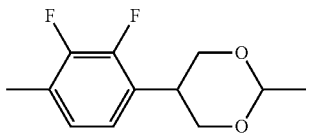
(Va-8)

[Chem. 113]

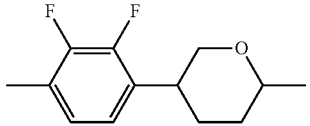
(Va-9)

[Chem. 114]

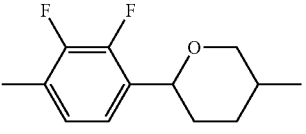
(Va-10)

[Chem. 115]

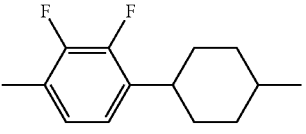
(Va-11)

[Chem. 116]

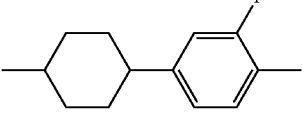
(Va-12)

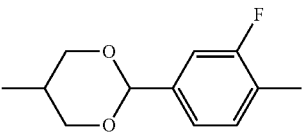
(Va-13)

[Chem. 117]

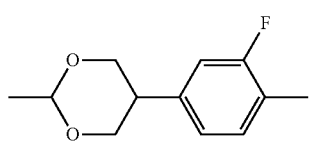
(Va-14)

[Chem. 118]

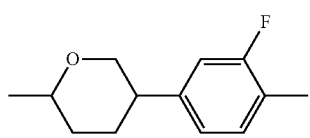
(Va-15)

[Chem. 119]

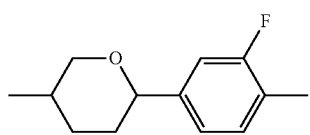
(Va-16)

[Chem. 120]

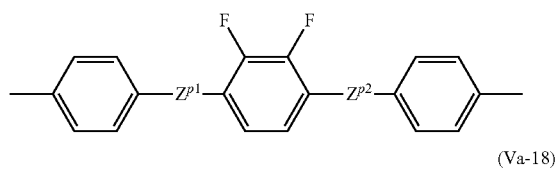
(Va-17)

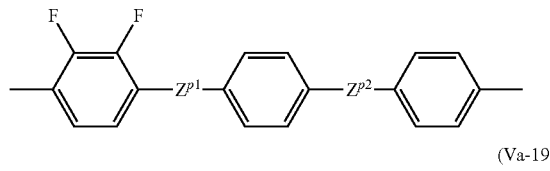
(Va-18)

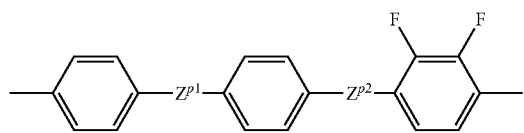
(Va-19)

[Chem. 121]

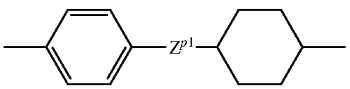
(Va-20)

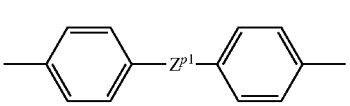
(Va-21)

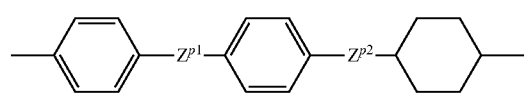
(Va-22)

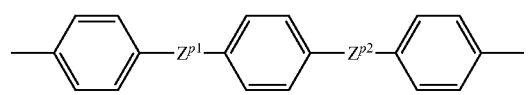
(Va-23)

(In these formulas, opposite ends are bonded to $Sp^1$ and $Sp^2$, respectively. $Z^{p1}$ and $Z^{p2}$ each independently represent —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CF=CF—, —C≡C—, or a single bond. In each 1,4-phenylene group in these formulas, any hydrogen atom is optionally substituted with —CH$_3$, —OCH$_3$, a fluorine atom, or a cyano group. One or two or more CH$_2$CH$_2$ groups in each cyclohexylene group are each optionally substituted with —CH=CH—, —CF$_2$O—, or —OCF$_2$—.)

When U has a ring structure, it is preferable that at least one of $Sp^1$ and $Sp^2$ is —O—(CH$_2$)$_s$— (wherein s is an integer of 1 to 7, and the oxygen atom is bonded to an aromatic ring), and it is also preferable that both $Sp^1$ and $Sp^2$ are each —O—(CH$_2$)$_s$—.

In general formula (V) above, k represents an integer of 1 to 5. The compound represented by general formula (V) is preferably a bifunctional compound with k=1 or a trifunctional group with k=2 and more preferably a bifunctional compound.

Specifically, the compound represented by general formula (V) above is preferably a compound represented by the following general formula (Vb):

[Chem. 122]

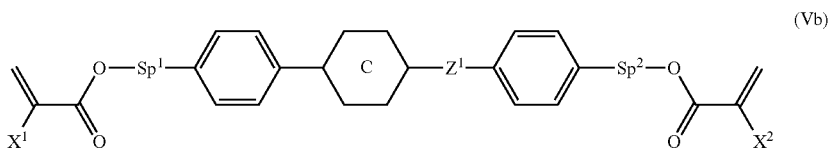
(Vb)

(wherein $X^1$ and $X^2$ each independently represent a hydrogen atom or a methyl group; $Sp^1$ and $Sp^2$ each independently represent a single bond, an alkylene group having 1 to 12 carbon atoms, or —O—$(CH_2)_s$— (wherein s is an integer of 1 to 7, and the oxygen atom is bonded to an aromatic ring); $Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— ($Y^1$ and $Y^2$ each represent a fluorine atom), —C≡C—, or a single bond; C represents a 1,4-phenylene group, a trans-1,4-cyclohexylene group, or a single bond; and, in each 1,4-phenylene group in the formula, any hydrogen atom is optionally substituted with a fluorine atom).

In general formula (Vb) above, $X^1$ and $X^2$ each independently represent a hydrogen atom or a methyl group. The compound represented by general formula (Vb) is preferably a diacrylate derivative in which $X^1$ and $X^2$ are each a hydrogen atom or a dimethacrylate derivative in which $X^1$ and $X^2$ are each a methyl group, and a compound in which one of $X^1$ and $X^2$ is a hydrogen atom and the other is a methyl group is also preferable. Among these compounds, the diacrylate derivative has the highest polymerization rate, and the dimethacrylate derivative has the lowest polymerization rate. The asymmetric compound has an intermediate polymerization rate. Any preferred form may be used according to an intended application.

In general formula (Vb) above, $Sp^1$ and $Sp^2$ each independently represent a single bond, an alkylene group having 1 to 12 carbon atoms, or —O—$(CH_2)_s$—. preferably, at least one of $Sp^1$ and $Sp^2$ is —O—$(CH_2)_s$—. More preferably, $Sp^1$ and $Sp^2$ are each —O—$(CH_2)$—. In this case, s is preferably 1 to 6.

In general formula (Vb) above, $Z^1$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— ($Y^1$ and $Y^2$ each represent a fluorine atom), —C≡C—, or a single bond. $Z^1$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably —COO—, —OCO—, or a single bond, and particularly preferably a single bond. In general formula (Vb) above, C represents a 1,4-phenylene group in which any hydrogen atom is optionally substituted with a fluorine atom, a trans-1,4-cyclohexylene group in which any hydrogen atom is optionally substituted with a fluorine atom, or a single bond and is preferably a 1,4-phenylene group or a single bond. When C represents a ring structure other than a single bond, $Z^1$ is preferably a linking group other than a single bond. When C is a single bond, $Z^1$ is preferably a single bond.

As described above, it is preferable that C in general formula (Vb) above is a single bond and two rings form a ring structure. Specifically, the polymerizable compound having such a ring structure is preferably a compound represented by any of the following general formulas (V-1) to (V-6), particularly preferably a compound represented by any of general formulas (V-1) to (V-4), and most preferably a compound represented by general formula (V-2).

[Chem. 123]

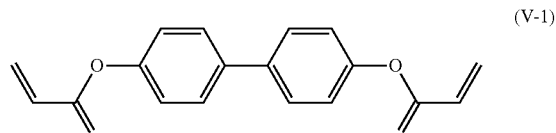

(V-1)

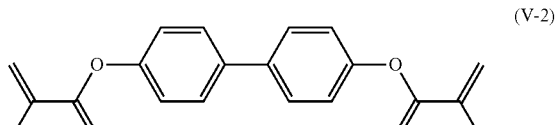

(V-2)

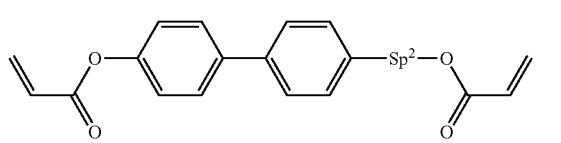

(V-3)

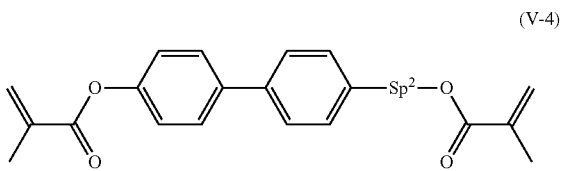

(V-4)

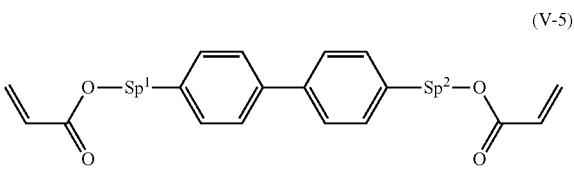

(V-5)

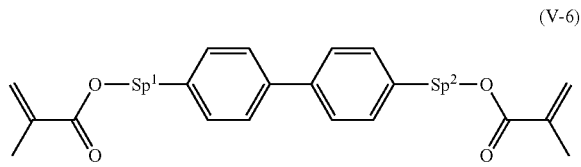

(V-6)

The compound of general formula (Vb) is preferably a compound represented by any of the following general formulas (V1-1) to (V1-5) in terms of increasing the solubility in the liquid crystal composition and is particularly preferably a compound represented by general formula (V1-1).

It is also preferable that general formula (Vb) above includes a three-ring structure. In this case, compounds represented by general formulas (V1-6) to (V1-13) are preferable because the solubility in the liquid crystal composition can be increased. Compounds represented by general formulas (V-1) to (V-6) can exert a strong anchoring force on the liquid crystal, and it is preferable to use a mixture of one of these compounds and one of the compounds represented by general formulas (V1-1) to (V1-5) that have a weak anchoring force and good compatibility with the liquid crystal composition.

[Chem. 124]
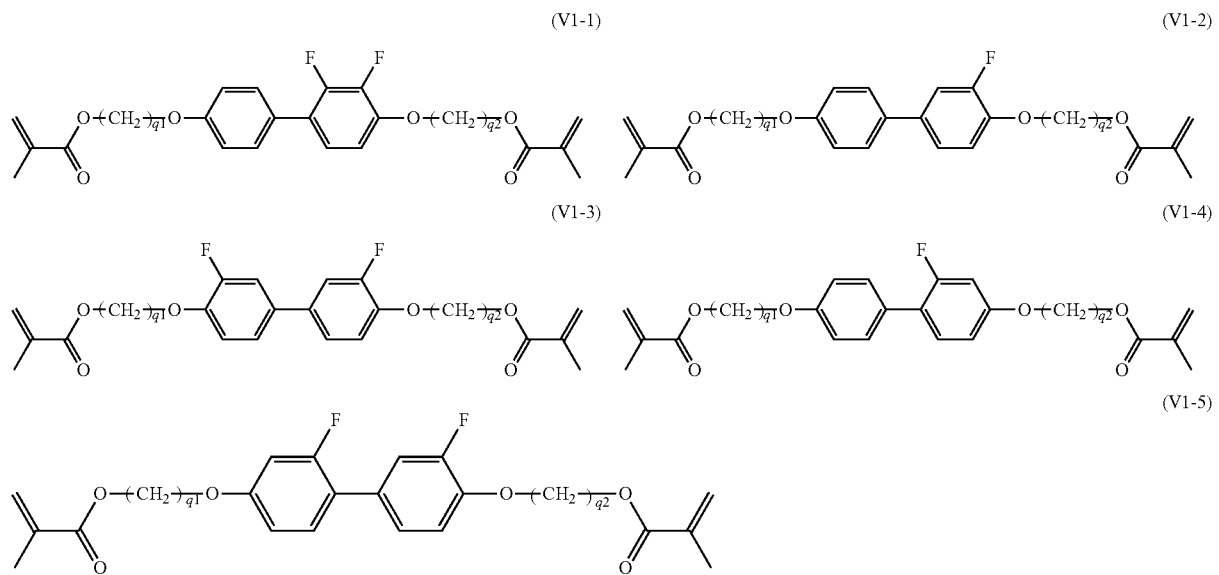
[Chem. 125]
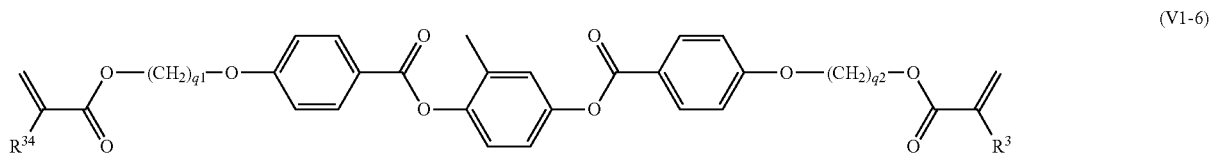
[Chem. 126]
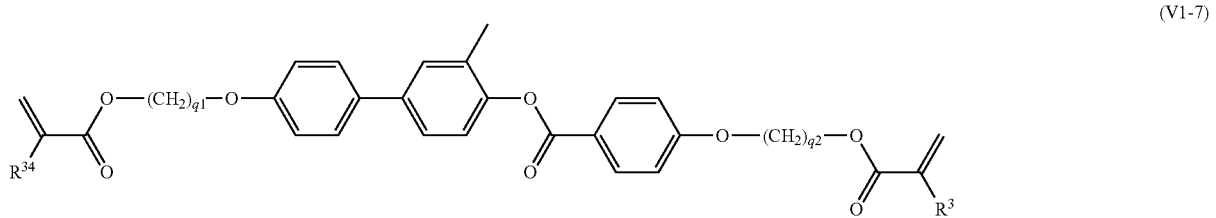
[Chem. 127]
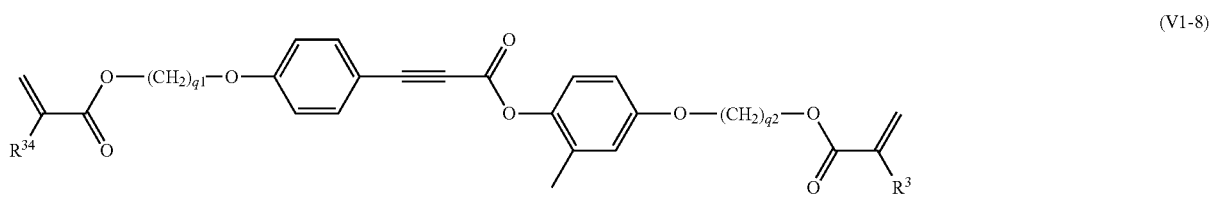
[Chem. 128]
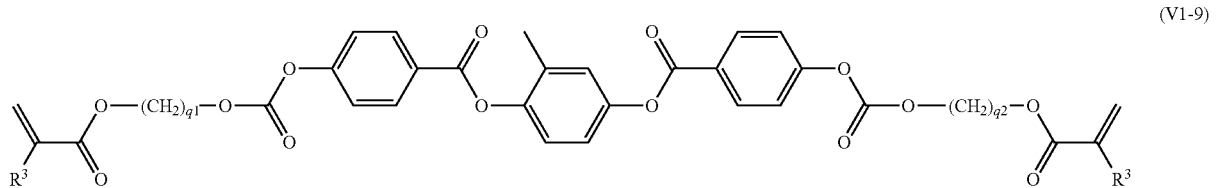

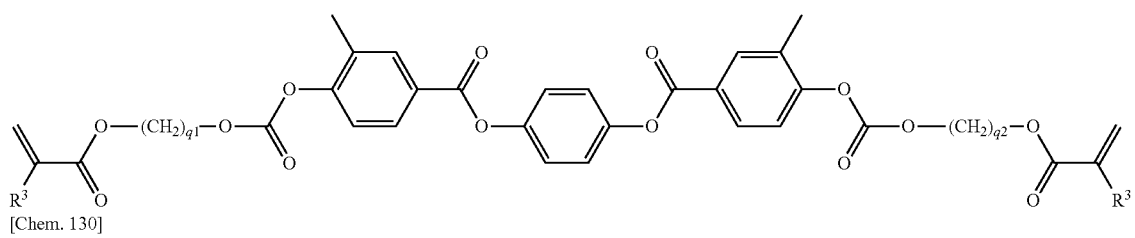
(V-10)

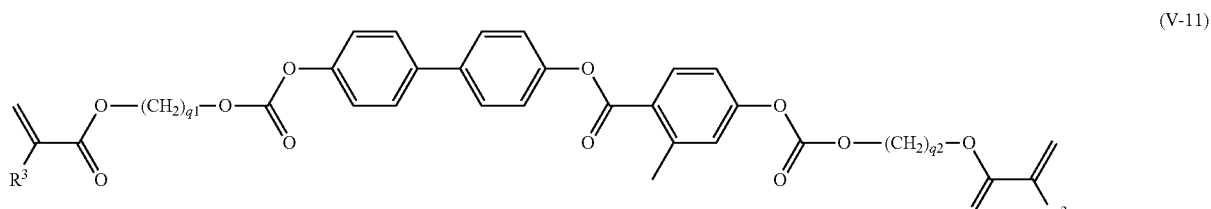
(V-11)

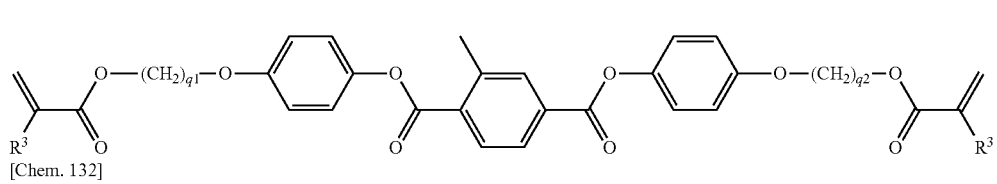
(V1-12)

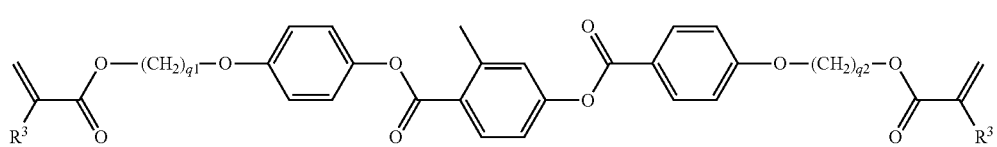
(V1-13)

(In these formulas, $q^1$ and $q^2$ each independently represent an integer of 1 to 12, and $R^3$ represents a hydrogen atom or a methyl group.)

Specifically, the compound represented by general formula (V) above is preferably a compound represented by general formula (Vc) because the reaction rate can be increased and the pretilt angle is thermally stabilized. If necessary, the number of carbon atoms in $Sp^1$, $Sp^2$, and $Sp^3$ may be controlled to obtain a desired pretilt angle. The relation between the pretilt and the number of carbon atoms shows the same tendency as that when the number of functional groups is two.

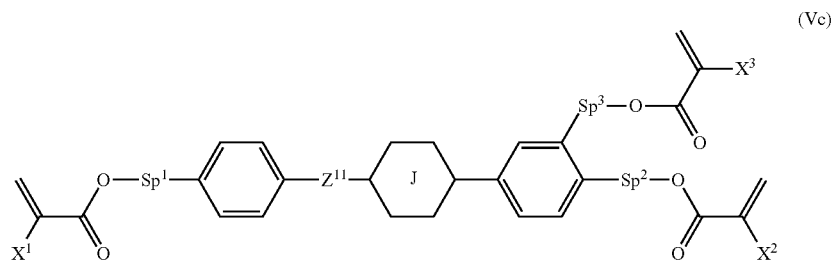
(Vc)

(In the above formula, $X^1$, $X^2$, and $X^3$ each independently represent a hydrogen atom or a methyl group; $Sp^1$, $Sp^2$ and $Sp^3$ each independently represent a single bond, an alkylene group having 1 to 12 carbon atoms, or —O—$(CH_2)_s$— (wherein s represents an integer of 2 to 7, and the oxygen atom is bonded to an aromatic ring); $Z^{11}$ represents —OCH$_2$—, —CH$_2$O—, —COO—, —OCO—, —CF$_2$O—, —OCF$_2$—, —CH$_2$CH$_2$—, —CF$_2$CF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CF═CF—, —C≡C—, or a single bond; represents a 1,4-phenylene group, a trans-1,4-cyclohexylene group, or a single bond; and, in each 1,4-phenylene group, any hydrogen atom is optionally substituted with a fluorine atom.)

[Polymerizable, Photo-Alignable Compound]

The alignment of a liquid crystal is largely influenced by the surface properties of alignment films disposed on surfaces of liquid crystal cell substrates. Therefore, before irradiation with ultraviolet rays, the liquid crystal and polymerizable compounds have been aligned uniformly because of the anchoring force of the alignment films. When these are exposed to ultraviolet rays, polymerization-phase separation occurs, and a polymer network is thereby formed. In the course of formation of the polymer network, the order parameter of mesogenic groups included in the polymerizable compounds tends to fluctuate due to, for example, cross-linking. Therefore, as the content of the polymerizable compounds increases, the density of cross-linking points increases, and the order parameter tends to decrease. During the course of formation of the polymer network from the substrate surfaces, the order parameter of the mesogenic groups forming the polymer network is high near the alignment films. However, as the thickness of the polymer network layer increases, the influence of the alignment film decreases, and the order parameter of the polymer network decreases. To increase the order parameter of the mesogenic groups forming the polymer network, it is desirable to align the mesogenic groups of the polymerizable compounds in one direction during polymerization-phase separation. When a photo-alignable compound is used, the liquid crystal and the polymerizable compounds can be aligned even in locations in which the influence of the alignment film is weak, and this is preferable because the order parameter in the polymer network increases all over the liquid crystal. Examples of the photo-alignable compound include photodecomposition-type, trans-cis photoisomerization-type, photocycloaddition-type, and photo-Fries rearrangement-type compounds. Any of these may be properly used such that an intended alignment state is obtained. As descried above, ultraviolet polymerization is performed. The ultraviolet rays used for exposure may be appropriately selected from collimated, unpolarized ultraviolet rays, linearly polarized ultraviolet rays, circularly polarized ultraviolet rays, etc. Exposure to collimated, unpolarized ultraviolet rays is used preferably for vertical alignment. It is particularly preferable that exposure is performed while the collimated, unpolarized ultraviolet rays are inclined with respect to the normal to the cell substrates. Exposure to linearly polarized ultraviolet rays is useful in order to obtain homogeneous alignment and is used preferably for an IPS mode and an FFS mode. Exposure to circularly polarized ultraviolet rays is used preferably for a twisted alignment display mode such as a TN mode.

In the liquid crystal display element of the present invention, the polymerizable compounds used comprise one or two or more polymerizable, photo-alignable compounds (Vn) having photo-alignment function, in order to improve the alignment of the polymer network. In particular, it is preferable to use a photoisomerizable, polymerizable, photo-alignable compound.

Each polymerizable, photo-alignable compound used in the present invention includes a polymerizable functional group, a mesogenic group, and a spacer group such as an alkylene group disposed between the mesogenic group and the polymerizable functional group. Preferably, a dichroic compound having the property that the compound is reoriented such that dichroic absorption in the propagation direction of light decreases is used for the mesogenic group. Preferably, the spacer group has 3 to 10 carbon atoms. To increase the anchoring force, the number of carbon atoms is within the range of preferably 3 to 8. A bicyclic mesogenic group has a low melting point and is preferred from the viewpoint that no precipitation occurs even when its content is increased. A tricyclic mesogenic group is preferred from the viewpoint that, when its conjugated system extends in the long axis direction of the mesogenic group, the dichroic ratio increases and the order parameter is improved. Because of the above properties, when the low-molecular weight liquid crystal and the above-described polymerizable compounds that are sandwiched between two transparent substrates are exposed to collimated ultraviolet rays, the mesogenic group in the photo-alignable compound is aligned such that its long axis is parallel to the propagating direction of the light. In this case, polymerization-phase separation occurs while the low-molecular weight liquid crystal and a polymerizable liquid crystal compound in the polymerizable compounds are reoriented such that the long axis direction of the polymerizable liquid crystal compound and the long axis direction of the mesogenic groups included in the low-molecular weight liquid crystal match the long axis direction of the mesogenic group in the photo-alignable compound, and the polymer network is thereby formed. As for the long axis of the mesogenic groups in the polymer network formed as described above, the order parameter is higher than that when no polymerizable, photo-alignable compound (Vn) is used. Specifically, the long axes of the mesogenic groups are aligned more uniformly in the propagation direction of the collimated ultraviolet rays used for exposure, and the optical axis of optical anisotropy substantially matches the easy alignment axis of the liquid crystal. When exposure to the collimated ultraviolet rays is performed in the direction normal to the cell, the average optical axis direction of the polymer network is aligned substantially with the direction normal to the cell substrates. When the exposure to the collimated ultraviolet rays is performed in an inclined direction, the long axes of the trans isomer molecules are aligned in the inclined direction, and the liquid crystal is aligned in the inclined direction of the ultraviolet rays. Then, when a polymer network is formed through polymerization-phase separation, the optical axis direction of the polymer network is substantially inclined with respect to the direction normal to the cell substrates, and a pretilt angle is thereby induced. In this case, transmittance in an ON state is further improved, and an improvement in response is also achieved. As for the alignment state of the liquid crystal in the cell with improved transmittance, when a voltage, for example, is applied to induce homogeneous alignment, the uniaxial alignment state is observed as a dark image under a polarizing microscope. When the alignment is disturbed, a complete dark image is not obtained, and bright defective spots are observed under the polarizing microscope. When only the polymerizable compound and the liquid crystal are used, the transmittance deteriorates, and many defective spots are found. However, when the polymerizable, photo-alignable compound is used, the order parameter of the mesogenic groups forming the polymer network is improved. This is preferred because the number of defective spots decreases or no defective spots occur and the transmittance is significantly improved. When the polymerizable, photo-alignable compound is reversibly photoisomerizable, the compound has cis and trans isomers. Preferably, the polymerizable, photo-alignable compound is a photoisomerizable compound that is converted to a trans isomer when the compound absorbs ultraviolet rays, and the trans isomer has a rod-like shape similar to the shape of the low-molecular weight liquid crystal. In the alignment state obtained in this case, the long axis direction of the trans-mesogenic groups is substantially the same as the long axis direction of the low-molecular weight liquid crystal. Moreover, when cross-linking of polymerizable, photo-alignable compound is started after the start of cross-linking of the polymerizable compound, the polymerizable compound is first cross-linked while the alignment state of the mesogenic group in the polymerizable, photo-alignable compound before cross-linking is maintained, and the order parameter of the mesogenic group in the polymerizable compound can be increased. It is therefore preferable that the reaction rate of the polymerizable, photo-alignable compound is slower than the reaction rate of the polymerizable compound. When the functional group of the polymerizable compound is an acryloyl group, it is preferable that the functional group of the polymerizable, photo-alignable compound is a methacryloyl group because cross-linking of the polymerizable, photo-alignable compound is delayed. When the polymerizable, photo-alignable compound is cross-linked, the polymerizable, photo-alignable compound in the trans form is copolymerized with the polymerizable compound, and the copolymer is formed such that the easy alignment axis of the liquid crystal matches the optical axis direction or easy alignment axis direction of the polymer network. However, after the formation of the polymer network, the ambient environment has such an influence that the trans-isomer is converted to the cis-isomer to deform the polymer network. In this case, it is preferable that the amount of the polymerizable, photo-alignable compound is about 1% or less based on the total amount of the polymerizable compound and the polymerizable, photo-alignable compound. This is because, since the amount of the polymerizable compound present is large, the polymer network does not deform. Moreover, it is preferable that molecules of the polymerizable, photo-alignable compound are cross-linked to the polymerizable compound and confined in spaces in which the trans isomer cannot deform into the cis isomer. This is because, even if heat, for example, induces conversion to the cis isomer, deformation to the steric cis isomer does not easily occur, and the molecular configuration close to the trans isomer is maintained. This state is influenced by inter-crosslink density. It is therefore preferable to appropriately select the type of the polymerizable compound such that stable properties can be obtained during long-term storage.

If the content of the polymerizable, photo-alignable compound used in the present invention is 0.001% by mass or less, only a weak reorientation force is obtained, and the effect of improving the transmittance is hardly noticeable. If the content is 1% by mass or more, there is a high possibility of color development due to the influence of the dichroic ratio. Therefore, the content is preferably 1% by mass or less. Preferably, the lower limit of the content is 0.005% by mass or more, and the upper limit is 1% by mass or less. The polymerizable, photo-alignable compound is added in an amount of preferably within the range of from 0.005% by mass to 1% by mass inclusive based on the total weight of the polymerizable composition containing the polymerizable compound and the polymerizable, photo-alignable compound and the liquid crystal composition containing one or two or more liquid crystal compounds that are used to produce the liquid crystal display element of the present invention. The polymerizable, photo-alignable compound is added in an amount of more preferably within the range of from 0.005% by mass to 0.5% by mass inclusive in terms of the reorientation force and non-coloring properties and particularly preferably within the range of from 0.01% by mass to 0.3% by mass inclusive because polymerization is not influenced by dichroic ultraviolet absorption. When the polymerizable, photo-alignable compound is added within the above range, polymerization-phase separation occurs while the polymerizable liquid crystal compound contained in the polymerizable composition and the low-molecular weight liquid crystal are reoriented. Therefore, a highly aligned polymer network can be formed.

It is preferable to use one or two or more polymerizable, photo-alignable compounds selected from polymerizable, photo-alignable compounds represented by the following general formula (Vn-1):

[Chem. 134]

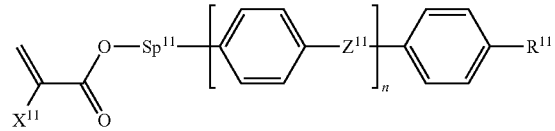

(Vn-1)

(wherein $X^{11}$ represents a hydrogen atom or a methyl group;

$Sp^{11}$ represents a single bond, an alkylene group having 1 to 12 carbon atoms, or —O—$(CH_2)_{s1}$— (wherein s1 is an integer of 1 to 11, and the oxygen atom is bonded to an aromatic ring);

n represents an integer of 1 to 3;

$Z^{11}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —C≡C—, a single bond, —$CY^1$=$CY^2$— ($Y^1$ and $Y^2$ each independently represent a hydrogen atom or a fluorine atom), —CH=N—, —N=CH—, or —N=N—, wherein, when a plurality of $Z^{11}$s are present, they may be the same or different, provided that at least one $Z^{11}$ is —CH=CH—, —CH=N—, —N=CH—, or —N=N—;

$R^{11}$ represents a hydrogen atom, a fluorine atom, a chlorine atom, a bromine atom, an iodine atom, pentafluorosulfuranyl group, a cyano group, a nitro group, an isocyano group, a thioisocyano group, a linear or branched alkyl group which has 1 to 12 carbon atoms and in which one —$CH_2$— group or two or more nonadjacent —$CH_2$— groups are each independently optionally substituted with —O—, —S—, —CO—, —COO—, —OCO—, —CO—

—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, or a group represented by formula (I-1-1):

[Chem. 135]

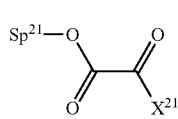

(Vn-1-1)

(wherein, in (Vn-1-1), $X^{21}$ represents a hydrogen atom or a methyl group, and $Sp^{21}$ represents a single bond, an alkylene group having 1 to 12 carbon atoms, or —O—$(CH_2)_{s2}$— (wherein s2 is an integer of 1 to 11, and the oxygen atom is bonded to an aromatic ring));

in each 1,4-phenylene group in formula (Vn-1), any hydrogen atom is optionally substituted with a fluorine atom, a fluorinated methyl group, a fluorinated methoxy group, an alkyl group having 1 or 2 carbon atoms, or the group represented by formula (Vn-1-1); and when a plurality of $X^{21}$s and $Sp^{21}$s are present, they may be the same or different).

It is more preferable to use one or two or more polymerizable, photo-alignable compounds selected from compounds represented by general formula (Vn-2) in which $R^{11}$ in general formula (Vn-1) is the group represented by formula (Vn-1-1):

[Chem. 136]

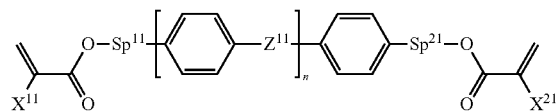

(Vn-2)

(wherein n, $X^{11}$, $X^{21}$, $Sp^{11}$, $Sp^{21}$, and $Z^{11}$ are the same as the groups defined for general formula (Vn-1)).

A polymerizable, photo-alignable compound represented by general formula (Vn-2-1) in which n in general formula (Vn-2) is 1 and in which the mesogenic group includes two rings is preferred in terms of improvement in alignment.

[Chem. 137]

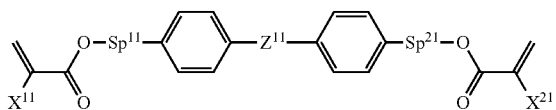

(Vn-2-1)

(In this formula, $X^1$, $X^{21}$, $Sp^{11}$, and $Sp^{21}$ are the same as the groups defined for general formula (Vn-1), and $Z^{111}$ represents —CH=CH—, —CH=N—, —N=CH—, or —N=N—.)

In general formula (Vn-2-1), $Z^{111}$ is more preferably —CH=CH— or —N=N— and is particularly preferably —N=N—.

In general formula (Vn-2-1), $Sp^{11}$ and $Sp^{21}$ are each independently preferably an alkylene group having 1 to 12 carbon atoms or —O—$(CH_2)_{s2}$— (wherein s2 represents an integer of 1 to 11, and the oxygen atom is bonded to an aromatic ring) and particularly preferably —O—$(CH_2)_{s2}$— (wherein s2 represents an integer of 1 to 11, and the oxygen atom is bonded to an aromatic ring).

Specifically, the compound represented by general formula (Vn-2-1) is preferably a compound represented by any of the following general formulas (Vn-2-1-1) to (Vn-2-1-8).

[Chem. 138]

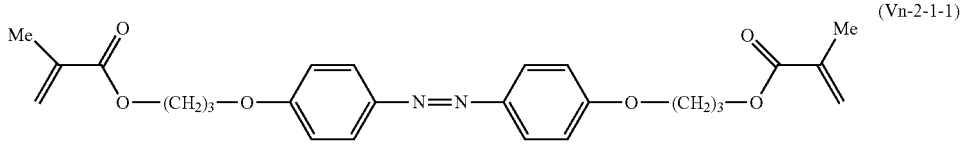

(Vn-2-1-1)

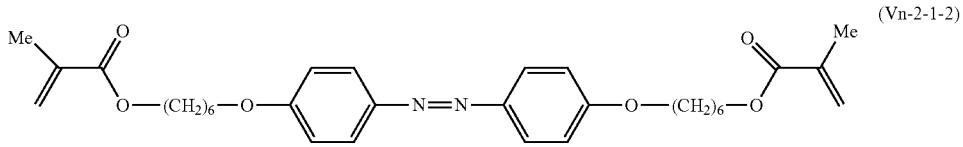

(Vn-2-1-2)

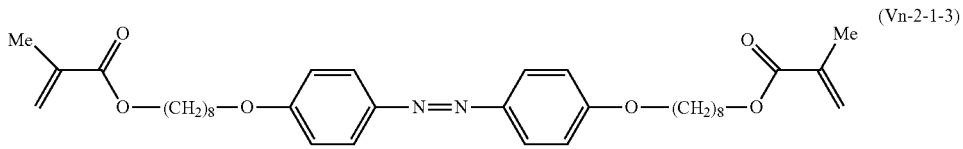

(Vn-2-1-3)

-continued

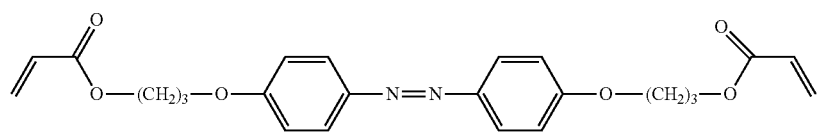
(Vn-2-1-4)

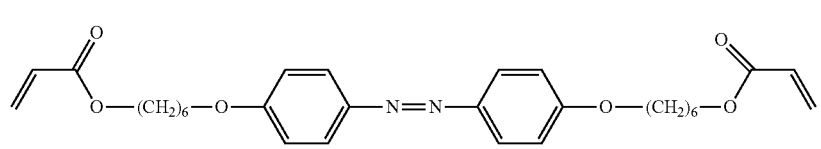
(Vn-2-1-5)

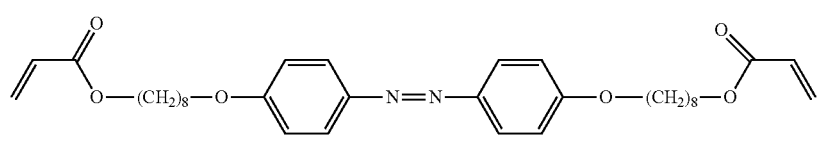
(Vn-2-1-6)

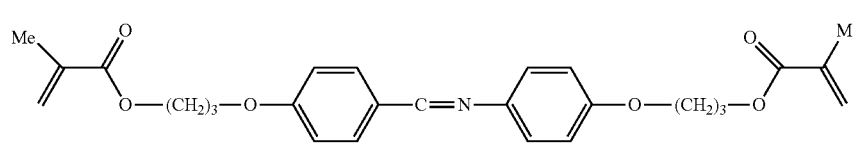
(Vn-2-1-7)

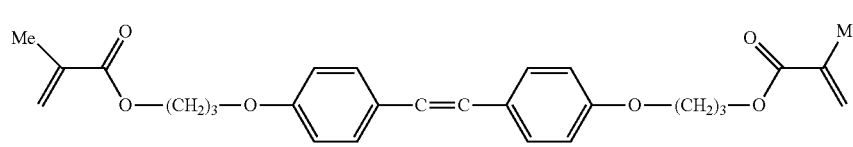
(Vn-2-1-8)

A polymerizable, photo-alignable compound represented by general formula (Vn-2-2) in which n in general formula (Vn-2) is 2 and in which the mesogenic group includes three rings is preferred from the viewpoint that an increased dichroic ratio contributes to an increase in sensitivity. The increased dichroic ratio is preferred because the order parameter can be increased.

[Chem. 139]

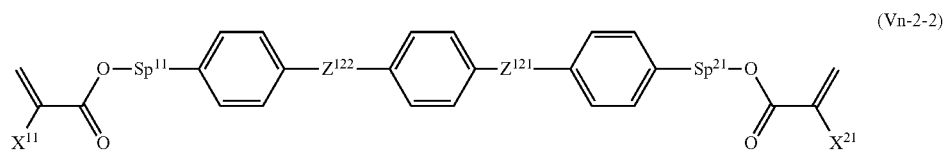
(Vn-2-2)

(In this formula, $X^{11}$, $X^{21}$, $Sp^{11}$, and $Sp^{21}$ are the same as the groups defined for general formula (Vn-1); $Z^{121}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —C≡C—, a single bond, —CY$^1$=CY$^2$— (Y$^1$ and Y$^2$ each independently represent a hydrogen atom or a fluorine atom), —CH=N—, —N=CH—, or —N=N—; and $Z^{122}$ represents —CH=CH—, —CH=N—, —N=CH—, or —N=N—.)

In general formula (Vn-2-2), $Z^{121}$ is more preferably —OCH$_2$—, —CH$_2$O—, —COO—, —OCO—, a single bond, —CH=CH—, or —N=N—. $Z^{121}$ is particularly preferably —COO—, —OCO—, a single bond, —CH=CH—, or —N=N—.

In general formula (Vn-2-2), $Z^{122}$ is more preferably —CH=CH— or —N=N—. $Z^{122}$ is particularly preferably —N=N—.

In general formula (Vn-2-2), $Sp^{11}$ and $Sp^{21}$ are each independently more preferably an alkylene group having 1 to 12 carbon atoms or —O—(CH$_2$)$_{s2}$— (wherein s2 represents an integer of 1 to 11, and the oxygen atom is bonded to an aromatic ring) and more preferably —O—(CH$_2$)$_{s2}$— (wherein s2 represents an integer of 1 to 11, and the oxygen atom is bonded to an aromatic ring).

Specifically, the compound represented by general formula (Vn-2-2) is preferably a compound represented by any of the following general formulas (Vn-2-2-1) to (Vn-2-2-11).

[Chem. 140]
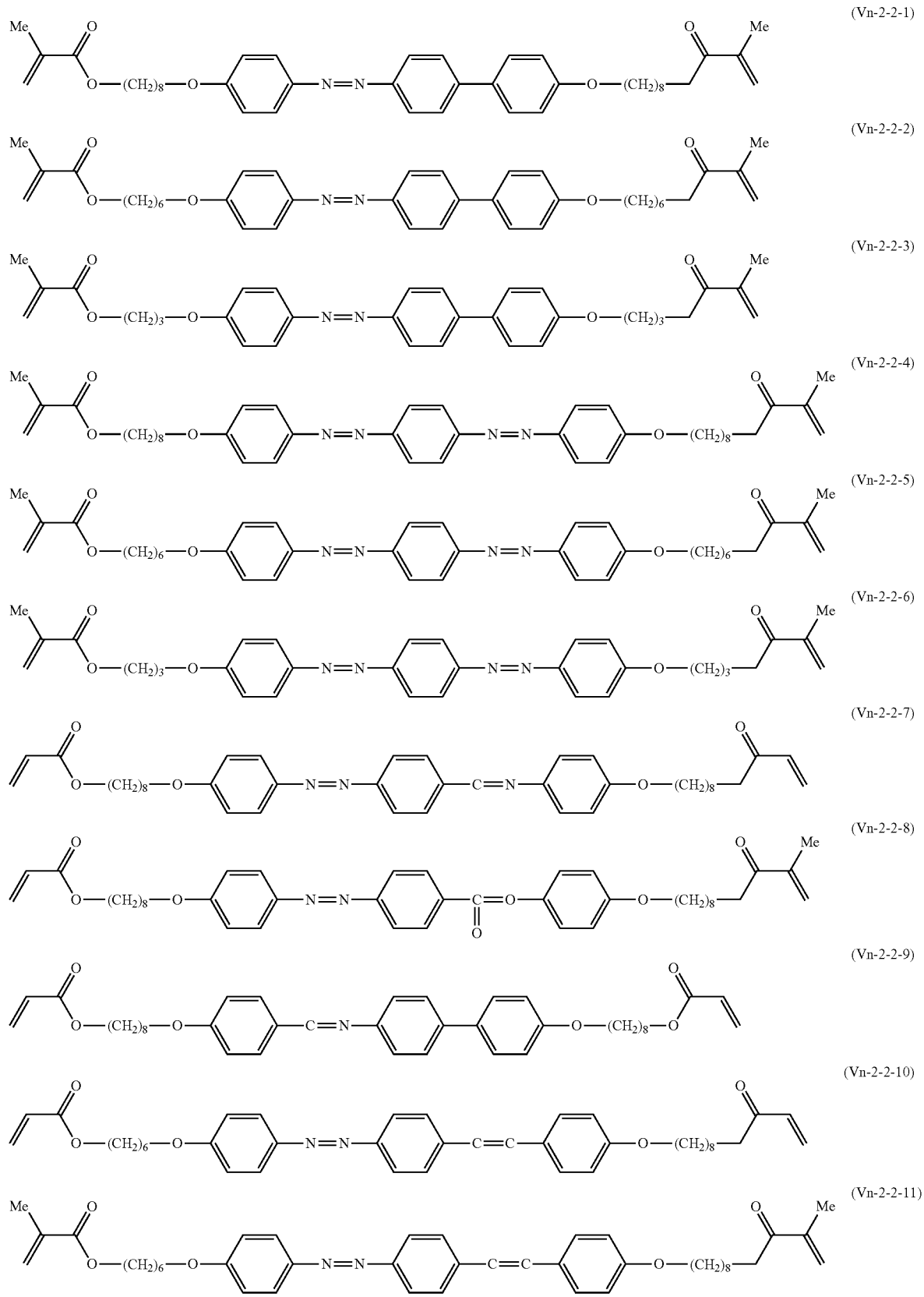

A polymnerizable, photo-alignable compound represented by general formula (Vn-2-3) in which n in general formula (Vn-2) is 3 and in which the mesogenic group includes three rings is preferred from the following points of view. Since the distance between the functional groups can be increased, the inter-crosslink density after polymerization can be reduced. The dichroic ratio increases, and the photosensitivity is improved. The tricyclic mesogenic group can provide an improvement in liquid crystallinity and an improvement in the order parameter. Moreover, this polymerizable, photo-alignable compound is preferable and useful because the anchoring force increases and therefore the decay time is improved. A tetracyclic mesogenic group is preferred to the tricyclic mesogenic group from the following points of view. The inter-crosslink density is reduced, and the dichroic ratio is improved. The anchoring force is increased, and the liquid crystallinity and the order parameter are increased.

[Chem. 141]

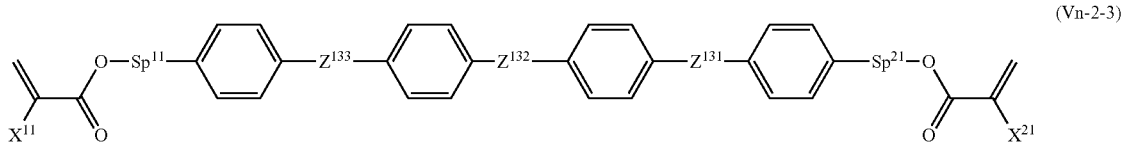

(Vn-2-3)

(In this formula, $X^{11}$, $X^{21}$, $Sp^{11}$, and $Sp^{21}$ are the same as the groups defined for general formula (Vn-1); $Z^{131}$ and $Z^{132}$ each independently represent —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —C≡C—, a single bond, —CY$^1$=CY$^2$— (Y$^1$ and Y$^2$ each independently represent a hydrogen atom or a fluorine atom), —CH=N—, —N=CH—, or —N=N—; and $Z^{133}$ represents —CH=CH—, —CH=N—, —N=CH—, or —N=N—.)

In general formula (Vn-2-3), $Z^{131}$ and $Z^{132}$ are each independently more preferably —OCH$_2$—, —CH$_2$O—, —COO—, —OCO—, a single bond, —CH=CH—, or —N=N—. $Z^{131}$ and $Z^{132}$ are each independently still more preferably —COO—, —OCO—, a single bond, —CH=CH—, or —N=N—, and $Z^{131}$ is particularly preferably —CH=CH— or —N=N—.

In general formula (Vn-2-3), $Z^{133}$ is more preferably —CH=CH— or —N=N—. $Z^{133}$ is particularly preferably —N=N—.

In general formula (Vn-2-3), $Sp^{11}$ and $Sp^{21}$ are each independently more preferably an alkylene group having 1 to 12 carbon atoms or —O—(CH$_2$)$_{s2}$— (wherein s2 is an integer of 1 to 11, and the oxygen atom is bonded to an aromatic ring) and particularly preferably —O—(CH$_2$)$_{s2}$— (wherein s2 is an integer of 1 to 11, and the oxygen atom is bonded to an aromatic ring).

Specifically, the compound represented by general formula (Vn-2-3) is preferably a compound represented by any of the following general formulas (Vn-2-3-1) to (Vn-2-3-10).

[Chem. 142]

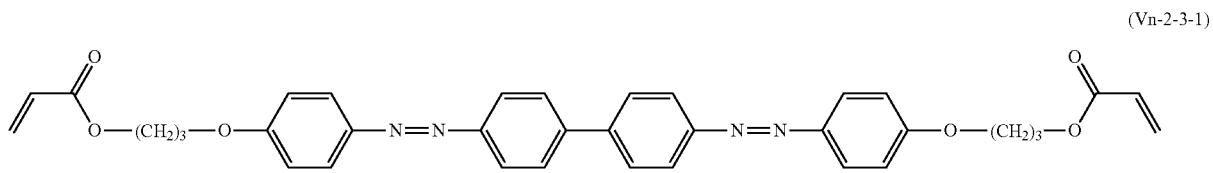

(Vn-2-3-1)

-continued
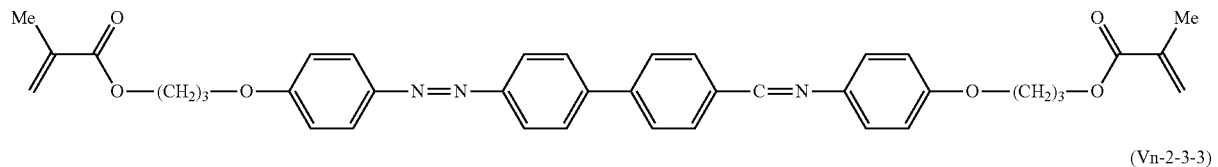
(Vn-2-3-2)
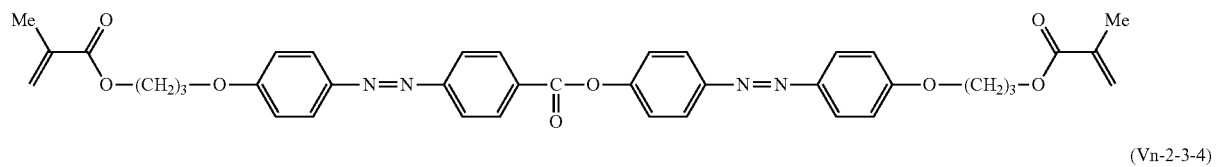
(Vn-2-3-3)
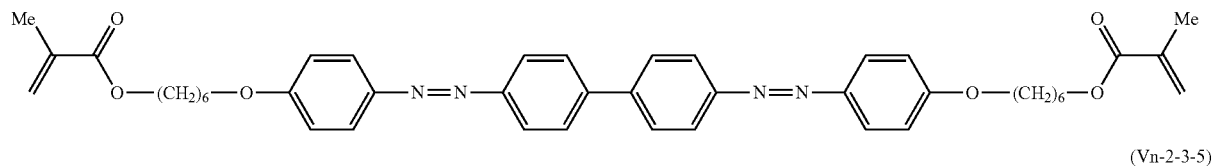
(Vn-2-3-4)
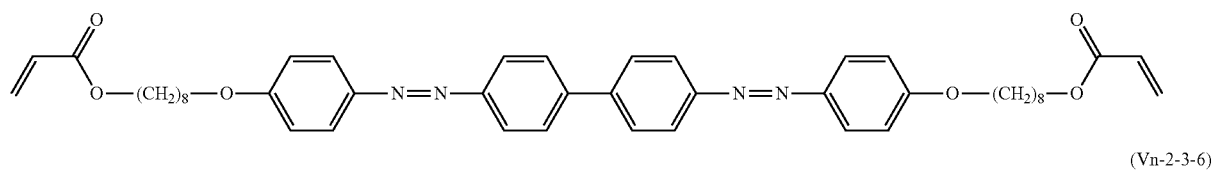
(Vn-2-3-5)
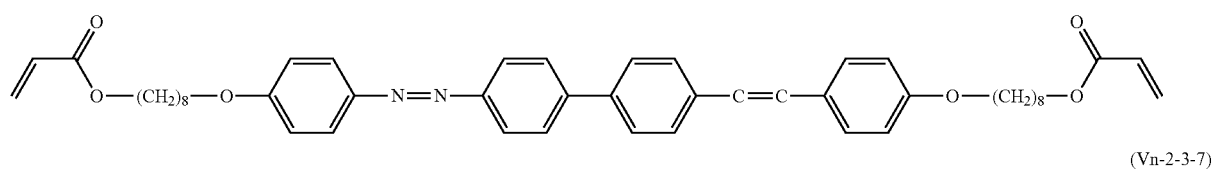
(Vn-2-3-6)
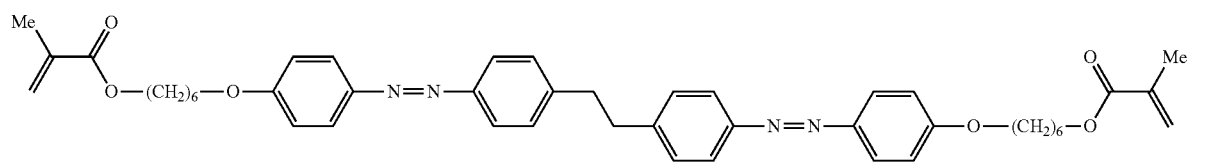
(Vn-2-3-7)
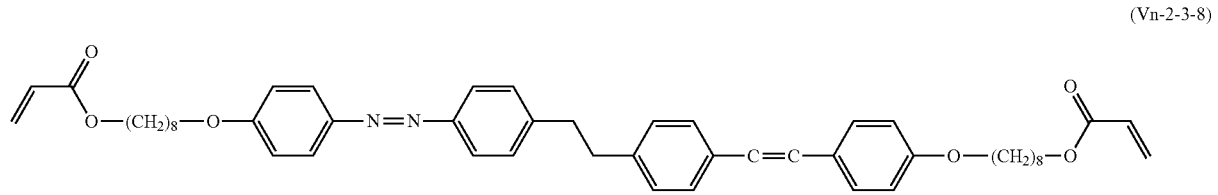
(Vn-2-3-8)
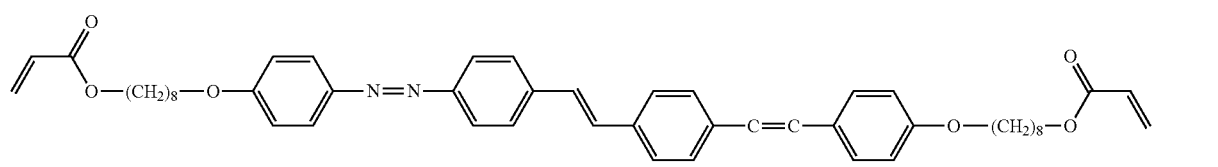
(Vn-2-3-9)
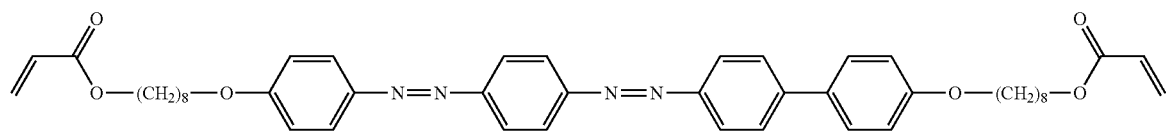
(Vn-2-3-10)

It is more preferable to use one or two or more selected from the polymerizable, photo-alignable compounds represented by general formulas (Vn-2-1) to (Vn-2-3) above. A tricyclic compound has high crystallinity and may precipitate. It is therefore preferable to use a combination of a dicyclic compound and a tricyclic compound because solubility is improved. It is particularly preferable to use one or two or more selected from the polymerizable, photo-alignable compounds represented by general formulas (Vn-2-1) to (Vn-2-2).

[Polymerization Initiator]

To polymerize the polymerizable compounds used in the present invention, a polymerization method such as radical polymerization, anionic polymerization, or cationic polymerization can be used. It is preferable to polymerize using radical polymerization, and it is more preferable to use radical polymerization by photo-Fries rearrangement or radical polymerization using a photopolymerization initiator.

The radical polymerization initiator used may be a thermal polymerization initiator or a photopolymerization initiator, and a photopolymerization initiator is preferred. Specifically, the following compounds are preferable.

Acetophenone-based compounds such as diethoxyacetophenone, 2-hydroxy-2-methyl-1-phenylpropan-1-one, benzildimethylketal, 1-(4-isopropylphenyl)-2-hydroxy-2-methylpropane-1-one, 4-(2-hydroxyethoxy)phenyl-(2-hydroxy-2-propyl)ketone, 1-hydroxycyclohexyl-phenylketone, 2-methyl-2-morpholino(4-thiomethylphenyl)propane-1-one, 2-benzyl-2-dimethylamino-1-(4-morpholinophenyl)-butanone, 4'-phenoxyacetophenone, and 4'-ethoxyacetophenone;

benzoin-based compounds such as benzoin, benzoin isopropyl ether, benzoin isobutyl ether, benzoin methyl ether, and benzoin ethyl ether;

acylphosphine oxide-based compounds such as 2,4,6-trimethylbenzoyldiphenylphosphine oxide;

benzil- and methylphenylglyoxy ester-based compounds;

benzophenone-based compounds such as benzophenone, o-benzoylbenzoic acid methyl ester, 4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyl)benzophenone, 3,3'-dimethyl-4-methoxybenzophenone, 2,5-dimethylbenzophenone, and 3,4-dimethylbenzophenone;

thioxanthone-based compounds such as 2-isopropylthioxanthone, 2,4-dimethylthioxanthone, 2,4-diethylthioxanthone, and 2,4-dichlorothioxanthone;

aminobenzophenone-based compounds such as Michler's ketone and 4,4'-diethylaminobenzophenone;

10-butyl-2-chloroacridone; 2-ethylanthraquinone; 9,10-phenanthrenequinone; and camphorquinone. Of these, benzildimethylketal is most preferable.

It is also preferable to use a plurality of polymerization initiators in consideration of the life and reactivity of radicals.

The polymerization initiators described above may not be used. In this case, radical polymerization by photo-Fries rearrangement is used, and a polymerizable liquid crystal compound having a conjugated structure that absorbs ultraviolet rays is added to perform the polymerization. For example, a polymerizable liquid crystal compound having a conjugated structure and represented by any of the following general formulas (X1c-1) to (X1c-4) is used instead of the polymerization initiator. This is preferable because the voltage holding ratio of the liquid crystal element is not reduced.

It is also preferable to use such a polymerizable liquid crystal compound in combination with a polymerization initiator.

[Chem. 143]

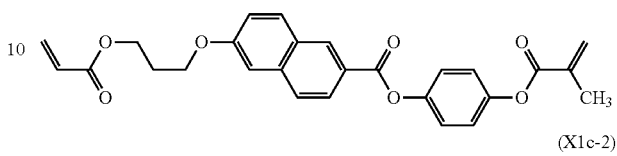
(X1c-1)

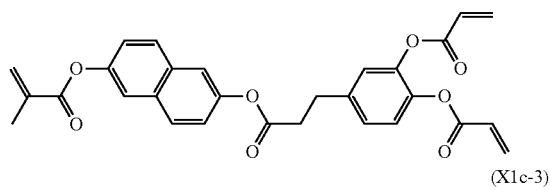
(X1c-2)

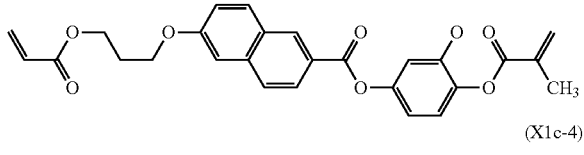
(X1c-3)

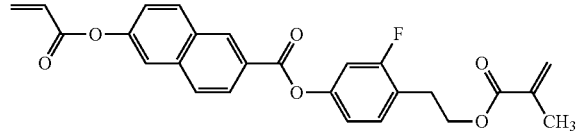
(X1c-4)

[Polymerizable Composition]

The polymerizable composition used in the present invention contains two or more polymerizable compounds exemplified above and is contained in an amount of preferably 1% by mass or more and less than 10% by mass and more preferably 1% by mass or more and less than 8% by mass based on the total weight of the polymerizable composition and the liquid crystal composition. The lower limit of the content of the polymerizable composition is preferably 2% by mass or more, and the upper limit is preferably less than 9% by mass, more preferably less than 7% by mass, still more preferably less than 5% by mass, and yet more preferably less than 4% by mass. Preferably, the polymerizable composition in the present invention comprises one or two or more polymerizable compounds and one or two or more polymerizable, photo-alignable compounds.

It is also preferable that the polymerizable composition used in the present invention and containing two or more polymerizable compounds exemplified above is contained in an amount of 10% by mass or more and less than 40% by mass based on the total weight of the polymerizable composition and the liquid crystal composition. In this case, the lower limit of the content of the polymerizable composition is preferably 9% by mass or more and more preferably 10% by mass or more, and the upper limit is preferably less than 30% by mass, more preferably less than 25% by mass, still more preferably less than 20% by mass, and yet more preferably less than 15% by mass. Moreover, the polymerizable composition used in the present invention and containing two or more polymerizable compounds exemplified above is contained in an amount of preferably 5% by mass or more and less than 15% by mass and more preferably 7% by mass or more and less than 12% based on the total weight of the polymerizable composition and the liquid crystal composition. The polymerizable composition used in the present invention is contained as the polymerizable compounds in an amount of 1% by mass or more and less than 40% by mass. It is preferable that the polymerizable composition forms a polymer network having uniaxial optical anisotropy, uniaxial refractive index anisotropy, or an easy alignment axis direction. It is more preferable that the polymer network is formed such that its optical axis or easy alignment axis substantially matches the easy alignment axis of the low-molecular weight liquid crystal.

The polymer network also encompasses a polymer binder in the form of a macromolecular thin film formed by gathering a plurality of polymer network segments. The polymer binder is characterized in that it has refractive index anisotropy showing uniaxial alignment, that the low-molecular weight liquid crystal can be dispersed in the thin film, and that the uniaxial optical axis of the thin film is substantially aligned with the optical axis of the low-molecular weight liquid crystal. In this case, unlike in the cases of a polymer dispersed liquid crystal and a polymer network liquid crystal, which are light scattering liquid crystals, no light scattering occurs. Other features are that high-contrast display is obtained in a liquid crystal element that uses polarization and that the decay time can be shortened to improve the responsiveness of the liquid crystal element. Moreover, the polymerizable liquid crystal composition used in the present invention allows a polymer network layer to be formed over the entire liquid crystal element and differs from a PSA (Polymer Sustained Alignment) liquid crystal composition that forms a polymer thin film on a liquid crystal element substrate to induce pretilt.

Preferably, at least two polymerizable compounds that differ in Tg at any concentration are contained to control Tg as needed. Preferably, a polymerizable compound used as a precursor of a high-Tg polymer has a molecular structure allowing a high cross-linking density and has two or more functional groups. Preferably, a precursor of a low-Tg polymer has a structure having one functional group or a structure having two or more functional groups and having a spacer group such as an alkylene group between the functional groups to increase the molecular length. When the Tg of the polymer network is controlled for the purpose of improving the thermal stability and impact resistance of the polymer network, it is preferable to appropriately control the ratio of the polyfunctional monomer to the monofunctional monomer. The Tg is related to the thermal molecular mobility of main and side chains of the polymer network at the molecular level and has an influence on electrooptical properties. For example, when the cross-linking density increases, the molecular mobility of the main chain decreases, and the anchoring force acting on the low-molecular weight liquid crystal increases. In this case, the driving voltage increases, and the decay time is shortened. When the cross-linking density is reduced such that Tg is lowered, the thermal mobility of the polymer main chain increases, and the anchoring force acting on the low-molecular weight liquid crystal decreases. In this case, the driving voltage tends to decrease, and the decay time tends to increase. The anchoring force at the interface of the polymer network is influenced not only by the Tg as described above but also by the molecular mobility of polymer side chains. When a polymerizable compound having a polyvalent branched alkylene group and a polyvalent alkyl group is used, the anchoring force at the polymer interface is reduced. This polymerizable compound having a polyvalent branched alkylene group and a polyvalent alkyl group is effective in inducing a pretilt angle and acts such that the anchoring force in the polar angle direction is reduced.

When the polymerizable compounds in the polymerizable liquid crystal composition in a liquid crystal phase state are polymerized, the molecular weight of the polymerizable compounds increases, and the liquid crystal composition and the polymerizable compounds undergo phase separation. The form of two-phase separation varies largely depending on the type of the liquid crystal compound contained and the types of the polymerizable compounds. The phase separation structure may be formed through binodal decomposition. In this case, the polymerizable compound phase is formed as a large number of island-like nuclei in the liquid crystal phase, and then the nuclei grow. Alternatively, the phase separation structure may be formed through spinodal decomposition in which fluctuations in the concentrations of the liquid crystal phase and the polymerizable compound phase result in phase separation. To form the polymer network through binodal decomposition, it is preferable that the content of the low molecular weight liquid crystal is at least 85% by mass or more. It is preferable to use a polymerizable compound with a high reaction rate because a large number of nuclei of the polymerizable compound having a size smaller than the wavelength of visible light are generated and a phase separation structure of the order of nanometers is formed. Therefore, when polymerization in the polymerizable compound phase proceeds, a polymer network with a gap distance shorter than the wavelength of visible light is formed, but this depends on the phase separation structure. The gaps in the polymer network are formed due to the phase-separated low-molecular weight liquid crystal phase. It is particularly preferable that the size of the gaps is smaller than the wavelength of visible light. This is because of the following reasons. In the liquid crystal display element obtained, no light scattering occurs, so that high contrast is achieved. In addition, the influence of the anchoring force from the polymer network is increased, and the decay time is shortened, so that fast response is achieved. Nucleation of the polymerizable compound phase in binodal decomposition is influenced by a change in compatibility due to the types of the compounds and the combination thereof, by the reaction rate, and by parameters such as temperature, and it is preferable to control them appropriately. When ultraviolet polymerization is used, the reaction rate depends on the functional groups in the polymerizable compounds, the type and amount of a photo-initiator, and the intensity of ultraviolet rays used for exposure, and the conditions for ultraviolet exposure may be controlled appropriately such that the reaction is facilitated. Preferably, the ultraviolet exposure intensity is at least 20 mW/cm$^2$ or more. When the amount of the low-molecular weight liquid crystal is 85% by mass or more, it is preferable to form the polymer network based on a phase separation structure formed by spinodal decomposition. In spinodal decomposition, a fine phase separation structure based on periodic fluctuations in the concentrations of the two phases is obtained, and this is preferred because a uniform gap distance smaller than the wavelength of visible light can be easily formed. It is preferable to form the polymer network. When the amount of the polymerizable compounds is less than 15% by mass, it is preferable to form the phase separation structure through binodal decomposition. When the amount is 15% by mass or more, it is preferable to form the phase separation structure through spinodal decomposition. When the content of the polymerizable compounds is increased, two-phase separation of the low-molecular weight liquid crystal phase and the polymerizable compound phase occurs at a phase transition temperature due to the influence of temperature. At a temperature higher than the two-phase separation transition temperature, an isotropic phase is present. At a temperature lower than the two-phase separation transition temperature, separation occurs. This is not preferable because a uniform phase separation structure is not obtained. When two-phase separation occurs due to temperature, it is preferable to form the phase separation structure at a temperature higher than the two-phase separation temperature. In any of the above cases, the polymer network is formed while the same alignment state as that of the low-molecular weight liquid crystal is maintained. The polymer network formed exhibits optical anisotropy that conforms to the alignment of the low-molecular weight liquid crystal. Examples of the form of the liquid crystal layer in the polymer network include: a structure in which the liquid crystal composition forms a continuous layer in the three-dimensional network structure of the polymer; a structure in which droplets of the liquid crystal composition are dispersed in the polymer; a structure in which both the continuous layer and the droplets are present; and a structure in which polymer network layers extending from surfaces of opposed substrates are present and only the liquid crystal layer is present near a central portion between the opposed substrates. In any of these structures, it is preferable that the liquid crystal composition has a pretilt angle of 0 to 900 with respect to the direction normal to the liquid crystal element substrates. The pretilt angle is induced by the action of the polymer network. It is preferable that the polymer network formed has the ability to align the coexisting low-molecular weight liquid crystal with the alignment direction of the alignment films of the liquid crystal cell. It is also preferable that the polymer network has the function of pre-tilting the low-molecular weight liquid crystal with respect to the direction of the polymer interface. It is preferable to introduce a polymerizable compound that causes the low-molecular weight liquid crystal to be pre-tilted with respect to the polymer interface because this is useful to reduce the driving voltage of the liquid crystal element. Moreover, the polymer network may have refractive index anisotropy, and it is preferable to use a polymerizable compound having a mesogenic group in order to obtain the ability to align the liquid crystal in the alignment direction.

A polymerizable compound having a polyvalent alkyl or polyvalent branched alkylene group and having no mesogenic group that induces vertical alignment may be used for a vertical alignment cell such as a VA mode cell, and it is also preferable to use this polymerizable compound in combination with a polymerizable compound having a mesogenic group. When the above-described polymerizable liquid crystal composition is used to form a polymer network in a vertical alignment cell through phase separation polymerization, it is preferable that a fiber-like or columnar polymer network is formed in substantially the same direction as the vertical direction of the low-molecular weight liquid crystal with respect to the liquid crystal cell substrates. Vertical alignment films disposed on cell substrate surfaces may be subjected to, for example, rubbing treatment such that inclined alignment is induced for the liquid crystal. When these vertical alignment films are used, a pretilt angle is induced, and it is preferable that a fiber-like or columnar polymer network is formed so as to be inclined in the same direction as the low-molecular weight liquid crystal aligned at the pretilt.

In a method in which the pretilt angle is induced while a voltage is applied, it is preferable to perform polymerization under application of a voltage within the range of a voltage lower by about 0.9 V than a threshold voltage of the polymerizable liquid crystal composition to a voltage higher by about 2 V than the threshold voltage, because a fiber-like or columnar polymer network with a desired pretilt angle is formed. This method is preferable in the case of vertical alignment such as the VA mode because the optical axis direction or easy alignment axis direction of the polymer network is inclined so as to induce a pretilt angle of preferably 0.1 to 30.0°, more preferably 0.1 to 10.00, still more preferably 0.1 to 5.0°, and particularly preferably 0.1 to 3.0° with respect to the direction normal to transparent substrates before irradiation with energy rays. This method is more preferable in the case of horizontal alignment such as the TN mode because the optical axis direction or easy alignment axis direction of the polymer network is inclined so as to induce a pretilt angle of preferably 0.1 to 300, preferably 0.1 to 10.00, more preferably 0.1 to 5.0°, still more preferably 0.1 to 3.0°, and particularly preferably 0.1 to 2.0° with respect to a direction parallel to the transparent substrates before irradiation with energy rays. The fiber-like or columnar polymer network formed by any of the above methods is characterized in that the polymer network connects the two cell substrates. Therefore, the thermal stability of the pretilt angle is improved, and the reliability of the liquid crystal display element is thereby enhanced.

Another method for forming a fiber-like or columnar polymer network with inclined alignment to induce a pretilt angle for the low-molecular weight liquid crystal is to use a combination of a bifunctional acrylate in which an alkylene group between a functional group and a mesogenic group has 6 or more carbon atoms and which induces a small pretilt angle and a bifunctional acrylate in which an alkylene group between a functional group and a mesogenic group has 5 or more carbon atoms and which induces a large pretilt angle. By adjusting the ratio of these compounds added, a desired pretilt angle can be induced.

Inducing the pretilt angle is important for the VA mode, and the pretilt angle can be induced by using: a method in which polymerization-phase separation is performed while a voltage is applied; a method in which polymerization-phase separation is performed using a plurality of polymerizable compounds that induce different pretilt angles; or a method in which polymerization-phase separation is performed while the photo-aligning function of a polymerizable compound having reversible photo-alignment function is used to align the low-molecular weight liquid crystal and the polymerizable liquid crystal compounds in the direction of travel of ultraviolet rays. Any of these methods may be used as needed to produce the liquid crystal element of the present invention.

In a parallel alignment cell such as an IPS or FFS mode cell, the polymerizable liquid crystal composition used forms a fiber-like or columnar polymer network through phase separation polymerization, and the low-molecular weight liquid crystal is aligned parallel to the alignment direction of alignment films disposed on surfaces of liquid crystal cell substrates. In this case, it is preferable that the refractive index anisotropy or easy alignment axis direction of the fiber-like or columnar polymer network formed is substantially the same as the alignment direction of the low-molecular weight liquid crystal. More preferably, the fiber-like or columnar polymer network is distributed almost all over the cell except for spaces in which the low-molecular weight liquid crystal is dispersed. For the purpose of inducing the pretilt angle with respect to the polymer interface direction, it is preferable to use a polymerizable compound having a polyvalent alkyl or polyvalent alkylene group and having no mesogenic group and a polymerizable compound having a mesogenic group.

Electrooptical properties are influenced by the surface area of the polymer network interface and the gap distance of the polymer network. It is important not to cause light scattering, and it is preferable that the average gap distance is smaller than the wavelength of visible light. For example, one method used to reduce the gap distance by increasing the surface area of the interface is to increase the content of a monomer composition. In this case, the polymer network is formed such that the polymerization-phase separation structure is changed to cause the gap distance to be reduced, whereby the surface area of the interface increases. Therefore, the driving voltage decreases, and the decay time is shortened. The polymerization phase separation structure is also influenced by the temperature of polymerization.

In the present invention, it is preferable that polymerization is performed at an increased phase separation rate so that a phase separation structure having fine gaps is obtained. The phase separation rate is largely influenced by the compatibility between the low-molecular weight liquid crystal and the polymerizable compounds and by the polymerization rate. Since the phase separation rate largely depends on the molecular structures and contents of the compounds, it is preferable to use them while their chemical compositions are appropriately controlled. When the compatibility is high, it is preferable to use a polymerizable compound with a high polymerization rate. When ultraviolet polymerization is used, it is preferable to increase the intensity of the ultraviolet rays. It is also preferable to increase the content of the polymerizable compounds in the polymerizable liquid crystal composition. When the compatibility is low, the rate of phase separation is sufficiently high, and this is preferable in terms of production of the liquid crystal element of the present invention. One method used to reduce the compatibility is to perform polymerization at low temperature. When the temperature is low, the order parameter of the liquid crystal increases, and the compatibility between the liquid crystal and the monomers decreases, so that the rate of polymerization-phase separation can be increased. Another method is to perform polymerization while the polymerizable liquid crystal composition is cooled to a temperature at which the composition is in a supercooled state. In this case, it is only necessary that the temperature be slightly lower than the melting point of the polymerizable liquid crystal composition. This is preferable because it is possible to accelerate phase separation by reducing the temperature by a few degrees. In this manner, a polymerization phase separation structure corresponding to that obtained when several tens of percent of the monomer composition is added to the liquid crystal is formed. Specifically, a polymer network structure is formed, in which the surface area of the polymer network interface is large and the gap distance is small. This structure acts such that the decay time decreases. Therefore, in the polymerizable liquid crystal composition in the present invention, it is preferable to appropriately adjust the chemical composition of the polymerizable liquid crystal in consideration of alignability, the cross-linking density, the anchoring force, and the gap distance such that the decay time decreases.

To obtain high-contrast display in a liquid crystal element using the polymerizable liquid crystal composition in the present invention, it is necessary to prevent light scattering. However, it is important that the phase separation structure be controlled to form an appropriate polymer network layer such that the intended voltage-transmittance characteristics and the intended switching characteristics are obtained, in consideration of the above-described methods. The polymer network layer structure will next be specifically described.

<Continuous Polymer Network Layer Structure>

A continuous polymer network layer structure is a structure in which the polymer network layer is formed in the liquid crystal phase over the entire liquid crystal display element such that the liquid crystal phase is continuous. It is preferable that the easy alignment axis or uniaxial optical axis of the polymer network is substantially the same as the easy alignment axis of the low molecular weight liquid crystal, and it is preferable that the polymer network is formed so as to induce a pretilt angle for the low-molecular weight liquid crystal. It is preferable that the average gap distance of the polymer network is smaller than the wavelength of visible light, i.e., at least smaller than 450 nm, because the occurrence of light scattering is prevented. The decay response time can be reduced to less than the response time when the low-molecular weight liquid crystal is used alone through the interaction effect (anchoring force) between the polymer network and the low-molecular weight liquid crystal. To achieve this, the average gap distance is preferably within the range of 50 nm to 450 nm. To allow the decay time to be less influenced by the cell thickness and to allow the liquid crystal to have a decay time comparable to that of a thin cell even when the cell is thick, it is preferable that at least the average gap distance is within the range having a lower limit of about 200 nm and an upper limit of about 450 nm. When the average gap distance is reduced, a problem arises in that the driving voltage increases. To reduce the increase in driving voltage to 25 V or less to thereby shorten the decay response time, it is only necessary that the average gap distance be within the range of about 250 nm to 450 nm. This is preferable because the decay response time can be improved, i.e., falls within the range of about 5 msec. to about 1 msec. To control the increase in the driving voltage within about 5 V, it is preferable that the average gap distance is within the range of about 300 nm to 450 nm. Moreover, by controlling the average gap distance of the polymer network, a fast decay response time of 1 msec. or less can be achieved. In some cases, the driving voltage increases to 30 V or more. Even in these cases, it is only necessary to set the average gap distance to about 50 nm to about 250 nm. In order to control the decay response time to 0.5 msec. or less, it is preferable to set the average gap distance to about 50 nm to about 200 nm. In contrast to the gap distance, the average diameter of the polymer network is preferably within the range of from 20 nm to 700 nm. As the content of the polymerizable compounds increases, the average diameter tends to increase. When reactivity is increased to increase the rate of polymerization-phase separation, the density of the polymer network increases, and the average diameter of the polymer network decreases. Therefore, the phase separation conditions are controlled as needed. When the content of the polymerizable compounds is 10% or less, the average diameter is preferably 20 nm to 160 nm. When the average gap distance is within the range of 200 nm to 450 nm, the average diameter is preferably within the range of 40 to 160 nm. When the content of the polymerizable compounds is more than 10%, the average diameter is preferably within the range of 50 nm to 700 nm and more preferably within the range of 50 nm to 400 nm.

<Discontinuous Polymer Network Layer Structure>

The distance d between the two opposed substrates is determined such that the product (retardation) of the cell thickness (d) and the effective birefringence ($\Delta n$) of the liquid crystal is about 0.275 to about 0.33. When the content of the polymerizable compounds is sufficient, the polymer network layer is formed over the entire liquid crystal display element, and the liquid crystal phase is continuous in this structure. However, when the content of the polymerizable compounds is low, the amount of the polymer network layer is not sufficient to cover the entire cell, and the polymer network layer is formed discontinuously. When the polarity of the surfaces of the substrates such as polyimide alignment films is high, the polymerizable compounds tend to gather near liquid crystal cell interfaces, and the polymer network grows from the substrate surfaces. In this case, a polymer network layer is formed so as to adhere to each substrate interface. The polymer network is formed such that a polymer network layer on a cell substrate surface, a liquid crystal layer, and another polymer network layer on the counter substrate are stacked in this order. In the structure including the stack of polymer network layer/liquid crystal layer/polymer network layer, it is preferable that the polymer network layers formed have a thickness, in the cross-sectional direction of the cell, of at least 0.5% or more of the cell thickness, preferably 1% or more, and more preferably 5% or more, because the effect of reducing the decay time is obtained through the anchoring force between the polymer network and the low-molecular weight liquid crystal. However, in this case, the influence of the cell thickness increases. Therefore, when the decay time increases as the cell thickness increases, the thickness of the polymer network layers is increased as needed. In the polymer network structure in each polymer network layer, it is only necessary that the low-molecular weight liquid crystal and the easy alignment axis or uniaxial optical axis of the polymer network be aligned in substantially the same direction and that the polymer network be formed so as to induce the pretilt angle for the low-molecular weight liquid crystal. The average gap distance is preferably within the range of 90 nm to 450 nm.

When the content of the two or more polymerizable compounds is from 1% by mass to 6% by mass based on the total weight of the polymerizable composition containing the polymerizable compounds and the liquid crystal composition, it is preferable to use a bifunctional monomer having a mesogenic group with a high anchoring force, and it is preferable to use a bifunctional monomer with a high polymerization rate and having a structure in which the distance between the functional groups is small. Moreover, it is preferable to form the polymerization-phase separation structure at a low temperature of 0° C. or lower. When the content of the two or more polymerizable compounds is from 6% by mass to less than 10% by mass based on the total weight of the polymerizable composition containing the polymerizable compounds and the liquid crystal composition, it is preferable to use a combination of any of the above bifunctional monomers and a monofunctional monomer with a low anchoring force, and it is preferable to form the polymerization-phase separation structure within the range of 25° C. and −20° C. as needed. When the melting point is equal to or higher than room temperature, it is preferable to form the polymerization-phase separation structure at a temperate lower by about 5° C. than the melting point because the same effect as that of low-temperature polymerization is obtained. When the content of the two or more polymerizable compounds is from 10% by mass to less than 40% by mass based on the total weight of the polymerizable composition containing the polymerizable compounds and the liquid crystal composition, the influence of the polymer binder or the polymer network on the alignment of the low-molecular weight liquid crystal and on the driving voltage is large, and the driving voltage thereby increases. Therefore, it is preferable to use a polymerizable compound that has the ability to align the low-molecular weight liquid crystal and has a mesogenic group having a relatively weak anchoring force. For example, in the polymerizable compound having a mesogenic group with a weak anchoring force, it is effective to increase the number of carbon atoms of an alkylene group present between a functional group and the mesogenic group, and the number of carbon atoms is preferably 5 to 10. When the content of the polymerizable compounds is more than 30% by mass, liquid crystal droplets may disperse in the polymer binder in some cases. Even in this case, it is preferable that the polymer binder has refractive index anisotropy and that the alignment direction of the alignment films on the substrate surfaces matches the optical axis direction of the polymer binder.

As the concentration of the polymerizable compounds included in the polymerizable liquid crystal composition increases, the anchoring force between the liquid crystal composition and the polymer interface increases, and Td decreases. As the anchoring force between the liquid crystal composition and the polymer interface increases, τr increases. To reduce the sum of τd and τr to less than 1.5 ms, the concentration of the two or more polymerizable compounds based on the total weight of the polymerizable composition containing the polymerizable compounds and the liquid crystal composition is 1% by mass or more and less than 40% by mass, preferably 2% by mass or more and 15% by mass or less, and more preferably 3% by mass or more and 8% by mass or less.

When the liquid crystal display element is used for a TFT driving liquid crystal display element, it is necessary to improve reliability by preventing flicker, an afterimage due to image sticking, etc., and one of the important characteristics is a voltage holding ratio. One factor that causes a reduction in the voltage holding ratio may be ionic impurities contained in the polymerizable liquid crystal composition. In particular, mobile ions have a strong influence on the voltage holding ratio. It is therefore preferable that purification treatment, for example, is performed to remove the mobile ions so that the specific resistance is at least $10^{14}$ Ω·cm or more. When the polymer network is formed by radical polymerization, the voltage holding ratio may decrease because of ionic impurities generated from the photopolymerization initiator etc. It is therefore preferable to select a polymerization initiator that causes only small amounts of organic acids and low molecular weight by-products to be generated.

[Liquid Crystal Display Element]

The liquid crystal display element of the present invention has the same structure as conventional liquid crystal display elements except that a copolymer is contained in the liquid crystal composition and the content of the copolymer is 1% by mass or more and less than 40% by mass based on the total mass of the liquid crystal composition and the copolymer. Specifically, the liquid crystal display element according to the present invention has a structure in which a liquid crystal layer is sandwiched between two transparent substrates, at least one of which has electrodes. Preferably, the liquid crystal display element of the present invention has an alignment layer for aligning the liquid crystal composition on at least one of the transparent substrates. By applying a voltage to the alignment layer disposed on one substrate and an electrode disposed on the other substrate, the alignment of the liquid crystal molecules is controlled. It is preferable that the polymer network or a polymer binder has uniaxial refractive index anisotropy or an easy alignment axis direction and that the optical axis direction or easy alignment axis direction of the polymer network or the polymer binder is the same as the easy alignment axis direction of the low molecular weight liquid crystal. In this respect, the above described liquid crystal differs from a light scattering type polymer network liquid crystal and a light scattering type polymer dispersed liquid crystal having no uniaxial refractive index anisotropy or no easy alignment axis direction. It is preferable that the easy alignment axis direction of the alignment layer and the easy alignment axis direction of the polymer network or the polymer binder are the same. In the liquid crystal layer, the polymer network having refractive index anisotropy is formed by irradiating the liquid crystal composition containing the polymerizable compounds with ultraviolet rays or an electron beam in the temperature range of −50° C. to 30° C. while an AC electric field is applied. The polymer network is formed in the liquid crystal such that the optical axis direction of the polymer network forms a pretilt angle with respect to the substrate surfaces. By providing a polarizing plate, a retardation film, etc., display is obtained using this alignment state. The liquid crystal display element is applicable to operational modes such as TN, STN, ECB, VA, VA-TN, IPS, FFS, π cell, OCB, and cholesteric liquid crystal modes. Of these, VA, IPS, FFS, VA-TN, TN, and ECB modes are particularly preferred. The liquid crystal display element of the present invention that has the polymer or copolymer contained in the liquid crystal composition differs from a PSA (Polymer Sustained Alignment) liquid crystal display element having a polymer or copolymer on alignment films.

In the liquid crystal display element of the present invention, the distance (d) between the substrates is preferably within the range of 2 to 5 μm and more preferably 3.5 μm or less. Generally, the birefringence of a liquid crystal composition is adjusted such that the product of the birefringence and the cell thickness is equal to about 0.275. However, in the polymerizable liquid crystal composition in the present invention, since the polymer network is formed as a result of the polymerization-phase separation, the birefringence of the liquid crystal display element when an electric field is applied is reduced by the action of the anchoring force of the polymer network and the optical properties of the polymer network. Therefore, the product of the distance (d) between the substrates and the birefringence (Δn) of each of the liquid crystal composition and the polymerizable composition or the liquid crystal composition contained in the polymerizable liquid crystal composition is particularly preferably within the range of 0.3 to 0.4 μm when the increase in the driving voltage due to the formation of the polymer network is about 5 V or less, more preferably within the range of 0.30 to 0.35 μm when the increase in the driving voltage is about 3 V or less, and particularly preferably within the range of 0.29 to 0.33 μm when the increase in the driving voltage is 1 V or less. When the distance (d) between the substrates of the liquid crystal display element and the product of the birefringence (Δn) of the liquid crystal composition and the distance (d) between the substrates are within the above ranges, the transmittance is as high as that of the low-molecular weight liquid crystal alone, and fast response display with preferable color reproducibility can be obtained. It is preferable that the birefringence of the liquid crystal composition used in the polymerizable liquid crystal composition is set such that the product of the cell thickness (d) and the birefringence (Δn) is 1 to 1.9 times 0.275. It is also preferable that the distance d between the two opposed substrates is determined such that the product (retardation) of the cell thickness (d) and the effective birefringence (Δn) of the liquid crystal is about 0.275 to about 0.35.

The driving voltage of the liquid crystal display element of the present invention is not determined only by the dielectric anisotropy and elastic constants of the liquid crystal composition and is largely influenced by the anchoring force acting between the liquid crystal composition and the polymer interface.

For example, the following relation describing the driving voltage of a polymer dispersed liquid crystal display element is shown in Japanese Unexamined Patent Application Publication No. 6-222320.

$$Vth \propto \frac{d}{\langle r \rangle + {}^1 Kii/A} \left( \frac{{}^2 Kii}{\Delta \varepsilon} \right)^{\frac{1}{2}} \qquad [\text{Math. 1}]$$

(Vth represents a threshold voltage; $^1Kii$ and $^2Kii$ represent elastic constants; i represents 1, 2, or 3; Δε represents dielectric constant anisotropy; <r> represents the average gap distance between transparent polymer material interfaces; A represents the anchoring force of the transparent polymer material acting on a liquid crystal composition; and d represents the distance between substrates having transparent electrodes.)

According to this relation, the driving voltage of the light scattering liquid crystal display element is determined by the average gap distance between the transparent polymer material interfaces, the distance between the substrates, the elastic constants and dielectric constant anisotropy of the liquid crystal composition, and the anchoring energy between the liquid crystal composition and the transparent polymer material.

Among them, parameters that can be controlled in the liquid crystal display element of the present invention are the physical properties of the liquid crystal and the anchoring force of the polymer. The anchoring force largely depends on the molecular structure of the polymer and the molecular structure of the low molecular weight liquid crystal. Therefore, when a polymerizable compound with a strong anchoring force is selected, the response time can be reduced to 1.5 ms or less, but, at the same time, the driving voltage increases to 30 V or higher. It is therefore preferable to select an appropriate liquid crystal compound and appropriate polymerizable compounds to adjust the chemical composition such that the driving voltage is 30 V or less and the response speed is 1.5 ms or less. To adjust the chemical composition, it is preferable that a polymer precursor with a strong anchoring force and a polymer precursor with a weak anchoring force are appropriately mixed such that the driving voltage is well-balanced with the response speed. Among the physical properties of the liquid crystal composition that can be used to reduce the driving voltage, the dielectric anisotropy is particularly preferably 6 or more for a P-type liquid crystal and −3 or less for an N-type liquid crystal. The birefringence is preferably 0.09 or more. Moreover, it is more preferable that the birefringence of the liquid crystal composition and the refractive index of fiber-like or columnar polymer network are as close as possible to each other to prevent light scattering. However, since the retardation of the liquid crystal element is influenced by the concentrations of the polymer precursors, it is preferable to use the polymer precursors such that the birefringence of the liquid crystal composition is appropriately increased or decreased in order to obtain the necessary retardation.

Preferably, the liquid crystal display element of the present invention is obtained as follows. While the above-described liquid crystal composition is held at −50° C. to 30° C., the polymerizable compounds are polymerized by irradiation with energy rays to thereby form a polymer network having refractive index anisotropy or an easy alignment axis direction in the liquid crystal composition. The upper limit of the polymerization temperature is 30° C., and the polymerization temperature is preferably 20° C. to −10° C. As will be described later in Examples, the present inventor has found that Td can be further reduced by low-temperature polymerization and room temperature polymerization, although this depends on the chemical compositions of the polymerizable compounds. The reason for this may be, for example, that: 1) the polymerizable compounds are polymerized with the degree of orientation of the liquid crystal molecules increased due to low temperature; 2) phase separation occurs easily because of the reduced compatibility between the polymer polymerized by low-temperature polymerization and the liquid crystal composition, so that the rate of polymerization-phase separation increases and the gap distance of the polymer network is reduced; and 3) even when a polymerizable compound with a relatively weak anchoring force is used, the influence of the anchoring force by the formed polymer network having refractive index anisotropy can be strong because the gap distance is small.

Preferably, the liquid crystal display element of the present invention is formed such that the polymer network or polymer binder has uniaxial refractive index anisotropy or an easy alignment axis direction and that the optical axis direction or easy alignment axis direction of the polymer network or polymer binder forms a pretilt angle with respect to the transparent substrates. It is also preferable to obtain the polymer as follows. The orientation of the low-molecular weight liquid crystal is controlled by controlling the strength of an electric field such that the low-molecular weight liquid crystal is inclined with respect to the substrate surfaces. Then the liquid crystal layer is irradiated with energy rays while a voltage is applied to thereby polymerize the polymerizable compounds, and a polymer having refractive index anisotropy or an easy alignment axis direction is formed in the liquid crystal composition. For example, in a VA-TN mode with vertical alignment and in the VA mode with vertical alignment, it is particularly preferable that polymerization is performed while a voltage is applied such that the pretilt angle is within 20° with respect to the direction normal to the substrates. This is because not only an effect corresponding to the effect of protrusions used in an existing VA mode cell or fine polymer protrusions in a PSA liquid crystal is obtained, but also a high-speed response that cannot be achieved by the PSA is obtained. Moreover, when polymerization is performed while electric fields are applied from a plurality of directions, multiple domains can be formed, and this is more preferred because an improvement in viewing angle is achieved. Preferably, photo-alignment treatment or rubbing alignment treatment is performed on the alignment films such that a pretilt angle for the low-molecular weight liquid crystal is induced at the substrate interface-vertical alignment film interfaces. This is preferred because the inclined direction of the low-molecular weight liquid crystal is defined and the occurrence of alignment defects during switching is prevented. It is also preferable that the alignment treatment is performed such that the low-molecular weight liquid crystal is inclined in a plurality of directions. In the liquid crystal layer, the liquid crystal composition containing the polymerizable compounds is irradiated with ultraviolet rays or an electron beam within the temperature range of −50° C. to 30° C. while an AC electric field is applied appropriately, and a polymer network having refractive index anisotropy is thereby formed in the liquid crystal such that the optical axis direction of the polymer network forms a pretilt angle with respect to the substrate surfaces. As for the pretilt angle, it is more preferable that polymerization-phase separation is performed while the low-molecular weight liquid crystal having dielectric anisotropy is in an aligned state obtained by application of the electric field. In the thus-obtained liquid crystal element, the polymerizable compounds have been polymerized, and the optical axis of the polymer network after polymerization is inclined with respect to the substrate surfaces.

The two substrates used in the liquid crystal display element of the present invention may be formed using glass or a flexible transparent material such as a plastic. A transparent substrate having a transparent electrode layer can be obtained, for example, by sputtering of indium tin oxide (ITO) onto the transparent substrate such as a glass plate.

A color filter can be produced, for example, by a pigment dispersion method, a printing method, an electrodeposition method, or a staining method. An example of a color filter production method using the pigment dispersion method will be described. A curable coloring composition for the color filter is applied to a transparent substrate, subjected to patterning treatment, and then cured by heating or irradiation with light. This process is repeated for each of the three colors, red, green, and blue, and pixel portions of the color filter can thereby be produced. Moreover, pixel electrodes including active elements such as TFTs and thin-film diodes may be disposed on the substrate.

The substrates described above are disposed so as to face each other with their transparent electrode layers located on the inner side. In this case, the distance between the substrates may be adjusted using a spacer. It is preferable to adjust the distance such that a light adjusting layer to be obtained has a thickness of 1 to 100 μm. The thickness is more preferably 1.5 to 10 μm. When a polarizing plate is used, it is preferable that the product of the refractive index anisotropy Δn of the liquid crystal and the cell thickness d is adjusted such that the contrast is maximized. The product is preferably ½ or ¼ of 550 nm, which depends on the display mode. When there are two polarizing plates, the polarization axes of the polarizing plates may be adjusted such that the viewing angle and contrast are improved. Moreover, a retardation film for increasing the viewing angle may be used. Examples of the spacer include glass particles, plastic particles, alumina particles, and columnar spacers made of photoresist materials etc. Then a sealing agent such as an epoxy-based thermosetting composition is screen-printed onto the substrates while a liquid crystal inlet is formed, and the substrates are laminated and heated to thermally cure the sealing agent.

To sandwich the polymerizable liquid crystal composition between the two substrates, an ordinary vacuum injection method or an ODF method may be used. In a liquid crystal display element production process using the ODF method, an epoxy-based photo- and heat-curable sealing agent is applied to one of a backplane substrate and a frontplane substrate using a dispenser to form a closed loop bank. A prescribed amount of the polymerizable liquid crystal composition is added dropwise to the closed loop bank under degassing, and then the frontplane and the backplane are joined, whereby the liquid crystal display element can be produced. The polymerizable liquid crystal composition used in the present invention can be preferably used because the liquid crystal-monomer composite material can be stably added dropwise in the ODF step.

To polymerize the polymerizable compounds, it is preferable to use a polymerization method in which the polymerizable compounds are irradiated with active energy rays. Since an appropriate polymerization rate is desirable in order to obtain good alignment performance for the liquid crystal, the polymerizable compounds are irradiated with ultraviolet rays or an electron beam, irradiated with a combination of the ultraviolet rays and the electron beam, or irradiated sequentially with the ultraviolet rays and the electron beam. When ultraviolet rays are used, a polarized light source may be used, or an unpolarized light source may be used. When the polymerizable liquid crystal composition sandwiched between the two substrates is polymerized, it is necessary that at least the substrate on the irradiation side has appropriate transparency to the active energy rays. It is preferable that the liquid crystal composition containing the polymerizable compounds is irradiated with ultraviolet rays or an electron beam in the temperature range of −50° C. and 20° C. while an AC electric field is applied. The frequency of the AC electric field applied is preferably within the range of 10 Hz to 10 kHz and more preferably within the range of 100 Hz to 5 kHz, and the voltage is selected according to the desired pretilt angle of the liquid crystal display element. Specifically, the pretilt angle of the liquid crystal display element can be controlled by the voltage applied. In a horizontal electric field MVA mode liquid crystal display element, it is preferable, in terms of alignment stability and contrast, that the pretilt angle is controlled to 800 to 89.90

Preferably, the temperature during irradiation is within the temperature range of −50° C. to 30° C. The lamp used to generate the ultraviolet rays may be a metal halide lamp, a high-pressure mercury lamp, or an ultrahigh-pressure mercury lamp. As for the wavelength of the ultraviolet rays used for the irradiation, it is preferable that ultraviolet rays in a wavelength range other than the absorption wavelength range of the liquid crystal composition are used, and it is preferable that ultraviolet rays with a wavelength of 365 nm or less are filtered out as needed. The intensity of the ultraviolet rays used for the irradiation is preferably 0.1 mW/cm$^2$ to 100 W/cm$^2$ and more preferably 2 mW/cm$^2$ to 50 W/cm$^2$. The amount of the energy of the ultraviolet rays used for the irradiation may be controlled appropriately and is preferably 10 mJ/cm$^2$ to 500 J/cm$^2$ and more preferably 100 mJ/cm$^2$ to 200 J/cm$^2$. During the irradiation with the ultraviolet rays, the intensity may be changed. The time of the ultraviolet irradiation is appropriately selected according to the intensity of the ultraviolet rays used for the irradiation and is preferably from 10 seconds to 3,600 seconds and more preferably from 10 seconds to 600 seconds.

(Horizontal Electric Field Type)

First, a liquid crystal display element in one embodiment of the invention will be described with reference to the drawings. FIG. 1 is a schematic cross-sectional view illustrating an example of the liquid crystal display element of the present invention. The liquid crystal display element 10 in the present embodiment of the present invention includes a first substrate 2 in which an alignment layer 4 has been formed on one side, a second substrate 7 which is spaced apart from the first substrate and in which a photo-alignment layer has been formed on one side, and a liquid crystal layer 5 filled into the space between the first substrate 2 and the second substrate 7 and in contact with the pair of alignment layers. The liquid crystal display element 10 further includes an electrode layer 3 disposed between one of the alignment layers 4 (4a and 4b) and the first substrate 2, and the electrode layer 3 includes thin film transistors serving as active elements, a common electrode 22, and pixel electrodes.

Figure 3:
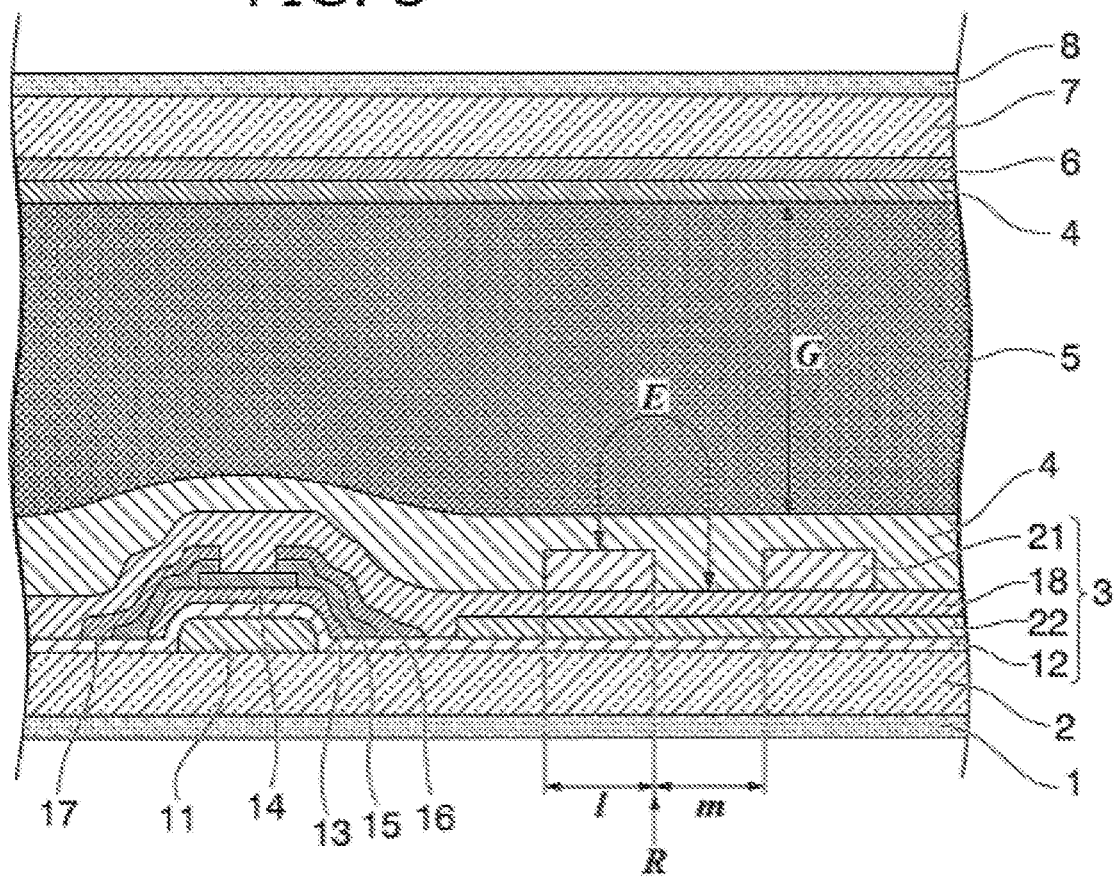
FIG. 3 is a cross-sectional view of the liquid crystal display element.

FIG. 1 is a schematic illustration showing the structure of the liquid crystal display element. In FIG. 1, for the sake of convenience of description, the components are spaced apart from each other. As described in FIG. 1, the liquid crystal display element 10 in the present embodiment of the present invention is configured as a horizontal electric field liquid crystal display element (the FFS mode is shown in the figure as an example of the IPS mode) containing a polymerizable liquid crystal composition (or the liquid crystal layer 5) sandwiched between the first transparent insulating substrate 2 and the second transparent insulating substrate 7 disposed so as to face each other. In the first transparent insulating substrate 2, the electrode layer 3 is formed on the surface on the side toward the liquid crystal layer 5. One of the pair of alignment films 4 (4a and 4b) is disposed between the liquid crystal layer 5 and the first transparent insulating substrate 2, and the other is disposed between the liquid crystal layer 5 and the second transparent insulating substrate 7. The pair of alignment films 4 (4a and 4b) are in direct contact with the polymerizable liquid crystal composition included in the liquid crystal layer 5 and induce homogeneous alignment. When no voltage is applied, liquid crystal molecules in the polymerizable liquid crystal composition are oriented substantially parallel to the substrates 2 and 7. As shown in FIGS. 1 and 3, the second substrate 7 and the first substrate 2 may be sandwiched between a pair of polarizing plates 1 and 8. In FIG. 1, a color filter 6 is disposed between the second substrate 7 and one of the alignment films 4. The form of the liquid crystal display element according to the present invention may be a so-called color filter-on-array (COA), and the color filter may be disposed between the liquid crystal layer and the electrode layer including the thin film transistors. Alternatively, the color filter may be disposed between the second substrate and the electrode layer including the thin film transistor.

Specifically, the liquid crystal display element 10 in the present embodiment of the present invention has a structure including the first polarizing plate 1, the first substrate 2, the electrode layer 3 including the thin film transistors, an alignment film 4, the liquid crystal layer 5 containing the polymerizable liquid crystal composition, another alignment film 4, the color filter 6, the second substrate 7, and the second polarizing plate 8 that are sequentially stacked.

Glass or a flexible transparent material such as a plastic may be used for the first substrate 2 and the second substrate 7, and an opaque material such as silicon may be used for one of them. The two substrates 2 and 7 are laminated using a sealant or a sealing material such as an epoxy-based thermosetting composition disposed in their periphery. To maintain the distance between the substrates, particle-like spacers such as glass particles, plastic particles, or alumina particles or pillar spacers formed of a resin by photolithography may be disposed between the substrates.

Figure 2:
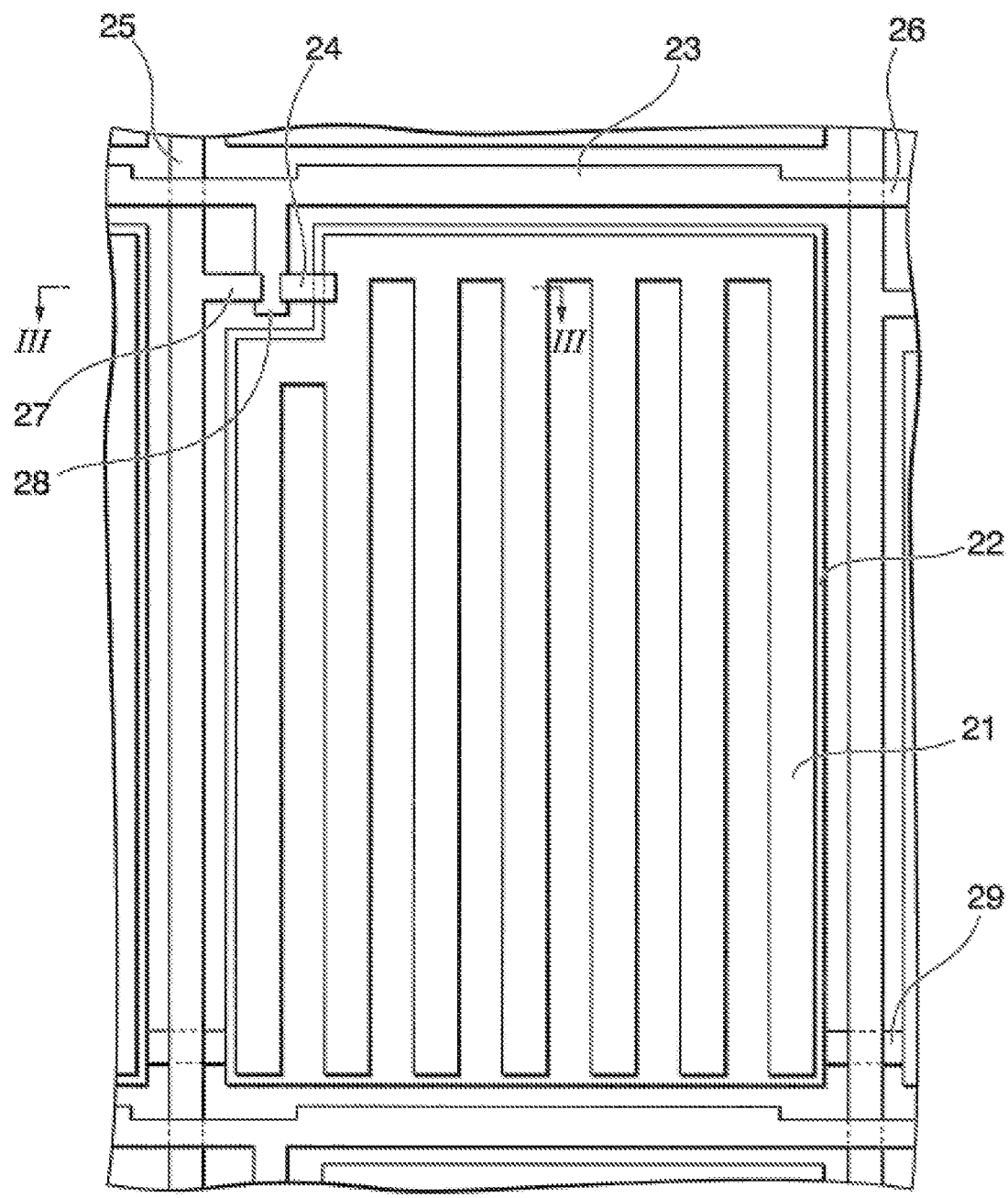
FIG. 2 is a partial enlarged view of [FIG. 1].

FIG. 2 is an enlarged plan view showing a region of the electrode layer 3 formed on the substrate 2, the region being surrounded by line II in FIG. 1. FIG. 3 is a cross-sectional view obtained by cutting the liquid crystal display element shown in FIG. 1 in the direction of line III-III in FIG. 2. As shown in FIG. 2, in the electrode layer 3 including the thin film transistors formed on a surface of the first substrate 2, a plurality of drain electrode 24 for supplying scanning signals and a plurality of data lines 25 for supplying display signals are disposed in a matrix formed so as to intersect each other. In FIG. 2, only a pair of drain electrode 24 and a pair of data lines 25 are shown.

Regions surrounded by the plurality of drain electrode 24 and the plurality of data lines 25 form unit pixels of the liquid crystal display device, and the common electrode 22 and a pixel electrode 21 are formed in each unit pixel. In the vicinity of each of the intersections of the drain electrode 24 and the data lines 25 that intersect each other, a thin film transistor including a source electrode 27, a gate lines 26, and a gate electrode 28 is disposed. The thin film transistor is connected to the pixel electrode 21 and used as a switching element that supplies a display signal to the pixel electrode 21. In addition, a common line (not shown) parallel to the drain electrode 24 is provided. The common line is connected to the common electrode 22 to supply a common signal to the common electrode 22.

One preferred exemplary embodiment of the structure of the thin film transistor is shown in FIG. 3. This structure includes: a gate electrode 11 formed on the surface of the substrate 2; a gate insulating layer 12 disposed so as to cover the gate electrode 11 and also cover substantially the entire surface of the substrate 2; a semiconductor layer 13 formed on the surface of the gate insulating layer 12 so as to face the gate electrode 11; a protective layer 14 disposed so as to cover part of the surface of the semiconductor layer 13; a drain electrode 16 that is disposed so as to cover one side-end portion of the protective layer 14 and one side-end portion of the semiconductor layer 13 and is in contact with the gate insulating layer 12 formed on the surface of the substrate 2; a source electrode 17 that is disposed so as to cover the other side-end portion of the protective layer 14 and the other side-end portion of the semiconductor layer 13 and is in contact with the gate insulating layer 12 formed on the surface of the substrate 2; and an insulating protective layer 18 disposed so as to cover the drain electrode 16 and the source electrode 17. An anodized film (not shown) may be formed on the surface of the gate electrode 11 in order to, for example, eliminate a step at the gate electrode.

Amorphous silicon, polycrystalline silicon, etc. may be used for the semiconductor layer 13. However, it is preferable to use a transparent semiconductor film such as a film of ZnO, IGZO (In—Ga—Zn—O), or ITO because a harmful effect of photocarriers caused by light absorption can be prevented and the aperture ratio of the element can be increased.

For the purpose of reducing the width and height of a Schottky barrier, an ohmic contact layer 15 may be disposed between the semiconductor layer 13 and the drain electrode 16 or the source electrode 17. A material, such as n-type amorphous silicon or n-type polycrystalline polysilicon, doped with an impurity such as phosphorus at a high concentration may be used for the ohmic contact layer.

Each of the gate lines 26, the data lines 25, and the common line 29 is preferably a metal film and more preferably a film of Al, Cu, Au, Ag, Cr, Ta, Ti, Mo, W, Ni, or an alloy thereof. Particularly preferably, an Al line or an Al alloy line is used. The insulating protective layer 18 is a layer having an insulating function and formed, for example, from a film of silicon nitride, silicon dioxide, or silicon oxynitride.

In the embodiment shown in FIGS. 2 and 3, the common electrode 22 is a flat plate-shaped electrode formed over substantially the entire surface of the gate insulating layer 12, and each pixel electrode 21 is a comb-shaped electrode formed on the insulating protective layer 18 covering the common electrode 22. Specifically, the common electrode 22 is disposed at a portion closer to the first substrate 2 than the pixel electrode 21, and these electrodes are disposed so as to overlap each other through the insulating protective layer 18. The pixel electrodes 21 and the common electrode 22 are formed of, for example, a transparent conductive material such as ITO (Indium Tin Oxide), IZO (Indium Zinc Oxide), or IZTO (Indium Zinc Tin Oxide). Since the pixel electrodes 21 and the common electrode 22 are formed of the transparent conductive material, the area of an opening formed in each unit pixel can be large, and both the aperture ratio and the transmittance can increase.

Each pixel electrode 21 and the common electrode 22 are formed such that the interelectrode distance (also referred to as the minimum distance): R between the pixel electrode 21 and the common electrode 22 is smaller than the distance: G between the first substrate 2 and the second substrate 7 in order to generate a fringe field between these electrodes. The interelectrode distance: R is the distance between the electrodes in a direction horizontal to the substrates. In the example shown in FIG. 3, the comb-shaped pixel electrode 21 overlaps the flat plate-shaped common electrode 22, and therefore the interelectrode distance: R is 0. Since the minimum distance R is smaller than the distance (i.e., the cell gap): G between the first substrate 2 and the second substrate 7, a fringe field E is formed. Therefore, in the FFS liquid crystal display element, it is possible to use a parabolic electric field and a horizontal electric field formed in a direction perpendicular to lines forming the comb shape of the pixel electrode 21. The comb-shaped portion of the pixel electrode 21 has an electrode width: l and a gap width: m, and it is preferable that the width of the comb-shaped portion of the pixel electrode 21 is appropriately adjusted such that all the liquid crystal molecules in the liquid crystal layer 5 can be driven by the electric fields generated. The minimum separation distance R between the pixel electrode and the common electrode can be adjusted by the (average) film thickness of the gate insulating layer 12. Unlike FIG. 3, the liquid crystal display element according to the present invention may be formed such that the interelectrode distance (also referred to as the minimum distance): R between the pixel electrode 21 and the common electrode 22 is larger than the distance: G between the first substrate 2 and the second substrate 7 (the IPS mode). In one exemplary structure in this case, a comb-shaped pixel electrode and a comb-shaped common electrode are disposed in an alternating manner in substantially the same plane.

One preferred embodiment of the liquid crystal display element according to the present invention is preferably an FFS liquid crystal display element using a fringe field. When the minimum separation distance d between adjacent portions of the common electrode 22 and the pixel electrode 21 is smaller than the minimum separation distance D between the alignment films 4 (the distance between the substrates), a fringe field is formed between the common electrode and the pixel electrode, and the horizontal alignment and vertical alignment of the liquid crystal molecules can be effectively utilized. In the FFS liquid crystal display element of the present invention, when a voltage is applied to the liquid crystal molecules arranged such that their long axis direction is parallel to the alignment direction of the alignment layers, equipotential lines of the parabolic electric field between the pixel electrode 21 and the common electrode 22 are formed also above the pixel electrode 21 and the common electrode 22, and the liquid crystal molecules in the liquid crystal layer 5 are arranged such that their long axis extends along the electric field. Therefore, even when the dielectric anisotropy is low, the liquid crystal molecules can be driven.

In terms of preventing light leakage, it is preferable that the color filter 6 in the present invention has a black matrix (not shown) formed in portions corresponding to the thin film transistors and storage capacitors 23. The color filter 6 includes single dots each including three filter pixels generally including R (red), G (green), and B (blue) filter pixels for videos and images, and these three filters are arranged, for example, in the extending direction of the gate lines. The color filter 6 can be produced, for example, by a pigment dispersion method, a printing method, an electrodeposition method, or a staining method. An example of a color filter production method using the pigment dispersion method will be described. A curable coloring composition for the color filter is applied to a transparent substrate, subjected to patterning treatment, and then cured by heating or irradiation with light. This process is repeated for each of the three colors, red, green, and blue, and pixel portions of the color filter can thereby be produced. Moreover, pixel electrodes including active elements such as TFT and thin-film diodes may be disposed on the substrate to form a so-called color filter-on-array.

The pair of alignment films 4 that induce homogeneous alignment are disposed on the electrode layer 3 and the color filter 6 so as to be in direct contact with the polymerizable liquid crystal composition included in the liquid crystal layer 5.

By adjusting the polarizing axis of the polarizing plate 1 and the polarizing axis of the polarizing plate 8, the viewing angle and the contrast can be adjusted and improved. It is preferable that the polarizing plates 1 and 8 have transmission axes orthogonal to each other so that the liquid crystal display element operates in the normally black mode. It is particularly preferable that one of the polarizing plate 1 and the polarizing plate 8 is disposed such that its transmission axis is parallel to the alignment direction of the liquid crystal molecules. It is also preferable that the product of refractive index anisotropy Δn of the liquid crystal and the cell thickness d is adjusted such that the contrast is maximized. Moreover, a retardation film for increasing the viewing angle may also be used.

In another embodiment of the liquid crystal display element, the IPS mode may be used. One condition in this case is that the minimum separation distance d between adjacent portions of the common electrode and each pixel electrode is longer than the minimum separation distance G between the liquid crystal alignment films. In one exemplary structure, the common electrode and each pixel electrode are formed on the same substrate and are disposed in an alternating manner such that the minimum separation distance d between adjacent portions of the common electrode and the pixel electrode is longer than the minimum separation distance G between the liquid crystal alignment films.

In a method for producing the liquid crystal display element according to the present invention, it is preferable that, after a coating film is formed on one of the substrates that has the electrode layer and/or the surfaces of the substrates, the pair of substrates are disposed spaced apart from each other so as to face each other with the coating film located on the inner side, and then the liquid crystal composition is filled into the space between the substrates. In this case, it is preferable that spacers are used to adjust the distance between the substrates.

Preferably, the distance between the substrates (the average thickness of the liquid crystal layer obtained, and this distance is referred to also as the separation distance between the coating films) is adjusted to 1 to 100 μm. The average separation distance between the coating films is more preferably 1.5 to 10 μm.

In the present invention, examples of the spacers used to adjust the distance between the substrates include glass particles, plastic particles, alumina particles, and pillar spacers made of photoresist materials etc.

The FFS liquid crystal display element described using FIG. 1 to FIG. 3 is a merely example, and the present invention can be embodied in various other forms so long as they do not depart from the technical scope of the invention.

Another embodiment of the liquid crystal display element according to the present invention will be described using FIGS. 4 and 5.

Figure 4:
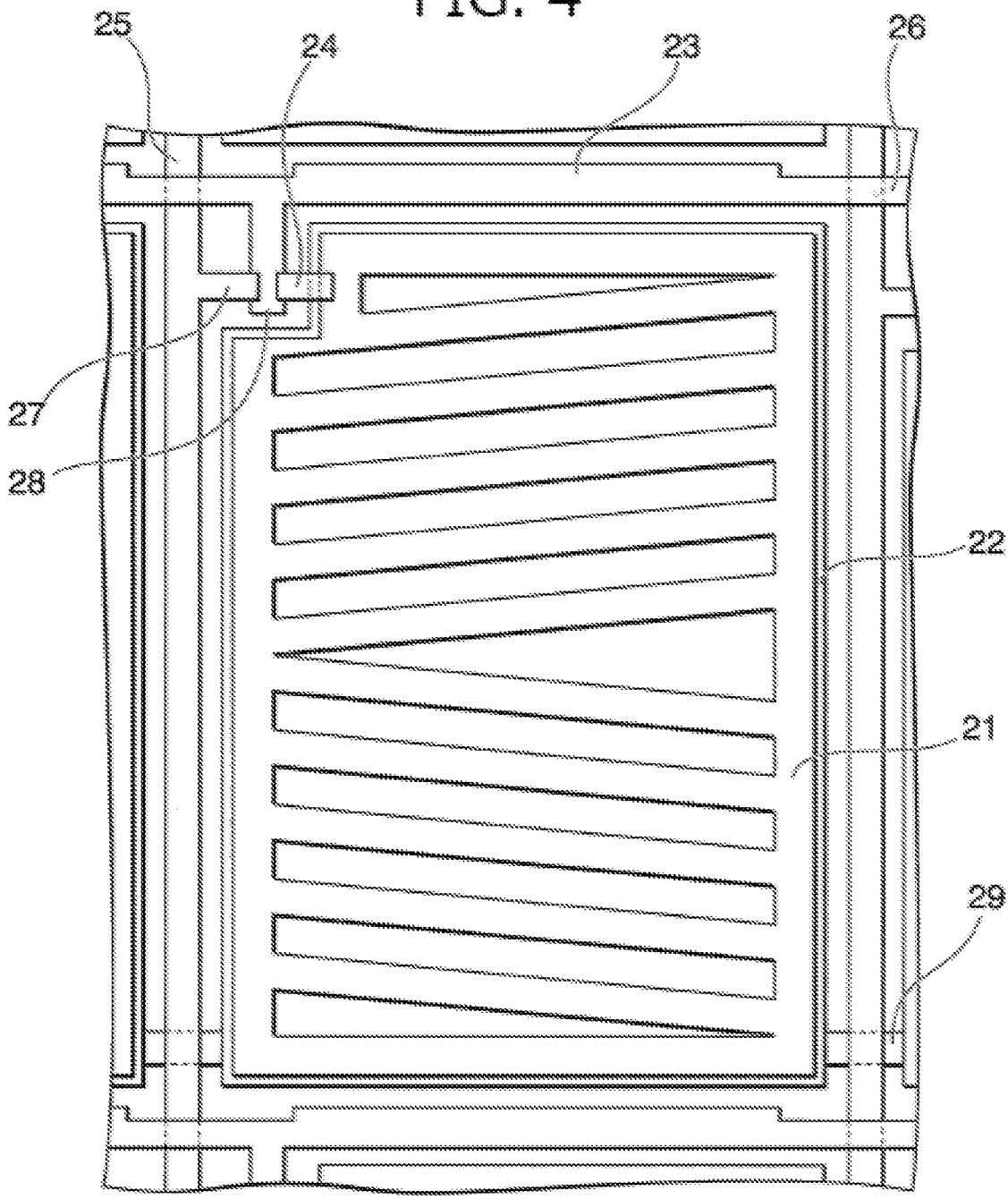
FIG. 4 is a partial enlarged view of [FIG. 1].

For example, FIG. 4 is another embodiment of the enlarged plan view showing a region of the electrode layer 3 formed on the substrate 2, the region being surrounded by line II in FIG. 1. As shown in FIG. 4, the pixel electrode 21 may be configured to have slits. The pattern of the slits may be formed so as to have inclinations with respect to the drain electrode 24 or the data lines 25.

The pixel electrode 21 shown in FIG. 4 has a substantially rectangular flat plate shape with substantially rectangular frame-shaped cutout portions. A comb-shaped common electrode 22 is formed over the entire back side of the pixel electrode 21 through the insulating protective layer 18 (not shown). When the minimum separation distance R between adjacent portions of the common electrode and the pixel electrode is smaller than the minimum separation distance G between the alignment layers, the display element operates in the FFS mode. When the minimum separation distance R is longer, the display element operates in the IPS mode. Preferably, the surface of the pixel electrode is covered with an insulating protective film and an alignment film layer. As in the above case, the storage capacitors 23 that store display signals supplied through the data lines 25 may be disposed in regions surrounded by the plurality of drain electrode 24 and the plurality of data lines 2. No particular limitation is imposed on the shape of the cutout portions, and the cutout portions used may have not only the substantially rectangular shape shown in FIG. 4 but also well-known shapes such as elliptic, circular, rectangular, diamond, triangular, and parallelogrammic shapes. When the minimum separation distance R between adjacent portions of the common electrode and the pixel electrode is longer than the minimum separation distance G between the alignment layers, the display device operates in the IPS mode.

Figure 5:
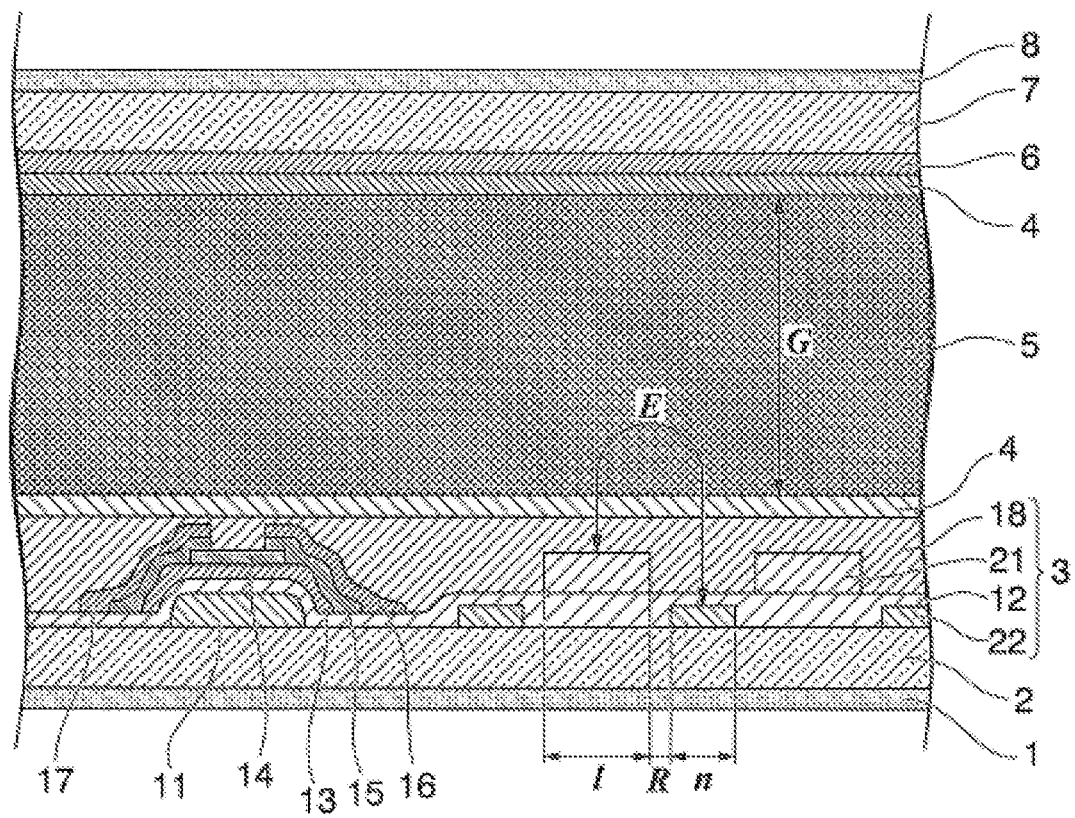
FIG. 5 is a cross-sectional view of the liquid crystal display element.

FIG. 5 shows an embodiment different from the embodiment in FIG. 3 and is another example of the cross-sectional view obtained by cutting the liquid crystal display element shown in FIG. 1 in the direction of line III-III in FIG. 2. The first substrate 2 in which an alignment layer 4 and the electrode layer 3 including the thin film transistors 20 have been formed on one side and the second substrate 8 in which another alignment layer 4 has been formed on one side are spaced a prescribed distance D apart from each other so as to face each other, and this space is filled with the liquid crystal layer 5 containing the liquid crystal composition. The gate insulating layer 12, the common electrode 22, the insulating protective layer 18, the pixel electrode 21, and one of the alignment layers 4 are sequentially stacked on part of the surface of the first substrate 2. As also shown in FIG. 4, the pixel electrode 21 has a flat plate shape having triangular cutout portions formed in its central and opposite end portions and rectangular cutout portions formed in the rest of the region. The common electrode 22 has a structure including comb-shaped common electrode sections disposed substantially parallel to the substantially elliptic cutout portions of the pixel electrode 21 and located on the first substrate side of the pixel electrode.

In the example shown in FIG. 5, the common electrode 22 used has a comb shape or slits, and the interelectrode distance R between the pixel electrode 21 and the common electrode 22 is R=α (in FIG. 5, the horizontal component of the distance between the electrodes is denoted as R for convenience). In the example in FIG. 3, the common electrode 22 is formed on the gate insulating layer 12. However, as shown in FIG. 5, the common electrode 22 may be formed on the first substrate 2, and the pixel electrode 21 may be disposed through the gate insulating layer 12. The pixel electrode 21 has an electrode width: l, and the common electrode 22 has an electrode width: n. The distance between the electrodes is denoted by R. It is preferable that these widths are appropriately adjusted such that all the liquid crystal molecules in the liquid crystal layer 5 can be driven by the electric fields generated. When the minimum separation distance R between adjacent portions of the common electrode and the pixel electrode is smaller than the minimum separation distance G between the alignment layers, the display element operates in the FFS mode. When the minimum separation distance R is longer, the display element operates in the IPS mode. In FIG. 5, the position of the pixel electrode 21 in the thickness direction differs from the position of the common electrode 22 in the thickness direction. However, the positions of these electrodes in the thickness direction may be the same, and the common electrode may be disposed on the liquid crystal layer 5 side.

(Vertical Electric Field Type)

Figure 6:
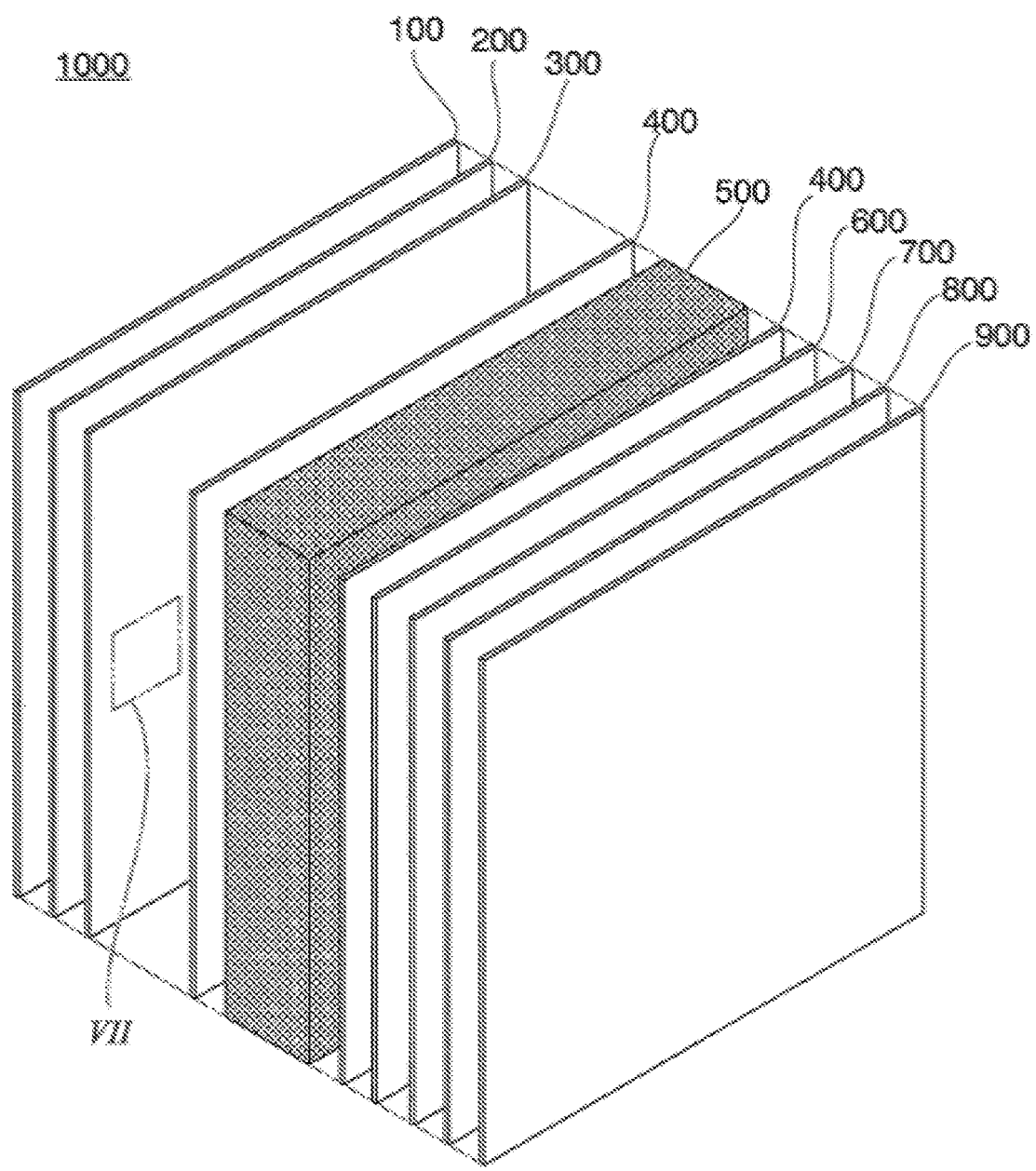
FIG. 6 is a schematic illustration of a liquid crystal display element.
Figure 7:
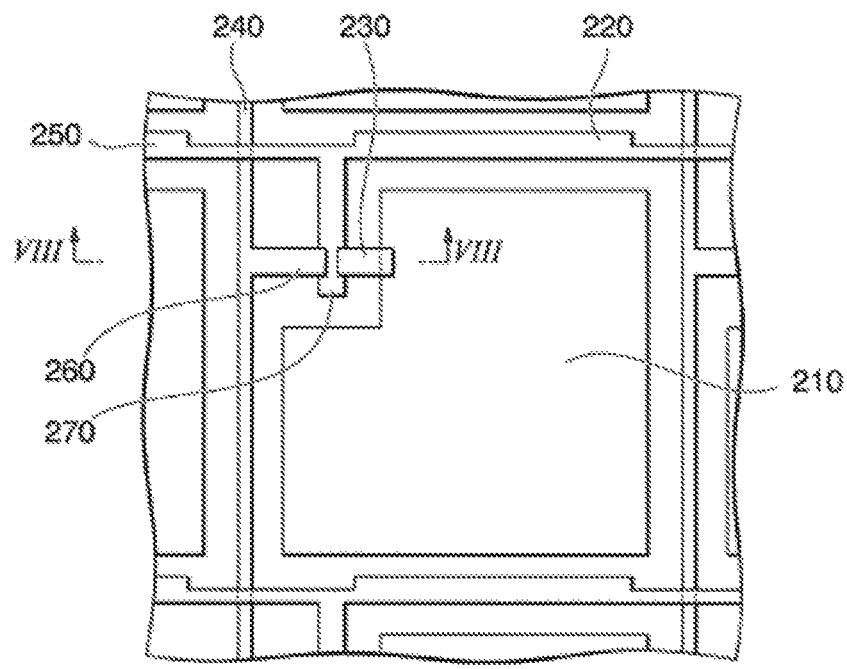
FIG. 7 is a partial enlarged view of [FIG. 6].
Figure 8:
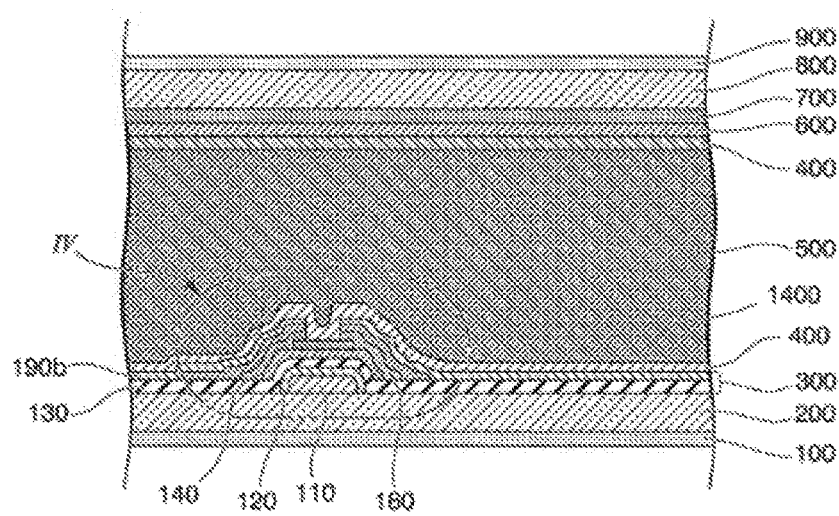
FIG. 8 is a cross-sectional view of the liquid crystal display element.
Figure 9:
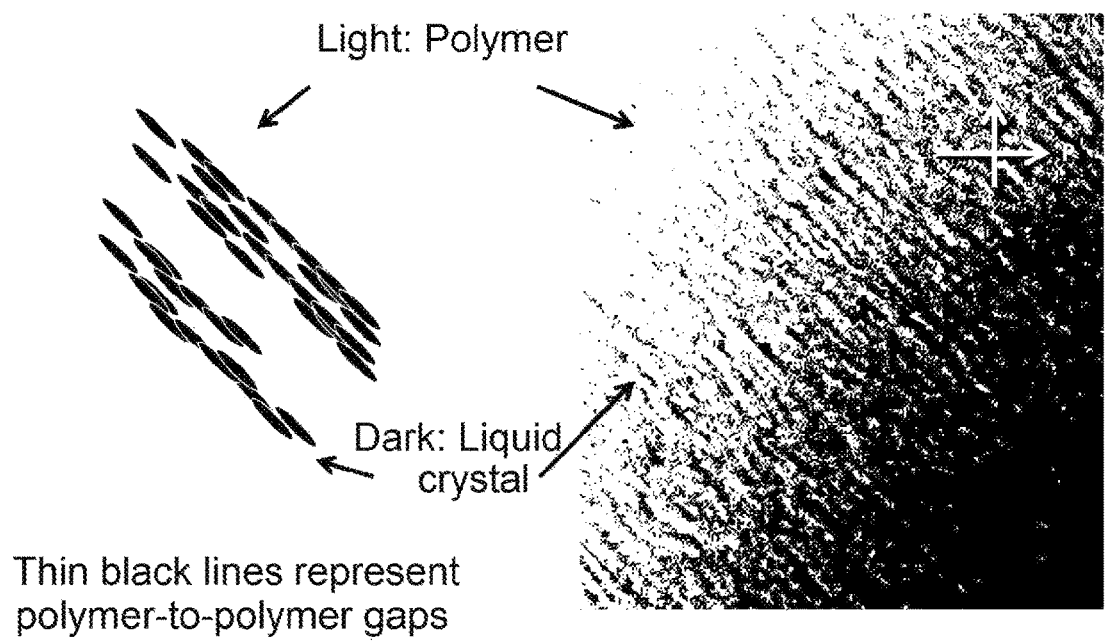
FIG. 9 shows a photograph and an illustration of an aligned, polymerized, phase-separated structure observed under a polarizing microscope.

Another preferred embodiment of the present invention is a vertical electric field liquid crystal display element using the liquid crystal composition. FIG. 6 is a schematic illustration showing the structure of the vertical electric field liquid crystal display element. In FIG. 7, for the sake of convenience of description, the components are spaced apart from each other. FIG. 7 is an enlarged plan view of a region of an electrode layer 300 formed on a substrate and including thin film transistors (this layer is referred to also as a thin film transistor layer 300), the region being surrounded by line VII in FIG. 6. FIG. 8 is a cross-sectional view obtained by cutting the liquid crystal display element shown in FIG. 6 in the direction of line VIII-VIII in FIG. 7. Referring to FIGS. 6 to 9, the vertical electric field liquid crystal display element according to the present invention will be described.

As shown in FIG. 6, the liquid crystal display element 1000 according to the present invention has a structure including: a second substrate 800 provided with a transparent electrode (layer) 600 (referred to also as a common electrode 600) formed of a transparent conductive material; a first substrate 200 on which pixel electrodes formed of a transparent conductive material and a thin film transistor layer 300 have been formed, the thin film transistor layer 300 including thin film transistors that control the pixel electrodes provided on the pixels; and a polymerizable liquid crystal composition (or a liquid crystal layer 500) sandwiched between the first substrate 200 and the second substrate 800. In this liquid crystal display element, the orientation of liquid crystal molecules in the polymerizable liquid crystal composition when no voltage is applied is substantially perpendicular to the substrates 200 and 800. As shown in FIGS. 6 and 8, the second substrate 800 and the first substrate 200 may be sandwiched between a pair of polarizing plates 100 and 900. In FIG. 6, a color filter 700 is disposed between the first substrate 200 and the common electrode 600. A pair of alignment films 400 are formed on the transparent electrodes (electrode layers) 600 and 1400 so as to be adjacent to the liquid crystal layer 500 in the present invention and in direct contact with the polymerizable liquid crystal composition included in the liquid crystal layer 500.

Specifically, the liquid crystal display element 1000 according to the present invention is configured to include the first polarizing plate 100, the first substrate 200, the electrode layer (referred to also as the thin film transistor layer) 300 including the thin film transistors, a photo-alignment film 400, the layer 500 including the liquid crystal composition, another alignment film 400, the common electrode 600, the color filter 700, the second substrate 800, and the second polarizing plate 900 that are sequentially stacked. Preferably, the alignment films 400 are each a photo-alignment film.

Figure 10:
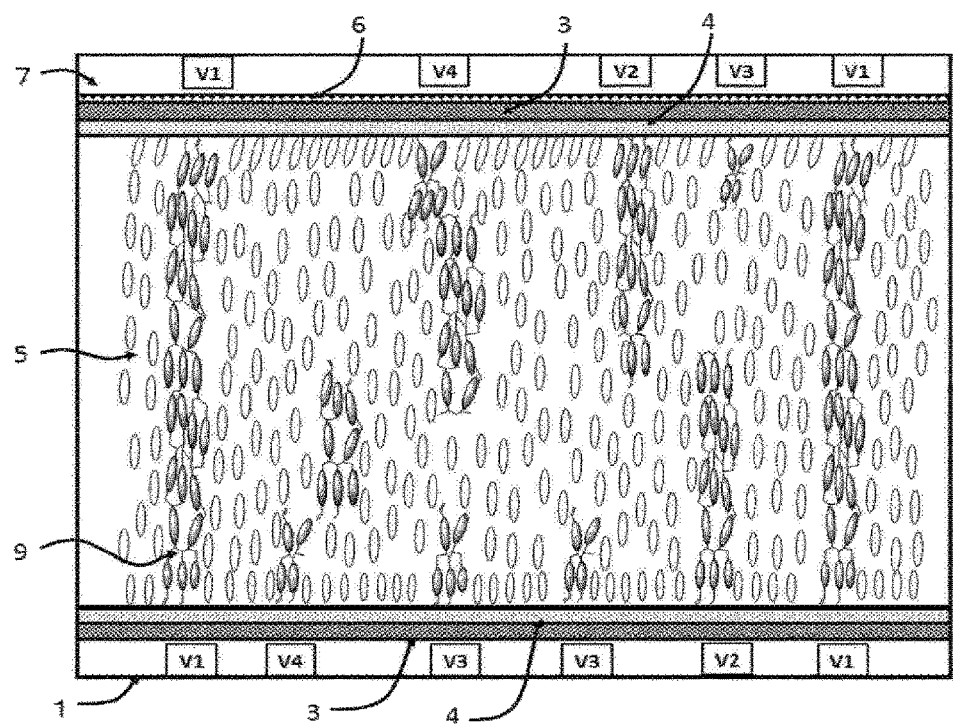
FIG. 10 is a schematic illustration showing the alignment of liquid crystal molecules and polymer network structures in a VA liquid crystal display device.

FIG. 10 is a schematic cross-sectional view showing one embodiment of a VA mode liquid crystal display device in the present invention and illustrating polymer network structures and a liquid crystal molecule alignment structure formed in a liquid crystal layer of a liquid crystal cell produced using alignment films subjected to alignment treatment (mask rubbing or photo-alignment treatment). The vertical alignment films formed on transparent electrodes on the inner side (liquid crystal layer side) of the liquid crystal cell are slightly inclined (0.1 to 5.0°) with respect to the direction normal to glass substrates. The vertical alignment films and the liquid crystal molecules form a 90-degree twisted structure between the upper and lower substrates.

The polymerizable monomers are aligned in the vertical direction due to the anchoring force of the vertical alignment films. The aligned polymerizable monomers are polymerized and fixed by irradiation with ultraviolet light to thereby form a polymer network. The thus-formed polymer network may have, for example, one of the following four structures: (V1) The polymer network formed extends between the upper and lower substrates. (V2) The polymer network formed extends from the upper (lower) substrate in a direction toward the liquid crystal to an intermediate location. (V3) The polymer network formed is present only near the surfaces of the alignment films (in the case where the polymerizable monomers are mainly monofunctional monomers). (V4) Segments of the polymer network are bonded to each other in the liquid crystal layer (but no floating).

The thus-formed anisotropic polymer network is almost completely separated from the liquid crystal layer, and the liquid crystal molecules are thought to be aligned and arranged between segments of the polymer network. This structure clearly differs from the molecular alignment structure of a so-called polymer network liquid crystal in which liquid crystal molecules and the polymer network are present in a mixed form and in which light scattering occurs when no voltage is applied. This above structure also differs completely from the structure of an alignment sustaining layer present near an alignment film used for PSA etc.

Examples of the polymer network and the liquid crystal molecule alignment structure obtained by the method using the alignment films have been shown. However, a so-called MVA mode using structural members such as ribs or slits may have a structure essentially similar to any of the above-described structures except that the structure of the polymer network near the substrate interfaces and the pretilt of liquid crystal molecules differ from those of above-described structures because of the intensity of an oblique electric field applied through the structural members or slits.

In the VA liquid crystal display device having the above-described polymer network and the above-described liquid crystal molecular alignment of the liquid crystal molecules, the anchoring force acting on the liquid crystal molecules when no voltage is applied is enhanced due to the synergistic effect of the anchoring force of the liquid crystal alignment films and the anchoring force of the polymer network, and this allows the response speed when the voltage is OFF to increase.

(Horizontal/Oblique Electric Field Type)

In one novel display technique previously proposed, a liquid crystal display region can be divided into multiple domains different in alignment by a simple method that use only an ingenious electrode structure without subjecting the alignment films to a complicated process such as mask rubbing or mask exposure. Specifically, in this method, an oblique electric field and a horizontal electric field are applied to the liquid crystal layer.

Figure 11:
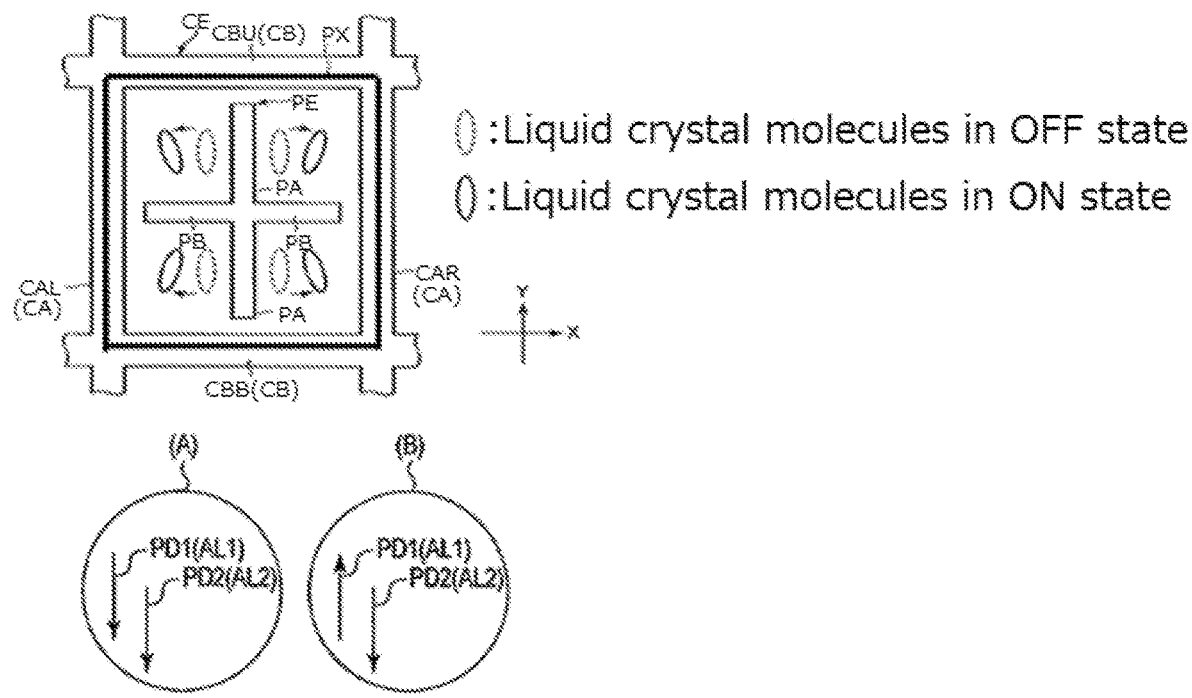
FIG. 11 shows schematic illustrations of an electrode structure of an oblique electric field liquid crystal display device and the alignment of liquid crystal molecules.

FIG. 11 is a plan view schematically showing a minimum unit structure of one pixel PX in a TFT liquid crystal display element using the above technique. The structure and operation of this horizontal/oblique electric field liquid crystal display device will be described briefly.

A pixel electrode PE includes a main pixel electrode PA and a sub-pixel electrode PB. The main pixel electrode PA and the sub-pixel electrode PB are electrically connected to each other. Both the main pixel electrode PA and the sub-pixel electrode PB are disposed on an array substrate AR. The main pixel electrode PA extends in a second direction Y, and the sub-pixel electrode PB extends in a first direction X different from the second direction Y. In the example shown, the pixel electrode PE is formed into a substantially cross shape. The sub-pixel electrode PB is joined to a substantially central portion of the main pixel electrode PA and extends from the central portion toward opposite sides, i.e., the left and right side of the pixel PX. The main pixel electrode PA and the sub-pixel electrode PB are substantially orthogonal to each other. The pixel electrode PE is electrically connected at the pixel electrode PB to a switching element not illustrated.

A common electrode CE includes main common electrodes CA and sub-common electrodes CB, and the main common electrodes CA and the sub-common electrodes CB are electrically connected to each other. The common electrode CE is electrically insulated from the pixel electrode PE. In the common electrode CE, at least part of the main common electrodes CA and at least part of the sub-common electrodes CB are disposed on a counter substrate CT. The main common electrodes CA extend in the second direction Y. The main common electrodes CA are disposed on opposite sides of the main pixel electrode PA. In this case, the main common electrodes CA do not overlap the main pixel electrode PA in the X-Y plane, and substantially equal spaces are formed between the main pixel electrode PA and the main common electrodes CA. Specifically, the main pixel electrode PA is located at substantially the midpoint between its adjacent main common electrodes CA. The sub-common electrodes CB extends in the first direction X. The sub-common electrodes CB are disposed on opposite sides of the sub-pixel electrode PB. In this case, the sub-common electrodes CB do not overlap the sub-pixel electrode PB in the X-Y plane, and substantially equal spaces are formed between the sub-pixel electrode PB and the sub-common electrodes CB. Specifically, the sub-pixel electrode PB is located at substantially the midpoint between its adjacent sub-common electrodes CB.

In the example illustrated, each of the main common electrodes CA is formed into a strip shape extending linearly in the second direction Y. Each of the sub-common electrodes CB is formed into a strip shape extending linearly in the first direction X. The two main common electrodes CA are spaced apart from each other and arranged parallel to each other in the first direction X. In the following description, to distinguish them, the main common electrode on the left side in the figure is referred to as CAL, and the main common electrode on the right side in the figure is referred to as CAR. The two sub-common electrodes CB are spaced apart from each other and arranged parallel to each other in the second direction Y. In the following description, to distinguish them, the main common electrode on the upper side in the figure is referred to as CBU, and the main common electrode on the lower side in the figure is referred to as CBB. The main common electrode CAL and the main common electrode CAR are at the same potential as the sub-common electrode CBU and the sub-common electrode CBB. In the example illustrated, the main common electrode CAL and the main common electrode CAR are connected to the sub-common electrode CBU and the sub-common electrode CBB.

The main common electrode CAL and the main common electrode CAR are disposed between the pixel PX and its adjacent pixels on the left and right sides, respectively. Specifically, the main common electrode CAL is disposed on both sides of the boundary between the pixel PX illustrated and a pixel on its left side (not shown), and the main common electrode CAR is disposed on both sides of the boundary between the pixel PX illustrated and a pixel on its right side (not shown). The sub-common electrode CBU and the main common electrode CBB are disposed between the pixel PX and its vertically adjacent pixels on the upper and lower sides, respectively. Specifically, the sub-common electrode CBU is disposed on both sides of the boundary between the pixel PX illustrated and a pixel on its upper side (not shown), and the sub-common electrode CBB is disposed on both sides of the boundary between the pixel PX illustrated and a pixel on its lower side (not shown).

In the example illustrated, the pixel PX includes four regions separated by the pixel electrode PE and the common electrode CE and each formed as an opening or a transmission portion mainly contributing to display. In this example, the initial alignment direction of liquid crystal molecules LM is a direction substantially parallel to the second direction Y. A first alignment film AL1 is disposed on a surface of the array substrate AR that faces the counter substrate CT and extends over the entire active area ACT. The first alignment film AL1 covers the pixel electrode PE and is disposed also on a second interlayer insulating film 13. The first alignment film AL1 is formed of a material exhibiting horizontal alignment. The array substrate AR may further include a fist main common electrode and a first sub-common electrode as part of the common electrode.

Figure 12:
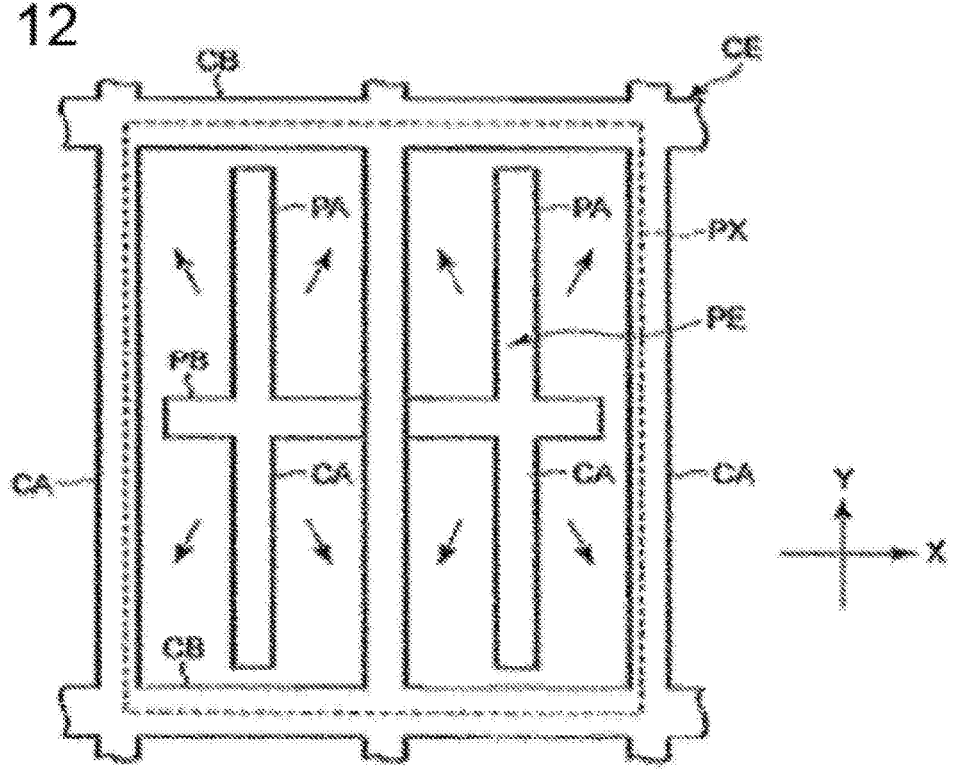
FIG. 12 is a schematic illustration showing an electrode structure of an eight-domain oblique electric field liquid crystal display device.
Figure 13:
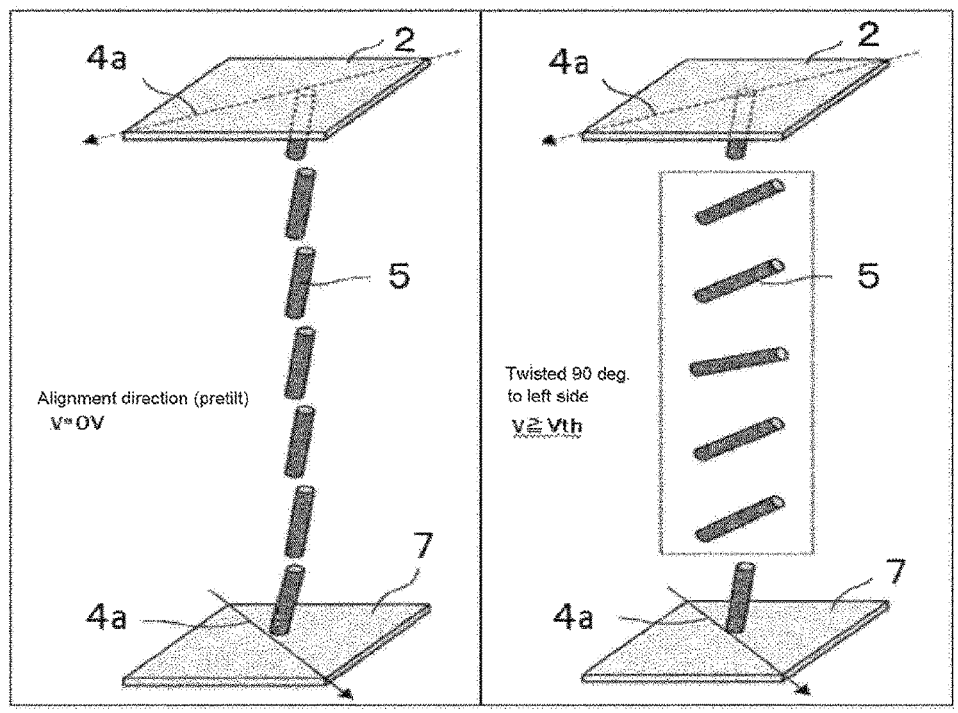
FIG. 13 is a schematic illustration of the molecular alignment of liquid crystal molecules in a VA-TN liquid crystal cell.
Figure 14:
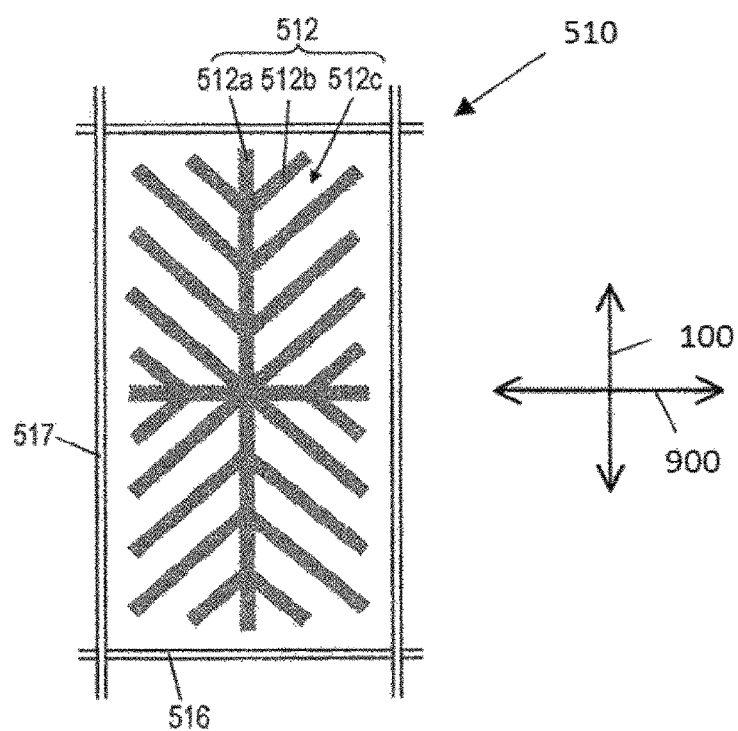
FIG. 14 is a schematic illustration of an electrode structure of a fishbone VA liquid crystal cell.
Figure 15:
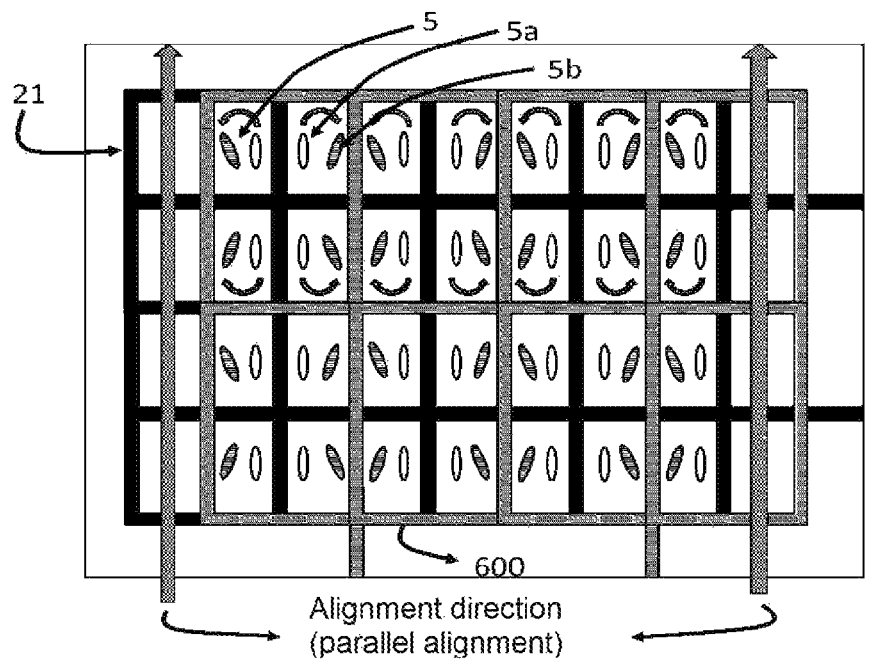
FIG. 15 shows a plan view of an electrode structure of an oblique test cell and a schematic illustration of the motion of liquid crystal molecules.
Figure 16:
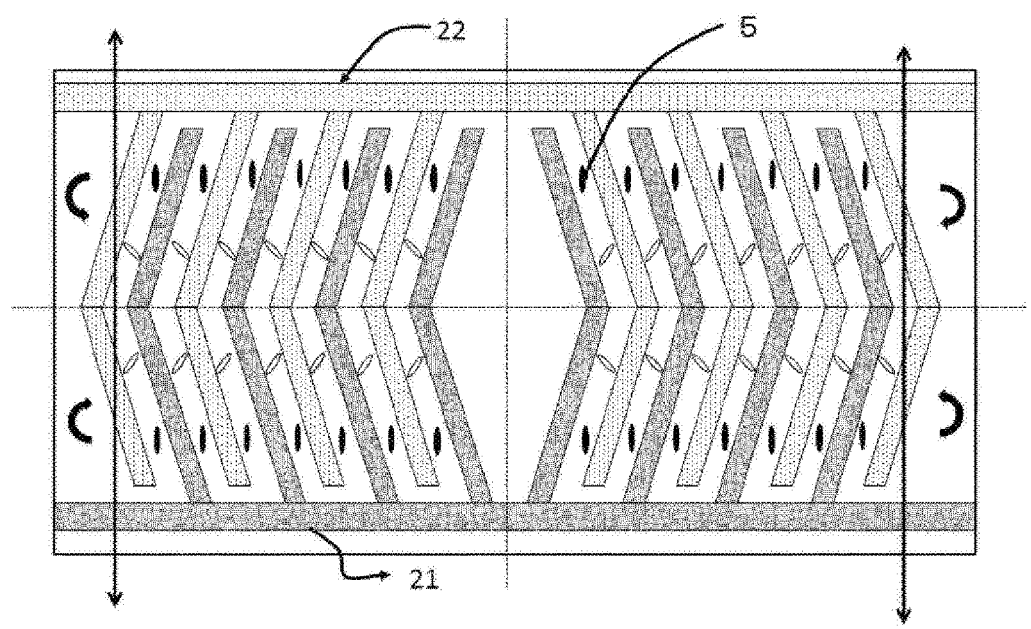
FIG. 16 shows a plan view of an electrode structure of an alignment-divided IPS-mode test cell and a schematic illustration of the motion of liquid crystal molecules.
Figure 17:
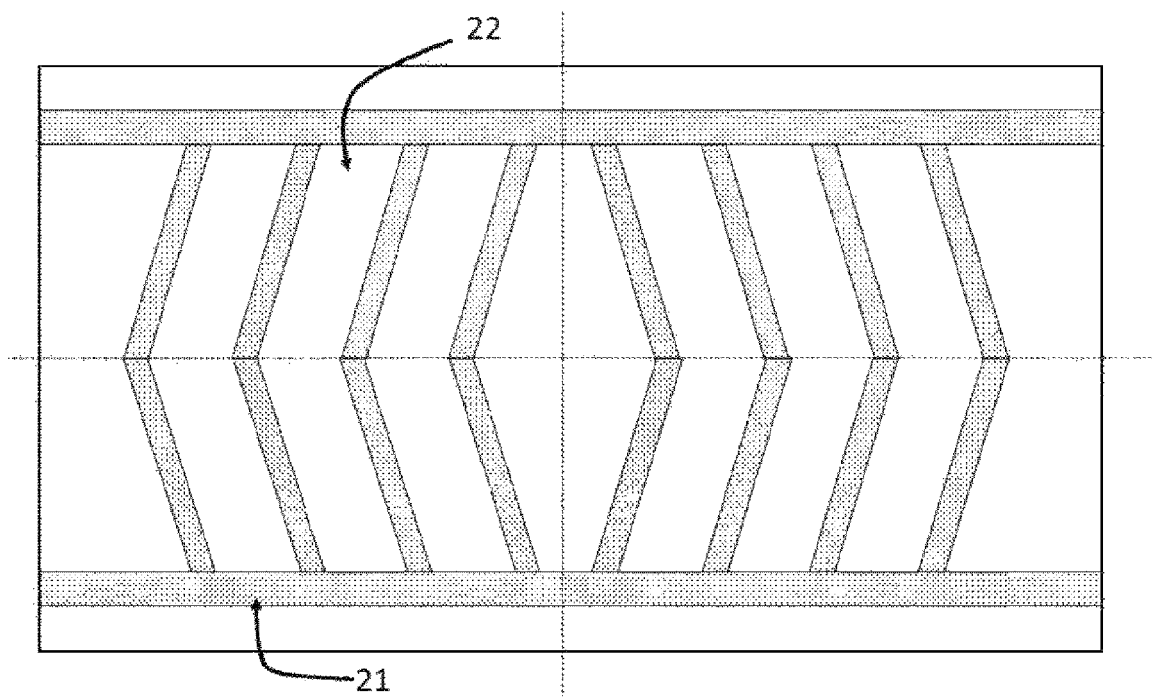
FIG. 17 is a plan view of an electrode structure of an alignment-divided FFS-mode test cell.

FIG. 12 is a schematic illustrate of an electrode structure of an eight-domain oblique electric field liquid crystal display device. As shown in the figure, by dividing one pixel into 8 sections, the viewing angle can be further increased.

Next, the operation of a liquid crystal display panel having the above-described structure will be described. When no voltage is applied to the liquid crystal layer, i.e., in a no electric field state (OFF state) in which no electric field is formed between the pixel electrode PE and the common electrode CE, liquid crystal molecules LM in the liquid crystal layer LQ are aligned such that their long axis is oriented in a first alignment treatment direction PD1 of the first alignment film AL1 or a second alignment treatment direction of a second alignment film AL2, as indicated by broken lines in FIG. 11. The above OFF state corresponds to the initial alignment state, and the alignment direction of the liquid crystal molecules LM in the OFF state corresponds to the initial alignment direction. Strictly speaking, the liquid crystal molecules LM are not necessarily aligned parallel to the X-Y plane and are often pretilted. Therefore, the precise initial alignment direction of the liquid crystal molecules LM is a direction obtained by orthogonally projecting the alignment direction of the liquid crystal molecules LM in the OFF state onto the X-Y plane.

Both the first alignment treatment direction PD1 and the second alignment treatment direction PD2 are substantially parallel to the second direction Y. In the OFF state, the liquid crystal molecules LM are in the initial alignment state in which their long axis is oriented in a direction substantially parallel to the second direction Y, as indicated by the broken lines in FIG. 11. Specifically, the initial alignment direction of the liquid crystal molecules LM is parallel to the second direction Y (or forms 0° with respect to the second direction Y).

In the example illustrated, the first alignment treatment direction PD1 and the second alignment treatment direction PD2 are parallel to each other and the same. In this case, in a cross section of the liquid crystal layer LQ, liquid crystal molecules LM near a central portion of the liquid crystal layer LQ are aligned substantially horizontally (the pretilt angle is almost zero). Liquid crystal molecules LM near the first alignment film AL1 and liquid crystal molecules LM near the second alignment film AL2 are aligned at their respective pretilt angles such that the liquid crystal molecules LM are oriented symmetrically with respect to the central portion serving as a boundary (splay alignment). When the liquid crystal molecules LM are in the splay alignment state as described above, the liquid crystal molecules LM near the first alignment film AL1 and the liquid crystal molecules LM near the second alignment film AL2 provide optical compensation even in a direction inclined from the direction normal to the substrates. Therefore, when the first alignment treatment direction PD1 and the second alignment treatment direction PD2 are parallel to each other and the same, the amount of leakage of light during black display is small, and a high contrast ratio can be achieved, so that display quality can be improved. When the first alignment treatment direction PD1 and the second alignment treatment direction PD2 are parallel but opposite to each other, liquid crystal molecules LM near the first alignment film AL1, near the second alignment film AL2, and in the central portion of the liquid crystal layer LQ are aligned at substantially the same pretilt angle in a cross section of the liquid crystal layer LQ (homogeneous alignment). Part of backlight from a backlight 4 passed through a first polarizing plate PL1 and enters a liquid crystal display panel LPN. The light entering the liquid crystal display panel LPN is linearly polarized light orthogonal to a first polarizing axis AX1 of the first polarizing plate PL1. The polarization state of the linearly polarized light undergoes almost no change when it passes through the liquid crystal display panel LPN in the OFF state. Therefore, the linearly polarized light passing through the liquid crystal display panel LPN is absorbed by a second polarizing plate PL2 that is disposed in a cross Nicol positional relation with respect to the first polarizing plate PL1 (black display).

When a voltage is applied to the liquid crystal layer LQ, i.e., when a potential difference is formed between the pixel electrode PE and the common electrode CE (the ON state), a horizontal electric field substantially parallel to the substrates (or an oblique electric field) is formed between the pixel electrode PE and the common electrode CE. Due to the influence of the electric field, the long axes of the liquid crystal molecules LM are rotated in a plane substantially parallel to the X-Y plane, as shown by solid lines in the figure.

In the example shown in FIG. 11, liquid crystal molecules LM in the lower half of a region between the pixel electrode PE and the main common electrode CAL rotate clockwise with respect to the second direction Y and are aligned so as to be oriented to the lower left in the figure, and liquid crystal molecules LM in the upper half rotate counterclockwise with respect to the second direction Y and are aligned so as to be oriented to the upper left in the figure. Liquid crystal molecules LM in the lower half of a region between the pixel electrode PE and the main common electrode CAR rotate counterclockwise with respect to the second direction Y and are aligned so as to be oriented to the lower right in the figure, and liquid crystal molecules LM in the upper half rotate clockwise with respect to the second direction Y and are aligned so as to be oriented to the upper right in the figure. When the electric field is formed between the pixel electrode PE and the common electrode CE in the pixel PX, the alignment directions of liquid crystal molecules LM differ in different regions separated by boundary portions corresponding to the pixel electrode PE, and a plurality of domains with different alignment directions are formed. Specifically, a plurality of domains are formed in each pixel PX.

During the ON state, when linearly polarized light orthogonal to the first polarizing axis AX1 of the first polarizing plate PL1 enters the liquid crystal display panel LPN, the polarization state of the linearly polarized light is changed according to the alignment state of the liquid crystal molecules LM during the passage of the linearly polarized light through the liquid crystal layer LQ. During the ON state, at least part of the light passing through the liquid crystal layer LQ passes through the second polarizing plate PL2 (white display). In the above structure, four domains can be formed in one pixel, and the viewing angle can be optically compensated in four directions, so that the viewing angle can be increased. Therefore, high-transmittance display with no tone reversal can be achieved, and a liquid crystal display device with good display quality can be provided. Moreover, by setting the opening areas of the four regions in each pixel that are separated by the pixel electrode PE and the common electrode CE to be substantially equal to each other, these regions can have substantially the same transmittance, and light beams passing through the openings optically compensate each other, so that uniform display over a wide viewing angle can be achieved.

EXAMPLES

The present invention will next be described in more detail by way of Examples, but the invention is not limited to these Examples. "%" in compositions in the following Examples and Comparative Examples means "% by mass."

Examples 1 to 21 and Reference Examples 1 to 4

The following N-type liquid crystal compositions were prepared: a liquid crystal composition represented by (LCN-1) below ($\Delta n$: 0.103, viscosity $\eta$: 15.1, $\Delta\varepsilon$-3.8); a liquid crystal composition represented by (LCN-2) ($\Delta n$: 0.12, viscosity $\eta$: 19 mPa·s, and $\Delta\varepsilon$: −3.3); and a liquid crystal composition represented by (LCN-3) ($\Delta n$: 0.11, viscosity $\eta$: 17 mPa·s, and $\Delta\varepsilon$: −3.2).

A compound represented by any of formulas (V1-1-1) to (V1-1-8) was used as a polymerizable liquid crystal compound.

A compound represented by any of formulas (Vn-2-1-1) to (Vn-2-1-6) and (Vn-2-2-1) to (Vn-2-2-6) was used as a polymerizable, photo-alignable compound. A small amount of the polymerizable, photo-alignable compound was added such that the amount of the polymerizable, photo-alignable compound was 1% by mass or less based on the total amount of the polymerizable liquid crystal compound and the polymerizable, photo-alignable compound.

A polymerization photo-initiator Irgacure 651 was added such that its content was 2% based on the total amount of the polymerizable liquid crystal compound and the polymerizable, photo-alignable compound. In the mixing ratio of In Tables, the values of the percentage of the polymerizable compound and the percentage of the polymerizable, photo-alignable compound include 2% of the polymerization photo-initiator.

[Chem. 144]

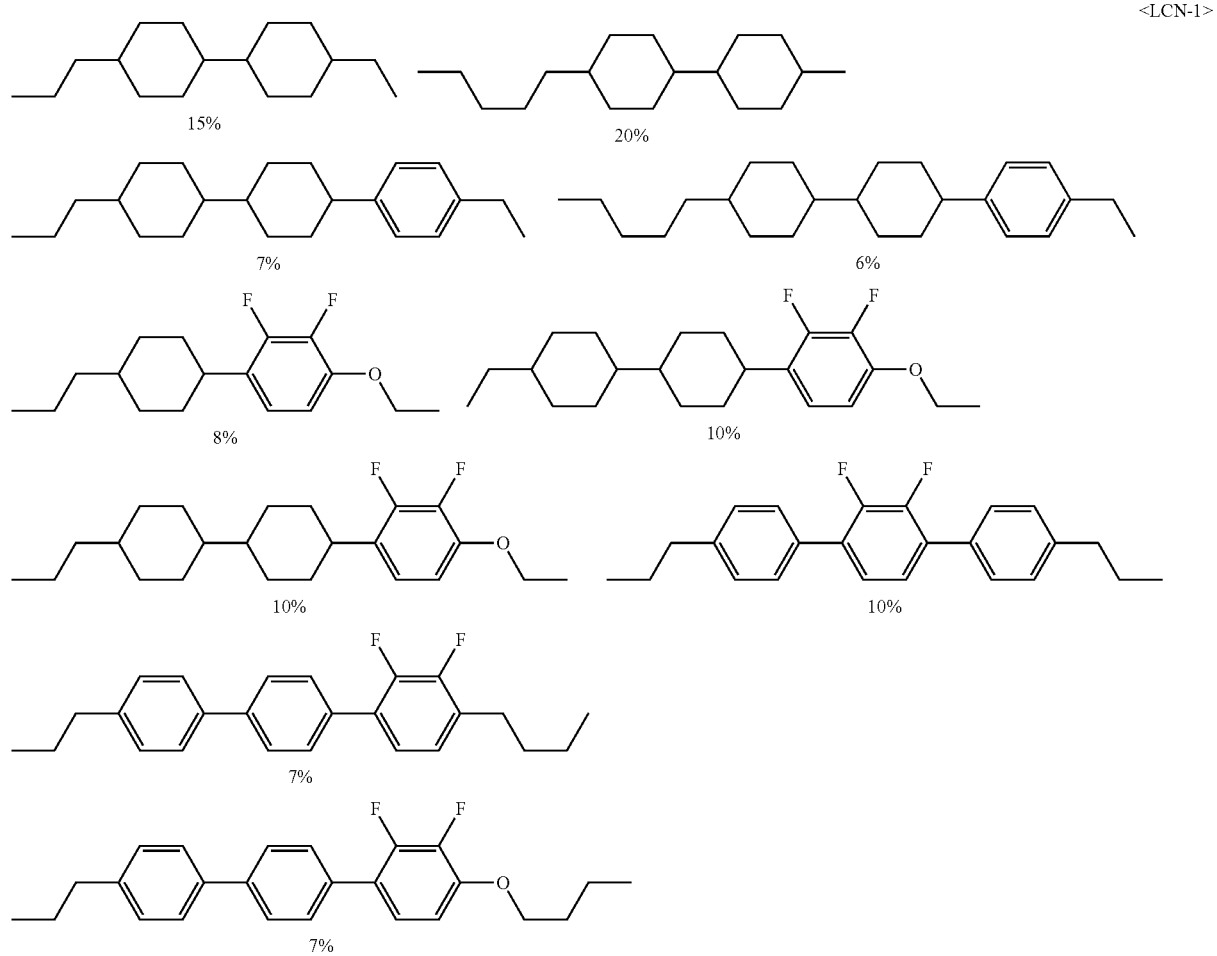

<LCN-1>

[Chem. 145]

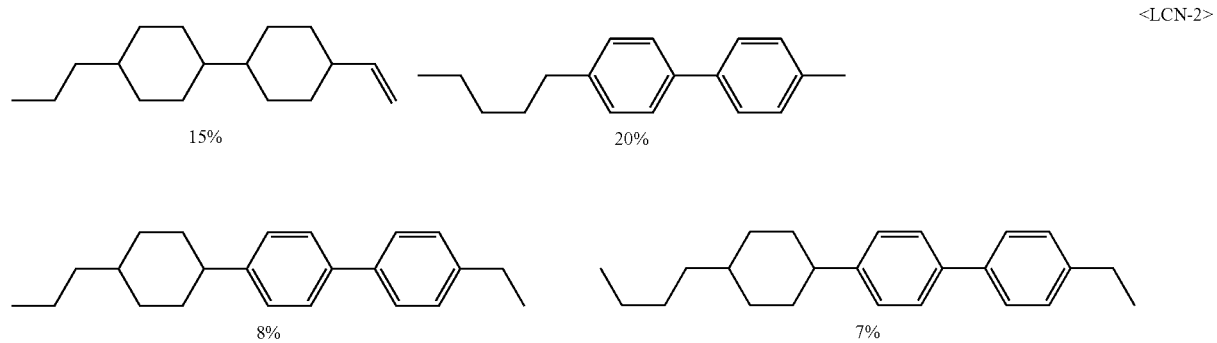

<LCN-2>

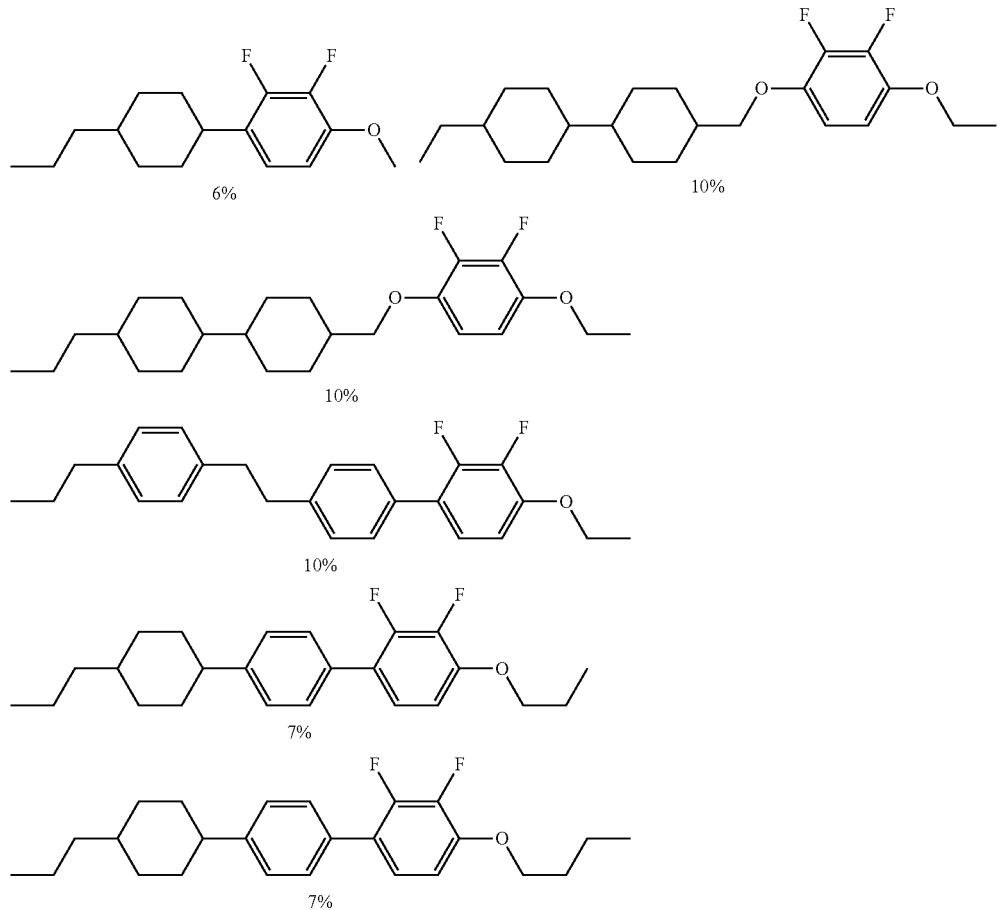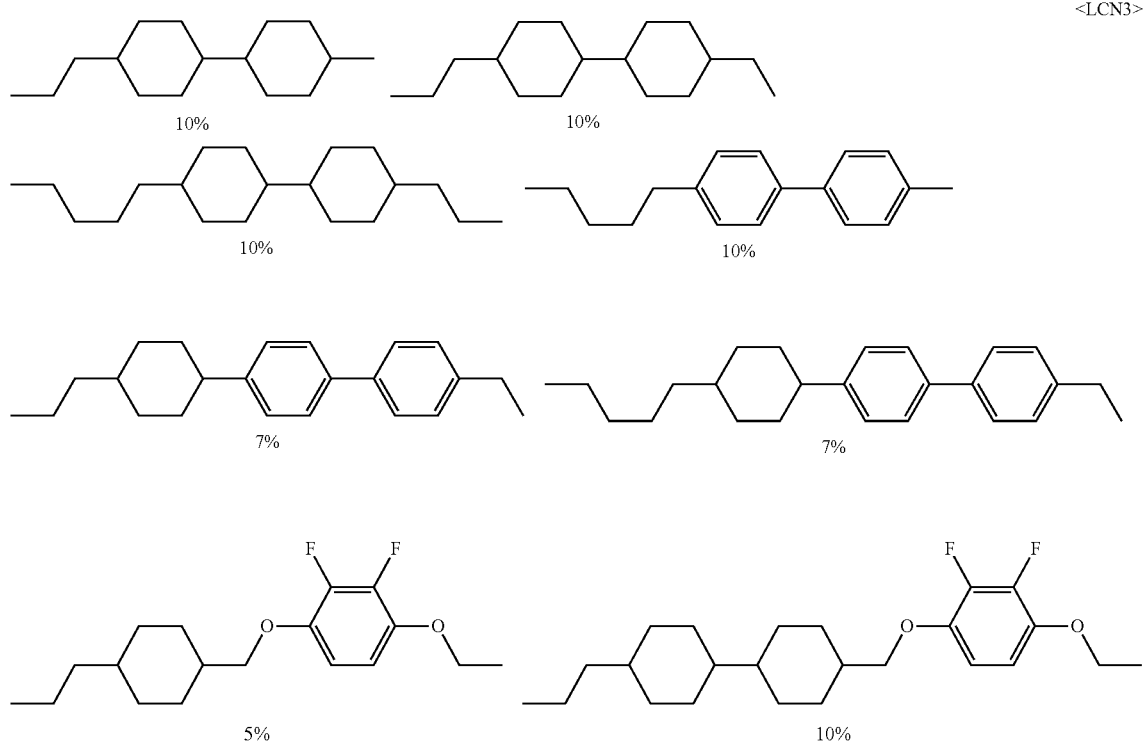

-continued
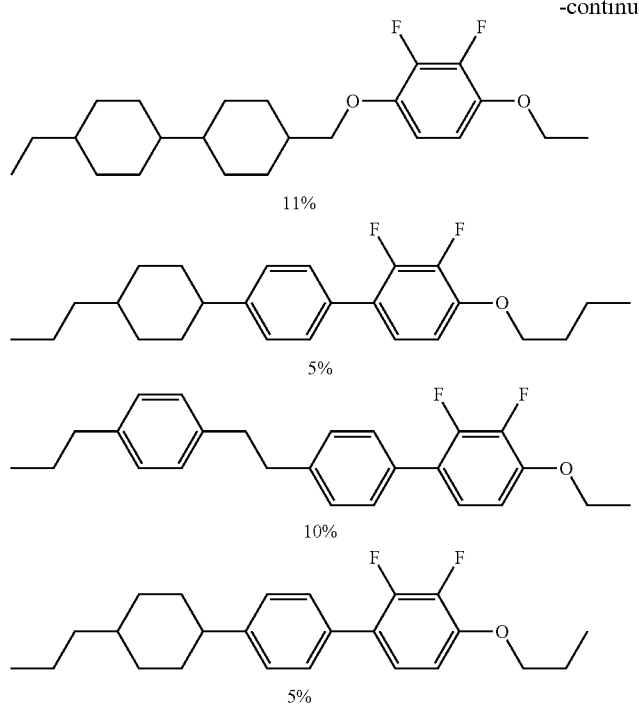
[Chem. 147]
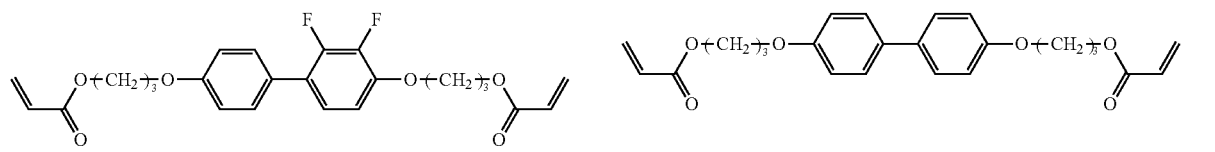
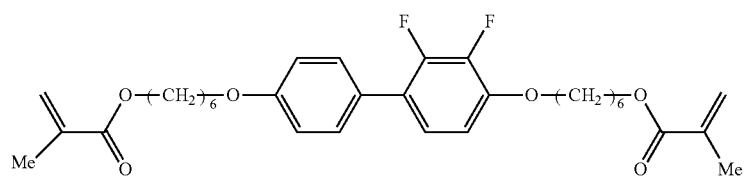
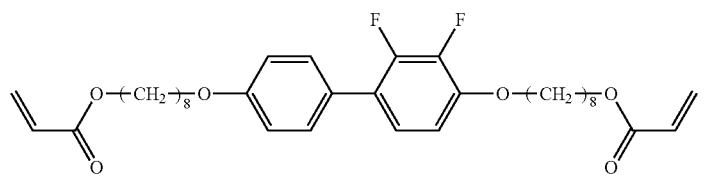
[Chem. 148]
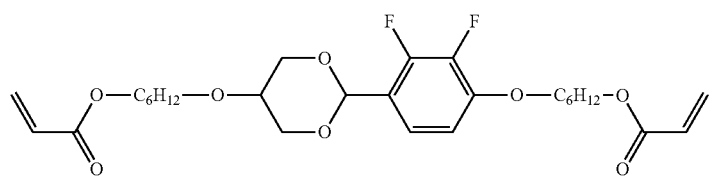
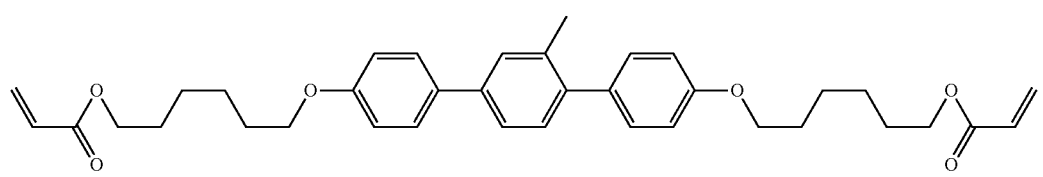

-continued
(V1-1-7)
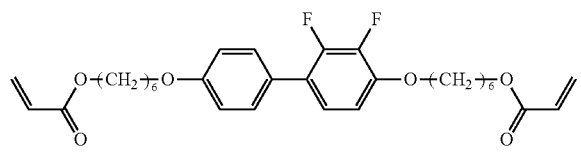
(V1-1-8)
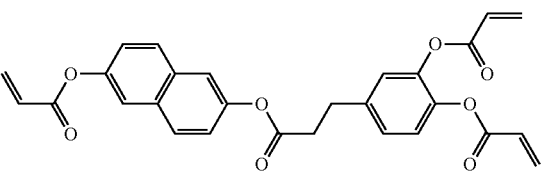
[Chem. 149]
(Vn-2-1-1)
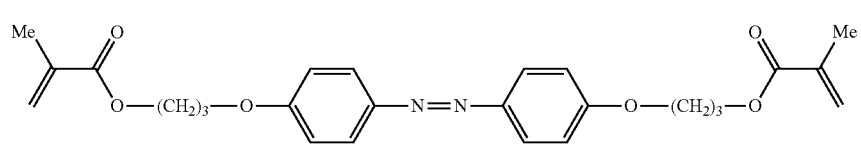
(Vn-2-1-2)
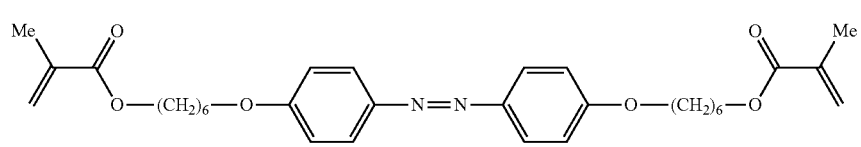
(Vn-2-1-3)
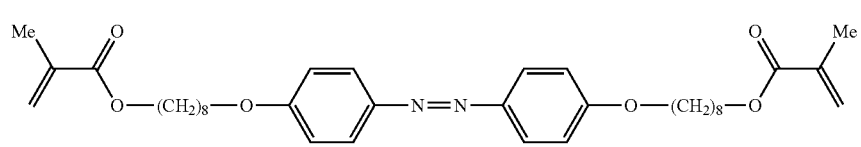
(Vn-2-1-4)
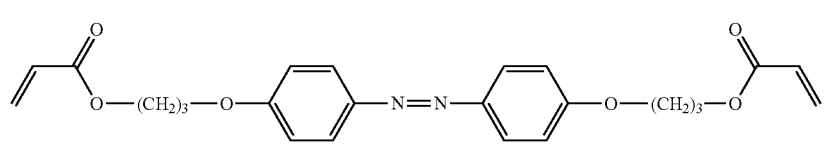
(Vn-2-1-5)
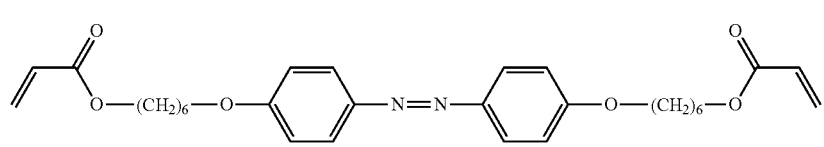
(Vn-2-1-6)
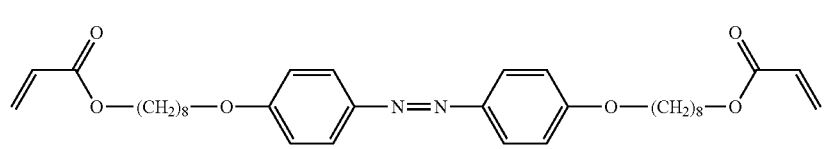
[Chem. 150]
(Vn-2-2-1)
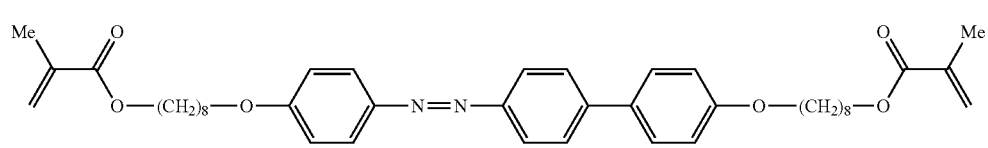
(Vn-2-2-2)
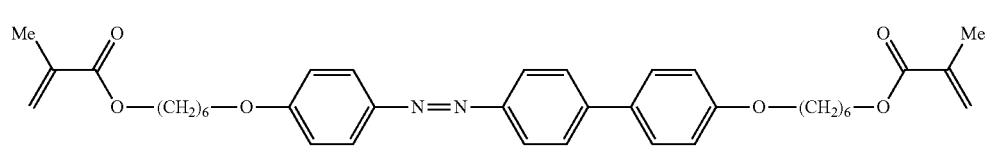
(Vn-2-2-3)
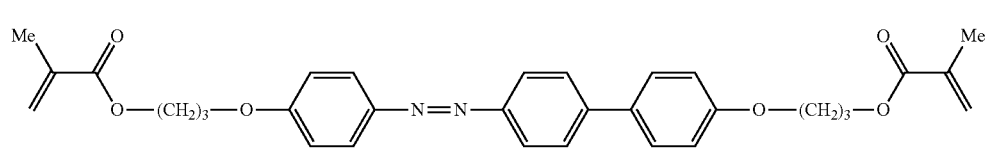

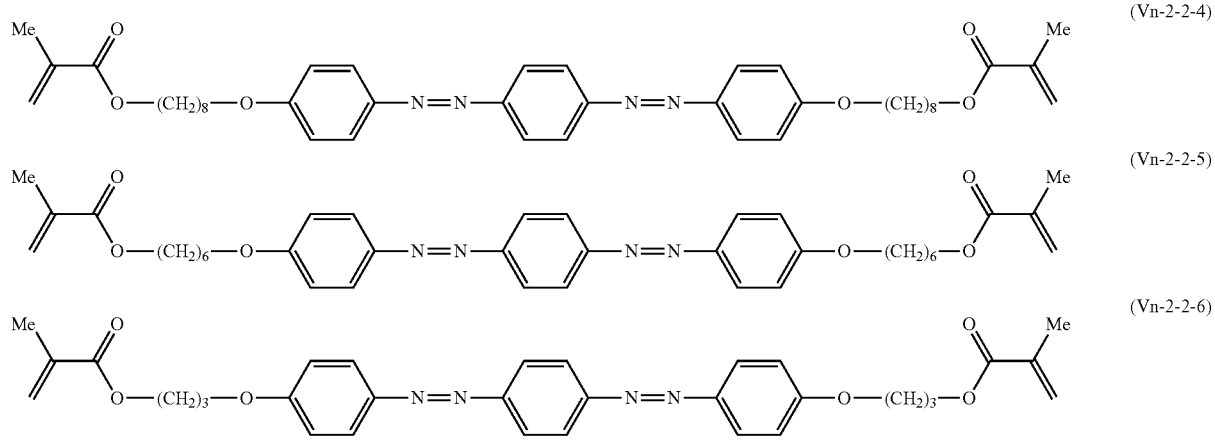

Example 1

The liquid crystal composition represented by LCN-2 above (Δn: 0.102, viscosity η: 16.8, and Δε: −3.8) was used as the N type liquid crystal composition; the compound represented by formula (V1-1-7) above was used as the polymerizable compound; and the compound represented by formula (Vn2-1-2) was used as the polymerizable, photo-alignable compound. These compounds were used at a ratio shown in a Table below. A polymerizable liquid crystal composition containing the polymerization photo-initiator Irgacure 651 in an amount of 2% based on the total amount of the polymerizable compound (V1-1-7) and the polymerizable, photo-alignable compound (Vn2-1-2) was prepared.

A parallel rubbing alignment cell with ITO and having a cell gap of 3 μm was used as a liquid crystal cell. This liquid crystal cell was prepared by applying polyimide alignment films and then subjecting the polyimide alignment films to rubbing alignment treatment such that the pretilt angle was 5° with respect to the direction normal to substrate surfaces in order to obtain vertical liquid crystal alignment (homeotropic alignment). As for the polymerizable liquid crystal composition, the polymerizable liquid crystal compound in solid form was heated to 60° C. and dissolved in the nematic liquid crystal composition. Then the resultant mixture was observed at room temperature under a polarizing microscope to confirm that the polymerizable liquid crystal compound was dissolved uniformly to form a nematic liquid crystal phase. The polymerizable liquid crystal composition prepared was injected into the glass cell using a vacuum injection method.

After the injection, the glass cell was removed, and the injection port was sealed with a sealing material 3026E (manufactured by ThreeBond Co., Ltd.). Then the liquid crystal cell was irradiated with collimated ultraviolet rays at an irradiation intensity of 15 mW/cm² for 80 seconds from the direction normal to the liquid crystal cell substrates through an ultraviolet cut filter L-37 (manufactured by HOYA CANDEO OPTRONICS CORPORATION). The polymerizable compounds dissolved in the polymerizable liquid crystal composition were thereby polymerized to obtain a VA mode liquid crystal display element. When the cell produced was placed between two orthogonal polarizing plates, the cell turned black, and this dark image did not change even when the cell was rotated in an azimuth angle direction. It was therefore confirmed that the optical axis direction of the polymer network was the same as the easy alignment axis direction of the liquid crystal. The cell with a voltage of 10 V applied thereto was observed under the polarizing microscope, and uniaxial alignment was confirmed.

A rectangular wave of 60 Hz was applied to the produced VA mode cell, and its voltage-transmittance characteristics, pretilt angle, and response times were measured. As for the voltage-transmittance characteristics, V90 represents the driving voltage and is the voltage necessary to change the transmittance by 90% of the total allowable change in transmittance. T0 is the level of blackness of the display at the minimum transmittance. T100 is the brightness of the display at the maximum transmittance. The rise time is the time necessary to switch from the OFF state to the ON state, and the decay time is the time necessary to return from the OFF state to the ON state. These response times were measured using the change in transmittance when a rectangular burst wave of 100 Hz was applied at V90 for 1 second. The transmittance when the polarizing plates were disposed in a parallel Nicol arrangement was set to 100%, and the intensity of transmitting light when the polarizing plates were disposed in a cross Nicol arrangement was set to 0%. The results are shown in a Table below.

The pretilt angle was examined by the measurement of the angle dependency of retardation using a rotating analyzer method. The polymerizable liquid crystal composition used to produce the cell was left to stand at 20° C. for one week, and it was confirmed that no crystallization of the polymerizable compounds occurred. The polymerizable liquid crystal composition used to produce the cell was left to stand at 20° C. for one week, and it was confirmed that no crystallization of the polymerizable compounds occurred.

Examples 2 to 21 and Reference Examples 1 to 4

VA mode liquid crystal display elements in Examples 2 to 21 and Reference Examples 1 to 4 were produced under the same conditions as in Example 1 except that an N-type liquid crystal composition, a polymerizable compound, a polymerizable, photo-alignable compound shown in Tables below were used at a ratio shown in the Tables and that the rubbing alignment treatment was performed such that a pretilt angle shown in the Tables below was obtained. A rectangular wave of 60 Hz was applied to each of the VA mode cells produced to measure their voltage-transmittance characteristics and response times. The results are shown in the following Tables.

TABLE 1

| | Liquid crystal | % | Polymerizable liquid crystal compound | % | Polymerizable, photo-alignable compound | % | Pretilt angle | V90 | T0 | T100 | Decay time | Rise time |
|---|---|---|---|---|---|---|---|---|---|---|---|---|
| Reference Example 1 | LCN-2 | 93 | V1-1-7 | 7 | — | 0 | 5.1 | 19.6 | 0.0 | 64.9 | 1.39 | 0.51 |
| Reference Example 2 | LCN-2 | 97 | V1-1-1 | 3 | — | 0 | 4.6 | 26.0 | 0.0 | 55.0 | 1.39 | 0.33 |
| Reference Example 3 | LCN-3 | 98 | V1-1-2 | 2 | — | 0 | 5.4 | 16.2 | 0.0 | 65.5 | 2.81 | 0.69 |
| Reference Example 4 | LCN-1 | 97 | V1-1-3 | 3 | — | 0 | 5.0 | 6.2 | 0.0 | 82.1 | 5.95 | 4.35 |
| Reference Example 5 | LCN-2 | 93 | V1-1-4 | 7 | — | 0 | 4.8 | 19.0 | 0.0 | 56.1 | 1.59 | 1.17 |
| Example 1 | LCN-2 | 93 | V1-1-7 | 6.97 | Vn-2-1-2 | 0.03 | 5.0 | 17.2 | 0.0 | 74.0 | 1.31 | 0.96 |
| Example 2 | LCN-2 | 93 | V1-1-7 | 6.97 | Vn-2-1-1 | 0.03 | 4.8 | 15.3 | 0.0 | 77.0 | 1.70 | 1.07 |
| Example 3 | LCN-2 | 93 | V1-1-7 | 6.97 | Vn-2-1-5 | 0.03 | 4.8 | 15.1 | 0.0 | 79.4 | 1.88 | 1.10 |
| Example 4 | LCN-2 | 93 | V1-1-7 | 6.97 | Vn-2-2-2 | 0.03 | 4.8 | 16.0 | 0.0 | 71.6 | 1.47 | 0.81 |
| Example 5 | LCN-2 | 92 | V1-1-7 | 7.966 | Vn-2-2-3 | 0.034 | 4.7 | 14.9 | 0.0 | 83.6 | 1.91 | 1.23 |
| Example 6 | LCN-2 | 93 | V1-1-7 | 6.97 | Vn-2-2-5 | 0.03 | 5.0 | 16.0 | 0.0 | 73.3 | 1.56 | 0.96 |
| Example 7 | LCN-1 | 93 | V1-1-7 | 6.97 | Vn-2-1-2 | 0.03 | 4.9 | 18.7 | 0.0 | 71.0 | 1.22 | 0.87 |
| Example 8 | LCN-1 | 93 | V1-1-7 | 6.97 | Vn-2-1-1 | 0.03 | 5.3 | 16.2 | 0.0 | 74.0 | 1.43 | 1.00 |
| Example 9 | LCN-1 | 93 | V1-1-7 | 6.97 | Vn-2-1-5 | 0.03 | 5.1 | 15.9 | 0.0 | 76.4 | 1.51 | 0.98 |
| Example 10 | LCN-1 | 93 | V1-1-7 | 6.97 | Vn-2-2-2 | 0.03 | 5.2 | 16.8 | 0.0 | 70.6 | 1.32 | 0.79 |

TABLE 2

| | Liquid crystal | % | Polymerizable liquid crystal compound | % | Polymerizable, photo-alignable compound | % | Pretilt angle | V90 | T0 | T100 | Decay time | Rise time |
|---|---|---|---|---|---|---|---|---|---|---|---|---|
| Example 11 | LCN-1 | 92 | V1-1-7 | 7.966 | Vn-2-2-3 | 0.03 | 4.9 | 15.7 | 0.0 | 81.3 | 1.43 | 1.13 |
| Example 12 | LCN-1 | 93 | V1-1-7 | 6.97 | Vn-2-2-5 | 0.03 | 4.7 | 17.0 | 0.0 | 71.2 | 1.32 | 0.89 |
| Example 13 | LCN-3 | 94 | V1-1-7 | 5.97 | Vn-2-1-2 | 0.03 | 4.7 | 15.0 | 0.0 | 77.4 | 1.73 | 1.84 |
| Example 14 | LCN-2 | 94 | V1-1-7 | 5.94 | Vn-2-1-1 | 0.06 | 4.8 | 14.4 | 0.0 | 76.2 | 1.93 | 1.58 |
| Example 15 | LCN-2 | 93 | V1-1-7 | 6.93 | Vn-2-2-2 | 0.07 | 4.7 | 16.2 | 0.0 | 72.0 | 1.48 | 0.85 |
| Example 16 | LCN-2 | 93 | V1-1-7 | 6.93 | Vn-2-2-3 | 0.07 | 5.1 | 15.8 | 0.0 | 72.7 | 1.50 | 0.96 |
| Example 17 | LCN-2 | 93 | V1-1-7 | 6.93 | Vn-2-2-5 | 0.07 | 4.7 | 16.9 | 0.0 | 70.7 | 1.43 | 0.88 |
| Example 18 | LCN-1 | 93 | V1-1-5 | 6.97 | Vn-2-1-3 | 0.03 | 5.2 | 18.1 | 0.0 | 75.1 | 1.36 | 0.89 |
| Example 19 | LCN-1 | 93 | V1-1-6 | 6.97 | Vn-2-2-3 | 0.03 | 5.2 | 19.0 | 0.0 | 78.0 | 1.57 | 0.50 |
| Example 20 | LCN-3 | 97 | V1-1-8 | 2.96 | Vn-2-2-6 | 0.04 | 4.8 | 20.8 | 0.0 | 75.6 | 1.90 | 0.29 |
| Example 21 | LCN-2 | 97 | V1-1-4 | 2.98 | Vn-2-1-6 | 0.02 | 5 | 8.0 | 0.0 | 81.9 | 3.37 | 2.59 |

It was found that, when the polymer network was formed such that its optical axis direction matched the easy alignment axis of the liquid crystal, the decay time was reduced due to the effect of the anchoring force of the polymer network. It was confirmed that, when a cell with a transmittance of 70% or more was observed under a polarizing microscope with a voltage of 10 V applied to the cell while a rotation stage of the polarizing microscope was rotated such that a dark image was obtained, the dark image with uniaxial alignment was observed. When the transmittance was less than 70%, white spots of a size of about 1 μm were found in the uniaxial alignment dark image. This indicates that the alignment of the liquid crystal was disturbed by the polymer network.

Examples 22 and 23

The liquid crystal composition represented by LCN-3 above (Δn: 0.11, viscosity η: 17 mPa·s, and Δε: −3.2) was used as the N-type liquid crystal composition; the compound represented by formula (V1-1-7) above was used as the polymerizable compound; and the compound represented by formula (Vn2-1-2) was used as the polymerizable, photo-alignable compound. These compounds were used at a ratio shown in a Table below. A polymerizable liquid crystal composition containing the polymerization photo-initiator Irgacure 651 in an amount of 2% based on the total amount of the polymerizable compound (V1-1-7) and the polymerizable, photo-alignable compound (Vn2-1-2) were thereby prepared.

A parallel rubbing alignment cell with ITO and having a cell gap of 3 μm was used as a liquid crystal cell. This liquid crystal cell was prepared by applying polyimide alignment films and then subjecting the polyimide alignment films to rubbing alignment treatment such that the pretilt angle was 5° with respect to the direction normal to substrate surfaces in order to obtain vertical alignment (homeotropic alignment) of the liquid crystal. As for the polymerizable liquid crystal composition, the polymerizable liquid crystal compound in solid form was heated to 90° C. and dissolved in the nematic liquid crystal composition. Then the resultant mixture was observed at room temperature under a polarizing microscope to confirm that the polymerizable liquid crystal compound was dissolved uniformly to form a nematic liquid crystal phase. The polymerizable liquid crystal composition prepared was injected into the glass cell using the vacuum injection method.

After the injection, the glass cell was removed, and the injection port was sealed with a sealing material 3026E (manufactured by ThreeBond Co., Ltd.). Then the liquid crystal cell was irradiated with collimated ultraviolet rays at an irradiation intensity of 2 mW/cm² for 600 seconds from a direction inclined 250 with respect to the direction normal to the liquid crystal cell substrates through an ultraviolet cut filter L-37 (manufactured by HOYA CANDEO OPTRONICS CORPORATION) (Example 22). In Example 23, the liquid crystal cell was irradiated with collimated ultraviolet rays at an irradiation intensity of 2 mW/cm² for 600 seconds from the direction normal to the liquid crystal cell substrates through the ultraviolet cut filter L-37 (manufactured by HOYA CANDEO OPTRONICS CORPORATION). The polymerizable compounds dissolved in the polymerizable liquid crystal composition were thereby polymerized to obtain VA mode liquid crystal display elements. When each cell produced was placed between two orthogonal polarizing plates, the cell turned black, and this dark image did not change even when the cell was rotated in an azimuth angle direction. It was therefore confirmed that the optical axis direction of the polymer network was the same as the easy alignment axis direction of the liquid crystal A rectangular wave of 60 Hz was applied to each of the produced VA mode cells, and the voltage-transmittance characteristics and the response times were measured. The results are shown in the following table.

voltage is applied, 6 color filter, 7 second transparent insulating substrate, 8 polarizing plate, 9 continuous or discontinuous polymer network, 10 liquid crystal display element, 11 gate electrode, 12 gate insulating layer, 13 semiconductor layer, 14 protective layer, 15 ohmic contact layer, 16 drain electrode, 17 source electrode, 18 insulating protective layer, 21 pixel electrode, 22 common electrode, 23 storage capacitor, 24 gate line, 25 data line, 26 gate lines, 27 source electrode, 28 gate electrode, 29 common line, 100 polarizing plate, 110 gate electrode, 120 gate insulating layer, 130 semiconductor layer, 140 protective layer, 160 drain electrode, 190*b* organic insulating film, 200 first substrate, 210 pixel electrode, 220 storage capacitor, 230 drain electrode, 240 data line, 250 gate line, 260 source electrode, 270 gate electrode, 300 thin film transistor layer, 400 alignment film, 500 liquid crystal layer, 510 liquid crystal display device, 512 pixel electrode, 512*a* pixel trunk electrode, 512*b* pixel branch electrode, 512*c* pixel slit, 516 scan line, 517 signal line, 600 common electrode, 700 color filter, 800 second substrate, 900 polarizing plate, 1000 liquid crystal display element, 1400 transparent electrode (layer), PX pixel, PE pixel electrode, PA main pixel electrode, PB sub-pixel electrode, CE common electrode, CA main common electrode, CAL left main common electrode, CAR right main common electrode, CB sub-common electrode, CBU upper sub-common electrode, CBB lower sub-common electrode

TABLE 3

|  | Liquid crystal | % | Polymerizable liquid crystal compound | % | Polymerizable, photo-alignable compound | % | Pretilt angle | V90 | T0 | T100 | Decay time | Rise time | Exposure angle |
|---|---|---|---|---|---|---|---|---|---|---|---|---|---|
| Example 22 | LCN-3 | 94 | V1-1-7 | 5.94 | Vn-2-1-1 | 0.06 | 7.1 | 15.7 | 0.0 | 80.1 | 1.93 | 1.58 | 25 |
| Example 23 | LCN-3 | 94 | V1-1-7 | 5.94 | Vn-2-1-1 | 0.06 | 5.2 | 18.1 | 0.0 | 76.3 | 1.20 | 0.84 | 0 |

As can be seen from the results in the above Examples, when the polymer network was formed such that its optical axis direction matched the easy alignment axis of the liquid crystal, the decay time was reduced due to the effect of the anchoring force of the polymer network. Each cell was observed under a polarizing microscope with a voltage of 10 V applied to the cell, and uniaxial alignment was confirmed.

When ultraviolet exposure was performed in the direction normal to the cell (Example 23), the pretilt angle after polymerization was substantially the same as the pretilt angle, i.e., 5°, induced in the liquid crystal cell by the alignment treatment. In (Example 22), ultraviolet exposure was performed at an inclination of 25° with respect to the direction normal to the cell substrates. Therefore, the pretilt angle was changed to 7.1°, and the inclination direction of the liquid crystal molecules under an electric field was defined, so that the transmittance T100 was improved.

Each of the polymerizable liquid crystal compositions used to produce the cells was left to stand at 20° C. for 1 week, and it was found that no crystallization of the polymerizable compounds occurred.

REFERENCE SIGNS LIST

1 polarizing plate, 2 first transparent insulating substrate, 3 electrode layer, 4 alignment film, 4*a* alignment direction, 5 liquid crystal layer, 5*a* liquid crystal molecule when no voltage is applied, 5*b* liquid crystal molecules when a

The invention claimed is:

1. A liquid crystal display element comprising: two transparent substrates, at least one of the two transparent substrates being provided with an electrode; a liquid crystal composition sandwiched between the two transparent substrates and containing at least one liquid crystal compound; and a copolymer included in the liquid crystal composition, the copolymer being a cured product of a polymerizable composition that contains at least two polymerizable compounds, wherein the polymerizable compounds used comprise at least one polymerizable, photo-alignable compound (Vn), and wherein the content of the polymerizable composition is 1% by mass or more and less than 40% by mass based on the total weight of the polymerizable composition and the liquid crystal composition wherein the at least one polymerizable, photo-alignable compound (Vn) used comprise at least one selected from polymerizable, photo-alignable compounds represented by the following general formula (Vn-1):

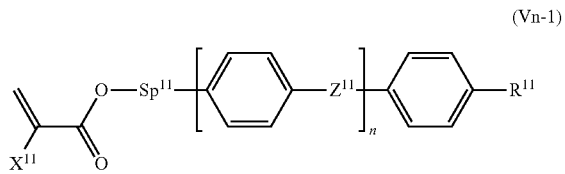

(Vn-1)

wherein X¹¹ represents a hydrogen atom or a methyl group;

Sp¹¹ represents a single bond, an alkylenegroup having 1 to 12 carbon atoms, or —O—(CH₂)ₛ₁— wherein s1 represents an integer of 1 to 11, and the oxygen atom in —O—(CH₂)ₛ₁— is bonded to an aromatic ring;

n represents an integer of 1 to 3;

Z¹¹ represents —OCH₂—, —CH₂O—, —COO—, —OCO—, —CF₂O—, —OCF₂—, —CH₂CH₂—, —CF₂CF₂—, —CH═CH—COO—, —CH═CH—OCO—, —COO—CH═CH—, —OCO—CH═CH—, —COO—CH₂CH₂—, —OCO—CH₂CH₂—, —CH₂CH₂—COO—, —CH₂CH₂—OCO—, —COO—CH₂—, —OCO—CH₂—, —CH₂—COO—, —CH₂—OCO—, —C≡C—, a single bond, —CY¹═CY²— wherein Y¹ and Y² each independently represent a hydrogen atom or a fluorine atom, —CH═N—, —N═CH—, or —N═N—; when a plurality of Z¹¹s are present, they may be the same or different, but at least one Z" is —CH═CH—, —CH═N—, —N═CH—, or —N═N—; and R¹¹ represents a hydrogen atom, a fluorine atom, a chlorine atom, a bromine atom, an iodine atom, a pentafluorosulfuranyl group, a cyano group, a nitro group, an isocyano group, a thioisocyano group, a linear or branched alkyl group which has 1 to 12 carbon atoms and in which one —CH₂— group or at least two nonadjacent —CH₂— groups are each independently optionally substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, or a group represented by formula (Vn-1-1):

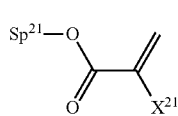

(Vn-1-1)

wherein, in formula (Vn-1-1), X²¹ represents a hydrogen atom or a methyl group; Sp²¹ represents a single bond, an alkylene group having 1 to 12 carbon atoms, or —O—(CH₂)ₛ₂— wherein s2 represents an integer of 1 to 11, and the oxygen atom in —O—(CH₂)ₛ₂— is bonded to an aromatic ring, wherein, in each 1,4-phenylene group present in formula (Vn-1), any hydrogen atom is optionally substituted with a fluorine atom, a fluorinated methyl group, a fluorinated methoxy group, an alkyl group having 1 or 2 carbon atoms, or the group represented by formula (Vn-1-1), and wherein, when a plurality of X²'s and Sp²'s are present, they may be the same or different, wherein the polymerizable compounds comprise at least one compound selected from compounds represented by the following general formula (P):

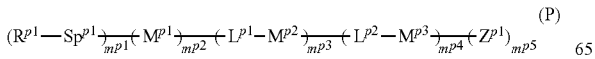

(P)

wherein Z^{p1} represents a fluorine atom, a cyano group, a hydrogen atom, an alkyl group which has 1 to 15 carbon atoms and in which any hydrogen atom is optionally substituted with a halogen atom, an alkoxy group which has 1 to 15 carbon atoms and in which any hydrogen atom is optionally substituted with a halogen atom, an alkenyl group which has 1 to 15 carbon atoms and in which any hydrogen atom is optionally substituted with a halogen atom, an alkenyloxy group which has 1 to 15 carbon atoms and in which any hydrogen atom is optionally substituted with a halogen atom, or -Sp^{p2}-R^{p2};

R^{p1} and R^{p2} each independently represent any of the following formulas (R-I) to (R-IX):

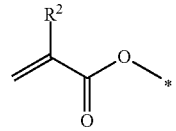

(R-I)

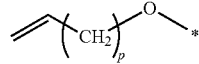

(R-II)

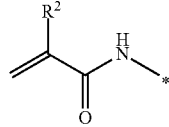

(R-III)

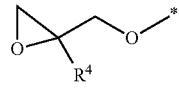

(R-IV)

(R-V)

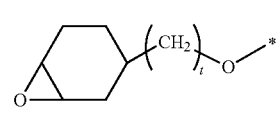

(R-VI)

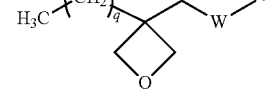

(R-VII)

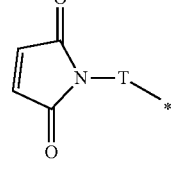

(R-VIII)

(R-IX)

HS—* wherein, in formulas (R-I) to (R-IX), R² to R⁶ are each independently a hydrogen atom, an alkyl group having 1 to 5 carbon atoms, or a halogenated alkyl group having 1 to 5 carbon atoms; W is a single bond, —O—, or a methylene group; T is a single bond or —COO—; and p, t, and q are each independently 0, 1, or 2, Sp^{p1} and Sp^{p2} each represent a spacer group, and Sp^{p1} and Sp^{p2} each independently represent a single bond, an alkylene group having 1 to 12 carbon atoms, or —O—(CH$_2$)$_s$— wherein s is an integer from 1 to 11, and the oxygen atom in —O—(CH$_2$)$_s$— is bonded to an aromatic ring, wherein L$^{p1}$ and L$^{p2}$ each independently represent a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —OCH$_2$CH$_2$O—, —CO—NR$^a$—, —NR$^a$—CO—, —SCH$_2$—, —CH$_2$S—, —CH=CR$^a$—COO—, —CH=CR$^a$—OCO—, —COO—CR$^a$=CH—, —OCO—CR$^a$=CH—, —COO—CR$^a$=CH—COO—, —COO—CR$^a$=CH—OCO—, —OCO—CR$^a$=CH—COO—, —OCO—CR$^a$=CH—OCO—, —(CH$_2$)$_z$—C(=O)—O—, —(CH$_2$)$_z$—O—(C=O)—, —O—(C=O)—(CH$_2$)$_z$—, —(C=O)—O—(CH$_2$)$_z$—, —CH=CH—, —CF=CF—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— wherein each Ra independently represents a hydrogen atom or an alkyl group having 1 to 4 carbon atoms, and z represents an integer of 1 to 4, wherein M$^{p2}$ represents a 1,4-phenylene group, a 1,4-cyclohexylene group, an anthracene-2,6-diyl group, a phenanthrene-2,7-diyl group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, and M$^{p2}$ may be unsubstituted or substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen atom, a cyano group, a nitro group, or —R$^{p1}$, wherein M$^{p1}$ represents any of the following formulas (i-11) to (ix-11):

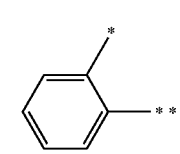
(i-11)

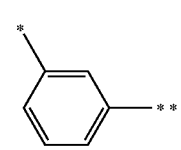
(ii-11)

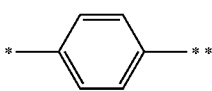
(iii-11)

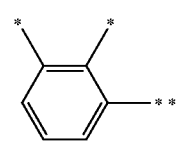
(iv-11)

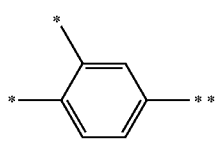
(v-11)

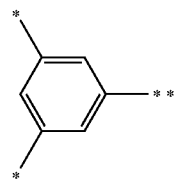
(vi-11)

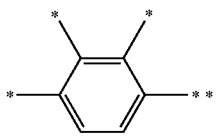
(vii-11)

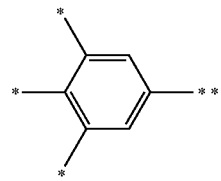
(viii-11)

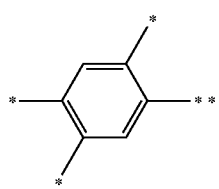
(ix-11)

wherein * represents a bond to Sp$^{p1}$, and ** represents a bond to L$^{p1}$ or L$^{p2}$, wherein M$^{p3}$ represents any of the following formulas (i-13) to (ix-13):

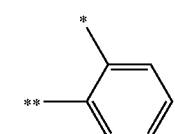
(i-13)

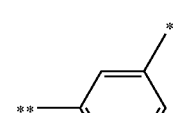
(ii-13)

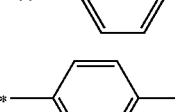
(iii-13)

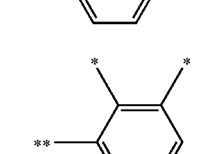
(iv-13)

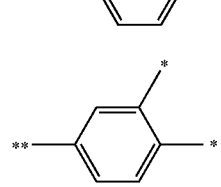
(v-13)

-continued

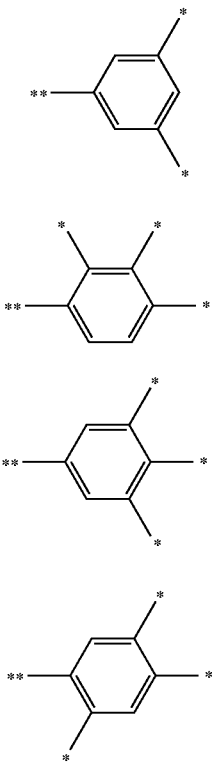

(vi-13)

(vii-13)

(viii-13)

(ix-13)

wherein * represents a bond to $Z^{p1}$, and ** represents a bond to $L^{p2}$, and
wherein $m^{p2}$ to $m^{p4}$ each independently represent 0, 1, 2, or 3; $m^{p1}$ and $m^{p5}$ each independently represent 1, 2, or 3; when a plurality of $Z^{p1}$s are present, they may be the same or different when a plurality of $R^{p1}$s are present, they may be the same or different when a plurality of $R^{p2}$s are present, they may be the same or different when a plurality of $Sp^{p1}$s are present, they may be the same or different when a plurality of $Sp^{p2}$s are present, they may be the same or different when a plurality of $L^{p1}$s are present, they may be the same or different and when a plurality of $M^{p2}$s are present, they may be the same or different.

2. The liquid crystal display element according to claim 1, wherein the copolymer in the liquid crystal composition forms a polymer network, and wherein the liquid crystal display element further comprises alignment layers that are disposed on the respective transparent substrates and used to align the liquid crystal composition.

3. The liquid crystal display element according to claim 2, wherein the polymer network has uniaxial refractive index anisotropy, and wherein an optical axis direction or an easy alignment axis direction of the polymer network matches an easy alignment axis direction of the liquid crystal composition.

4. The liquid crystal display element according to claim 1, wherein the liquid crystal composition has a pretilt angle of 0 to 90° with respect to a direction normal to the transparent substrates.

5. The liquid crystal display element according to claim 2, wherein the polymer network forms a layer having a thickness of a cell in a cross-sectional direction of the cell, the thickness being at least 0.5%.

6. The liquid crystal display element according to claim 2, wherein an optical axis direction or an easy alignment axis direction of the polymer network forms a pretilt angle of 0.1 to 30.0° with respect to a direction normal to the transparent substrates.

7. The liquid crystal display element according to claim 1, wherein the at least one polymerizable, photo-alignable compound represented by general formula (Vn-1) is used in an amount of 0.005% by mass or more and less than 1.0% by mass based on the total amount of the polymerizable compounds comprising the at least one polymerizable, photo-alignable compound and the liquid crystal composition.

8. The liquid crystal display element according to claim 1, wherein the liquid crystal composition contains a liquid crystal compound represented by the following general formula (LC):

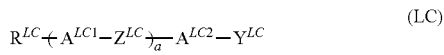

(LC)

wherein, in general formula (LC), $R^{LC}$ represents an alkyl group having 1 to 15 carbon atoms; at least one $CH_2$ group in the alkyl group is each optionally substituted with —O—, —CH=CH—, —CO—, —COO—, or provided that no oxygen atoms are directly adjacent to each other; at least one hydrogen atom in the alkyl group is each optionally substituted with a halogen atom; $A^{LC1}$ and $A^{LC2}$ each independently represent a group selected from the group consisting of a group (a), a group (b), and a group (c) below:
(a) a trans-1,4-cyclohexylene group (one $CH_2$ group or two or more non-adjacent $CH_2$ groups present in the trans-1,4-cyclohexylene group are each optionally substituted with an oxygen atom or a sulfur atom,
(b) a 1,4-phenylene group wherein one CH group or two or more non-adjacent CH groups present in the 1,4-phenylene group are each optionally substituted with a nitrogen atom, and
(c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chroman-2,6-diyl group;
wherein at least one hydrogen atom contained in each of the group (a), the group (b), and the group (c) is each optionally substituted with a fluorine atom, a chlorine atom, —$CF_3$, or —$OCF_3$,
wherein $Z^{LC}$ represents a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—,
wherein $Y^{LC}$ represents a hydrogen atom, a fluorine atom, a chlorine atom, a cyano group, or an alkyl group having 1 to 15 carbon atoms; at least one $CH_2$ group in the alkyl group is each optionally substituted with —O—, —CH=CH—, —CO—, —OCO—, —COO—, —C≡C—, —$CF_2O$—, or —$OCF_2$—, provided that no oxygen atoms are directly adjacent to each other; and at least one hydrogen atom in the alkyl group is each optionally substituted with a halogen atom, and
wherein a represents an integer of 1 to 4; when a is 2, 3, or 4 and a plurality of $A^{LC1}$s are present in general formula (LC), the plurality of $A^{LC1}$s may be the same or different; and when a is 2, 3, or 4 and a plurality of $Z^{LC}$s are present, the plurality of $Z^{LC}$s may be the same or different.

9. The liquid crystal display element according to claim 1, wherein the liquid crystal display element has a VA mode, IPS mode, FFS mode, VA-TN mode, TN mode, or ECB mode cell structure.

10. A liquid crystal display element comprising: two transparent substrates, at least one of the two transparent substrates being provided with an electrode; a liquid crystal composition sandwiched between the two transparent substrates and containing at least one liquid crystal compound; and a copolymer included in the liquid crystal composition, the copolymer being a cured product of a polymerizable composition that contains at least two polymerizable compounds, wherein the polymerizable compounds used comprise at least one polymerizable, photo-alignable compound (Vn), wherein the content of the polymerizable composition in a composition comprising the polymerizable composition and the liquid crystal composition is 1% by mass or more and less than 40% by mass based on the total weight of the polymerizable composition and the liquid crystal composition, and wherein the polymerizable compounds in the composition are polymerized by irradiation with energy rays, wherein the at least one polymerizable, photo-alignable compound (Vn) used comprise at least one selected from polymerizable, photo-alignable compounds represented by the following general formula (Vn-1):

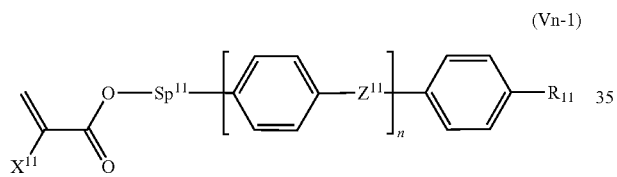

(Vn-1)

wherein $X^{11}$ represents a hydrogen atom or a methyl group;

$Sp^{11}$ represents a single bond, an alkylene group having 1 to 12 carbon atoms, or —O—$(CH_2)_{s1}$— wherein s1 represents an integer of 1 to 11, and the oxygen atom in —O—$(CH_2)_{s1}$— is bonded to an aromatic ring;

n represents an integer of 1 to 3;

$Z^{11}$ represents —$OCH_2$—, —$CH_2O$—, —COO—, —OCO—, —$CF_2O$—, —$OCF_2$—, —$CH_2CH_2$—, —$CF_2CF_2$—, —CH═CH—COO—, —CH═CH—OCO—, —COO—CH═CH—, —OCO—CH═CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —C≡C—, a single bond, —$CY^1$═$CY^2$— wherein $Y^1$ and $Y^2$ each independently represent a hydrogen atom or a fluorine atom, —CH═N—, —N═CH—, or —N═N—; when a plurality of $Z^{11}$s are present, they may be the same or different, but at least one $Z^{11}$ is —CH═CH—, —CH═N—, —N═CH—, or —N═N—; and $R^{11}$ represents a hydrogen atom, a fluorine atom, a chlorine atom, a bromine atom, an iodine atom, a pentafluorosulfuranyl group, a cyano group, a nitro group, an isocyano group, a thioisocyano group, a linear or branched alkyl group which has 1 to 12 carbon atoms and in which one —$CH_2$— group or at least two nonadjacent —$CH_2$— groups are each independently optionally substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, or a group represented by formula (Vn-1-1):

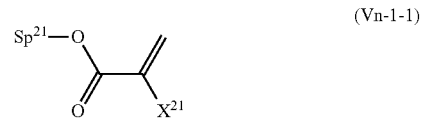

(Vn-1-1)

wherein, in formula (Vn-1-1), $X^{21}$ represents a hydrogen atom or a methyl group; $Sp^{21}$ represents a single bond, an alkylene group having 1 to 12 carbon atoms, or —O—$(CH_2)_{s2}$— wherein s2 represents an integer of 1 to 11, and the oxygen atom in —O—$(CH_2)_{s2}$— is bonded to an aromatic ring, wherein, in each 1,4-phenylene group present in formula (Vn-1), any hydrogen atom is optionally substituted with a fluorine atom, a fluorinated methyl group, a fluorinated methoxy group, an alkyl group having 1 or 2 carbon atoms, or the group represented by formula (Vn-1-1), and wherein, when a plurality of $X^{21}$s and $Sp^{21}$s are present, they may be the same or different, wherein the polymerizable compounds comprise at least one compound selected from compounds represented by the following general formula (P):

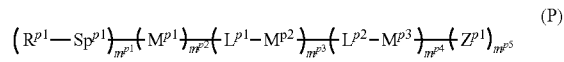

(P)

wherein $Z^{p1}$ represents a fluorine atom, a cyano group, a hydrogen atom, an alkyl group which has 1 to 15 carbon atoms and in which any hydrogen atom is optionally substituted with a halogen atom, an alkoxy group which has 1 to 15 carbon atoms and in which any hydrogen atom is optionally substituted with a halogen atom, an alkenyl group which has 1 to 15 carbon atoms and in which any hydrogen atom is optionally substituted with a halogen atom, an alkenyloxy group which has 1 to 15 carbon atoms and in which any hydrogen atom is optionally substituted with a halogen atom, or -$Sp^{p2}$-$R^{p2}$;

$R^{p1}$ and $R^{p2}$ each independently represent any of the following formulas (R-I) to (R-IX):

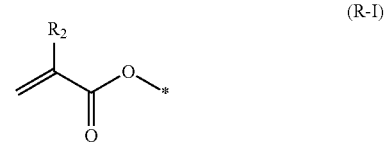

(R-I)

(R-II)

-continued

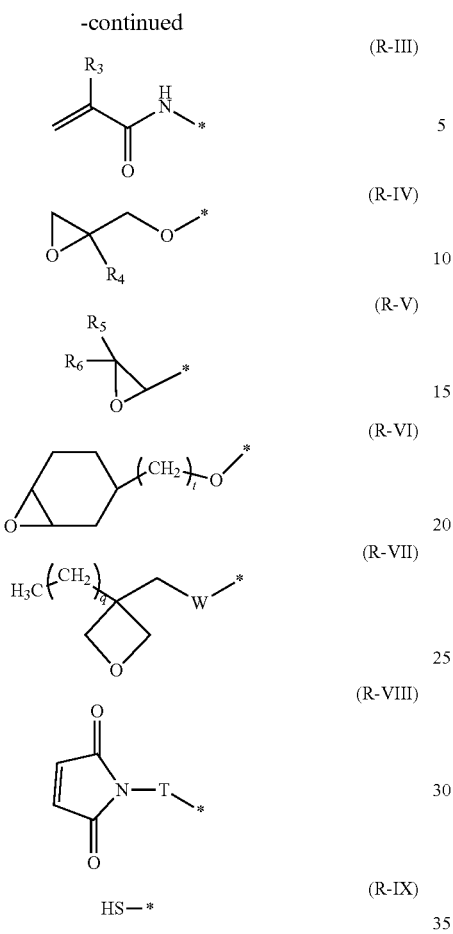

(R-III)

(R-IV)

(R-V)

(R-VI)

(R-VII)

(R-VIII)

(R-IX)

wherein, in formulas (R-I) to (R-IX), $R^2$ to $R^6$ are each independently a hydrogen atom, an alkyl group having 1 to 5 carbon atoms, or a halogenated alkyl group having 1 to 5 carbon atoms; W is a single bond, —O—, or a methylene group; T is a single bond or —COO—; and p, t, and q are each independently 0, 1, or 2, $Sp^{p1}$ and $Sp^{p2}$ each represent a spacer group, and $Sp^{p1}$ and $Sp^{p2}$ each independently represent a single bond, an alkylene group having 1 to 12 carbon atoms, or —O—(CH$_2$)$_s$— wherein s is an integer from 1 to 11, and the oxygen atom in —O—(CH$_2$)$_s$— is bonded to an aromatic ring, wherein $L^{p1}$ and $L^{p2}$ each independently represent a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —OCH$_2$CH$_2$O—, —CO—NR$^a$—, —NR$^a$—CO—, —SCH$_2$—, —CH$_2$S—, —CH═CR$^a$—COO—, —CH═CR$^a$—OCO—, —COO—CR$^a$═CH—, —OCO—CR$^a$═CH—, —COO—CR$^a$═CH—COO—, —COO—CR$^a$═CH—OCO—, —OCO—CR$^a$═CH—COO—, —OCO—CR$^a$═CH—OCO—, —(CH$_2$)$_z$—C(═O)—O—, —(CH$_2$)$_z$—O—(C═O)—, —O—(C═O)—(CH$_2$)$_z$—, —(C═O)—O—(CH$_2$)$_z$—, —CH═CH—, —CF═CF—, —CF═CH—, —CH═CF—, —CF$_2$—, —CF$_2$O—, —OCF$_2$—, —CF$_2$CH$_2$—, —CH$_2$CF$_2$—, —CF$_2$CF$_2$—, or —C≡C— wherein each Ra independently represents a hydrogen atom or an alkyl group having 1 to 4 carbon atoms, and z represents an integer of 1 to 4, wherein $M^{p2}$ represents a 1,4-phenylene group, a 1,4-cyclohexylene group, an anthracene-2,6-diyl group, a phenanthrene-2,7-diyl group, a pyridine-2,5-diyl group, a pyrimidine-2,5-diyl group, a naphthalene-2,6-diyl group, an indan-2,5-diyl group, a 1,2,3,4-tetrahydronaphthalene-2,6-diyl group, or a 1,3-dioxane-2,5-diyl group, and $M^{p2}$ may be unsubstituted or substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen atom, a cyano group, a nitro group, or —$R^{p1}$, wherein $M^{p1}$ represents any of the following formulas (i-11) to (ix-11):

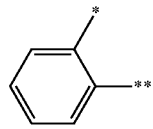

(i-11)

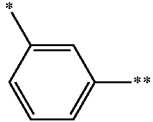

(ii-11)

(iii-11)

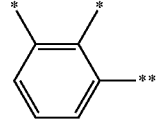

(iv-11)

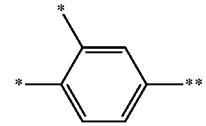

(v-11)

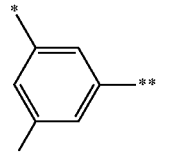

(vi-11)

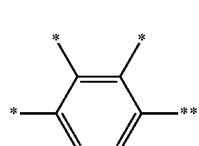

(vii-11)

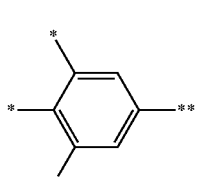

(viii-11)

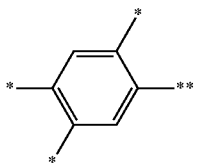

(ix-11)

wherein * represents a bond to $Sp^{p1}$, and ** represents a bond to $L^{p1}$ or $L^{p2}$, wherein $M^{p3}$ represents any of the following formulas (i-13) to (ix-13):

(i-13)

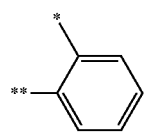

(ii-13)

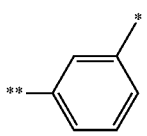

(iii-13)

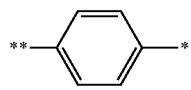

(iv-13)

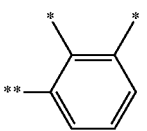

(v-13)

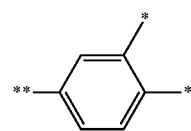

(vi-13)

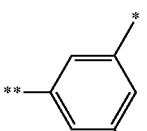

(vii-13)

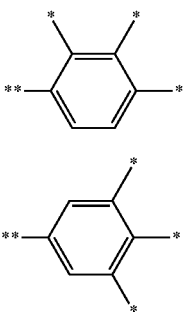

(viii-13)

(ix-13)

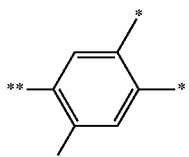

wherein * represents a bond to $Z^{p1}$, and ** represents a bond to $L^{p2}$, and wherein $m^{p2}$ to $m^{p4}$ each independently represent 0, 1, 2, or 3; $m^{p1}$ and $m^{p5}$ each independently represent 1, 2, or 3; when a plurality of $Z^{p1}$s are present, they may be the same or different; when a plurality of $R^{p1}$s are present, they may be the same or different; when a plurality of $R^{p2}$s are present, they may be the same or different when a plurality of $Sp^{p1}$s are present, they may be the same or different when a plurality of $Sp^{p2}$s are present, they may be the same or different when a plurality of $L^{p1}$s are present, they may be the same or different and when a plurality of $M^{p2}$s are present, they may be the same or different.

11. The liquid crystal display element according to claim 10, wherein the polymerizable compounds in the composition are polymerized by irradiation with the energy rays at a temperature of −50° C. to 30° C.

12. The liquid crystal display element according to claim 10, wherein the polymerizable compounds in the composition are polymerized by irradiation with the energy rays while a voltage is applied such that a pretilt angle with respect to a direction normal to the transparent substrates before irradiation with the energy rays is 0.1 to 30°.

* * * * *